US006189077B1

(12) United States Patent
Robertson et al.

(10) Patent No.: US 6,189,077 B1
(45) Date of Patent: Feb. 13, 2001

(54) TWO COMPUTER ACCESS CIRCUIT USING ADDRESS TRANSLATION INTO COMMON REGISTER FILE

(75) Inventors: Iain C. Robertson, Bedfordshire (GB); Jeffrey L. Nye, Houston; Michael D. Asal, Sugar Land, both of TX (US); Graham B. Short; Richard D. Simpson, both of Bedford (GB); James G. Littleton, Houston, TX (US)

(73) Assignee: Texas Instruments Incorporated, Dallas, TX (US)

( * ) Notice: Under 35 U.S.C. 154(b), the term of this patent shall be extended for 0 days.

(21) Appl. No.: 08/476,786

(22) Filed: Jun. 7, 1995

Related U.S. Application Data

(62) Division of application No. 08/359,324, filed on Dec. 15, 1994, now Pat. No. 5,546,553.

(51) Int. Cl.$^7$ .................................................. G06F 12/00
(52) U.S. Cl. .......................................... 711/149; 711/209
(58) Field of Search ............................. 395/412, 421.09, 395/495; 711/149, 209

(56) References Cited

U.S. PATENT DOCUMENTS

| 4,541,076 | * | 9/1985 | Bowers et al. .................. 365/230.05 |
| 4,694,426 | * | 9/1987 | Mason ................................... 365/78 |
| 4,894,797 | * | 1/1990 | Walp ..................................... 364/900 |
| 4,899,352 | * | 2/1990 | Cucchi et al. ...................... 375/118 |
| 4,968,906 | * | 11/1990 | Pham et al. ......................... 307/480 |
| 5,345,419 | * | 9/1994 | Fenstermaker et al. ......... 365/189.04 |
| 5,371,877 | * | 12/1994 | Drako et al. ........................ 395/425 |
| 5,473,756 | * | 12/1995 | Taylor ................................... 395/250 |

FOREIGN PATENT DOCUMENTS

2123590 * 5/1990 (JP) ................................ 365/230.05

* cited by examiner

*Primary Examiner*—Jack A. Lane
(74) *Attorney, Agent, or Firm*—Robert D. Marshall, Jr.; W. James Brady, III; Frederick J. Telecky, Jr.

(57) ABSTRACT

An access circuit for data swapping between two computers and a computer system including the access circuit. Each computer including an address bus for supplying addresses and a data bus for transferring data. The access circuit includes a register file and two address decoder circuits. The register file has a plurality of storage locations for storing data. The register file has dual data ports capable of simultaneous data transfer via the first data port with a first data storage location and via the second data port with a second, different storage location. Each address decoder is connected to the address bus of a corresponding computer and the register file. The address decoders translate an address received on the address bus to a storage location of the register file. Two handshakes circuits are connected to respective address decoders and digital computers. The first and second address decoders are connected to each other. When the storage location of the first address decoder equals the storage location of the second address decoder, one of the handshake circuits signals the corresponding digital computer a memory waitstate or memory fault. At least one of the decoders is be programmable to position in the address space of the corresponding computer. At least one the address decoders includes an autoincrement circuit advances the accessed storage location within the register file to a next storage location upon each data transfer.

6 Claims, 71 Drawing Sheets

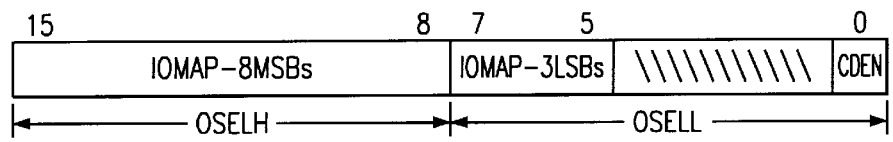
FIG. 7A
FIG. 7B
FIG. 7C
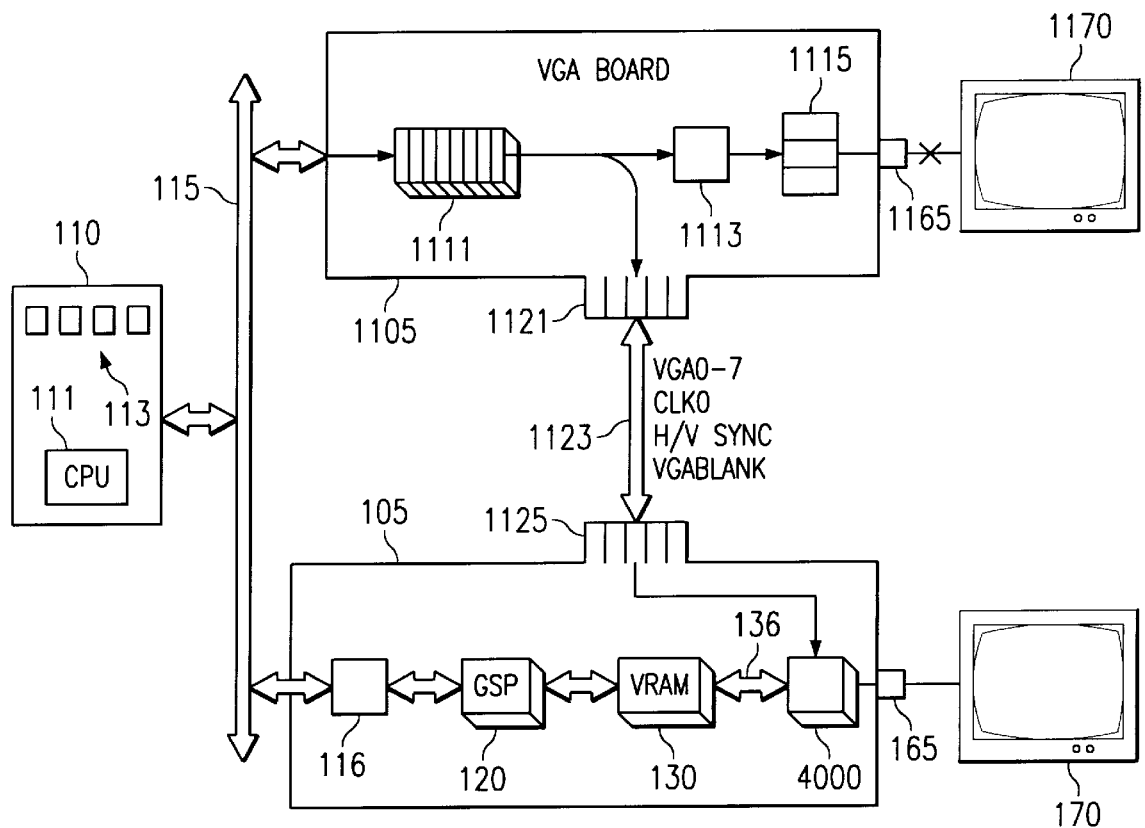
FIG. 8

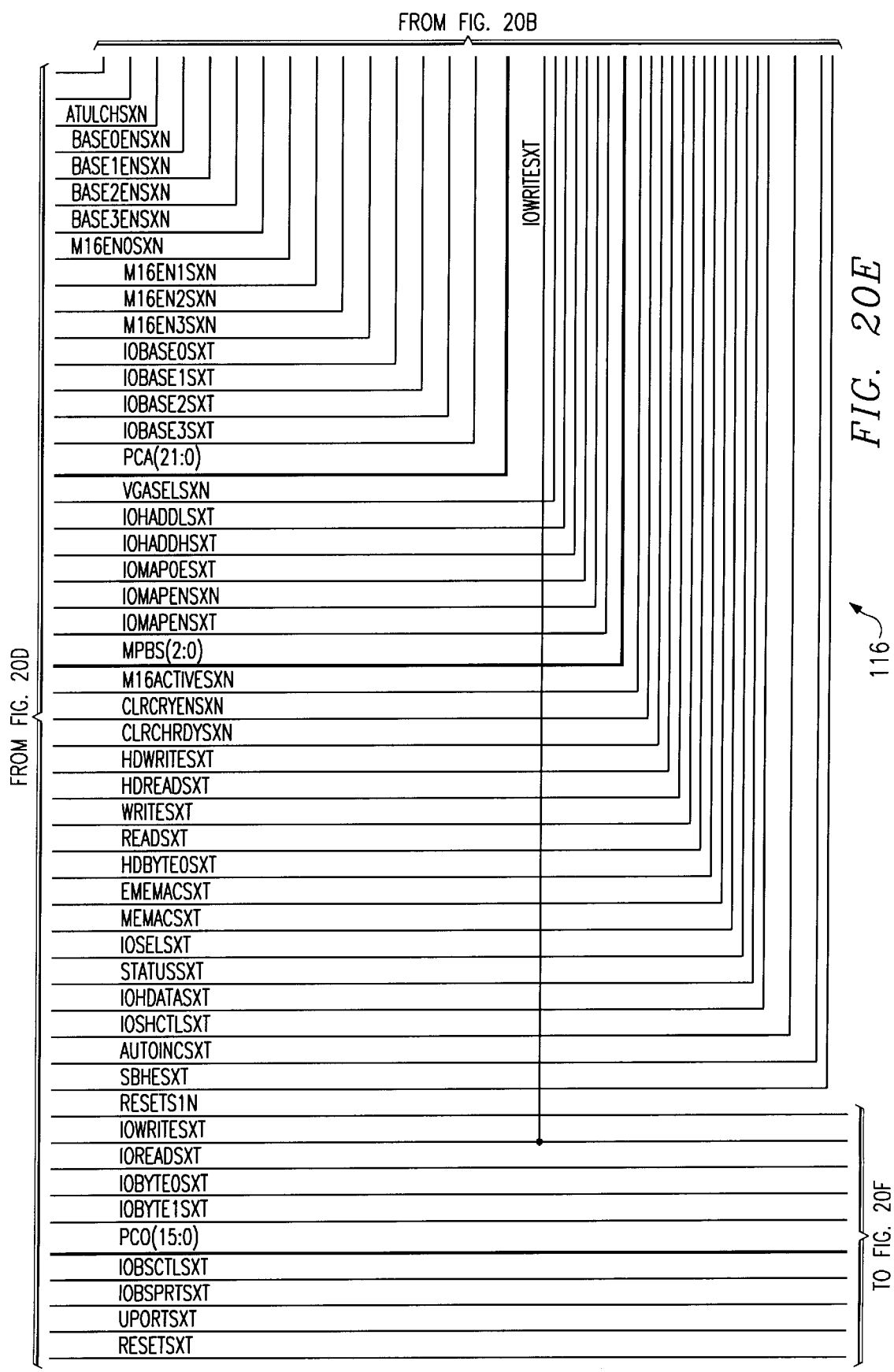

FIG. 33  MMDECODE

TWO COMPUTER ACCESS CIRCUIT USING ADDRESS TRANSLATION INTO COMMON REGISTER FILE

This application is a divisional of U.S. patent application Ser. No. 08/359,324 filed Dec. 15, 1994, U.S. Pat. No. 5,546,553 which is a continuation of U.S. patent application Ser. No. 07/586,914 filed Sep. 24, 1990.

CROSS-REFERENCE TO RELATED APPLICATIONS

The following coassigned patent applications are hereby incorporated herein by reference as background and supporting information to the subject matter disclosed herein:

Ser. No. 446,019, filed Dec. 5, 1989, "Data Communications System";

Ser. No. 08/978,457, filed Nov. 19, 1992 and now abandoned, Ser. No. 798,278, filed Nov. 20, 1991 and now abandoned; a continuation of Ser. No. 408,454, filed Sep. 14, 1989, and now abandoned; a continuation of Ser. No. 256,803, filed Oct. 11, 1988 and now abandoned; a continuation of Ser. No. 821,375 filed Jan. 22, 1986 and now abandoned "Data Processing System with Variable Memory Bank Selection; and Japanese analog laid-open application No. 13275/1987;

Ser. No. 965,561 filed Oct. 23, 1992; a continuation of Ser. No. 426,480, filed Oct. 23, 1989, and now abandoned; a continuation of Ser. No. 346,388 filed Apr. 27, 1989 and now abandoned; a continuation of Ser. No. 207,034 filed Jun. 13, 1988 and now abandoned; a continuation of Ser. No. 821,641 filed Jan. 23, 1986 "Graphics Data Processor, A Data Processing System, A Graphics Processing System and a Method of Processing Graphics Data";

U.S. Pat. No. 5,161,122, "Register Write Bit Protection Apparatus and Method";

Ser. No. 387,569, filed Jul. 28, 1989 and now abandoned, "Graphics Display Split-Serial Register System";

U.S. Pat. No. 5,329,617, "Graphics Processor Nonconfined Address Calculation System";

Ser. No. 386,850, filed Jul. 28, 1989 and now abandoned, "Real Time and Slow Memory Access Mixed Bus Usage";

U.S. Pat. No. 5,341,470, "Computer Graphics Systems, Palette Device and Methods for Shift Clock Pulse Insertion During Blanking".

BACKGROUND OF THE INVENTION

Without limiting the general scope of the invention, its background is described in connection with computer graphics, as one example only.

In computer systems, a host computer can be programmed to perform general purpose tasks including graphics routines. Greater speed and additional features are often desirable, and so a graphics coprocessor is added to supplement the capabilities of the host computer.

The graphics coprocessor is also called a graphics system processor (GSP), examples of which are the Texas Instruments TMS34010 and TMS34020 GSPs. The addition of a graphics coprocessor makes the computer system a multiprocessor system which can benefit from advances in the art of multiprocessor technology. Also, different computer bus architectures are in use today such as the ISA and MCA architectures, and this situation complicates system and circuit definition. Furthermore, several different kinds of memory such as ROM, DRAM (dynamic random access memory) and VRAM (video RAM) are useful with computers that have graphics capability, and are desirably accommodated. A host computer may have one memory address space, which is an allocation of different memory addresses to different functions according to an address map, and the GSP may have another memory address space.

Any improvements in multiprocessor technology, memory and addressing management and other aspects relating to host computers and graphics system processors are desirable so that graphics and other computer and electronic systems can be made faster and more convenient in commercial application.

SUMMARY OF THE INVENTION

Generally, and in one form of the invention, a multifunction access circuit is provided for use with first and second digital computers each having an address bus for supplying addresses and a data bus for supplying data. The access circuit has an address decoder with inputs for the address bus from the first computer, and an address translator circuit having address inputs for addresses supplied by the address bus of the first computer and outputs for translated addresses to the address bus of the second computer. The address translator circuit also has registers selectable by the address decoder and data inputs to program the registers so selected with data from the data bus from the first computer. Also in the access circuit is a port circuit with registers controlled by the address decoder for entry of address information from the data bus of the first computer and assertion of the address information on the address bus of the second computer. Further, a mode control circuit is connected to the address decoder and connected to the data bus to program the mode control circuit to selectively establish operation of the address translator circuit and of the port circuit.

In general, another form of the invention is a multifunction access circuit with an address decoder having inputs from the address bus from the first computer, and an address translator circuit having address inputs for addresses supplied by the address bus of the first computer and outputs for translated addresses to the address bus of the second computer. The address translator circuit also has registers selectable by the address decoder and data inputs to program the registers so selected with data from the data bus from the first computer. A bank select circuit is responsive to addresses from the address bus of the second computer to supply a set of bank select outputs.

In general, a further form of the invention is a multifunction access circuit having a first address decoder with inputs for the address bus and a read line from the first computer. A second address decoder has inputs for the address bus and a write line from the second computer. A logic circuit is provided with a register selectable by either of the first address decoder and the second address decoder and having data outputs for connection to the data bus from the first computer, and having data inputs for connection to the data bus from the second computer.

Generally, still another form of the invention is a memory access circuit for use with a computer operative to assert read and write signals and an address. The circuit has a memory accessible by asserting addresses thereto, an address translator circuit having address inputs for the address supplied by the computer and outputs for supplying a translated address, and a logic circuit connected to the outputs of the address translator circuit and responsive to a write signal to automatically increment the translated address for the memory and responsive to a control signal to return to the translated address. Control circuitry connected to the logic circuit and responsive to a read signal from the computer supplies the control signal to the logic circuit to return to the translated address.

In general, a yet further form of the invention is a multifunction access circuit for use with first and second digital computers each having an address bus for addresses. The access circuit has an address translator circuit with address inputs for addresses supplied by the address bus of the first computer and outputs for translated addresses to the address bus of the second computer. The address translator circuit also has registers establishing predetermined address segments, and the address translator circuit is responsive to addresses on the address inputs in the address segments. Control logic circuitry is connected to said address translator circuit and operative to supply a control signal when the address at the address inputs changes from one segment to another segment.

In general, a still further form of the invention is a multifunction access circuit that has a register file having data inputs and outputs connected to the data bus for each of the first and second digital computers, and a pair of address decoders connected to the address bus for each of the first and second computers, the decoders connected to the register file to support simultaneous reads and writes.

Other circuits, devices, systems, and methods are described and claimed herein.

BRIEF DESCRIPTION OF THE DRAWINGS

These and other features of the present invention will be readily understood from the following Description, taken in conjunction with the Drawings, in which:

FIG. 7A is a diagram of host bus address bits according to an ISA bus architecture;

FIG. 7B is a diagram of an option select register;

FIG. 7C is a diagram of host bus address bits according to an MCA bus architecture;

FIG. 8 is a block diagram of a computer graphics system with a VGA board and having an added printed wiring board as in FIGS. 1, 4 and 5 with VGA pass through;

Corresponding numerals and symbols in the different drawings refer to corresponding parts unless the context indicates otherwise.

DETAILED DESCRIPTION OF PREFERRED EMBODIMENTS

Figure 1:
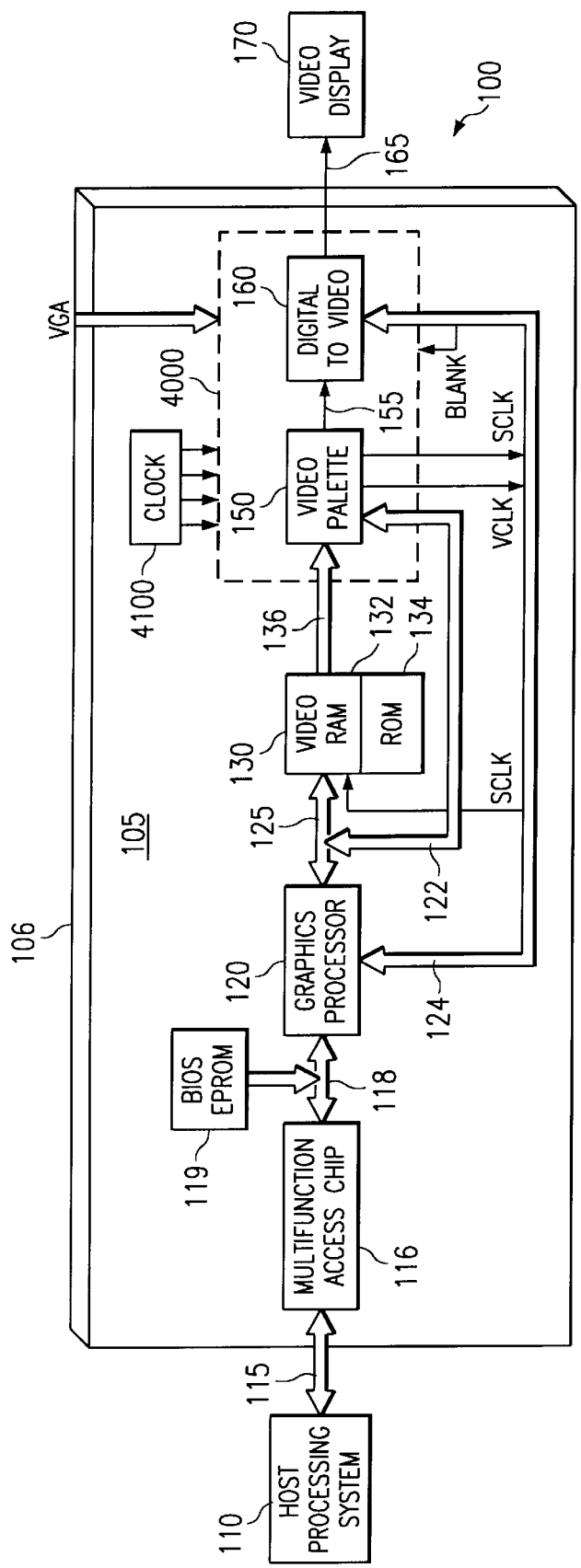
FIG. 1 is a block diagram of a computer graphics system.
Figure 2:
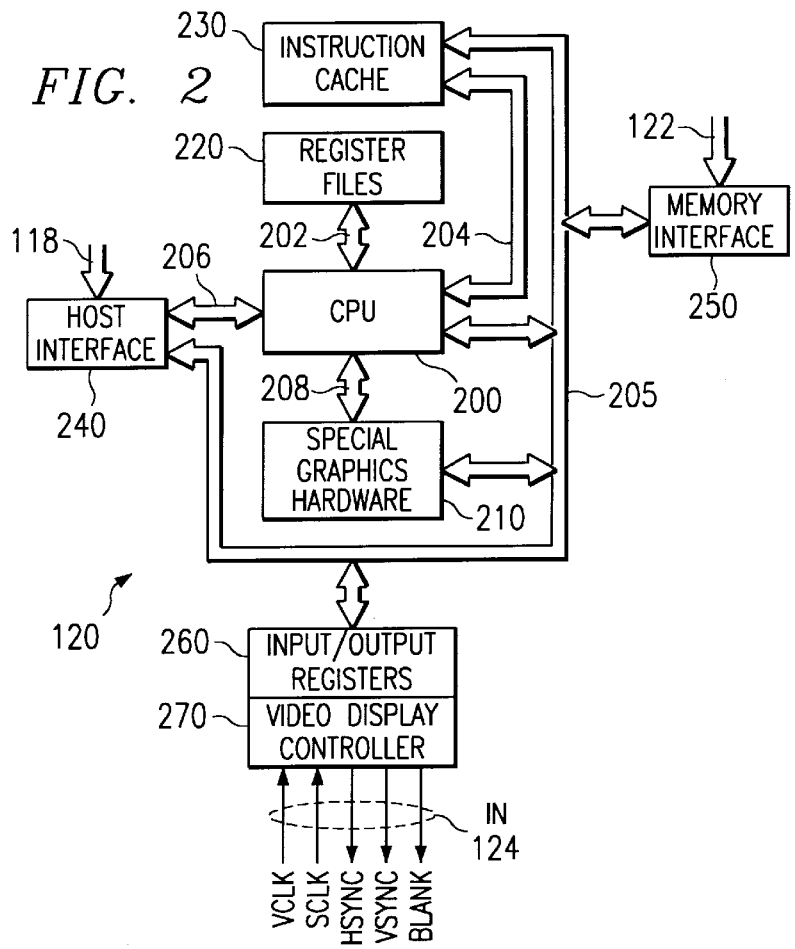
FIG. 2 is a block diagram of a graphics coprocessor.

FIGS. 1 and 2 illustrate a computer graphics system 100 including a graphics processing system 105 operating in conjunction with a host system 110. Supporting information is provided in coassigned patent applications Ser. No. 080,735 filed Jun. 22, 1993, a continuation of Ser. No. 544,774 filed Oct. 23, 1990 and now abandoned, entitled "PALETTE DEVICES, SYSTEMS AND METHODS FOR TRUE COLOR MODE"; U.S. Pat. No. 5,309,551 entitled "DEVICES, SYSTEMS AND METHODS FOR PALETTE PASS-THROUGH MODE"; U.S. Pat. No. 5,400,057 entitled "INTEGRATED CIRCUIT INTERNAL TEST CIRCUITS AND METHODS"; U.S. Pat. No. 5,293,468 entitled "CONTROLLED DELAY DEVICES, SYSTEMS AND METHODS"; U.S. Pat. No. 5,327,159 entitled "PACKED BUS SELECTION OF MULTIPLE PIXEL DEPTHS IN PALETTE DEVICES, SYSTEMS AND METHODS"; U.S. Pat. No. 5,287,100 entitled "GRAPHICS SYSTEMS, PALETTES AND METHODS WITH COMBINED VIDEO AND SHIFT CLOCK CONTROL"; U.S. Pat. No. 5,341,470 entitled "COMPUTER GRAPHICS SYSTEMS, PALETTE DEVICES AND METHODS FOR SHIFT CLOCK PULSE INSERTION DURING BLANKING"; U.S. Pat. No. 5,270,687 entitled "PALETTE DEVICES, COMPUTER GRAPHICS SYSTEMS AND METHODS WITH PARALLEL LOOKUP AND INPUT SIGNAL SPLITTING"; Ser. No. 965,561 filed Oct. 23, 1992, a continuation of Ser. No. 426,480 filed Oct. 23, 1989 and now abandoned, a continuation of Ser. No. 346,388 filed Apr. 27, 1989 and now abandoned, a continuation of Ser. No. 207,034 filed Jun. 13, 1988 and now abandoned, a continuation of Ser. No. 821,641 filed Jan. 23, 1986 and now abandoned, entitled "A GRAPHICS DATA PROCESSOR, A DATA PROCESSING SYSTEM, A GRAPHICS PROCESSING SYSTEM AND A METHOD OF PROCESSING GRAPHICS DATA", each of which is hereby incorporated by reference. Also incorporated by reference herein are publications with further supporting information as follows: Texas Instruments TMS 34010 User's Guide (August 1988); TIGA-340 ™ Interface, Texas Instruments Graphics Architecture, User's Guide, 1989, TMS 34020 User's Guide (January 1990), and TMS 44C251 Specification, all of which documents are currently available to the general public from Texas Instruments Incorporated.

FIG. 1 illustrates a block diagram of computer graphics system 100 which is constructed in accordance with the principles of a preferred embodiment of the present invention. Graphics processing system 105 includes a graphics printed wiring board 106 connected to a host processing system 110. Located on printed wiring board 106 are a graphics system processor GSP 120, a memory 130, a video palette 150 and a digital to video converter 160. Elements 150 and 160 are connected by bus 155 and combined in a palette device 4000 driven by clock circuitry 41000 all as described in the incorporated patent applications such as 080,735 filed Jun. 22, 1993, a continuation of Ser. No. 544,774 filed Oct. 23, 1990 and now abandoned, entitled "PALETTE DEVICES, SYSTEMS AND METHODS FOR TRUE COLOR MODE"; U.S. Pat. No. 5,309,551 entitled "DEVICES, SYSTEMS AND METHODS FOR PALETTE PASS-THROUGH MODE"; U.S. Pat. No. 5,400,057 entitled "INTEGRATED CIRCUIT INTERNAL TEST CIRCUITS AND METHODS"; U.S. Pat. No. 5,293,468 entitled "CONTROLLED DELAY DEVICES, SYSTEMS AND METHODS"; U.S. Pat. No. 5,327,159 entitled "PACKED BUS SELECTION OF MULTIPLE PIXEL DEPTHS IN PALETTE DEVICES, SYSTEMS AND METHODS"; U.S. Pat. No. 5,287,100 entitled "GRAPHICS SYSTEMS, PALETTES AND METHODS WITH COMBINED VIDEO AND SHIFT CLOCK CONTROL". A video display 170 is driven from the video output of system 105 via connecting line 165.

Host processing system 110 provides the major computational capacity for the graphics computer system 100. Host processing system 110 preferably includes at least one microprocessor 111 of FIG. 8, read only memory, random access memory 113 and assorted peripheral devices forming a complete computer system. Host processing system 110 of FIG. 1 preferably also includes some form of input device, such as a keyboard or a mouse, and some form of long term storage device such as a disk drive. The details of the construction of host processing system 110 are conventional in nature and known in the art, therefore the present application will not further detail this element. An important feature of host processing system 110, as far as the present embodiment is concerned, is that host processing system 110 determines the content of the visual display to be presented to the user by display 170.

Graphics system processor 120 provides the major data manipulation to generate the particular video display presented to the user. Graphics processor 120 is bidirectionally coupled to host processing system 110 via a host bus 115 to a multifunction access chip or circuit 116 and a bus 118 to the GSP 120. GSP 120 operates as an independent data processor from host processing system 110; however, it is expected that graphics processor 120 is responsive to requests from host processing system 110 and access circuit 116 via bus 118. Graphics processor 120 further communicates with memory 130, and video palette 4000 via video memory bus 122 and palette bus 136. Graphics processor 120 controls the data stored within video RAM 132 via video memory bus 125. In addition, graphics processor 120 may be controlled by programs stored in either video RAM 132 or read only memory 134. Read only memory 134 may additionally include various types of graphic image data, such as alphanumeric characters in one or more font styles and frequently used icons. In addition, graphics processor 120 controls the data stored within video palette 150. Also, graphics processor 120 controls digital to video converter 160 via video control bus 124. Graphics processor 120 can, for instance, control the line length and the number of lines per frame of the video image presented to the user by control of digital to video converter 160 via video control bus 124.

A preferred embodiment of multifunction access circuit 116 (also designated by a contemplated identifier 34094) is implemented as a single chip device for interfacing the TMS 34020 GSP to either the ISA bus (Industry Standard Architecture) or MCA bus (Micro Channel Architecture) as PC (personal computer) backplane buses. The device is fabricated in a 160 pin Quad Flat Pack using Texas Instruments TSC500 Standard Cell ASIC Technology.

This single chip multifunctional access circuit 116 allows the TMS34020 to be mapped into either the memory space or the I/O space of a PC 110. I/O mapping takes advantage of the implicit addressing host interface capabilities of the TMS34020 GSP 120. Memory mapping circuitry also provided in device 116 is selectively operable to coordinate with the GSP capabilities.

Four independent sets of memory mapping hardware allow four arbitrary regions of the TMS34020 memory space to be mapped into four separate arbitrarily selected and programmable memory segments of the PC memory map. Each of these mapping regions is individually programmable in size from 8 Kilobytes up to 4 Megabytes.

A special arbitrary alignment mode is provided in circuitry of one or more sets of the memory mapping hardware. This alignment mode establishes a starting address from which the region size begins in a particular address region of the memory map, and continues contiguously for the full region size. This is also called extended mapping mode.

Four fully programmable sets of address decoding hardware are incorporated in access circuit 116, to perform bank selecting of TMS34020 GSP 120 local memory.

VGA pass-through circuitry in access circuit 116 supports the TMS34020 subsystem in emulating VGA as one example of a resident graphics architecture to be passed through to the display as desired.

When a BIOS ROM or EPROM 119 is provided, the access device 116 is selectively preconfigurable at power-up so that GSP 120 can access the BIOS ROM 119 by asserting addresses in its own local memory space.

A shadow circuit is provided in access device 116 to shadow the HSTCTLL register of the GSP 120. In this way, interrupt polling is performed without burdening the GSP 120.

Video memory 130 includes video RAM 132 which is bidirectionally coupled to graphics processor 120 via video memory bus 125. Video RAM 130 includes bit mapped graphics data which controls the video image presented to the user. This video data may be manipulated by graphics processor 120 via video memory bus 125. In addition, the video data corresponding to the current display screen is output from video RAM 132 via video output bus 136. The data from video output bus 136 corresponds to the picture element or pixel to be presented to the user. For one example, video RAM 132 is formed of a plurality of TMS44251 256KX4 dynamic random access memory integrated circuits available from Texas Instruments Incorporated, the assignee of the present application. The TMS44251 integrated circuit includes dual ports, enabling display refresh and display update to occur concurrently.

In accordance with the typical arrangement of video random access memory 132, this memory consists of a bank of several separate random access memory integrated circuits. The output of each of these integrated circuits is typically only one or four bits wide and is output on video output bus 136.

Video palette 150 receives the high speed video data from video random access memory 132 via bus 136. Video palette 150 also receives data from graphics processor 120 via video memory bus 122. Video palette 150 converts the data received on parallel bus 136 into a video level output via bus 155. This conversion is achieved by means of a look-up table which is specified by graphics processor 120 via video memory bus 122. The output of video palette 150 may comprise color hue and saturation for each picture element or may comprise red, green and blue primary color levels for each pixel or any other suitable technique. The table of conversion from the code stored within video memory 132 and the digital levels output via bus 155 is controlled from graphics processor 120 via video memory bus 122.

FIG. 2 illustrates graphics processor 120 in further detail. Graphics processor 120 includes a central processing unit 200, special graphics hardware 210, register files 220, instruction cache 230, host interface 240, memory interface 250, input/output registers 260 and video display controller 270.

Central processing unit 200 not only does general purpose data processing and arithmetic and logic operations but also a number of special purpose graphics instructions, either alone or in conjunction with special graphics hardware 210.

Graphics processor 120 includes a major bus 205 which is connected to most parts of graphics processor 120 including the central processing unit 200. Central processing unit 200 is bidirectionally coupled to a set of register files 220 including a number of data registers, via bidirectional register bus 202. Register files 220 serve as a depository of immediately accessible data used by central processing unit 200. Register files 220 include, in addition to general purpose registers which are employed by central processing unit 200, a number of data registers which are employed to store implied operands for graphics instructions.

Central processing unit 200 is connected to instruction cache 230 via instruction cache bus 204. Instruction cache 230 is further coupled to bus 205 and is loaded with instruction words from video memory 130 (FIG. 1) via video memory bus 122 and memory interface 250. The instruction cache 230 speeds up the execution of functions that are used often within a particular portion of the program executed by central processing unit 200. Access to instruction cache 230 via instruction cache bus 204 is much faster than access to video memory 130.

Host interface 240 is coupled to central processing unit 200 via host interface bus 206. Host interface 240 is further connected to host processing system 110 (FIG. 1) via access bus 118, access circuit 116 and host system bus 115. Host Interface 240 controls the timing of data transfer between host processing system 110 and graphics processor 120. In this regard, host interface 240 enables either host processing system 110 to interrupt graphics processor 120 or vice versa. In addition, host interface 240 is coupled to major bus 205 enabling host processing system 110 via access circuit 116 to control directly the data stored within memory 130. Typically, host interface 240 would communicate graphics requests from host processing system 110 to graphics processor 120, enabling the host system to specify the type of display to be generated by video display 170 and causing graphic processor 120 to perform a desired graphic function.

Central processing unit 200 is coupled to special graphics hardware 210 via graphics hardware bus 208. Special graphics hardware 210 is further connected to major bus 205. Special graphics hardware 210 operates in conjunction with central processing unit 200 to perform special graphic processing operations. Central processing unit 200, in addition to its function of providing general purpose data processing, controls the application of the special graphics hardware 210 in order to perform special purpose graphics instructions. These special purpose graphics instructions concern the manipulation of data within the bit mapped portion of video RAM 132. Special graphic hardware 210 operates under the control of central processing unit 200 to enable particular advantageous data manipulations regarding the data within video RAM 132.

Memory interface 250 is coupled to bus 205 and further coupled to video memory bus 122 and 125. Memory interface 250 serves to control the communication of data and instructions between graphics processor 120 and memory 130. Memory 130 includes both the bit mapped data to be displayed via video display 170 and instructions and data necessary for the control of the operation of graphics processor 120. These functions include control of the timing of memory access, and control of data and memory multiplexing. In the preferred embodiment, video memory bus 125 includes multiplexed address and data information. Memory interface 250 enables graphics processor 120 to provide the proper output on video memory bus 125 at the appropriate time for access to memory 130.

Graphics processor 120 further includes input/output registers 260 and video display controller 270. Input/output registers 260 are bidirectionally coupled to bus 205 to enable reading and writing within these registers. Input/output registers 260 are preferably within the ordinary memory space of central processing unit 200. Input/output registers 260 include data which specifies the control parameters of video display controller 270. Video display controller 270 is clocked by a video clock signal VCLK from palette 4000. In accordance with the data stored within input/output registers 260, video display controller 270 generates the signals on video control bus 124 for the desired control of palette 4000.

Data within input/output registers 260 includes data for specifying the number of pixels per horizontal line, the horizontal synchronization and blanking intervals, the number of horizontal lines per frame and the vertical synchronization and blanking intervals. Input/output registers 260 may also include data which specifies the type of frame interlace and specifies other types of video control functions. Input/output registers 260 are also a depository for other specific kinds of input and output parameter which are more fully detailed below.

Graphics processor 120 operates in two differing address modes to address memory 130. These two address modes are x y addressing and linear addressing. Because the graphics processor 120 operates on both bit mapped graphic data and upon conventional data and instructions, different portions of the memory 130 may be accessed most conveniently via differing addressing modes. Regardless of the particular addressing mode selected, memory interface 250 generates the proper physical address for the appropriate data to be accessed. In linear addressing, the start address of a field is formed of a single multibit linear address. The field size is determined by data within a status register within central processing unit 200. In x y addressing the start address is a pair of x and y coordinate values. The field size is equal to the size of a pixel, that is the number of bits required to specify the particular data at a particular pixel.

Figure 3:
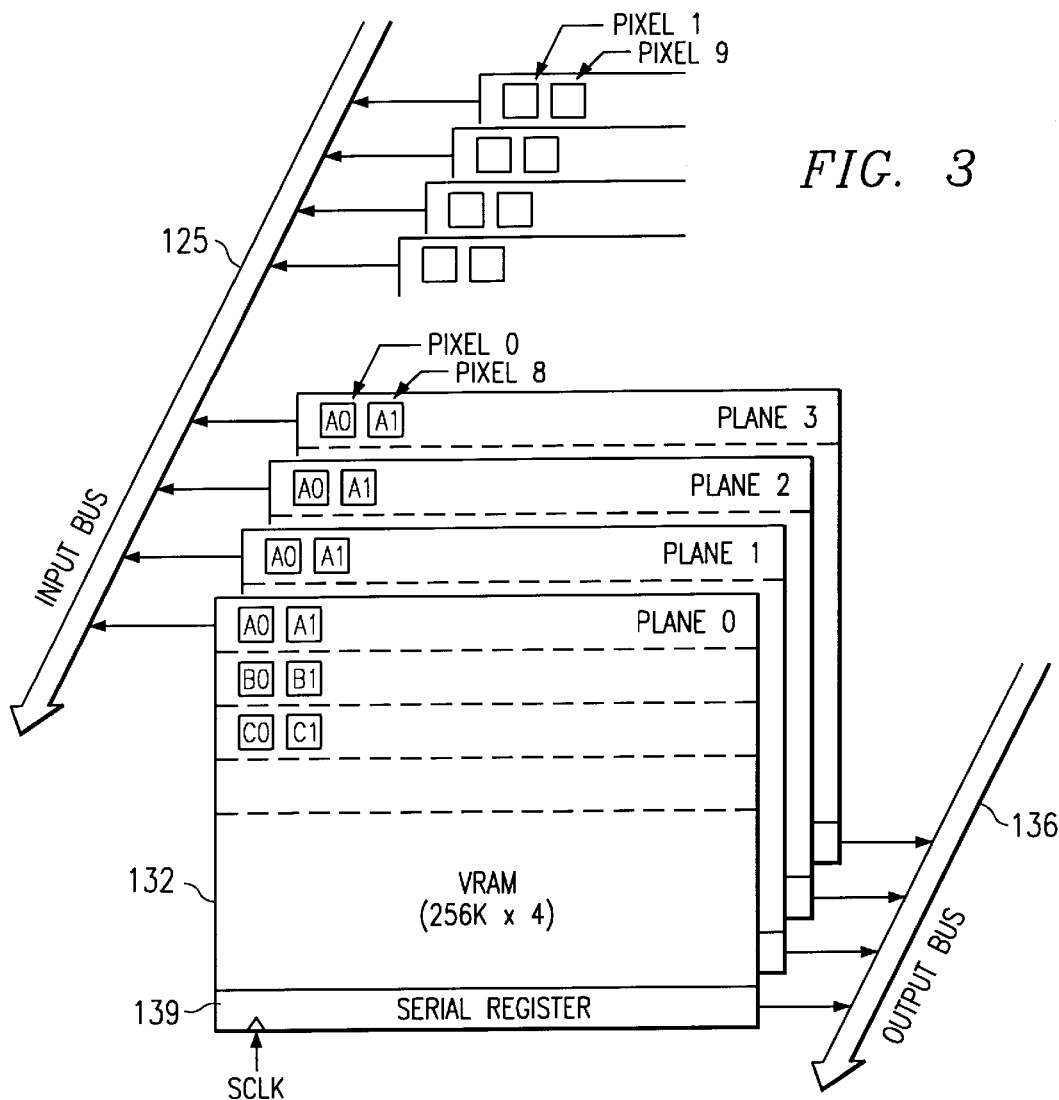
FIG. 3 is an expanded, stylized view of a video memory operating in conjunction with a split serial register.

Turning to FIG. 3, the memory structure of a typical graphics memory system is illustrated. Background information on video RAM (VRAM) is found in coassigned U.S. Pat. Nos. 4,330,852; 4,639,890 and 4,683,555 which are hereby incorporated by reference. While there are many memory structures and systems which could be used, one example shown in FIG. 3 uses eight VRAM memories 132 in an array. Each VRAM memory, or unit, has four sections, or planes, 0, 1, 2 and 3. The construction of each plane is such that a single data lead is used to write information to that plane. In a system which uses a 32 bit data bus, such as data bus 125, there would be 8 VRAM memories (two of which are shown in FIG. 3) each VRAM memory having four data leads connected to the input data bus.

Thus, for a 32 bit data bus, VRAM memory 132 would have its four data leads connected to data bus leads 0, 1, 2, 3 respectively. Likewise, the next VRAM memory would have its four leads 0, 1, 2, 3 connected to data bus leads 4, 5, 6, 7 respectively. This continues for the remaining six VRAM's such that the last VRAM has its leads connected to leads 28, 29, 30, 31 of bus 125.

The memories are arranged such that the pixel information for the graphics display is stored serially across the planes in the same row. Assuming a four bit per pixel system, then the bits for each pixel are stored in a separate VRAM memory. In such a situation, pixel 0 would be in the first VRAM and pixel 1 would be in the second VRAM. The pixel storage for pixels 2 through 7 are not shown. The pixel information for pixel 8 then would be stored in the first VRAM, still in row 0 but in column 2 thereof. The reason for this arrangement of pixel information will be more fully appreciated from an understanding of how information is retrieved from the memory.

Continuing with FIG. 3, each VRAM plane has a serial register 139 for shifting out information from a row of memory. The shifting occurs at a rate determined by shift clock signal SCLK from palette 4000. The outputs from these registers are connected to bus 136 in the same manner as the data input leads are connected to the input bus. Thus, data from a row of memory, say row 0, would be moved into register 139 and occur serially from each register 139 and in parallel on bus 136. This would occur for each plane of the eight memory array.

Looking at data output bus 136 then at an instant of time the first bit in each shift register would be on the bus. Thus, assuming row 0 is being outputted to the bus, the bus would have an its lead 0 the row 0, bit A0 (plane 0) of memory 130. Bus 136 lead 1 would have on it row 0, bit A0 (plane 1), while lead 2 would have row 0, bit A0 (plane 2) and lead 3 would have on it row 0, bit A0 (plane 3). These bits would be followed by the bits from the next VRAM. Thus, at a first instant of time, data bus 136 would have on it the four bits forming pixel 0 next to the four bits forming pixel 1, next to the four bits forming pixel 2. This continuea until the 32 bits forming the 8 pixels 0–7 are on the parallel leads of data bus 136. These bits are supplied to the graphics display and the shift registers all shift one position providing the bus with pixel information for the next 8 pixels, namely pixels 8 through 15. This shifting continues until the entire row in the VRAMs is shifted out and then a new row is selected for loading into the output serial registers.

Up to this point it is assumed that the bit information per pixel is 4 bits. If the pixel information were to be, say 8 bits, then two VRAMs would have to be used per pixel. This would change the bit patterns somewhat. Also, it should be noted that memory sizes and structures vary and the size and structure shown are only for illustrative purposes.

The serial register 139 for each memory can be 512 bits long thereby transferring 16384 bits to the display for each memory-to-serial register read cycle. These 16384 bits represent data for 2048 display pixels, assuming each pixel contains 8 bits. However, assume each scan line only requires 1280 pixels. Thus, on every line of memory 768 pixels from each row of memory cannot be displayed. This memory is difficult to use for other purposes and thus is effectively wasted.

To solve the problem, the serial output register 139 is split in half and each half is used to output data from the VRAM. While it is understood that 32 shift registers 139 are used, the discussion focuses on one plane of the memory with the understanding that all planes work in the same manner. The two halves of the register 139 are identified as half A and half B. Advantageously, the serial register 139 takes from memory an entire row of screen memory and presents that row to the screen pixel-by-pixel in a smooth, even flow.

As discussed above, if this were to occur with a single, unsplit serial register 139, then the information for one entire scan line of the display would have to be moved from memory 132 into the serial register 139 and then shifted onto the screen at the screen clocking rate. This, then, would require each row of memory to contain only one line (or full multiples thereof) of screen information. That is not the case with a split serial register, where bits can be shifted from the A section while other bits are loaded into the B section and shifted to the screen from the B section while other bits are loaded into the A section.

Figure 4:
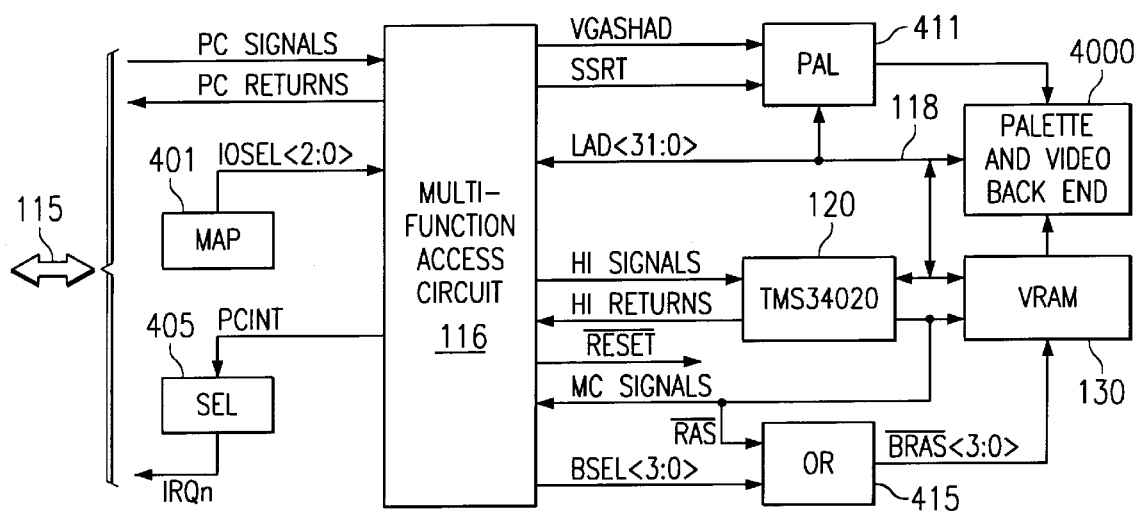
FIG. 4 is a block diagram of a computer graphics system showing a multifunctional access circuit and its signal paths in greater detail.

In FIG. 4, multifunction access circuit 116 is connected via bus 115 to a personal computer PC 110 of FIG. 1 and receives PC signals and replies with PC returns. A MAP selector 401 is a DIP switch, jumpers or other circuit that establishes a parallel digital signal for access circuit 116 activating predetermined address segments in PC address space for mapping or translation into the address space of GSP 120. An interrupt line from access circuit 116 is switched by a selector switch SEL 405 (or any suitable selector circuit) to a selected one of several interrupt lines in bus 115.

Access circuit 116 is connected to a local bus LAD connected to GSP 120 and palette and video backend 4000. A VGA control signal VGASHAD from access circuit 116 is fed to a PAL 411 which in turn supplies a VGA control output to palette chip 4000. A split shift register transfer signal SSRT is supplied to palette chip 4000 directly from access circuit 116, compare FIG. 22 and description in incorporated U.S. Pat. No. 5,341,470 entitled "COMPUTER GRAPHICS SYSTEMS, PALETTE DEVICES AND METHODS FOR SHIFT CLOCK PULSE INSERTION DURING BLANKING". Access circuit 116 also is connected to send and receive control signals and data to and from GSP 120. Bank selection of VRAM in VRAM section 130 is facilitated by bank select outputs BSEL[3:0] from access circuit 116 which are OR-ed by OR-gates 415 with RAS-(row address strobe) from GSP 120 to supply bank RAS signals BRAS-[3:0].

Figure 5:
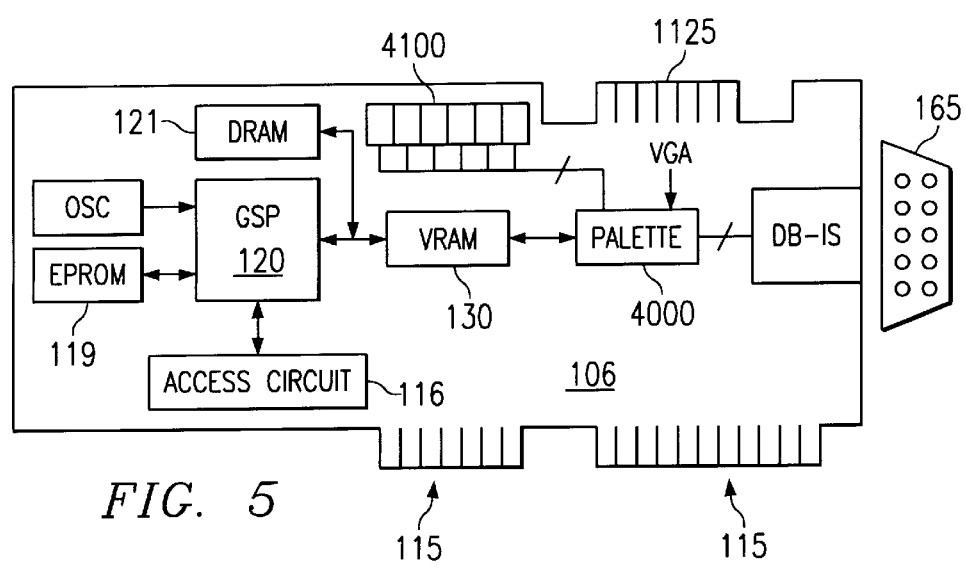
FIG. 5 is a pictorial sketch of a printed wiring board for computer graphics systems as shown in FIGS. 1 and 4.

In the pictorial sketch of FIG. 5 multifunction access circuit 116 is provided on a graphics system board 106. The board 106 is also stuffed with a 1 Megabit VRAM 130, a TMS 34020 GSP 120, DRAM 121, EPROM 119, programmable palette 4000 and a set of clock oscillators 4100. System board 106 is advantageously provided with opposite bus connectors, one for bus 115 and a feature connector 1125 for VGA pass through respectively. Board 106 is inserted into the motherboard of its host computer by the connector for bus 115.

Further in system 105, a connector 165 supplies RS343-A video (RGB) output to a color display device 170 of FIG. 1. Sync generation is incorporated on one of the color output channels, e.g. Green.

Figure 6:
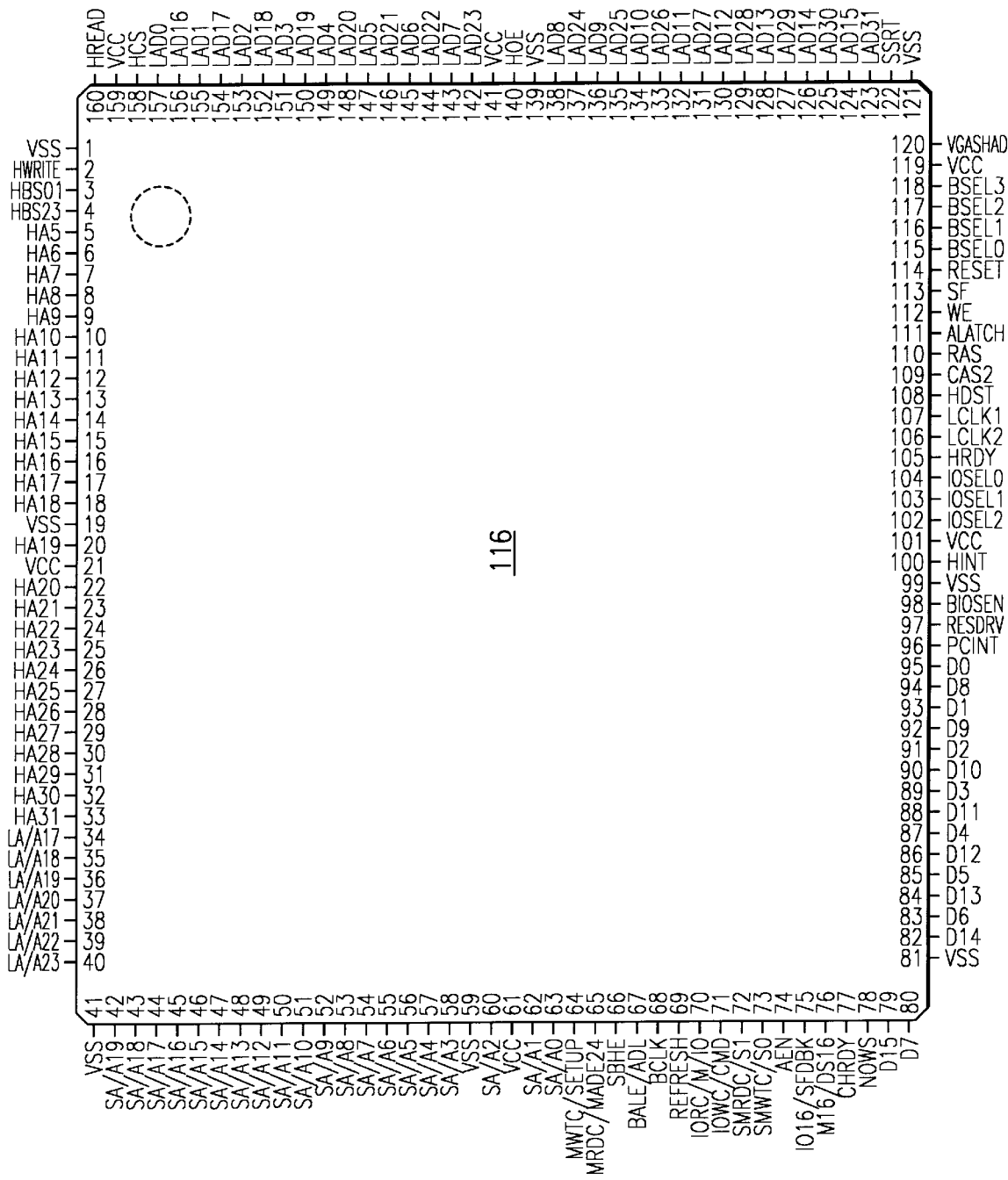
FIG. 6 is a pinout diagram of a multifunctional access circuit chip for computer graphics systems as shown in FIGS. 1 and 4.

FIG. 6 shows an exemplary pinout diagram for the multifunction access circuit 116. The designations of pins on the left and right sides of FIG. 6 are entered horizontally, and those for pins on top and bottom are entered vertically (e.g. VSS vertically in upper right corner). The functions of the pins and circuitry connected to them are described in more detail in connection with the other Figures of drawing.

Figure 7:
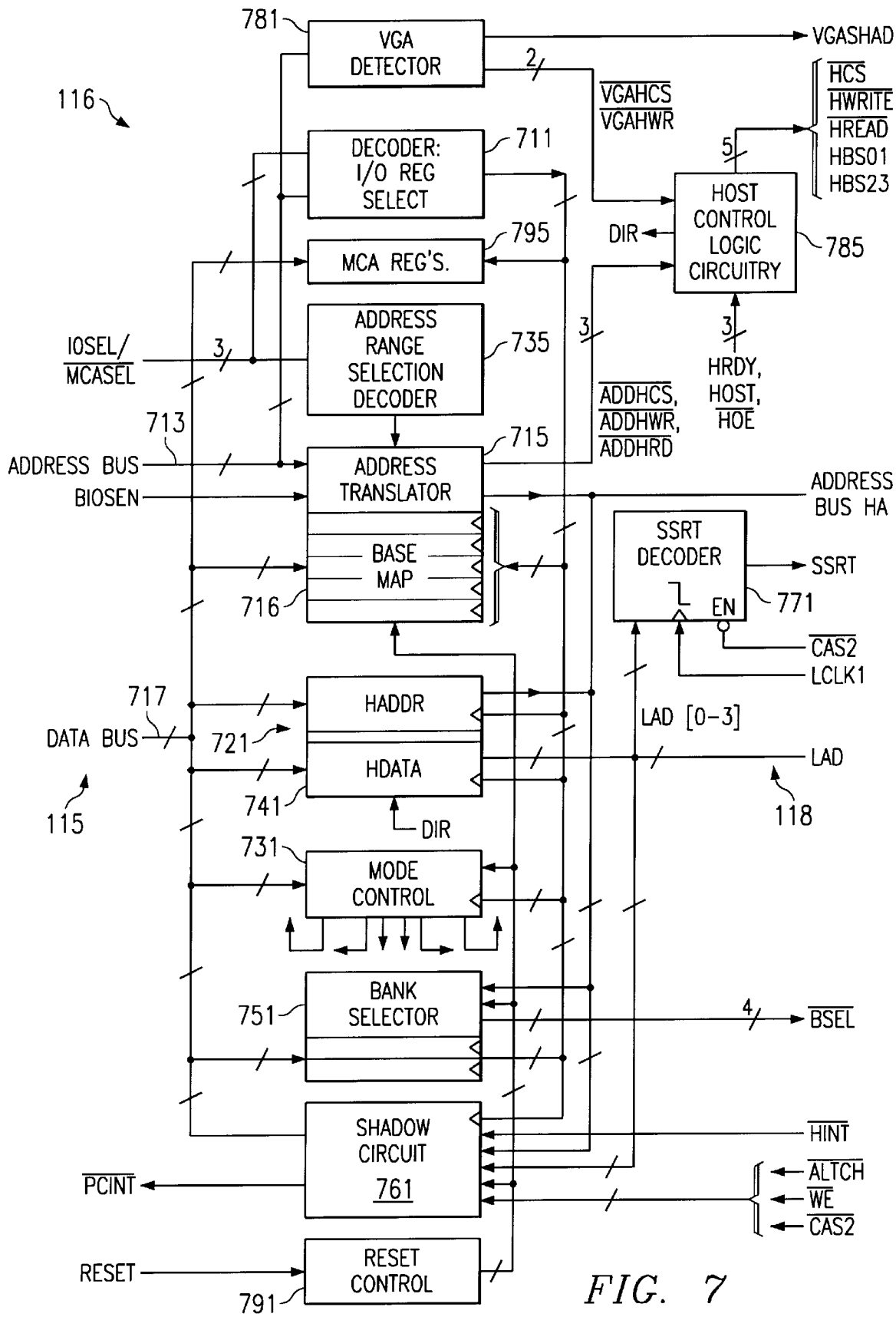
FIG. 7 is a block diagram of an multifunctional access circuit of FIGS. 4 and 6 having circuits with various registers shown in more figures hereinbelow.

In FIG. 7 multifunction access circuit 116 is used with first and second digital computers such as host PC 110 and GSP 120 of FIGS. 1 and 4. Each of the computers has an address bus for supplying addresses and a data bus for supplying data, see host bus 115 and LAD bus (including address bus HA) 118. The access circuit 116 has an address decoder 711 with inputs for the address bus 713 in bus 115 from the host computer.

An address translator circuit 715 has address inputs for addresses supplied by the address bus 713 of the host computer and outputs for translated addresses to the address bus HA of the graphics coprocessor 120. The address translator circuit 715 also has base and map registers 716 selectable by the address decoder 711 and data inputs via data bus 717 to program the registers so selected with data from the data bus 717 from the host computer.

A port circuit 721 includes HADDR registers controlled by the address decoder 711 for entry of address information from the data bus 717 and assertion of the address information on the address bus HA of the second computer.

A mode control circuit 731 is connected to the address decoder 711 and connected to the data bus 717 to program the mode control circuit to selectively establish operation of the address translator circuit 715 and of the port circuit 721.

An address range selection decoder 735 is fed by three lines IOSEL/MCASEL from MAP selector 401. Decoder 735 controls address translator 715. In this way selector 401 and decoder 735 act as a selection circuit feeding the address translator circuit 715 to establish a plurality of address ranges in which the address translator circuit 715 is to respond to the address bus 713 of the host computer to translate addresses.

A transceiver circuit HDATA 741 provides bidirectional communication between the data bus 717 from the host computer and the data bus [LAD 31:0] from the GSP 120.

A bank selector circuit 751 responds to addresses from the address bus HA of the GSP 120 to supply a set of bank select outputs BSEL.

A shadow register circuit 761 shadows GSP 120 host control register HSTCTLL for interrupt polling and message passing as described in further detail in connection with FIGS. 19 and 36.

A split shift register transfer decoder 771 is connected to the LAD data bus and responsive to control signals on LAD[0:3], local clock LCLK1 and column address strobe CAS2- from the GSP 120 to produce a flag signal on line SSRT for split shift register transfer.

VGA detector 781 is an address detector circuit responsive to particular addresses on host bus 713 to produce control signals including a shadow detect signal VGASHAD, control signal VGAHCS- and read/write VGAHWR- to support VGA graphics display pass-through mode. Host control logic circuitry 785 receives both the VGA control signals and further address unit control signals ADDHCS-, ADDHWR-, ADDHRD- from address translator 715. Circuitry 785 is also responsive to 34020 control signals HRDY, HOST and HOE-. Circuitry 785 feeds a communication direction control signal DIR to the transceivers in block 741. As outputs to GSP 120, the logic circuitry supplies HCS-, HWRITE-, HREAD-. and byte selects HBS01 and HBS23.

A reset control circuit 791 is responsive to a reset input RESET to establish predetermined bits in shadow circuit 761, bank selector 751, mode control 731 and address translator 715 on power up.

Viewed together, the host control logic circuitry 785 acts with circuitry in the TMS34020 as a memory access circuit for use with host computer 110. Host computer 110 can assert read and write signals and an address. The circuitry of FIGS. 1–5 has memory accessible by asserting addresses thereto. Access circuit 116 has address translator circuit 715 with address inputs for the address supplied by the host computer and outputs for supplying a translated address to the address logic in host interface 240 of the TMS34020 graphics coprocessor. That address logic has an address autoincrement circuit responsive to a write signal to automatically increment the translated address for the memory and responsive to a control signal HCS- to return to the translated address. Control circuitry 785 of FIG. 7 is connected to the address logic in the TMS34020 and is responsive to a read signal from the host computer 110 to supply the HCS- control signal to the logic circuit to return to the translated address. As described in the 34020 User's Guide, the TMS 34020 has an autoincrementing feature which allows a host processor 110 to address a contiguous block of local memory by specifying the address of only the first word in a block. The TMS34020 in autoincrement mode automatically generates subsequent addresses and byte selects. A host computer can access contiguous blocks of words 16 bits or 32 bits at a time.

To use autoincrementing, the host asserts HCS- active low at the beginning of the first access, providing the address and byte selects just as it does for a regular access. The host maintains HCS- active low throughout. The TMS34020 enables autoincrementing when it detects that HCS- remains low between the end of a previous access and the beginning of the current access. The host then uses HREAD- and HWRITE- as a strobe to request access to succeeding consecutive autoincremented addresses.

When autoincrementing is detected, the host interface 240 uses the value of HBS0-3 to determine whether the host is accessing the block 16 bits or 32 bits at a time. Byte select outputs HBS01 and HBS23 of the circuit 116 are fed to respective pairs of the HBS0-3 inputs of the 34020 GSP for example. If all 4 byte selects are active, the TMS34020 assumes that the host needs only one access to completely read or write a 32 bit location. If only two byte selects are active (HBS0 and HBS1, or HBS2 and HBS3), the TMS34020 assumes that the host requires two accesses to completely read or write a 32-bit location.

The TMS34020 latches the value of HBS0-3 at the falling edge of HCS-. If the next access will be made to a subsequent 16 bit or 32 bit location, the TMS34020 automatically generates the byte selects for the access by swapping its internal copy of the byte selects after each access. Thus, if the latched value of HBS0-3 is 0011, then the internal copy is swapped to 1100 at the beginning of the next access. This in turn is swapped back to 0011 at the beginning of the following access, and so on.

The TMS34020 supports autoincrementing for reads and writes when HINC=1 and HPFW=0, and it supports autoincrementing after writes only when HINC=1 and HPFW=1. HINC=0 disables the autoincrementing feature.

In a further advantageous feature, control logic circuitry 785, which is connected to address translator circuit 715, is operative to supply control signal HCS- when the host-asserted address on bus 713 changes from one address segment to another segment as defined by the base registers BASE0-3. Upon a segment change, circuit 785 generates the HCS- control signal as successive opposite transitions from low to high to low for the GSP 120. In this way, time consuming operations by the host computer 110 are eliminated by the operation of circuit 785.

VGA pass through mode provides VGA and non-VGA displays with as few as one monitor. In FIG. 8 a computer has a motherboard 110 with a microcomputer chip 111 and memory chips 113 mounted thereon. Motherboard 110 is connected to bus 115. A VGA-compatible graphics board 1105 is connected to the motherboard 110 by bus 115. If only VGA were to be used, a monitor 1170 would be connected to a DB-15 video connector 1165 on board 1105. Board 1105 has graphics circuitry mounted on it, and produces color code signals according to the VGA standard. The VGA circuitry has a memory buffer 1111 followed by a palette RAM 1131 and then a digital to analog converter DAC 1115. The VGA circuitry is controlled by the microcomputer chip on motherboard 110.

To provide advanced non-VGA displays, a board 105 of FIG. 1 is connected to bus 115. Board 105 has multifunction access device 116 and graphics processor 120 and is responsive to control by the microprocessor 111 such as an 80386 on motherboard 110. A video memory 130 is connected to the graphics processor 120 to produce color code signals on another bus 136 according to a second graphics architecture such as the Texas Instruments TIGA graphics architecture, for palette 4000 connected by printed wiring to the VRAM 130. A feature connector 1125 on board 105 is connected by a VGA bus 1123 to a feature connector 1121 on graphics board 1105. Feature connector 1121 provides color code signals according to the VGA standard. Feature connector 1125 on board 105 inputs the VGA color code signals.

By virtue of VGA pass-through, monitor 1170 can be dispensed with, and monitor 170 is connected to DB-15 video connector 165 to display both VGA graphics and TIGA graphics as user selects.

Figure 31:
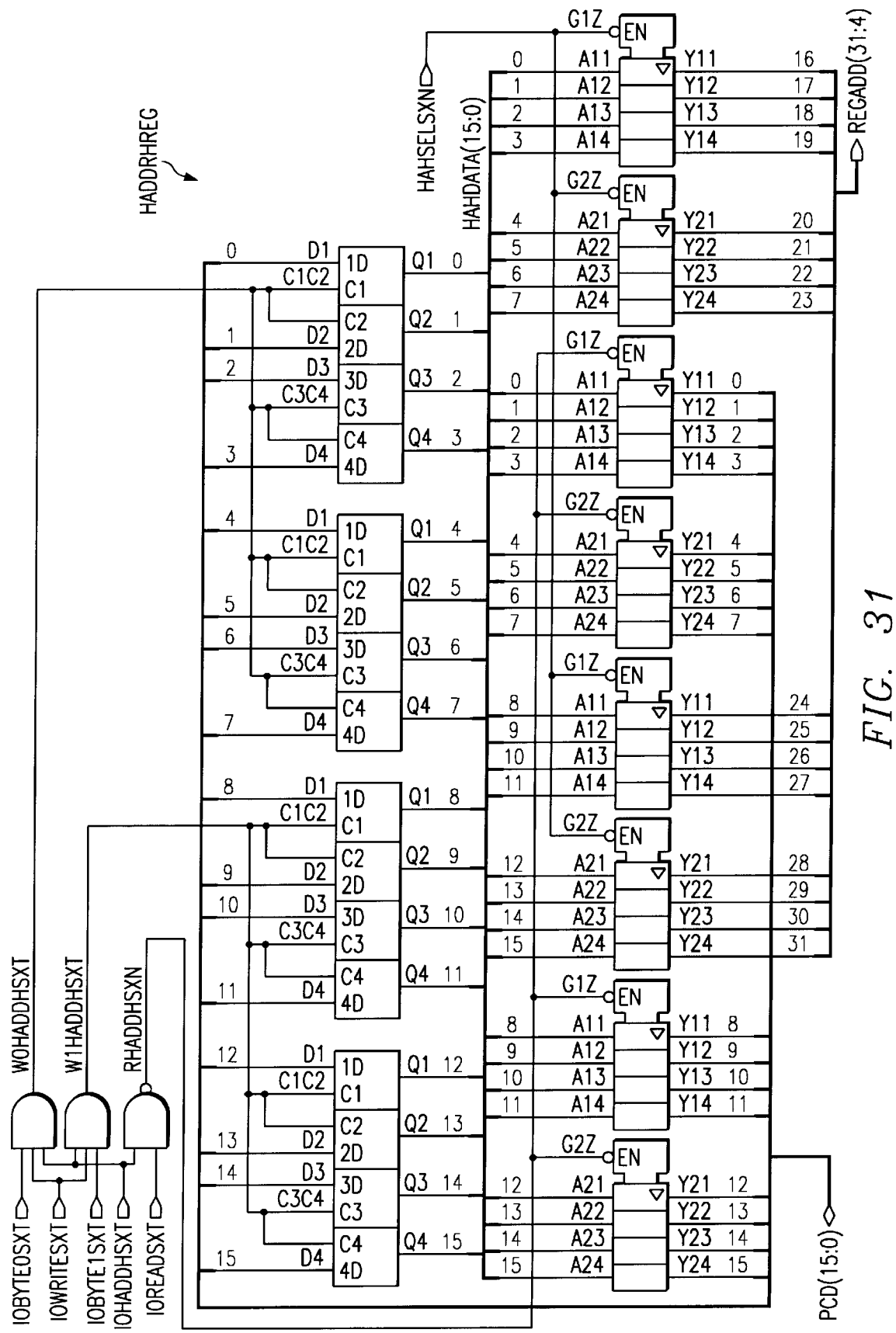
FIG. 31 is a schematic diagram of an address register circuit HADDRHREG of FIG. 21.

Palette 4000 has an input register 4011 of FIG. 31 of coassigned incorporated U.S. Pat. No. 5,341,470 entitled "COMPUTER GRAPHICS SYSTEMS, PALETTE DEVICES AND METHODS FOR SHIFT CLOCK PULSE INSERTION DURING BLANKING" with a first area connected to the video memory 130 of FIG. 8 to enter a first set of color code bits according to TIGA architecture. Input register 4011 has a second area connected to the feature connector 1125 to enter a second set of color code bits according to the VGA standard. Look-up table memory 4021 of FIG. 31 in said incorporated application TI-14523 supplies color data words in response to color codes from the input register 4011. Selector circuit 4051 is connected between the input register 4011 and the look-up table memory 4021. The selector circuit 4051 is connected via a control register 4371 to graphics processor 120 via bus 122 of FIG. 1 herein and is thereby controllable to transfer selected color codes on the selected bus 136 or 1123 according to the selected first or second graphics standard to the look-up table memory 4021.

Because of the way the hardware and software of a typical 80386 based computer such as an IBM-compatible PC (personal computer) works, boot-up operations shortly after the PC is powered up assert a predetermined address signal to "look for" the VGA graphics board 1105 of FIG. 8, which is provided as a standard board in an IBM-compatible PC. If the VGA board 1105 is connected to an IBM monitor 1170, a separate monitor 170 is needed to connect to board 105. During bootup, the PC CPU would find the VGA hardware 1105 and do the start-up sequence that would put text on the monitor 1170. Then when high resolution graphics is requested, the system would turn off the VGA monitor 1170 or not utilize it and then enable monitor 170. Since each monitor 1170 and 170 can be the same kind of device, it desirable in many cases to use a single monitor. If both boards 1105 and 105 are to be used with only one monitor, the VGA pass through circuit 781 on access device 116 detects the special VGA address when the host 110 is addressing VGA board 1105. This detection, or shadowing, activates the VGA pass-through circuit to allow viewing VGA data such as the initially displayed VGA prompt. VGA pass-through advantageously obviates any need to implement VGA itself on palette 4000 or anywhere on board 105. VGA board 1105 responds to the CPU on motherboard 110 during boot-up, provides the initial text and initial prompt directly to monitor 170 by virtue of the VGA pass-through mode provided in palette 4000, whereupon a switch can be made to the high resolution mode provided by board 105. Thus, there is no need for separate monitors for the VGA board 1105 and for high resolution board 105. Board 105 needs no VGA power up initializing software or other duplication of VGA.

In addition, the VGA pass-through mode allows VGA compatible application software to be executed by CPU 111 and allows VGA graphics to be created by board 110 or on the motherboard itself, whereupon the VGA graphics are passed through board 105 in the VGA pass-through mode. When high resolution mode is called for, the graphics are controlled by the CPU on board 110 but set up by graphics processor 120 (such as TMS 34010 or 34020 GSP from Texas Instruments Incorporated using the TIGA TI Graphics Architecture), passed through the VRAM 130 and palette 4000 to monitor 170.

The pass-through improvement does not depend on particular characteristics of VGA or TIGA. Accordingly, any two or more graphics architectures, standards or methods can be accommodated.

FIGS. 7a–c and 9–13 are described elsewhere herein.

Figure 14:
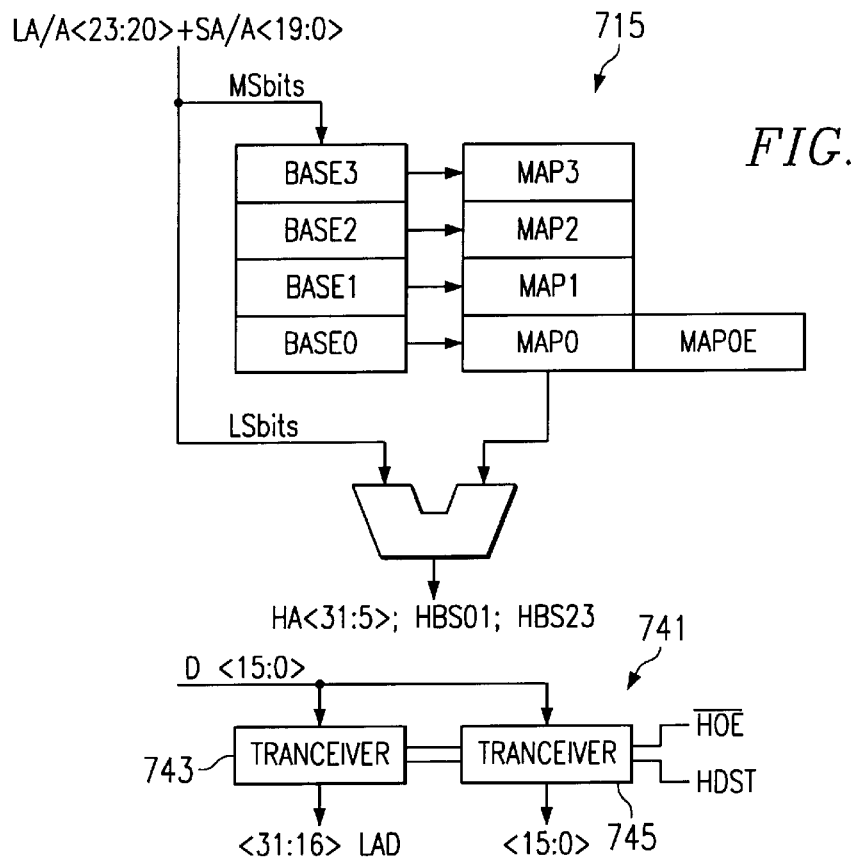
FIG. 14 is a block diagram of an address translator and a data input/output circuit in the multifunctional access circuit of FIGS. 4, 6 and 7.

In FIG. 14 address translator circuit 715 includes base registers BASE0-3 and map registers MAP0-3. Circuit 741 of FIG. 14 has a pair of 16 bit transceivers 743 and 745 to mediate bidirectional data transfers.

Figure 14A:
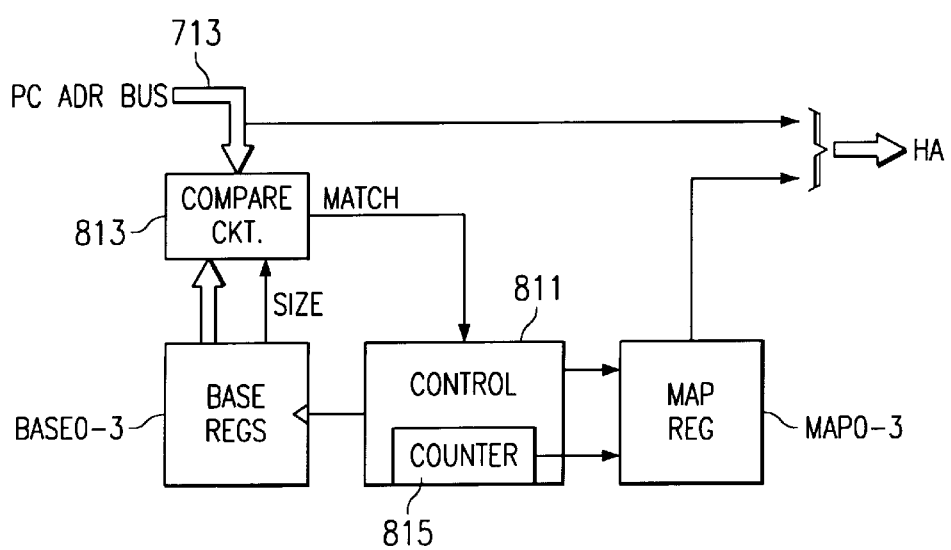
FIG. 14A is a block diagram detailing part of the address translator of FIG. 14.
Figure 16:
FIG. 16 is a diagram of a base register of FIGS. 14 and 15.

In FIG. 14A a control circuit 811 cooperates with a comparing circuit 813 to present the values in base registers BASE0-3 to circuit 813 for comparison with most significant bits (MS bits) of an address value on PC address bus 713. The base registers include segment size information (see also FIG. 16) to control the number of MS bits being compared by circuit 813. If the address on bus 713 lies in the predetermined address segment of any of the BASE registers, a MATCH signal is provided to the control circuit 811. A counter 815 in control circuit 811 counts up the base registers as it accesses them, and when a match occurs, the corresponding MAP register in the set MAP0-3 is accessed by putting its map MS bits onto the address bus HA to GSP 120. In this way address translation is accomplished. Advantageously, the circuit 811 with counter 815 prevents conflicting output from a pair of the map registers if a pair of the base registers contain the same value.

Figure 15:
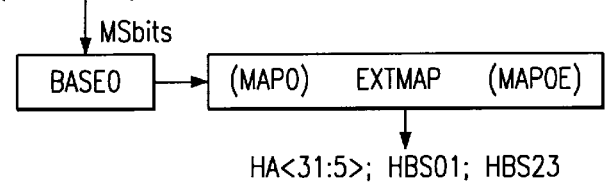
FIG. 15 is another detail of part of the circuit of FIG. 14.
Figure 17:
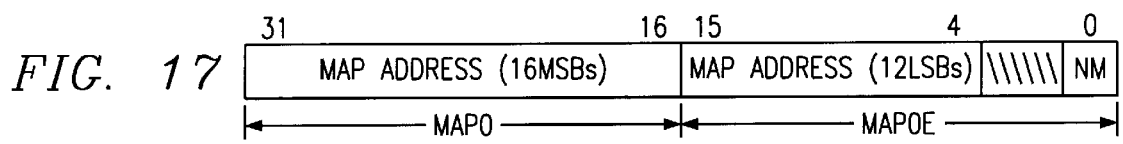
FIG. 17 is a diagram of a map register of FIGS. 14 and 15.

An extended map register MAP0E of FIGS. 14, 15 and 17 further provides output of least significant (LS) translation bits. Advantageously the map register and extended map register are connected to supply the address bus HA to the GSP 120 with an address having a value translated from but independent of the bits of the address signal from the host computer 110.

Figure 18:
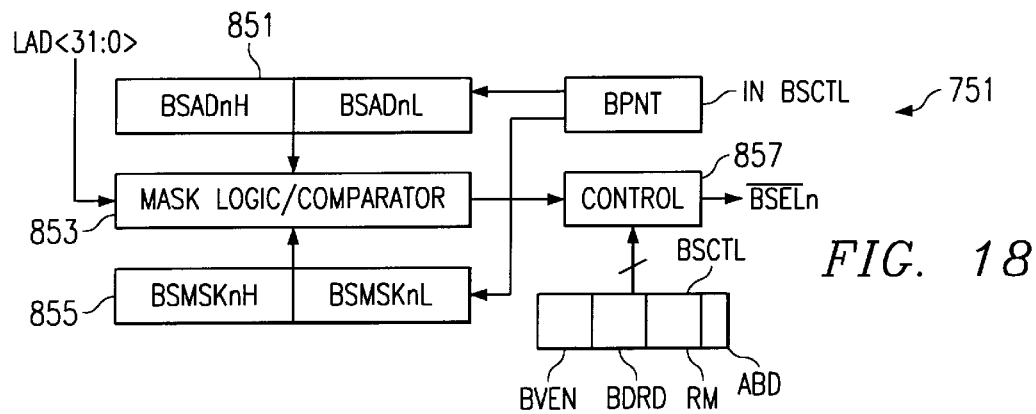
FIG. 18 is a block diagram of a bank selecting circuit in the multifunctional access circuit of FIGS. 4, 6 and 7.

In FIG. 18 bank selection circuit 751 of FIG. 7 has bank select address registers 851 that store a set of predetermined addresses as a basis of response to LAD bus addresses by circuit 751. The flexibility of response is enhanced by a further set of bank select mask registers 855 which establish which bits of the addresses are ignored and which are to be compared by a comparator 853. When a match occurs, comparator 853 sends a signal to a control circuit 857 which produces a bank select output appropriate to the selected bank. Thus, the comparator 853 and control 857 act as a memory strobe decoder. The mask register 855 defines which bits of an address on the LAD bus are significant for bank selection. The address register 851 holds a predetermined bank selection address, and the comparing circuit 853 is responsive to the address on the bus and mask register bits to produce a match output when the significant bits for bank selection on the address bus match the bank selection address in the address register.

The bank select circuit 751 has a programmable control register BSCTL. Control circuit 857 is responsive to bits in the control register BSCTL, such as bits indicating whether a bank consists of video RAM (VRAM) or not. The control circuitry 857 responds to the bits indicating VRAM to supply additional bank select signals. Other bits cause control circuit 857 to execute different refresh modes for dynamic random access memory (DRAM). To program load the various registers in circuit 751 an autoincrementing pointer circuit responsive to BPNT bits in BSCTL sequentially addresses the address registers 851 and mask registers 855 in response to a single address from the host address bus 713 (FIG. 7). Successive data are thus loaded from the host data bus 717 for programming the registers respectively. In FIG. 19, shadow circuit 761 of FIG. 7 is associated with a first address decoder 711 having inputs for the host address bus 713 and a read line IORC from the host computer. A second address decoder 863 has inputs for the address bus HA, and control lines for address latch ALTCH-, column address strobe CAS2-, and write WE- from the GSP 120. A logic circuit 865 has a register selectable by either of the first address decoder 711 and the second address decoder 863. Decoder 711 initiates output enable OE from circuit 865 to activate Q data outputs for connection to the data bus 717 to the host computer. Decoder 863 clocks D data inputs of circuit 865 that connect to the LAD data bus. Write protect circuitry is suitably connected to the register in circuit 865, and the register 865 includes space for interrupt and message passing bits. Interrupt signaling to the host is suitably supplied by an interrupt bit in register 865 and directly via an interrupt output HINT of TMS34020 through logic 867 to host interrupt line PCINT, see FIG. 4.

The shadow circuit makes a local copy of the 34020 host control register. The problem solved is that if the host 110 accesses the 34020, the GSP must take a cycle for servicing the host. By shadowing, the host 110 can read-access the shadow register 865 without having to access the 34020 host control register. On write, either host 110 or GSP 120 can write to the shadow register 865. The 34020 is connected to circuit 761 to simultaneously write to its own host control register HSTCTLL and to shadow register 865, thereby making the contents of the two registers identical at all times. Message bits in register 865 are accessible by the 34020 and host 110. These message bits are mailboxes respectively to the data bus of the host and to the data portion of the LAD bus.

Figure 9:
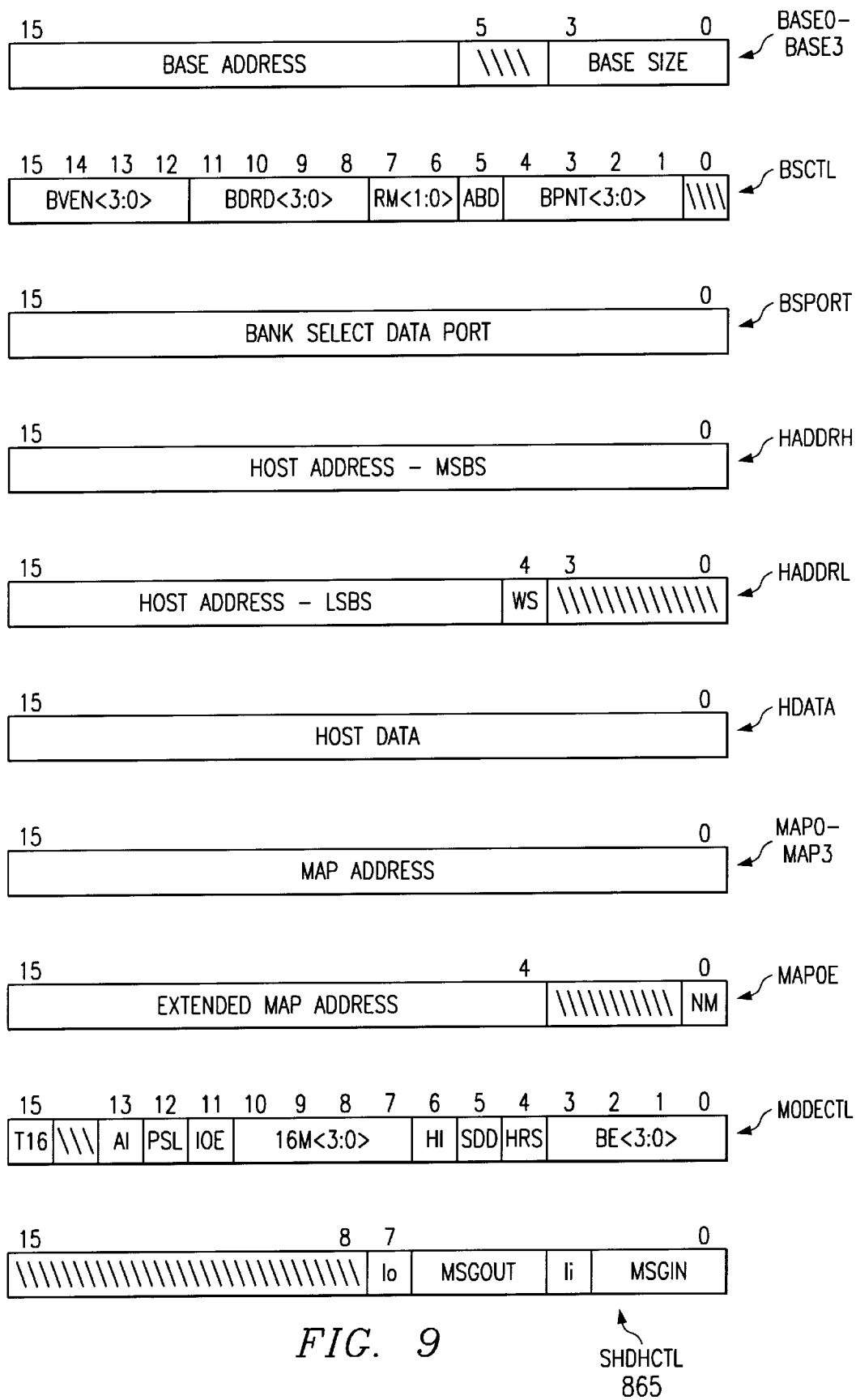
FIG. 9 is a diagram of further registers in the multifunctional access circuit of FIGS. 4, 6 and 7.

HINT is an output signal from the 34020 and HINT is activated by the GSP writing to GSP host control register. HINT is intercepted by the circuit 761 and turned into PCINT. FIG. 9 shows a detail of register 865 designated SHDHCTL. Bits Ii and Io are the images of two bits in the 34020 host control register. Ii controls the host message interrupt to the 34020 if the host 110 requested an interrupt by writing Ii. PCINT is the result of Io. The Io bit in register 865 is fed by HINT and goes from the 34020 to the circuit 761. When bit Io in the GSP is active it makes HINT active. In circuit 867 of FIG. 19 HINT is buffered and put out as PCINT.

Thus in this embodiment, the Ii bit is written by a signal on the host data bus and redundantly passed through the transceiver to the Ii bit of the corresponding register in the 34020. The Io bit of host control register HSTCTLL in the 34020 is written by the 34020 and fed to the HINT output of 34020 whence it is buffered in the circuit 867 and fed to the interrupt output PCINT. The Io bit of the shadow register 865 is also written in the shadowing process by the data portion of the LAD bus and fed to the interrupt output PCINT. In this way, interrupt signalling is completely supported, and furthermore interrupt polling and message passing also occur with reduced burden to the 34020.

A distinct other operation herein also called shadowing involves VGA pass through mode. In VGA the host 110 does the processing work that a GSP would do. The VGA card 1105 (FIG. 8) has memory 1111 to buffer the graphics data coming from the host, and a palette RAM 1113 and digital to analog converter DAC 1115. The circuits 781 and 785 of FIG. 7 operate so that access circuit 116 herein is said to shadow the VGA accesses to duplicate in palette 4000 any changes to the VGA palette 1113 entries. Different VGA signals include pixel data information and address information. Host 110 using VGA might perform operations which correspond to drawing a circle. Then it would write pixel data to the VGA buffer for display of video scan lines portraying the circle. Taking the circle example a step further, the color of the circle can be more efficiently changed by modifying a palette RAM entry than changing numerous VGA buffer entries. VGA detector 781 detects VGA addressing for VGA palette update by host 110 on bus 115 and simultaneously updates the palette 4000 as if it were the VGA palette.

The TMS34094 is a TSC500 standard cell ASIC to interface a TMS34020 to the ISA (Industry Standard Architecture) bus, or MCA (Micro Channel Architecture) bus.

MCA and ISA are both designed for the Intel 80×86 microprocessors, and so are similar in many aspects. This makes it relatively easy to offer support for both buses within the same chip, without incurring a great overhead compared with offering support for only one bus.

The primary features are listed below.

The TMS34094 will support two methods of access:

Memory mapped—TMS34020 memory space mapped directly into the PC memory space using mapping registers.

I/O mapped—TMS34020 memory space accessed indirectly via ADDRESS and DATA registers in PC I/O locations.

In order to further support a TMS34010-like interface, the TMS34020's HSTCTLL I/O register will be shadowed within the TMS34094, and will be accessible from a PC bus I/O location. This will allow either of the following handshake/interrupt schemes to be used efficiently:

Direct interruption, using the IRQ pins of the PC bus with selectable priority.

Polled, without hampering TMS34020 performance by having to access the HSTCTLL register directly.

The TMS34094 will also provide:

Support for 16 Mb address range (24 bits). This is the full range available for ISA. MCA has the capability to use 32 bit addressing (4 Gb).

Full compatibility with ISA bus limitations on 16-bit transfers (minimum segment size for 16-bit transfers is 128 kb). No such restrictions exist for MCA.

One bus wait state capability on ISA accesses. Zero wait state capability on MCA accesses.

Shadowing of direct writes to the VGA palette to allow VGA pass-through.

Support for power-up BIOS ROM mapped into the TMS34020's memory space on the graphics subsystem.

In addition, the following features not directly related to ISA/MCA/TMS34020 interfacing will be provided, in order to further reduce the system chip count:

A set of four fully programmable bank select signals, which can be gated, typically with $\overline{RAS}$, but perhaps with $\overline{CAS}$, $\overline{WE}$ or $\overline{TR/QE}$ from the TMS34020 to control which bank of memory is to be selected.

A signal to the video back-end to directly support the use of VRAM split serial register transfers. This signal will indicate when to insert the required SCLK pulse between the nonsplit and split transfers, in order to ensure correct operation.

FIG. 1 shows a typical system containing the TMS34094. The TMS34094 is connected directly between the PC bus and the TMS34020. No other interface hardware is required except:

A DIP switch package to determine the I/O address mapping (not required for MCA as pins must be wired to GND).

A DIP switch selector to determine which of the PC's IRQ lines the TMS34094's PCINT output is connected to.

A quad OR package to allow $\overline{RAS}$ to be gated with BSEL<3:0> to produce one $\overline{RAS}$ signal for each bank.

A PAL to control access to the palette.

In order to write a single byte to the TMS34020's local memory, a read (modify) write of the word containing the byte is performed.

This only applies to direct memory mapped accesses; the I/O registers on TMS34094 can be accessed as bytes or words.

| Key: | | |
|---|---|---|
| HI signals: | HA<31:5>, HBS01, HBS23, $\overline{HCS}$, $\overline{HREAD}$, $\overline{HWRITE}$ | |
| HI returns: | HRDY, HDST, $\overline{HOE}$, $\overline{HINT}$ | |
| MC signals: | $\overline{ALTCH}$, $\overline{RAS}$, $\overline{CAS2}$, $\overline{WE}$, SF, LCLK1, LCLK2 | |
| PC signals: | All PC bus input signals that the TMS34094 has pins for. | |
| PC returns: | CHRDY, $\overline{M16/CDDS16}$, $\overline{IO16/CDSFDBK}$, $\overline{NOWS}$. | |
| OR: | Quad OR package to gate BSEL<3:0> with $\overline{RAS}$. | |
| PAL: | Decodes VGASHAD, $\overline{WE}$, $\overline{TR/QE}$ and LAD<3:0> status code to control accesses to the palette. | |
| SEL: | Selector switch to determine which IRQ line PCINT connects to. | |
| MAP: | Selector switches to determine the value of IOSEL/$\overline{MCASEL}$<2:0> | |

A typical system containing the TMS34093 is illustrated in FIG. 4.

The TMS34094 will be packaged in a 160 pin EIAJ standard Quad Flat Pack. There are 146 functional pins, which are listed below. The remaining 14 pins will be used for VCC (6) and GND (8). See FIG. 6.

Many of the pins have both ISA and MCA functions. If these cases, the pin will have two names; the first corresponding to the ISA function, the second to the MCA function, and the two will be separated by a slash (/).

The following pins are inputs connected to the TMS34020 pins of the same name. The LAD bus are also outputs.

| LCLK1 | Local clock 1. |
|---|---|
| LCLK2 | Local clock 2. |
| LAD<31:0> | 32-bit local address/data bus. |
| $\overline{ALTCH}$ | Address latch. |
| $\overline{RAS}$ | Row address strobe. |
| $\overline{CAS2}$ | Column address strobe indicating access to the LS byte of HSTCTLL. |
| $\overline{WE}$ | Write enable indicating a write to HSTCTLL. |
| SF | VRAM special function pin, required to control SCLK insertion signal. |
| HDST | Host data strobe, for latching data into the TMS34094. |
| $\overline{HOE}$ | Host output enable for driving data out of the TMS34094. |
| HRDY | Host ready, indicates when a PC initiated cycle can complete. |
| $\overline{HINT}$ | Host interrupt, indicates an interrupt to the PC bus from the TMS34020. |

The following pins are outputs, which either connect to the TMS34020 pins of the same name, or to some other function in the TMS34020 system.

| $\overline{HCS}$ | Host chip select, asserted when a PC bus access to the TMS34020's local memory is detected. |
|---|---|
| $\overline{HREAD}$ | Host read, asserted in conjunction with $\overline{HCS}$ during PC read accesses to the TMS34020's local memory. |
| $\overline{HWRITE}$ | Host write, asserted in conjunction with $\overline{HCS}$ during PC write accesses to the TMS34020's local memory. |
| HA<31:5> | Host address, determines the 32-bit location in the TMS34020's local memory to be accessed. |
| HBS01 | Host byte select 01, connected to both HBS0 and HBS1 on the TMS34020, to indicate that the PC access is to the even 16-bit word of the 32-bit word specified by HA<31:5>. |
| HBS23 | Host byte select 23, connected to both HBS2 and HBS3 on the TMS34020, to indicate that the PC access is to the odd 16-bit word of the 32-bit word specified by HA<31:5>. |
| $\overline{RESET}$ | Reset. |
| $\overline{BSEL}$<3:0> | Bank selects, these can be gated with $\overline{RAS}$ or another TMS34020 signal to select the appropriate memory bank. |
| SSRT | Split serial register transfer indicator, used by the video back-end to insert an SCLK pulse required by VRAMs between normal and split serial register transfers. |
| VGASHAD | VGA shadow, indicates that a VGA palette write is being shadowed. |

The following pins are inputs, most of which are connected to the ISA or MCA bus lines of the same name. The D bus are also outputs.

| BCLK | 8 MHz ISA Bus clock. |
|---|---|
| BALE/$\overline{ADL}$ | Bus Address Latch Enable/Address Decode Latch. |
| SA/A<19:0> | System address bus/Address bus. |
| LA/A<23:20> | Latchable Address bus/Address bus, for accesses above 1 Mb. In ISA mode, these signals are connected to an internal pull-down current source, as they will be unconnected if the TMS34094 is plugged into an 8-bit slot. |
| LA<19:17> | Latchable Address bus. In ISA mode, these signals are connected to an internal pull-down current source, as they will be unconnected if the TMS34094 is plugged into an 8-bit slot. |
| D<15:0> | Data bus. |
| $\overline{MRDC}$/MADE24 | Memory Read Command/Memory Address Enable 24. In ISA mode, this signal is connected to an internal pull-up current source, as it will be unconnected if the TMS34094 is plugged into an 8-bit slot. |
| $\overline{SMRDC}$/$\overline{S0}$ | Memory Read Command (when access is to 1st Mb of address range)/Encoded read/write Status 0. |
| $\overline{MWTC}$/$\overline{CDSETUP}$ | Memory Write Command/Card Setup. In ISA mode, this signal is connected to an internal pull-up current source, as it will be unconnected if the TMS34094 is plugged into an 8-bit slot. |
| $\overline{SMWTC}$/$\overline{S1}$ | Memory Write Command (when access is to 1st Mb of address range)/Encoded read/write Status 1. |
| $\overline{IORC}$/M/$\overline{IO}$ | I/O read command/Memory/IO access indicator. |
| $\overline{IOWC}$/$\overline{CMD}$ | I/O Write Command/Command. |
| $\overline{SBHE}$ | System high byte enable, active when data is transferred on D(15,8). |
| AEN | Address enable. The TMS34094 ignores ISA DMA cycles, indicated by high a level on this pin. |
| REFRESH | Refresh. The TMS34094 must ignore PC refresh cycles. |
| RESDRV/CHRESET | Reset. |
| IOSEL/$\overline{MCASEL}$<2:0> | I/O select/MCA select. These pins are not connected to the ISA or MCA bus, but are connected to VCC or GND (usually through a DIP switch) to form a binary code. Six of the eight combinations indicate valid |

| | -continued |
|---|---|
| | mappings for where in the ISA I/O address space the TMS34094 resides. One of the illegal ISA combinations (000) selects MCA mode operation for the TMS34094. |
| BIOSEN | BIOS enable. This pin should be connected to VCC or GND (possibly through a DIP switch for configurability). Setting BIOSEN high (VCC) maps BIOS EPROM in the graphics subsystem into the PC's memory map at reset. |

The SA/A<19:0> and LA/A<23:20> are used together to form the full 24-bit address range. For ISA, LA<19:17> are the same value as SA/A<19:17>, but are valid earlier, in order to provide 16-bit access decode. They are not required for MCA.

The following pins are outputs, which connect to the ISA or MCA bus pins of the same name.

| | |
|---|---|
| NOWS | No wait states, which indicates that an ISA cycle can be shortened from its default length. Unconnected in MCA. |
| CHRDY | Channel ready, which indicates (when low) that a cycle must be extended beyond its default length. |
| M16/CDDS16 | Memory is 16-bits wide/Card Data Size is 16-bits; 16 bits of data can be transferred at once during the access. |
| IO16/CDSFDBK | I/O is 16-bits wide/Card Selected Feedback. |
| PCINT | ISA/MCA interrupt. This should be connected to the required ISA or MCA IRQ line externally. |

MCA requires less pins than ISA. If configured in MCA mode, the following input pins are not used, and should be tied low (to GND):

BCLK; LA<19:17>; AEN.

The IOSEL/MCASEL<2:0> lines select between ISA and MCA modes of operation. Table 3-1 shows the options selectable via these pins.

Sixteen 16-bit I/O locations are for the TMS34094. These will be addressed by mapping 32 bytes of PC I/O space into the TMS34094.

In MCA mode, the TMS34094's I/O registers are mapped into the PC I/O space via a special POS (Programmable Option Select) register, accessible when the CD SETUP signal is active. This special slot specific signal allows the TMS34094 to be accessed without it being mapped into the MCA I/O space.

The ISA bus has no such setup capabilities, and so the IOSEL/MCASEL<2:0> pins are used to select where in the ISA I/O space the TMS34094 resides.

TABLE 1

TMS34094 ISA/MCA MODE SELECTION

| IOSEL/MCASEL<2:0> | Description |
|---|---|
| 0 0 0 | MCA mode |
| 0 0 1 | ISA mode - I/O mapped to 0220–023F |
| 0 1 0 | ISA mode - I/O mapped to 0240–025F |
| 0 1 1 | reserved |
| 1 0 0 | ISA mode - I/O mapped to 0280–029F |
| 1 0 1 | ISA mode - I/O mapped to 02A0–02BF |
| 1 1 0 | ISA mode - I/O mapped to 02C0–02DF |
| 1 1 1 | ISA mode - I/O mapped to 02E0–02FF |

Table 2 lists undedicated I/O locations in ISA I/O space. The address range is 10 bits, aid most of the undedicated locations are in the 2xx range. This range can be subdivided into 6 available segments where 32 consecutive bytes are available.

TABLE 2

UNDEDICATED I/O LOCATIONS

| ADDRESS RANGE | # OF BYTES |
|---|---|
| 1F9–1FF | 8 |
| 208–277 | 112 |
| 280–2F7 | 120 |
| 320–35F | 64 |
| 370–377 | 8 |
| 390–39F | 16 |
| 3E0–3EF | 16 |

Available ranges for 16 16-bit registers (32 bytes) in the 2xx region: 220–23F; 240–25F; 280–29F; 2A0–23F; 2C0–2DF; 2E0–2FF
ISA address bits: See FIG. 7A.
s = 3-bit code set via DIP switches connected to IOSEL/MCASEL<2:0> pins to determine where in ISA I/O space the TMS34094 is mapped (codes 000 and 011 are illegal).
a = 5 bits of the address used to decode which of the 32 bytes required for sixteen 16-bit registers is being accessed.

MCA requires that each adapter contain certain registers that are accessible only when the slot specific CD SETUP signal is active. Table 3-2 shows the POS registers contained within the TMS34094. These registers are also assigned I/O addresses within the MCA I/O space. Note that in ISA mode, these registers are not accessible, and are completely ignored by the TMS34094.

TABLE 3

MCA POS REGISTERS

| MCA I/O Address | REGISTER | Description |
|---|---|---|
| 0 1 0 0 | IDL | ID register - low byte |
| 0 1 0 1 | IDH | ID register - high byte |
| 0 1 0 2 | OSELL | Option Select - low byte |
| 0 1 0 3 | OSELH | Option Select - high byte |

The ID registers are read only, and contain the TMS34094's unique MCA ID number.

TMS34094 MCA ID=8101

The Option select registers are both readable, and writeable, and contain 11 bits to map in the 32-bytes of I/O space. and the CDEN (Card Enable) bit of MCA: See FIG. 7B.

MCA address bits: See FIG. 7C.
s=11 bit IOMAP field from OSEL to determine where in MCA I/O space the TMS34094 is mapped.
a=5 bits of the address used to decode which of the 32 bytes required for sixteen 16-bit registers is being accessed.

MCA I/O Decoding Scheme

CDEN is cleared to zero at reset, and until set to 1, the TMS34094 will be disabled. It will not respond to any accesses other than to the POS registers.

Other optional POS registers are allowed by MCA but not supported by the TMS34094. An attempt to write to one of these other locations will have no effect. A read will cause the ID register (low or high byte, according to SA/A<0>) to be output.

The TMS34094 does not support the MCA channel check feature, and so is required by MCA to output a 1 on D<7> when a read is made to setup register 0105. As the MS bit of the ID is a 1, this requirement is satisfied.

I/O Registers

I/O Register Map

Table 4 shows the I/O registers and their addresses within the TMS34094. All registers are 16-bit registers. The LS bit of the address determines which byte within the register is being accessed; LSB=0 is LSbyte, and LSB=1 is MSbyte. Registers can be accessed either as bytes or words.

TABLE 4

I/O REGISTERS

| ADDRESS | REGISTER | DESCRIPTION |
|---|---|---|
| 0000x | MAP0 | Map register 0 |
| 0001x | MAP1 | Map register 1 |
| 0010x | MAP2 | Map register 2 |
| 0011x | MAP3 | Map register 3 |
| 0100x | BASE0 | Base register 0 |
| 0101x | BASE1 | Base register 1 |
| 0110x | BASE2 | Base register 2 |
| 0111x | BASE3 | Base register 3 |
| 1000x | HADDRL | Host Address low |
| 1001x | HADDRH | Host Address high |
| 1010x | HDATA | Host Data |
| 1011x | SHDHCTL | Shadow HSTCTLL |
| 1100x | BSCTL | Bank Select Control |
| 1101x | BSPORT | Bank select data port |
| 1110x | MAP0E | Map extension register |
| 1111x | MODECTL | General Mode Control |

I/O Register Descriptions

The I/O registers are listed alphabetically, and described in detail: See FIG. 9.

BASE0–BASE3 (Base Registers)

In memory mapped mode, the base registers each contain a value which is compared to a number of bits of the PC address bus. When a match occurs, the base register is selected, and an access to the TMS34020 is initiated. provided that the corresponding BE<3:0> bit is set. The LS 4 bits are encoded to indicate how many bits of the base address value are to be compared with the PC address. The base address segment size can range from 8 kb to 4 Mb.

BSCTL (Bank Select Control Register)

This register contains the bits necessary to specify the bank select mode.

BPNT<3:0> is a pointer field, which points to one of 16 registers accessed at the BSPORT I/O location. It is set to zero at reset, and autoincrements when the upper byte of BSPORT is accessed (either explicitly as a byte, or as part of a 16-bit access).

ABD disable all bank selects from being unconditionally active. ABD=0 overrides all other bank selection mechanisms except VGA pass-through accesses and causes BSEL<3:0> to be permanently active. VGA pass-through accesses disable all the bank selects regardless of the state of ABD. ABD=1 allows $\overline{BSEL}$<3:0> to be controlled by the bank selection hardware. ABD is cleared at reset.

BVEN<3:0> are individual VRAM selectors for each bank. If a bank contains VRAM, and should respond to write mask load or colour register load cycles generated by the TMS34020, set the associated BVEN<3:0> bit to a 1. This will cause the bank select signal for that bank ($\overline{BSELn}$) to be asserted whenever one of these cycles occur. BVEN<3:0> are cleared at reset.

BDRD<3:0> are individual DRAM refresh disables for each bank. If a bank does not require refreshing, set the associated BDRD<3:0> bit to a 1. This will prevent the bank select signal for that bank ($\overline{BSELn}$) from being asserted whenever the TMS34020 generates a DRAM refresh cycle. BDRD<3:0> are cleared at reset.

RM<1:0> determined how DRAM refresh cycles generated by the TMS34020 should affect the blank selects. There are four options, shown in Table 5. If banks are to be refreshed selectively, the TMS34094 will use the value of LAD<16> and LAD<17> to determine which bank or banks to select when a refresh occurs. (These are the 2 LSBs of the refresh pseudo are cleared at reset.

TABLE 5

DRAM REFRESH MODES

| RM1 | RM0 | FUNCTION |
|---|---|---|
| 0 | 0 | Refresh all banks together |
| 0 | 1 | Refresh alternate pairs of banks |
| 1 | 0 | Refresh one bank at a time |
| 1 | 1 | No refresh |

BSPORT (Bank Select Data Port)

Accessing this address actually accesses the BSADn (Bank select address) or BSMSKn (bank select mask) register pointed to by the BPNT<3:0> field in BSCTL. Each bank select signal ($\overline{BSELn}$) has associated with it a 32-bit address register (consisting of two 16-bit registers, BSADnL and BSADnH), and a 32-bit mask register (consisting of two 16-bit registers BSMSKnL and BSMSKnH). These registers are discussed in detail. Like other I/O registers, they can be accessed as 16-bit words, or as bytes.

HADDRH (Host Address Register—high word)

In I/O mapped mode, the data stored in this register is used to generate HA31-HA16. In conjunction with HADDRL it forms the address presented to the TMS34020 on the falling edge of $\overline{HCS}$.

HADDRL (Host Address Register—low word)

In I/O mapped mode, the data stored in this register is used to generate HA<15:5>. The word select (WS) is used to determine which pair of HBS<3:0> signals to assert, via the HBS01 and HBS23 signals. Bits 3-0 of this register are ignored. In conjunction with HADDRH it forms the address presented, to the TMS34020 on the falling edge of $\overline{HCS}$. WS is also used to determine which 16 bits of the 32-bit data transceivers are initially mapped to HDATA.

HDATA (Host Data Register)

In I/O mapped mode, this register is used as the 32-bit data transceivers for passing data between the PC and the TMS34020. Although HDATA is only addressed as a 16-bit location, the register will be physically implemented as 32-bits aligned with the 32-bits of the TMS34020's LAD bus. The WS bit in HADDRL determines which sixteen data bits are actually accessed. This in turn corresponds to the appropriate half of the LAD bus for the access (odd or even 16-bit word). In this way, the 32-bit TMS34020 datapath is multiplexed to the 16-bit (or 8-bit) PC datapath.

MAP0–MAP3 (Map Registers)

In memory mapped mode, the map registers each contain a value which is a pointer into a segment of the TMS34020's local memory. The BASE SIZE field in the corresponding base register determines the number of bits from the map register which are to be used for the pointer. This will range from 11 to 16 bits, depending on the segment size. The remaining bits required to completely address the TMS34020's local memory come directly from 24-bit PC address unless accessing the BASE0 segment in extended map mode. The address should always be left justified. Thus, bit 15 of the map register is always associated with bit 31 of the HA bus.

MAP0E(Extended Map Register)

In extended mapping mode (when NM=0), the extended map register is utilised. MAP0 and MAP0E are concatenated together to form a 32-bit register, containing the entire 28-bit address required to completely specify the address of a 16-bit word in the TMS34020's local memory. This is then used as the initial address for a block of data transfers using the TMS34020's autoincrement mode. NM=1 is the default following reset, disabling this feature.

MODECTL (Mode Control Register)

This register contains all the mode control bits for the TMS34094, with the exception of NM and those associated with Bank Selection.

BE<3:0> are the individual base register enables. Setting BEn to a 1 enables the BASEn register. When all four are zero, or if IOE (which enables the I/O mapped interface) is a 1, the TMS34094 memory mapped interface is disabled.

HRS causes the TMS34094, the TMS34020 and the graphics subsystem of which they are a part to be reset.

SDD disables the shadowing of direct palette writes for VGA pass-through when set to a 1. Zero is the default following reset, enabling VGA pass-through.

16M<3:0> are significant only in ISA mode. They are individual $\overline{M16}$ enables for each base register. When a memory mapped access is made to the segment defined by the BASEn register, $\overline{M16}$ will be asserted if the associated 16M<3:0> bit is a 1. This allows 16-bit memory transfers to be made between the TMS34094 and the ISA bus. Note that in MCA mode, $\overline{CD\ DS16}$ is always asserted, regardless of the state of these bits, for 16-bit transfers.

HI is a transparent read-through of the TMS34020's $\overline{HINT}$ pin. This is for compatibility with the SDB (which doesn't shadow HSTCTLL). Additionally, it also reflects the true state of the $\overline{HINT}$ pin at all times. As it is possible for HINT to be activated by a retry or fault on a host access, or by the host/EMU handshake protocol, $\overline{HINT}$ may be active when the INTOUT bit in HSTCTLL (and therefore SHDHCTL) is inactive.

IOE selects I/O mapped operation for the TMS34094 when set to a 1. This allows the TMS34020 to be accessed as a device mapped into the PC I/O space, rather than as a memory mapped device.

PSL selects which half of the LAD bus 16-bit memories are connected to if dynamic bus sizing is being used in the TMS34020 system. PSL=0 means the 16-bit port is on LAD<0:15>; PSL=1 means the 16-bit port is on LAD<16:31>.

AI is the autoincrement select bit. This is to enable autoincrement of memory mapped reads, to allow prefetched reads on a future device which may only perform prefetches when in autoincrement mode. Setting AI=1 enables autoincrement mode.

T16 suppresses the assertion of $\overline{M16}$, without preventing 16-bit transfers from being performed. This allows a software test to be performed to determine whether another PC add-in card sharing a 128 kb slot in PC memory is also a 16-bit card. When the PC writes a word, the TMS34094 will be expecting a word, but will get two bytes if $\overline{M16}$ isn't driven. No data muxing will be performed when the second (odd) byte is transfered, so that the odd byte of data will end up in the LS byte of the location (overwriting the even byte). By clearing T16 and reading back the location written, the software can determine whether some other PC add-in card drove $\overline{M16}$ or not. T16 should not be set when in MCA mode.

SHDHCTL (Shadow TMS34020's HSTCTLL Register)

Io=INTOUT;

Ii=INTIN

The TMS34094 monitors the LAD bus and when a write to the LS byte of HSTCTLL is detected, the data is copied into this location. The LAD status code at this time determines whether this is a PC or TMS34020 initiated write, and invokes write protect of the appropriate bits as outlined below (the same as for the register inside the TMS34020):

Only the PC can write to MSGIN

Only the TMS34020 can write to MSGOUT

The PC can only set INTIN and clear INTOUT

The TMS34020 can only set INTOUT and clear INTIN

This register allows the PC to poll interrupts and/or messages without having to access the TMS34020's local memory. It is not directly writable as an I/O location; it is updated when the TMS34020's HSTCTLL register is written to.

The TMS34094 will allow I/O registers to be accessed either 8- or 16-bits at a time. When the TMS34094 decodes an I/O address as being resident on-chip, it asserts the 1016 signal on the ISA bus, or $\overline{CD\ DS16}$ on the MCA bus. This allows the PC to transfer 16-bits of data at once if it wishes. The TMS34094 uses the $\overline{SBHE}$ signal from the PC bus to determine whether 8- or 16-bits of data are to be transfered simultaneously.

For ISA, the $\overline{NOWS}$ signal will be asserted when an I/O access occurs, to ensure that the access is minimum duration (3 BCLKs). For MCA, CHRDY is not deasserted, so that the access is the minimum (200 ns). The only exception to this is accesses to HDATA, which may be extended if the TMS34020 is not ready.

Reset is involked in one of two ways:

By holding RESDRV/CHRESET high for 4 LCLK cycles, or

By setting the HRS bit in MODECTL.

The 4-LCLK minimum on RESDRV/CHRESET high is to ensure that noise on the signal does not cause a spurious reset. The RESDRV/CHRESET signal has been observed as particularly noisy in some PCs.

Once reset has been detected, the following occurs:

1. The $\overline{RESET}$ signal to the TMS34020 is asserted until RESDRV/CHRESET is deasserted, or for a minimum of four LCLK cycles. This ensures that the TMS34020 recognises the reset.

2. $\overline{HCS}$ is inactive high during reset, so that the TMS34020 is halted after reset, the required condition being $\overline{HCS}$ high on the rising edge of $\overline{RESET}$.

3. Certain I/O registers are initialised, as outlined in the next section.

No logic is incorporated to ensure that $\overline{RESET}$ is held low for 40 LCLK cycles at power up. RESDRV/CHRESET is active long enough to guarantee this.

Generally, the I/O registers will be left uninitiallised at reset. However, there are a number of important exceptions to this:

MODECTL will be zeroed, disabling all TMS34020 access features of the TMS34094, and enabling VGA pass-through.

SHDHCTL is zeroed so that it accurately reflects the TMS34020's HSTCTLL register, which is also zeroed at reset.

BSCTL will be zeroed, so that BSAD0L is selected, and all bank selects will be permanently enabled.

The NM bit in MAP0E is set to a 1, disabling the extended mapping mode of MAP0.

The I/O mapped interface allows the TMS34020's local memory to be accessed by way of registers mapped into the I/O space of the PC. This provides an alternative to a memory mapped interface if there is limited PC memory space available. In addition (for ISA mode), if there is not a 128 kb region of PC memory available for 16-bit memory mapped accesses, 16-bit I/O mapped accesses will be faster than 8-bit memory mapped accesses.

Setting the IOE bit in MODECTL to a 1 enables the I/O mapped interface. This mode of operation uses the TMS34020's autoincrement mode to access a block of locations in the TMS34020's memory space, beginning from the location specified in HADDR. Data is read or written by accessing the HDATA I/O register.

Figure 10:
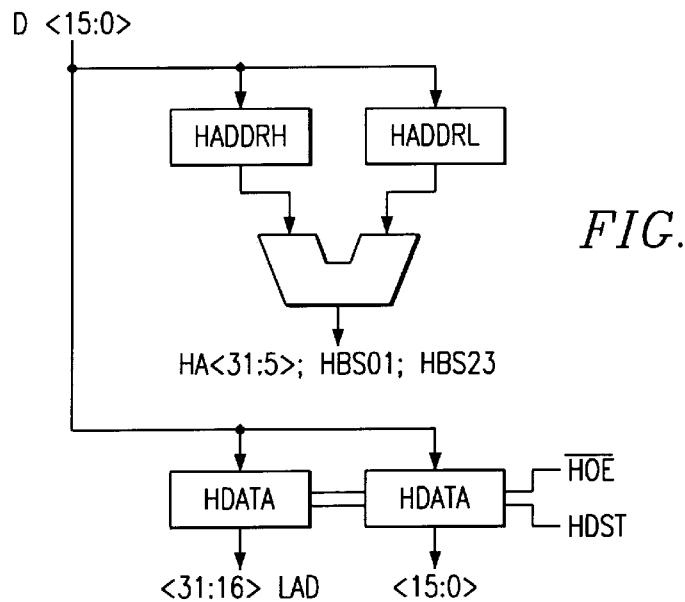
FIG. 10 is a block diagram of a port circuit in the multifunctional access circuit of FIGS. 4, 6 and 7.

The register architecture of the I/O mapped interface is outlined in FIG. 10. The address of the required location in the TMS34020's local memory is first written to HADDRH and HADDRL. Data is then transfered by either reading or writing HDATA. HDATA appears as one 16-bit location in the PC I/O space, but actually contains enough latches for 32 bits of data, as the TMS34020's LAD bus is 32-bits wide. The main features are:

- Two 16-bit address registers, HADDRL and HADDRH. These registers form a 32-bit register (known as HADDR) which contains the 28-bit address required to completely specify a word in the TMS34020's local memory.
- A 16-bit data register, HDATA. This is physically implemented as two 16-bit (data transceivers. Data is routed into or out of the appropriate half as determined by the odd/even word select bit HADDRL.
- The LS byte of the TMS34020 HSTCTLL I/O register is shadowed. This allows interrupt polling without degrading TMS34020 performance.

Selecting the Start Address

Figure 11:
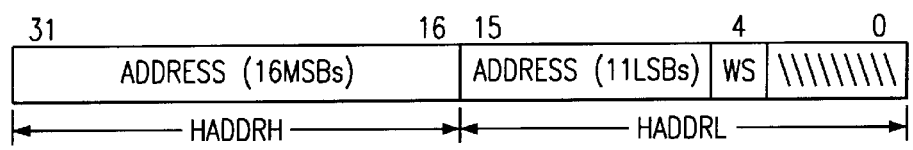
FIG. 11 is a diagram of a register in the circuit of FIG. 10.

HADDR contains the full 28-bit address of a word in the TMS34020's local memory. The most significant 27-bits are connected directly to the TMS34020's HA<31:5> bus. The least significant (WS) bit is used to determine which pair of byte strobes should be asserted via the HBS01 or HBS23 signals. FIG. 11 shows the different fields in the HADDR register.

Changing the Start Address

Reads and writes are accomplished by reading or writing HDATA. Control logic will decode these accesses, assert $\overline{\text{HREAD}}$ or $\overline{\text{HWRITE}}$ accordingly, and $\overline{\text{HCS}}$ if it was not active. The falling edge of $\overline{\text{HCS}}$ will then latch the address contained in HADDR into the TMS34020 (via HA<31:5>, HBS01 and HBS23).

$\overline{\text{HCS}}$ will then remain asserted until HADDR is accessed. Whenever a read or write of any byte of HADDR occurs. $\overline{\text{HCS}}$ is deactivated.

Once HADDR has been written to, $\overline{\text{HCS}}$ will be asserted at the beginning of the first subsequent access to HDATA. This will cause the TMS34020 to access sequential words in local memory (according to the state of the TMS34020's HINC and HPFW bits) beginning from the address contained in HADDR.

Therefore, in order to access a non-sequential location, simply writing the new address to HADDR will cause $\overline{\text{HCS}}$ to be deasserted, causing this address to be used for subsequent accesses to HDATA.

A read of HADDR will cause subsequent accesses to begin from the original address once more, without having to explicitly reload HADDR.

The TMS34020 must be placed in the appropriate autoincrement/prefetch mode (via HINC and HPFW) before using this feature.

Transfering Data

As noted above, reads and writes are accomplished by reading or writing HDATA. Because the TMS34020 cannot autoincrement by 8 bits, all accesses must be to words. Each subsequent access to HDATA will cause the TMS34020 to increment the initial address according to the state of the TMS34020's HINC and HPFW bits.

HDATA appears as a single 16-bit location within the PC I/O space, yet it is also connected to the TMS34020's 32-bit LAD bus. Because of this, HDATA is physically implemented as two 16-bit registers, although it appears as only one location in the PC I/O map. When HDATA is accessed and $\overline{\text{HCS}}$ is activated, the value of WS in HADDRL determines which half of HDATA is connected to D<15:0>. On subsequent accesses (when $\overline{\text{HCS}}$ is maintained low and the address is incremented by the TMS34020), this will toggle automatically, so that each half of HDATA is connected alternately to D<15:0>. If the TMS34020's prefetch after write mode is being used, the half of HDATA connected to D<15:0> will only change after writes. This mode will be detected automatically by the TMS34094, as it is the only autoincrement mode where both reads and writes occur during the same sequence (ie. without deasserting $\overline{\text{HCS}}$).

Although all accesses must be to words, these can be accomplished over either an 8- or 16-bit PC bus.

The PC bus asserts $\overline{\text{SBHE}}$ low when it transfers data on D<15:8>. If the accompanying address is that of an even byte (SA/A<0>=0), and the TMS34094 detects $\overline{\text{SBHE}}$ low (because it is connected to a 16-bit slot on the PC bus), a 16-bit transfer is assumed. Otherwise, the TMS34094 assumes data is being transfered as two bytes. Multiplexing logic within the TMS34094 will ensure that the data for odd bytes is transfered to or from the appropriate half of the 16-bit HDATA register currently selected.

Whether the PC bus is 8- or 16-bits wide, accesses to the TMS34020 will only be made for every 16-bits of data. In turn, the TMS34020 will only access its local memory once for every 16-bits of data (for writes) or 32-bits of data (for reads).

When an access is made to byte0 of HDATA, the appropriate $\overline{\text{HREAD}}$ or $\overline{\text{HWRITE}}$ strobe is activated. During this cycle the following will occur:

- If $\overline{\text{SBHE}}$ is activated at this time, all data will be transfered at once, and the strobe will be deactivated at the end of the access.
- If $\overline{\text{SBHE}}$ is not activated at this time, the $\overline{\text{HREAD}}$ or $\overline{\text{HWRITE}}$ strobe will not be deasserted at the end of the current access: it will remain active until the end of the access to byte 1.

Figure 12:
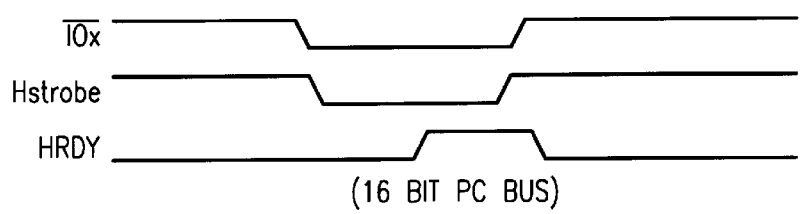
FIG. 12 is a waveform diagram of voltage versus time of signals in the multifunctional access circuit of FIGS. 4 and 7.
Figure 13:
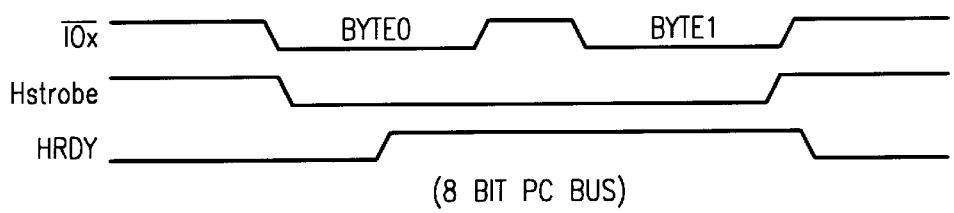
FIG. 13 is another waveform diagram of voltage versus time of signals in the multifunctional access circuit of FIGS. 4 and 7.

FIG. 12 and FIG. 13 illustrate this behavior.

$\overline{\text{IOx}}$=PC-bus IO read or write signal(s) (to HDATA I/O location)

Hstrobe=$\overline{\text{HREAD}}$ or $\overline{\text{HWRITE}}$

Data Size Considerations

Because the TMS34020 does not support 8-bit autoincrement, the I/O mapped interface will only support accesses to words. Single byte transfers will not be supported. To access a single byte, a read (modify) write is performed with software. This alleviates the need for the HADDR registers to be incrementable.

By placing the TMS34020 in increment after write mode, the PC need only write to HADDR to provide the address for the read, as the TMS34020 will not increment this until after the write has occured. This is probably worthwhile if it is necessary to write more than two or three isolated bytes at one time.

Typically, a single byte transfer will only be required occasionally. If single byte transfers were supported, a mode bit would be required to enable this mode (ie: to tell the TMS34094 to generate one TMS34020 access for each PC byte access). Thus, to write a single byte, the PC would have to:

1. Read (modify) write the MODECTL register in order to enable the single byte transfer mode.
2. Write the address of the byte to HADDR (2 I/O accesses).
3. Write the byte.
4. Read (modify) write the MODECTL register to disable the single byte transfer mode This requires eight I/O accesses. However to Simply read (modify) write the word containing the byte, the PC would 1. Write the address of the word to HADDR (2 I/O accesses).
2. Read the word.
3. Write the address of the word to HADDRL again (1 I/O access). Note that this will not be required if the TMS34020 is in prefetch after write mode.
4. Write the modified word.

This only requires five I/O accesses if HADDRL has to be respecified. Three successive single byte transfers (just repeating items 2 and 3 from the first list) would need to be performed before any performance benefit would arise, and this would be marginal.

The I/O mapped interface has:

1. (ISA Bus) single wait state (3 BCLK) access time, on 16-bit transfers or 8-bit transfers, although this may be extended if the TMS34020 is not immediately ready. When in an 8-bit slot, the 2nd byte access will be the minimum (3 BCLK) 8-bit cycle, as HRDY will already be valid.
2. (MCA Bus) zero wait state (200 ns) access time on all transfers, although this may be extended if the TMS34020 is not immediately ready. When in an 8-bit slot, the 2nd byte access will always be the minimum (200 ns) cycle, as HRDY will already be valid.

To allow interrupt polling without severely impacting TMS34020 performance, the LS byte of the TMS34020's HSTCTLL register is shadowed. Thus, polling the SHDH-CTL register in the TMS34094 obviates polling HSTCTLL without affecting the TMS34020. The $\overline{\text{ALTCH}}$, $\overline{\text{WE}}$ and $\overline{\text{CAS2}}$ signals are used to decode an access to the LSbyte of HSTCTLL, in conjunction with the address output by the TMS34020 on the LAD bus. The 16-bit SHDHCTL register within the TMS34094 will be updated from the LAD bus each time a write to HSTCTLL is detected.

The different fields within the register will be write protected in the same manner as the HSTCTLL register within the TMS34020. The status code output on the LAD bus in conjunction with the address will be used to determine whether the access is PC or TMS34020 initiated, and will invoke the appropriate write protects for the different fields.

This register will also be readable (completely asynchronously) as an I/O location from the PC bus. Protection circuitry will be incorporated to ensure that the PC does not read an indeterminate value if the TMS34020 writes to HSTCTLL while the PC is reading the I/O location.

Writing to SHDHCTL directly (as an I/O register) will have no effect.

The memory mapped interface will provide the ability to map part or parts of the TMS34020's local memory into one or more segments of the PC's memory space.

The interface will also provide the ability to disassociate the alignment of the segment of TMS34020 local memory from the alignment of the PC memory segment. This essentially requires the map register to be able to provide the full 28-bit word address required by the TMS34020, with none of the PC address bits passed through. In this mode the autoincrement mode of the TMS34020's host interface is utilised.

In addition, the ability to be able to map into a large (>1 Mb) area of PC memory is provided. This will allow the board to be used in an extended DOS environment (protected mode).

The register architecture of the memory mapped interface is outlined in FIG. 14. If the address present on the LA/A<23:20> and SA/A<19:0> buses is decoded by one of the base registers, the LS bits of the PC address and the contents of the associated map register form the address fed to the TMS34020. Data is transfered directly to or from the D<15:0> bus via data transceivers within the TMS34094 which are completely transparent to software (these are actually the same hardware which is accessible at the HDATA I/O location in I/O mapped mode). A special extended mapping mode is also available for BASE0/ MAP0.

The main features are:

Four base registers, each of which will decode a segment of PC memory space. The size of the segment will be variable on a register by register basis from between 8 kb and 4 Mb.

Four map registers, one to be associated with each base register. Each map register will point to a segment in the TMS34020's local memory space. The size of the segment will be determined by the base register size.

One map extension register. This will extend one of the map registers to contain all the bits of the address. This will allow the PC segment to be completely misaligned from the TMS34020 segment, utilising the TMS34020's autoincrement mode. When selected, this will allow the PC to transfer up to 4 Mb of data without having to remap, regardless of the alignment of the start address.

The base and map registers will be accessible as 16-bit I/O locations to the PC. Each register will occupy one 16-bit location in the PC I/O space. MAP0E also occupies one 16-bit location.

BASE1/MAP1, BASE2/MAP2 and BASE3/MAP3 always operate in this mode. Following reset, BASE0/ MAP0 are also configured to this mode (the NM bit in MAP0E is a 1). Whenever NM=1, the contents of MAP0E are ignored.

Each of the four base registers has associated with it one mapping register. Up to four segments in the PC memory space can be mapped to four segments of corresponding size in the TMS34020's local memory. Depending on the segment size, between 13 and 22 bits of the address from the PC bus will be passed directly to the TMS34020's HA bus and HBS lines. The number of map register bits used will vary to compensate for this, from 16 to 7 bits. This will always yield a 29-bit byte address, which corresponds to the 27-bit long word address to be connected to the HA<31:5> bus, and 2 byte address bits, the most significant of which is used to select either the HBS01 or HBS23 line, and the least significant of which is used to control data transfers between the TMS34094 and the PC bus. Table 6 shows how the number of significant bits in the base and map registers vary according to the segment size.

TABLE 6

VARIABLE SIZES OF BASE AND MAP REGISTERS

| SEGMENT SIZE (bytes) | BASE REGISTER SIZE (bits) | MAP REGISTER SIZE (bits) | NUMBER OF PC ADDRESS BITS |
|---|---|---|---|
| 8k | 11 | 16 | 13 |
| 16k | 10 | 15 | 14 |
| 32k | 9 | 14 | 15 |
| 64k | 8 | 13 | 16 |
| 128k | 7 | 12 | 17 |
| 256k | 6 | 11 | 18 |
| 512k | 5 | 10 | 19 |
| 1M | 4 | 9 | 20 |
| 2M | 3 | 8 | 21 |
| 4M | 2 | 7 | 22 |

By making the segment size of each base/map register pair individually selectable, the TMS34094 can map the TMS34020 into virtually any area of the PC's memory map not already allocated, even if the size of this area is not simply a power-of-2 bytes (by configuring two different sized segments together). The ability to map in a very large segment with each base register (up to 4 Mb each) is intended for applications running in protected mode. In this environment, the PC address range is 16 Mb, with all but the first megabyte available for dynamic allocation to the application. The TMS34094 can map in up to 12 Mb, by configuring three of the base registers to 4 Mb, and the fourth to 2 Mb.

The size of each segment is individually selectable. Because each base register is 16-bits, and only 11 of these bits are actually required for comparison to the corresponding bits of the PC address, there are 5 "spare" bits at the least significant end of the register. The 4 LS bits are used to select the segment size (see FIG. 16). The coding of the Base Size field is shown in Table 7-2.

Base Register Fields

TABLE 7

ENCODING OF BASE SIZE

| BS3 | BS2 | BS1 | BS0 | SEGMENT SIZE (bytes) |
|---|---|---|---|---|
| 0 | 0 | 0 | 0 | 8k |
| 0 | 0 | 0 | 1 | 16k |
| 0 | 0 | 1 | 0 | 32k |
| 0 | 0 | 1 | 1 | 64k |
| 0 | 1 | 0 | 0 | 128k |
| 0 | 1 | 0 | 1 | 256k |
| 0 | 1 | 1 | 0 | 512k |
| 0 | 1 | 1 | 1 | 1M |
| 1 | 0 | 0 | 0 | 2M |
| 1 | 0 | 0 | 1 | 4M |
| Other Combinations | | | | reserved |

Regardless of segment size, the addresses loaded into the base register's base address field and the map register are, e.g., left justified. Thus, the address bit representing MS PC address bit (LA<23>) is loaded into bit 15 of the base register, and the address bit representing HA<31> is loaded into bit 15 of the map register.

Note that when not using mapping above 1 Mb (for instance, in ISA mode when not using extended DOS), the 4 MSBs of the base register will be 0s.

When the segment size is greater than 8 kb, between 1 and 9 bits at the least significant end of the base and map register will become "don't cares". These will be ignored by the hardware.

Each base/map register pair can be selectively enabled or disabled via four Base Enable bits in the MODECTL register (BE<3:0>). This allows the user to enable only the number of different segment he requires. Setting a BEn bit to a 1 enables the BASEn register; clearing it to a zero disables it. Following reset, all four BE<3:0> bits will be zero.

If two or more base registers decode the PC address simultaneously, the base register with the lowest number will take priority, so as to avoid any conflict caused by multiple map registers attempting to drive HA<31:5> simultaneously, etc. Thus BASE0 will have the highest priority; BASE3 the lowest.

In order to support a GSP device which may have a cutdown host interface, and which may only perform prefetches in autoincrement mode (ie: there will be no address comparison mechanism), the AI bit in MODECTL will cause accesses to be made using the TMS34020's autoincrement feature, by maintaining $\overline{HCS}$ asserted.

If AI is set to a 1, the first access made to the TMS34094 will latch the address provided and assert $\overline{HCS}$ (in the normal way). However, $\overline{HCS}$ will not be deasserted after the access completes if the access was a read. $\overline{HCS}$ will remain asserted until either:

1. An access is made to the map register associated with the selected base register (ie: the map register which provided the MS HA<31:5> bits at the falling edge of $\overline{HCS}$), OR
2. An access is made to a different PC memory segment (ie: one of the other base registers decodes an access).

Either of these actions will be regarded as an end of sequence indication. A read of the map register will allow you to specify a new address without having to explicitly perform a remap.

Because the TMS34020 cannot autoincrement by 8 bits, all accesses must be to words. The TMS34094 will generate an access to the TMS34020 in the same manner as the I/O mapped interface (that is; each time a 16-bit access is made over a 16-bit PC bus, or each time a pair of accesses are made over an 8-bit PC bus). In order to write a single byte a read (modify) write is performed.

Writing a 0 to the LS (NM) bit of MAP0E causes MAP0 and MAP0E to form a single 32-bit register, EXTMAP. The other three BASE/MAP register pairs are unaffected, and continue to operate normally.

When configured in this mode, accesses decoded by BASE0 use the TMS34020's autoincrement mode to access a block of locations in the TMS34020's memory space, beginning from the location specified in EXTMAP. None of the address bits provided by the PC bus are used when an access is made. This allows the segment of the TMS34020's local memory to be completely misaligned from the segment in the PC memory space which the base register decodes. The size of the TMS34020 local memory segment is equal to the PC memory segment, but can start from an arbitrary location.

When NM is cleared to a 0, BASE0, MAP0 and MAP0E are reconfigured as shown in FIG. 15. Base registers 1, 2 and 3 are unaffected. This allows an arbitrarily aligned segment in the TMS34020's local memory equal in size to the total amount of PC memory space decoded by BASE0 to be accessed directly, without the need to perform a remap. This can be as large as 4 Mb. Additionally, other aligned segments of the TMS34020's local memory space can be mapped in concurrently via the other three base/map register pairs.

EXTMAP contains the full 28-bit address of a word in the TMS34020's local memory. The least significant bit of this address is used to determine which pair of byte strobes (HBS3-HBS2 or HBS1-HBS0) should be asserted, via the HBS01 and HBS23 signals. The remaining 27 bits form the address asserted over the HA<31:5> bus. FIG. 17 shows the different fields in the EXTMAP register.

After writing a 0 to NM, $\overline{HCS}$ will be asserted as soon as an access to the BASE0 segment is made, in the same way as for normal mapping mode, except that none of the bits of the PC address are used to form the value of HA<31:5>. All of this address comes from EXTMAP, and is latched by the TMS34020 on the falling edge of $\overline{HCS}$. Typically, the least significant part of this address (bits 15 to 4) which are contained in MAP0E, will be written at the same time as NM is cleared.

Because the TMS34020 cannot autoincrement by 8 bits, all accesses are to words. The TMS34094 will generate an access to the TMS34020 in the same manner as the I/O mapped interface (that is; each time a 16-bit access is made over a 16-bit PC bus, or each time a pair of accesses are made over an 8-bit PC bus).

Once an access is made to the BASE0 segment, all subsequent accesses decoded by the BASE0 register will cause the TMS34020 to access sequential words in local memory, as determined by the state of the TMS34020's HINC and HPFW bits. In order to access a non-sequential location $\overline{HCS}$ must be deasserted and a new address provided. $\overline{HCS}$ will remain asserted until either:

1. An access is made to EXTMAP (that is; either MAP0 or MAP0E), OR
2. An access is made to a different PC segment (ie: one of the other base registers decodes an access).

Either a read or a write to EXTMAP will deassert $\overline{HCS}$. A read will cause subsequent accesses to begin from the original address contained in EXTMAP once more, without having to explicitly remap.

The TMS34020 is placed in the appropriate autoincrement/prefetch mode (via HINC and HPFW) before using this feature.

Regardless of the mode, a set of 32-bit data transceivers are provided within the TMS34094 to accomplish the transfer of data. In I/O mapped mode, the HDATA I/O location accesses such transceivers, and the same hardware will be utilised for memory mapped mode, although they will be completely transparent to software. The byte address for an access, in conjunction with the $\overline{SBHE}$ signal from the PC bus determines which half of the 32-bit transceivers are enabled onto or loaded from the D<15:0> bus.

In order to offer support for 16-bit wide memory devices in the TMS34020's local memory, additional multiplexing logic is provided on the LAD bus side. The 16-bit Port Select bit (PSL) in MODECTL must be set according to which half of the LAD bus the 16-bit memories are connected to. This means that all 16-bit memories within the TMS34020's local memory are connected to the same half of the LAD bus. The multiplexing logic will be controlled by the value of PSL in conjunction with the value of LAD<4> on the falling edge of $\overline{ALTCH}$, or the fact that a TMS34020 host access occurs in page mode (page mode only occurs on host accesses when performing dynamic bus sizing).

Initially during an access, LAD<4> will be 0. At this time, the data transceivers will either latch or drive all 32 LAD lines. If the memory being accessed is only 16-bits wide, a second access will occur. If this occurs in page mode, or if LAD<4> is detected as a 1 (during a non page mode access), the value of PSL will determine which 16-bit half of the transceivers are to be connected to LAD:

If PSL=0, the MS 16-bits of the transceivers will be connected to LAD<15:0>, and will either latch or drive those lines according to the access type. The LS 16-bits of the transceivers will be inert at this time.

If PSL=1, the LS 16-bits of the transceivers will be connected to LAD<31:16>, and will either latch or drive those lines according to the access type. The MS 16-bits of the transceivers will be inert at this time.

The memory mapped interface will be capable of obtaining:

ISA Bus single wait state (3 BCLK) access time, on 16-bit transfers regardless of the mapping mode.

MCA Bus zero wait state (200 ns) access time on all transfers, although this may be extended if the TMS34020 is not immediately ready. When in an 8-bit slot, the 2nd byte access is the minimum (200 ns) cycle, as HRDY will already be valid.

Two interrupt schemes will be available.

Polled Interrupts via the SHDHCTL register.

Direct interrupts via the PCINT pin.

The PCINT output from the TMS34094 reflects the current state of the TMS34020's $\overline{HINT}$ pin (with opposite polarity), and should be connected to the ISA or MCA bus IRQ line. This provides a level triggered interrupt scheme.

Typically, an external DIP switch will be used to allow different IRQ lines to be selected.

In order to provide a robust shared interrupt mechanism, the TMS34094 would need to know which interrupt level it was on. This can be easily achieved via a register. However, unless this register actually controls which IRQ line is selected, the system is highly prone to error, as the interrupt priority information has to be provided twice: by loading a register from software, and by setting DIP switches on the board.

The SHDHCTL I/O register within the TMS34094 indicates the current state of the LSbyte of the TMS34020's HSTCTLL register (the INTIN, MSGIN, INTOUT and MSGOUT fields). As reads of SHDHCTL have no effect on the TMS34020, an efficient interrupt polling scheme can be implemented.

In addition, the current state of the TMS34020's $\overline{HINT}$ pin can be read from the HI bit of MODECTL. Useful if you wish to make use of the host/EMU handshake or host retry/bus fault interrupt mechanisms. In addition to INTOUT, $\overline{HINT}$ can become active under the following conditions which are not detected by shadowing HSTCTLL:

1. XOR of EMR and EMG (if the interrupt enable bit EMIEN is set). This may occur when using an emulator or debugger.
2. If a retry occurs on a host initiated access (provided that the interrupt enable bit HRBI is set).
3. If a bus fault occurs on a host initiated access (provided that the interrupt enable bit HRBI is set).

The TMS34094 will provide the ability for the graphics subsystem of which it is a part to be the primary graphics system for the PC, by allowing it to boot at power-up from a BIOS (Basic Input Output System) EPROM within the graphics subsystem. This feature is selected via the BIOSEN pin.

In order to be able to boot, the BIOS EPROM must be mapped into the PC's memory space at power-up. When BIOSEN is high, the BASE3/MAP3 register pair are initialised and enabled automatically:

BASE3 is set to 0C01. This selects C000 as the segment address in PC memory at which the BIOS EPROM is mapped, and assigns a 16 k segment size. (This means the BIOS EPROM occupies addresses C0000 to C3FFF in PC memory.)

MAP3 is set to F000. This selects F0000000 as the address in TMS34020 memory at which the BIOS EPROM is mapped (it occupies addresses F0000000 to F0003FFF).

BIOSEN is sampled during reset and BE<3> is set accordingly, so that BASE3/MAP3 are enabled if BIOSEN is high. This will then allow the BIOS EPROM to be accessed. At times other than reset, BIOSEN is ignored.

C000 is the segment address of the CGA/EGA/VGA BIOS EPROM. If one of these systems is already resident in the PC the TMS34020 graphics subsystem will not be the primary graphics hardware in the PC, and will not be required to boot at power-up. Thus conflicts should not be a problem.

The BIOS EPROM will typically contain some host code and some TMS34020 code. However, only the host code needs to be mapped into the PC's memory. Although 16 k may be insufficient to contain all the BIOS code in some applications, the vast majority of this code will typically be TMS34020 code, and does not need to lie within the bounds of the 16 k segment.

If for some reason a segment size of greater than 16 k is required, the BIOS code can cause the host to write to the BASE SIZE field of BASE3 to increase the segment size.

After power-up, application can utilise BASE3/MAP3 for other purposes simply by writing new values to them. If required the register-pair can be disabled by writing a 0 to BE<3> in the usual way.

The TMS34094 will provide the ability to perform VGA pass-through. In order to do this, the TMS34094 is able to detect writes to the VGA palette and copy the data into the palette on the graphics subsystem.

VGA pass-through will be enabled by default after the TMS34094 is reset, but can subsequently be switched off by setting the VPD (VGA pass-through disable) bit in MODECTL.

When VPD is a 0, the TMS34094 will detect accesses to the three I/O addresses which are used to store VGA palette information (03C6, 03C8 and 03C9), and initiate an access through the TMS34020's host interface by asserting $\overline{\text{HCS}}$ and $\overline{\text{HWRITE}}$. In this way, the data transfered to the VGA palette will also be latched by the TMS34094, and will subsequently be output onto the LAD bus by the TMS34020's $\overline{\text{HOE}}$ signal, and copied into the local palette, see FIG. 4.

During this special access, the VGASHAD signal output by the TMS34094 will be active. This is fed straight into the palette control PAL to initiate an access to the palette. The palette will then latch the data present on LAD<7:0> during the access. None of the TMS34094's bank select signals ($\overline{\text{BSEL}}$<3:0>) will be activated while VGASHAD is active, thereby disabling accesses to the TMS34020's local memory.

The address latched from HA<31:5> by the TMS34020 on the falling edge of $\overline{\text{HCS}}$ will depend on the TMS34094's current operating mode, and is of no consequence, except for the state of the 3 MSBs, which are used to address the appropriate registers within the local palette. As the bank selects are all disabled and the palette is accessed directly, this is acceptable. The value of HA<31:30> is encoded from the 2 LSBs of the PC address provided on SA/A<19:0>. See Table 8.

TABLE 8

VGA PASS-THROUGH ADDRESSES

| SA/A<19:0> | LAD<31:30> | PALETTE REGISTER |
|---|---|---|
| 03C6 | 10 | Read Mask |
| 03C8 | 00 | Write Address Mode |
| 03C9 | 01 | Colour Palette RAM |

Table 8 VGA Pass-Through Addresses

Although the other bits of HA<31:5> can have any value during a VGA shadow access, BSEL<3:0> will be inactive high, so that all memory is disabled. As LAD<31:30> is never 11, a TMS34020 I/O register is not accidentally accessed.

The palette control PAL decodes VGA pass-through accesses to the palette and asserts the appropriate palette control signals. A VGA pass-through access is detected when VGASHAD is active, and the status code on LAD<3:0> when $\overline{\text{ALTCH}}$ falls is 02 h (a host access). The PAL then uses LAD<31:30> at the falling edge of $\overline{\text{ALTCH}}$ to determine which palette register is to be accessed. VGASHAD should be ignored unless the host access status code is detected.

The TMS34094 will provide four active low bank select signals ($\overline{\text{BSEL}}$<3:0>), which can be gated externally with (for instance) $\overline{\text{RAS}}$ to provide four separate RAS's to four banks of memory. A quad OR package is provided externally.

The architecture of the bank select control for one bank is shown in FIG. 18. This is repeated four times to provide four separate bank select decodes. In order to offer maximum flexibility to completely define the address range for a given bank, each bank select signal will have:

Two 16-bit mask registers BSMSKnL and BSMSKnH. These registers form a 32-bit register (BSMSKn), which contain a mask of 1s and 0s to define which bits of the address output on LAD are to be ignored when determining whether or not a bank has been selected. Zeroes in BSMSKn correspond to address bits which are "don't cares".

Two 16-bit address registers, BSADnL and BSADnH. These registers form a 32-bit register (BSADn), which determines the value of the unmasked bits of the address output on LAD that should select the bank.

Some additional control logic for determining whether the bank should be selected for VRAM write mask or colour register load cycles, and DRAM refresh cycles. These are determined by the BVEN<3:0>, BDRD<3:0> and RM<1:0> bits in the BSCTL I/O register.

All banks are unconditionally enabled following reset, as ABD in the BSCTL I/O register is 0. Until this bit is set to 1, the address and mask registers, and other mode bits detailed in the following section, will have no effect. The primary reason for this feature is for BIOS support. BIOS accesses will occur before the user can set up the bank select registers. However, unless the banks are enabled, the BIOS accesses could be ignored.

When the TMS34020 generates a memory cycle, it outputs an address on the LAD<31:0> bus, which is latched by the TMS34094 on the falling edge of $\overline{\text{ALTCH}}$. If the unmasked bits of this address match the corresponding bits of any of the BSADn registers, the appropriate $\overline{\text{BSEL}}$<3:0> signal will be asserted. This will occur before $\overline{RAS}$ is asserted by the TMS34020. The $\overline{BSEL}$<3:0> signals will remain valid as long as $\overline{ALTCH}$ or $\overline{RAS}$ are active.

During special VRAM write-mask-load, or colour-register-load cycles, the VRAMs do not require an address, and the TMS34020 outputs all 0s on LAD<31:4>. During one of these cycles, the banks which contain VRAM are activated, to recognise the special cycle.

The bank VRAM enable (BVEN<3:0>) bits in BSCTL indicate whether a bank consists of VRAM or not. If the status code latched on the falling edge of $\overline{ALTCH}$ is either 0110 or 0111, signifying a VRAM write-mask-load, or colour-register-load cycle respectively, only the BSEL<3:0> signals which have corresponding BVEN<3:0> bits set will be asserted.

It is often desireable not to refresh all the memories in the system simultaneously, to minimise peak current and power consumption. The RM<1:0> bits in BSCTL provide a mechanism to control this. Table 9 shows the options available.

TABLE 9

DRAM REFRESH MODES

| RM1 | RM0 | FUNCTION |
|---|---|---|
| 0 | 0 | Refresh all banks together |
| 0 | 1 | Refresh alternate pairs of banks |
| 1 | 0 | Refresh one bank at a time |
| 1 | 1 | No refresh |

The TMS34094 uses the 2 LSBs of the refresh pseudo address output by the TMS34020 (on LAD<17:16>) to determine which banks to refresh in refresh mode 1 or 2. The pseudo address simply increments by 1 after each DRAM refresh. In mode 1, banks 0 and 1 are refreshed whenever LAD<16>=0; banks 2 and 3 when LAD<16>=1. In mode 2, both LAD<16> and LAD<17> are used to uniquely identify each bank, so that they are refreshed in sequence.

In addition, you can prevent any given bank from ever being refreshed by setting the appropriate BDRD<3:0> (Bank DRAM Refresh disable) bit to 1. This does not cause the sequence determined by RM<1:0> to be altered. For instance, if RM<1:0> is set to refresh one bank at a time, those banks enabled for refresh by BDRD<3:0> will still only get refreshed once every fourth TMS34020 refresh cycle, even if one of the banks has refresh disabled.

During VGA pass-through shadow writes, and coprocessor command cycles, all bank select signals will be inactive, so that no memory devices are selected. The VGASHD signal will explicitly select the palette. A coprocessor is explicitly selected by the status code on LAD<3:0>, SF high and $\overline{ALTCH}$ low.

There are a total of sixteen 16-bit registers required to specify four 32-bit addresses and four 32-bit masks. This is more than the required for the rest of the TMS34094's functionality. In order to keep the number of ISA I/O addresses allocated to the TMS34094 to a minimum, and because typically these registers are set once, after power-up, all sixteen registers are mapped into one ISA I/O location, BSPORT.

The BSCTL register, in addition to containing the BVEN<3:0>, BDRD<3:0>, RM<1:0> and ABD bank select mode bits, also contains a 4-bit autoincrementing pointer (BPNT<3:0>) to allow access to the sixteen address and mask registers. The pointer addresses of the bank select registers are shown in Table 10.

TABLE 10

| BPNT | REGISTER | DESCRIPTION |
|---|---|---|
| 0000 | BSAD0L | Bank Address 0 (low) |
| 0001 | BSAD0H | Bank Address 0 (high) |
| 0010 | BSAD1L | Bank Address 1 (low) |
| 0011 | BSAD1H | Bank Address 1 (high) |
| 0100 | BSAD2L | Bank Address 2 (low) |
| 0101 | BSAD2H | Bank Address 2 (high) |
| 0110 | BSAD3L | Bank Address 3 (low) |
| 0111 | BSAD3H | Bank Address 3 (high) |
| 1000 | BSMSK0L | Bank Mask 0 (low) |
| 1001 | BSMSK0H | Bank Mask 0 (high) |
| 1010 | BSMSK1L | Bank Mask 1 (low) |
| 1011 | BSMSK1H | Bank Mask 1 (high) |
| 1100 | BSMSK2L | Bank Mask 2 (low) |
| 1101 | BSMSK2H | Bank Mask 2 (high) |
| 1110 | BSMSK3L | Bank Mask 3 (low) |
| 1111 | BSMSK3H | Bank Mask 3 (high) |

BPNT<3:0> is in bits 1 to 4 of BSCTL. Thus, it contains a 16-bit word address aligned pointer.

When the BSPORT I/O location is accessed, data is routed to or from the BSxxx register pointed to by BPNT<3:0>. Just like other I/O registers, BSPORT can be accessed either as a single 16-bit location, or as a pair of bytes.

BPNT<3:0> is designed to autoincrement whenever data is transfered to or from the odd byte of BSPORT. This occurs whenever SA/A<0>=1, or when SA/A<0>=0 and $\overline{SBHE}$ is also 0, indicating a 16-bit transfer. Following reset, BPNT<3:0> is cleared to zero. The autoincrementing pointer allows all the registers to be initialised simply by writing sixteen words to BSPORT. To access a specific register, set BPNT<3:0> to the value you require before accessing BSPORT.

When performing byte transfers, in order to access the upper (odd) byte of one of the bank address or mask registers, access the odd byte of BSPORT.

Typically, the user will write to the address and mask registers, followed by a write to BSCTL to set the appropriate mode and ABD=1 before making any accesses to the TMS34020.

In split serial register VRAM mode, indicated by setting the SSV bit to a 1, the TMS34020 generates the split serial register transfer cycles required by the VRAMs. During horizontal blanking, a regular serial register transfer cycle is generated, to initialise the next VRAM row, and this is immediately followed by a split serial register transfer cycle, to configure the VRAM in split mode, and to ensure that the inactive half serial register contains undisplayed data rather than the data that was previously displayed.

However, in order for this to operate correctly, the SCLK input to the VRAM must be clocked between rising edge of $\overline{TR/QE}$ at the end of the normal transfer and the falling edge of RAS at the beginning of the split transfer to ensure that the tap point presented during the ordinary serial register transfer cycle is not overwritten. The TMS34094 provides a signal to inform the video backend logic of when to insert this pulse.

The TMS34094 looks at the status code output at the beginning of each TMS34020 memory cycle on the LAD<3:0>. If 0100 is detected and the SF pin is low (indicating an ordinary VRAM serial register transfer), the SSRT signal is asserted high on the falling edge of LCLK1 while $\overline{CAS2}$ is low. This is coincident with the rising edge of $\overline{TR/QE}$.

SSRT will remain asserted until the next falling edge of $\overline{ALTCH}$. The simplest way to generate the pulse on the SCLK signal is then to OR SSRT with the regular SCLK to generate an SCLK signal which will pulse high while SSRT is active.

Both the I/o mapped and memory mapped interfaces available on the TMS34094 are designed to make use of the TMS34020's autoincrement features. This section describes how the TMS34020 should be configured to make best use of the TMS34094's capabilities.

The TMS34020 has two mode bits, HINC and HPFW, located in the HSTCTLH I/O register. These are configured as shown in Table 11.

TABLE 11

TMS34020 AUTOINCREMENT FEATURES

| HINC | HPFW | FUNCTION |
|---|---|---|
| 0 | x | No Autoincrement |
| 1 | 0 | Autoincrement after every access |
| 1 | 1 | Autoincrement after reads only |

The response to autoincrement accesses whilst HINC=0 is given below:

For writes, the TMS34020 accesses the same 32-bit address on EACH host request. If 16-bit autoincrementing is selected (as it is by the TMS34094), the byte selects are still swapped, so successive accesses will oscillate between the two 16-bit words within the 32-bit location specified.

For reads, the TMS34020 copies all 32-bits of data from the location specified into the data transceivers (HDATA in I/O mapped mode) during the first access. On subsequent reads, no new data is transfered into the transceivers.

When HINC=0, accesses should be of the same type; either reads or writes, but not a mixture of the two. In order to change from one type to another, HCS- should be deasserted. On the TMS34094, this occurs automatically when the map registers are accessed to provide a new address.

The host can read from and write to contiguous words when HINC=1 and HPFW=0. This is the mode typically used; it allows blocks of data to be either read or written.

During read sequences, data is prefetched a long word at a time. This greatly enhances the access time for reads.

You should ensure that the HLB field in HSTCTLH (host last byte—similar to the TMS34010's LBL bit) is set to indicate which of the two words within a 32-bit word will be accessed last. Typically, this will be 00 (indicating that the odd word (data bits 16–31) will be accessed last. This is the default. However, this may be different for a big-endian host. If this is not set correctly, the TMS34020 will increment the long-word address before the PC has completely read or written the current one.

All autoincrementing accesses should be of the same type; either reads or writes, but not a mixture of the two. In order to change from one type to another, HCS- should be deasserted and a new address provided.

The host can read (modify) write contiguous words when HINC=1 and HPFW=1.

The address is incremented, and the next location prefetched, after each long word has been modified. No increment occurs after reads. This mode is useful if it is necessary to modify each 16-bit word, as each write invokes a prefetch of the next location. Use if you actually need to read the next location (to perform an RMW).

You should ensure that the HLB field in HSTCTLH (host last byte—similar to the TMS34010's LBL bit) is set to indicate which of the two words within a 32-bit word will be accessed last. Typically, this will be 00 (indicating that the odd word (data bits 16–31) will be accessed last. This is the default. However, this may be different for a big-endian host. If this is not set correctly, the TMS34020 will increment the long-word address before the PC has completely modified the current one.

In this mode of operation, the host should perform read and write requests alternately; the first access of the block can be either a read or a write. It is also possible to perform sequencial write accesses. However, the TMS34020 will still perform the prefetches.

In FIGS. 20–57 detailed block diagrams and schematic diagrams further illustrate circuitry for a preferred embodiment of the multifunction access chip 116 as a single integrated circuit device. Integration of all of the multifunction access blocks on a single chip also provides an important interconnected structural combination departure in the host-GSP environment that simplifies design of printed circuit board 106 of FIG. 1, reduces circuit size, reduces signal delays, reduces cost and increases reliability. A description of the circuits figure by figure follows next, and the APPENDIX additionally describes the circuits in FIGS. 20–57 by name. The signal lines are labeled in a mnemonic manner and are readily interpreted from their context and by breaking up the signal names into mnemonic parts. A nonexhaustive glossary of parts of signal names follows:

| | | |
|---|---|---|
| H--host | PC--host | LA--LAD bus |
| CTL--control | AC--access | EN--enable |
| VGA--VGA | SHAD--shadow | CMD--command |
| CPU--graphics coprocessor | | HIZ--high impedance |
| A--address | LATCH--latch | INT--interrupt |
| L--local | CLK--clock | MCA--bus architecture |
| CAS--column address strobe | | D--data |
| RAS--row address strobe | | OUT--output |
| R--read | IO--input/output | IN--input |
| MODE--mode | DRV--drive | HBS--host byte select |
| BS--bank select | | REG--register |
| BASE--base register | | MAP--map register |
| SEL--select | . . . H--high | . . . L--low |
| EXT--external | RDY--ready | CLR--clear |
| DST--destination, direction | | WR, WRITE--write |
| RD,READ--read | AUTOINC--autoincrement | |
| D2LA--host data to LAD | | N--number |
| MEM--memory | HCS--host control signal | |
| POSID-position and identification | | |

UL—unlatched

FIG. 20 shows a block diagram of the multifunction access device 116 of FIG. 7. In FIG. 20 device 116 includes Address Translation Unit ATU 2011 (FIG. 21) interconnected with Local Interface Unit LIU 2021 (FIG. 22), Data Flow Unit DFU 2031 (FIG. 23), and Local Decode Unit LDU 2041 (FIG. 24).

Figure 25A:
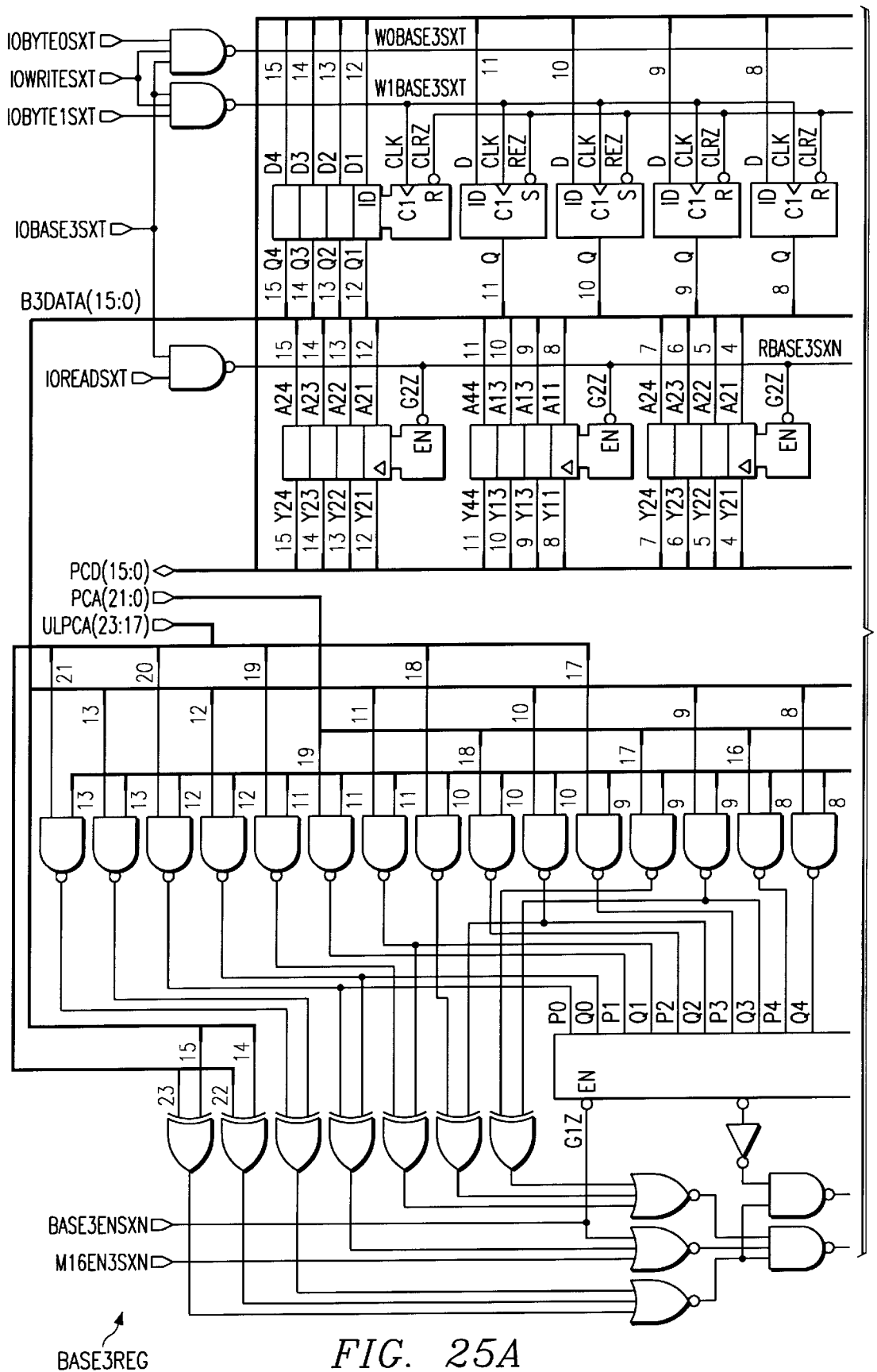
FIG. 25 is a block diagram of a base register circuit BASE3REG representative of each of four identical base register circuits BASE0REG, BASE1REG, BASE2REG, and BASE3REG in FIG. 21.
Figure 25B:
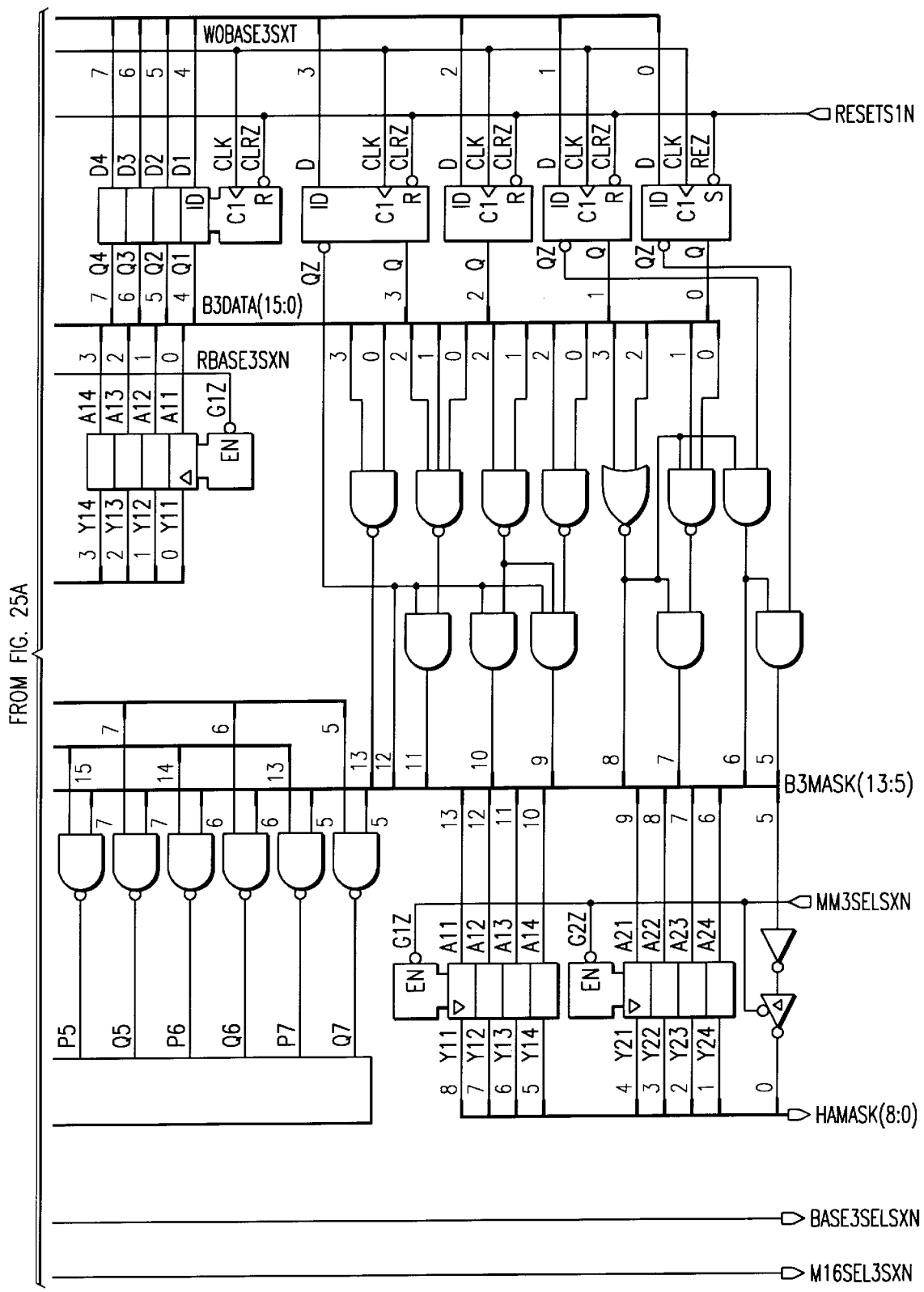

In FIG. 21 Address Translation Unit 2011 (also called an Address Control Unit ACU in the Appendix) translates the host address into address output to the TMS34020 graphics coprocessor 120. Four identical base registers BASE0REG, BASE1REG, BASE2REG and BASE3REG, detailed in FIG. 25, each contain the address of a segment in host memory. Four LSBs generate a mask to control the segment size. This is gated onto a host address mask bus HAMASK to control the merging of the host address with the appropriate Mask Register contents. FIG. 25 represents each of the base register circuits by inserting 0, 1, 2 or 3 where the index 3 appears in FIG. 25.

Figure 26:
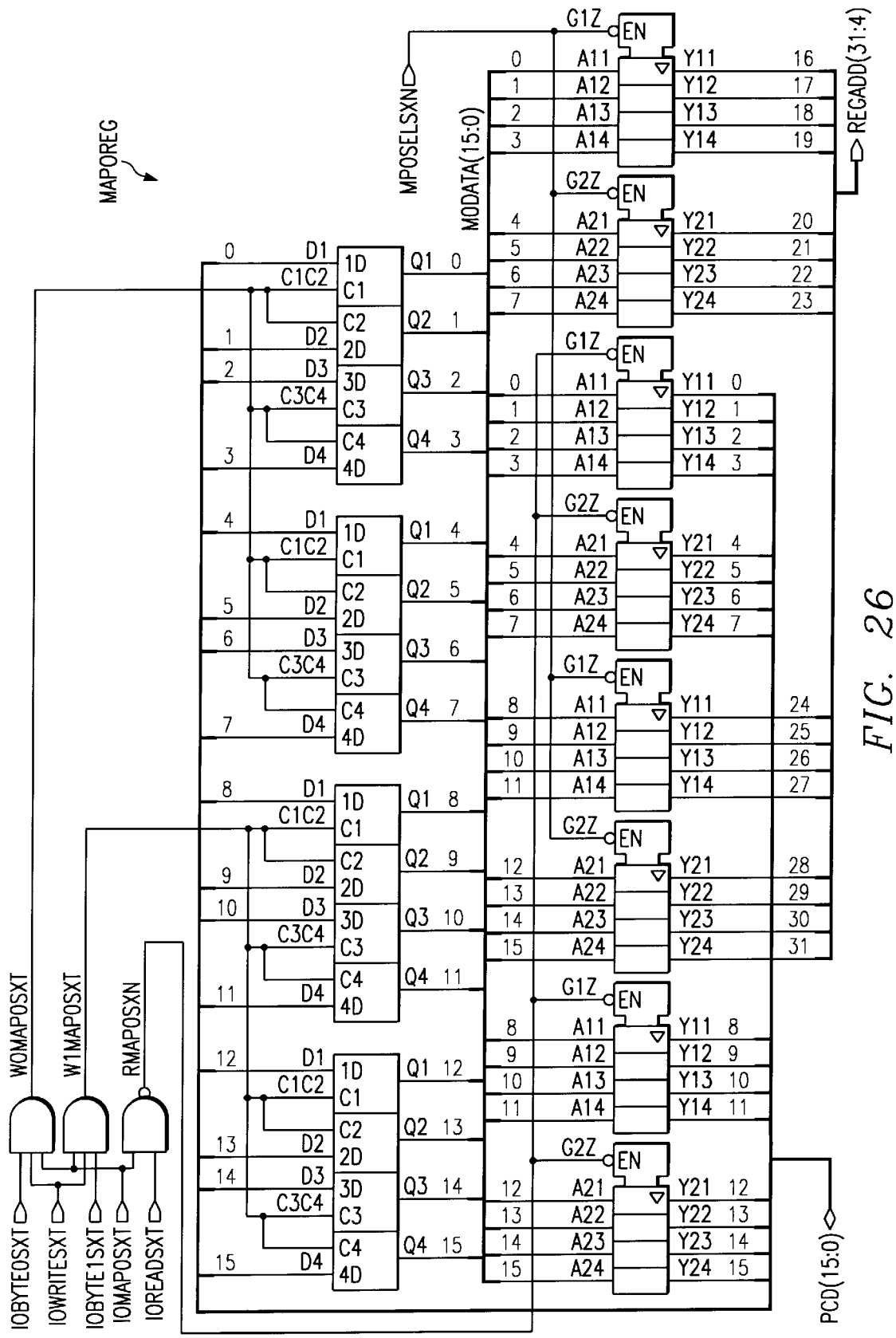
FIG. 26 is a block diagram of a map register circuit MAP0REG in FIG. 21.
Figure 27:
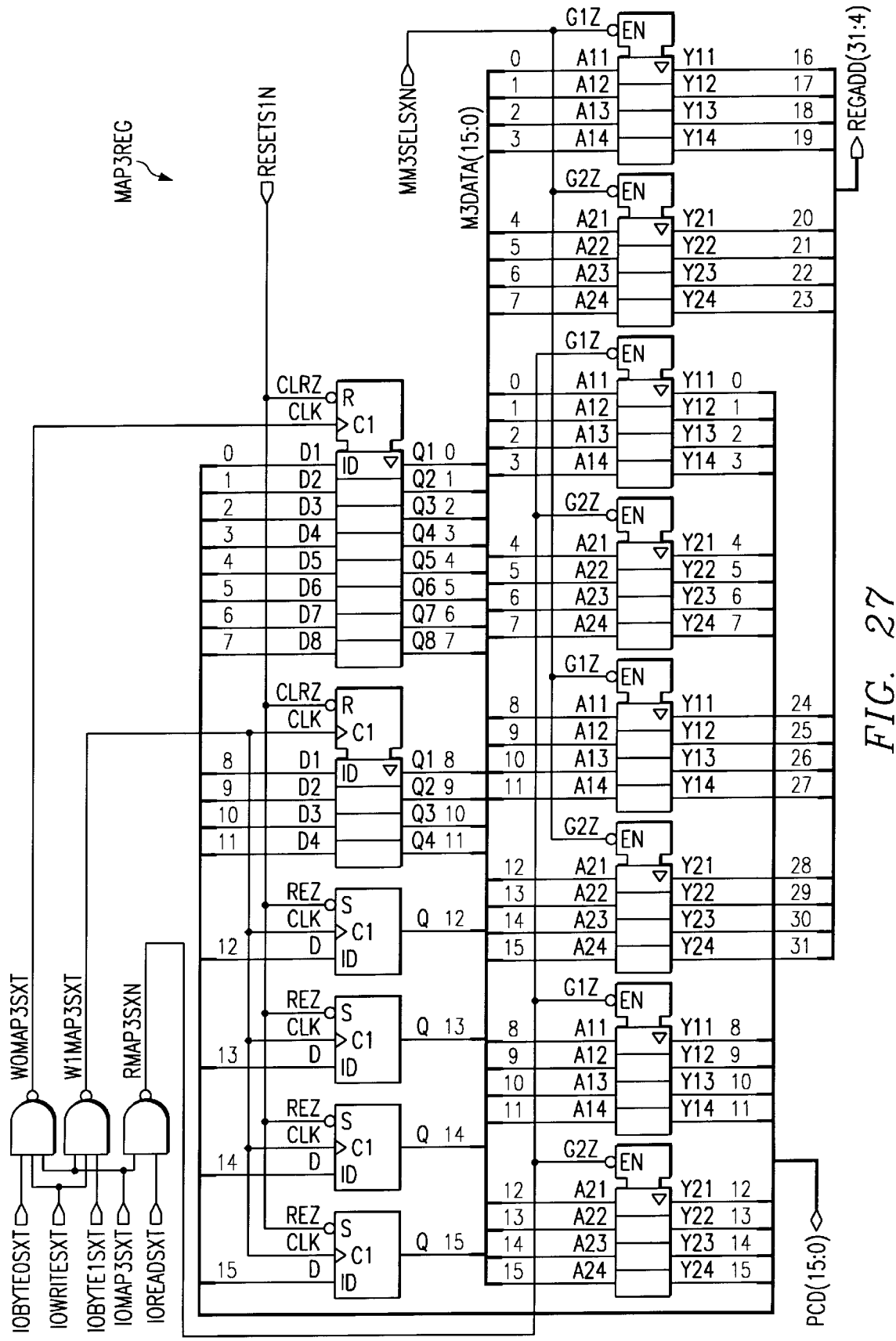
FIG. 27 is a block diagram of a map register circuit MAP3REG representative of three identical register circuits MAP1REG, MAP2REG and MAP3REG in FIG. 21.

In FIG. 21 four map registers MAP0REG, MAP1REG, MAP2REG, MAP3REG, detailed in FIGS. 26 and 27, each contain the address of a segment in TMS34020 memory. (FIG. 27 shows MAP3REG and represents MAP2REG and MAP1REG by inserting 2 or 1 where the index 3 appears in FIG. 27.) This segment is gated onto the REGADD bus when the corresponding BASE register is activated. The segment is then merged with the host address LSBs to form the address output to the TMS34020. Another map register MAP0EREG, detailed in FIG. 28, contains the LS part of the address output to the TMS34020 when extended mapping of MAP0REG is enabled. Along with MAP0REG, this register MAP0EREG completely specifies the address value on bus HA[31:5].

Figure 29:
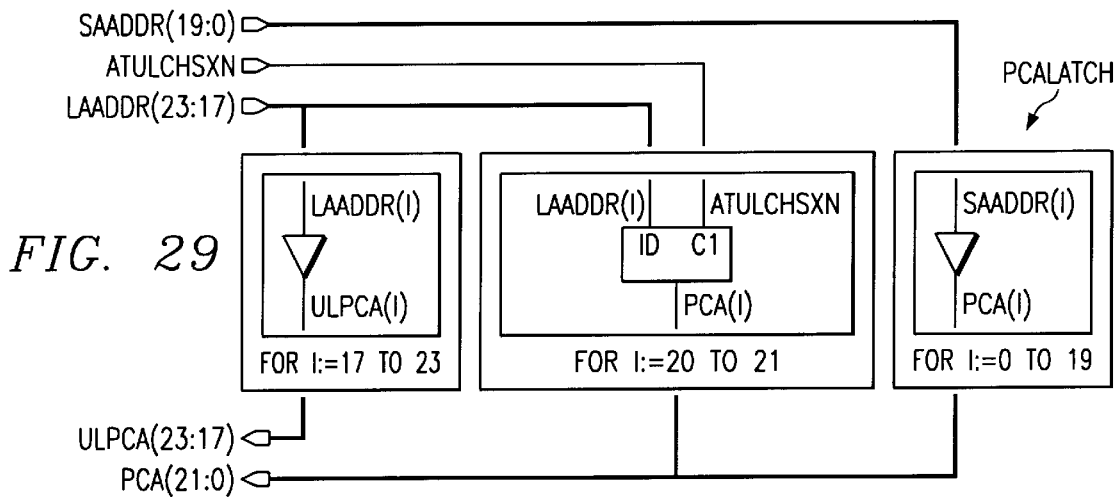
FIG. 29 is a schematic diagram of an address latch circuit PCALATCH in FIG. 21.

Block PCALATCH in FIG. 21 is detailed in FIG. 29. This circuitry acts as a host address latch that latches bus lines SAA[19:0] and LA[23:20] on the falling edge of CMD- in MCA mode. In ISA mode, LAA[23:20] is latched on the falling edge of BALE-.

Figure 30:
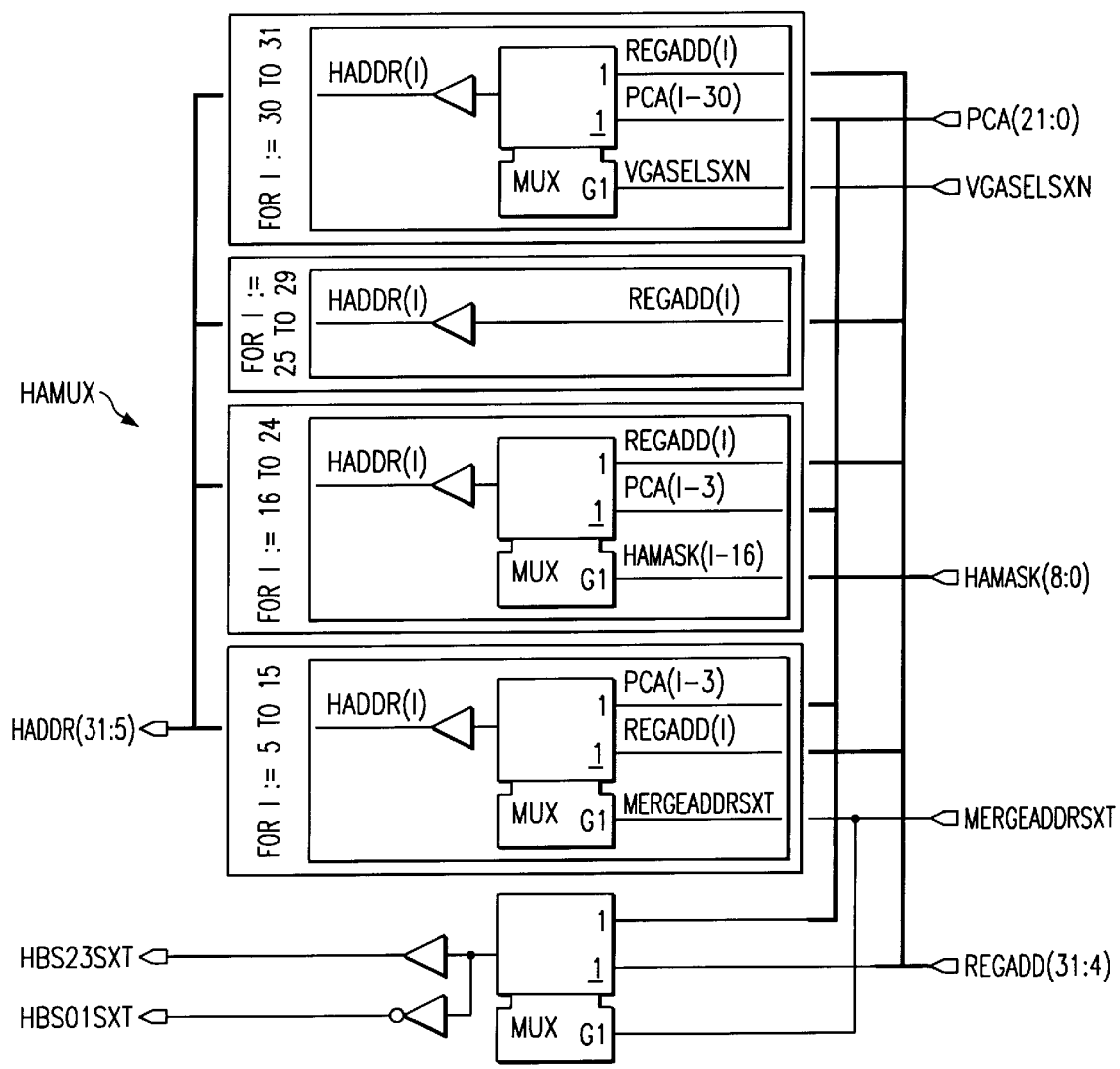
FIG. 30 is a schematic diagram of a circuit HAMUX of FIG. 21.

Block HAMUX in FIG. 21 is detailed in FIG. 30. HAMUX merges the host address with the MAP register address under the control of HAMASK. MERGEAD-DRSXT line controls the 12 LSBs for extended mapping or I/O mapped mode. Line VGAMUXSXT causes the 2 LSBs of the PC address to be output on bus lines HA[31:30] for VGA pass-through decode.

Figure 32:
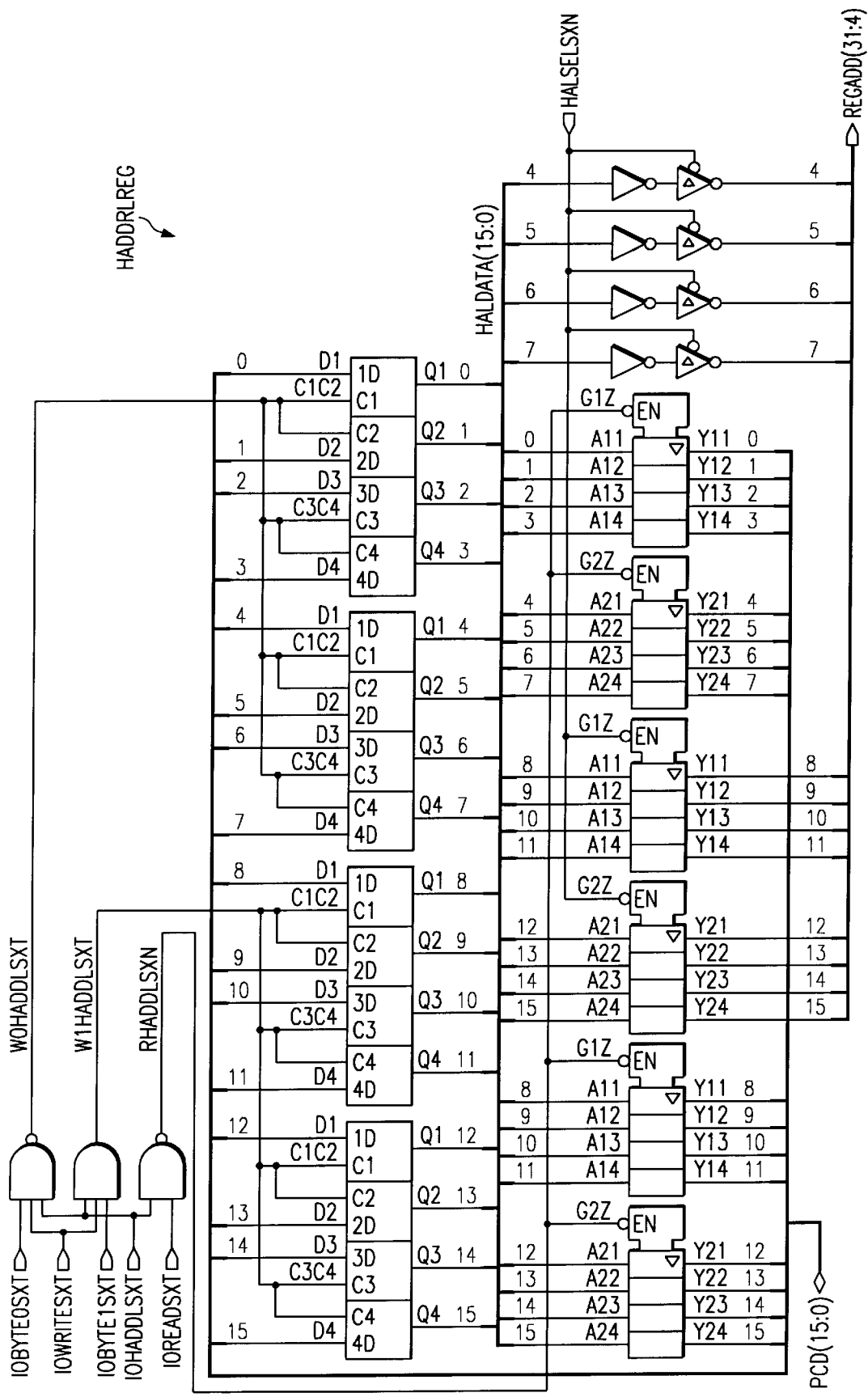
FIG. 32 is a schematic diagram of an address register circuit HADDRLREG of FIG. 21.

Blocks HADDRHREG and HADDRLREG in FIG. 21 are detailed in FIGS. 31 and 32. These correspond to registers HADDRH and HADDRL of FIG. 10.

Figure 33:
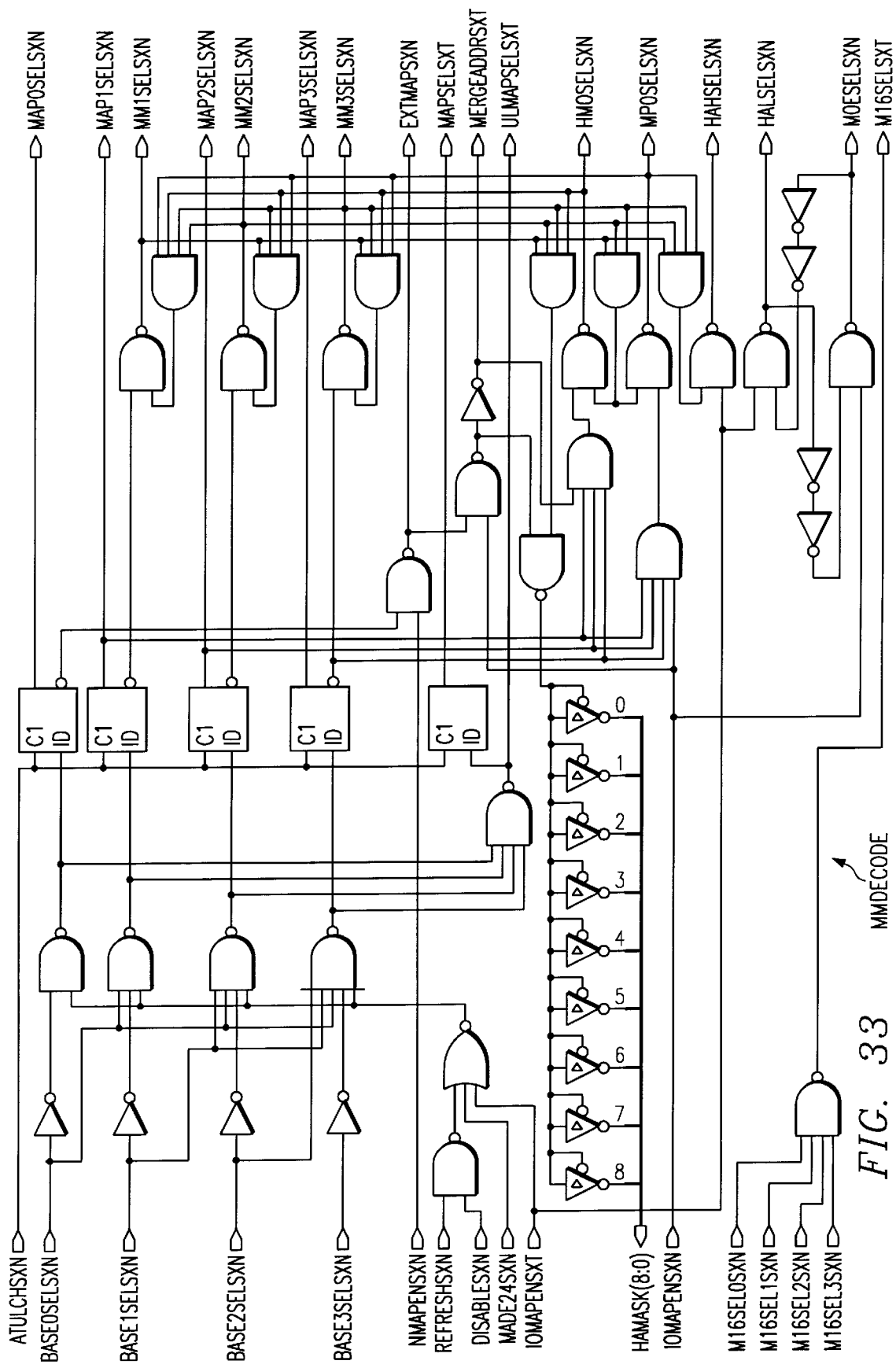
FIG. 33 is a schematic diagram of a decode circuit MMDECODE of FIG. 21.

Block MMDECODE in FIG. 21 is detailed in FIG. 33. The MMDECODE logic prioritizes the BASE register decodes, and determines which MAP register is to be selected. Then it determines which address and map values should be used. Block MMDECODE with its priority logic generally corresponds to control circuit 811 of FIG. 14A, and provides an advantageous alternative to counter circuit 815.

Figure 22A:
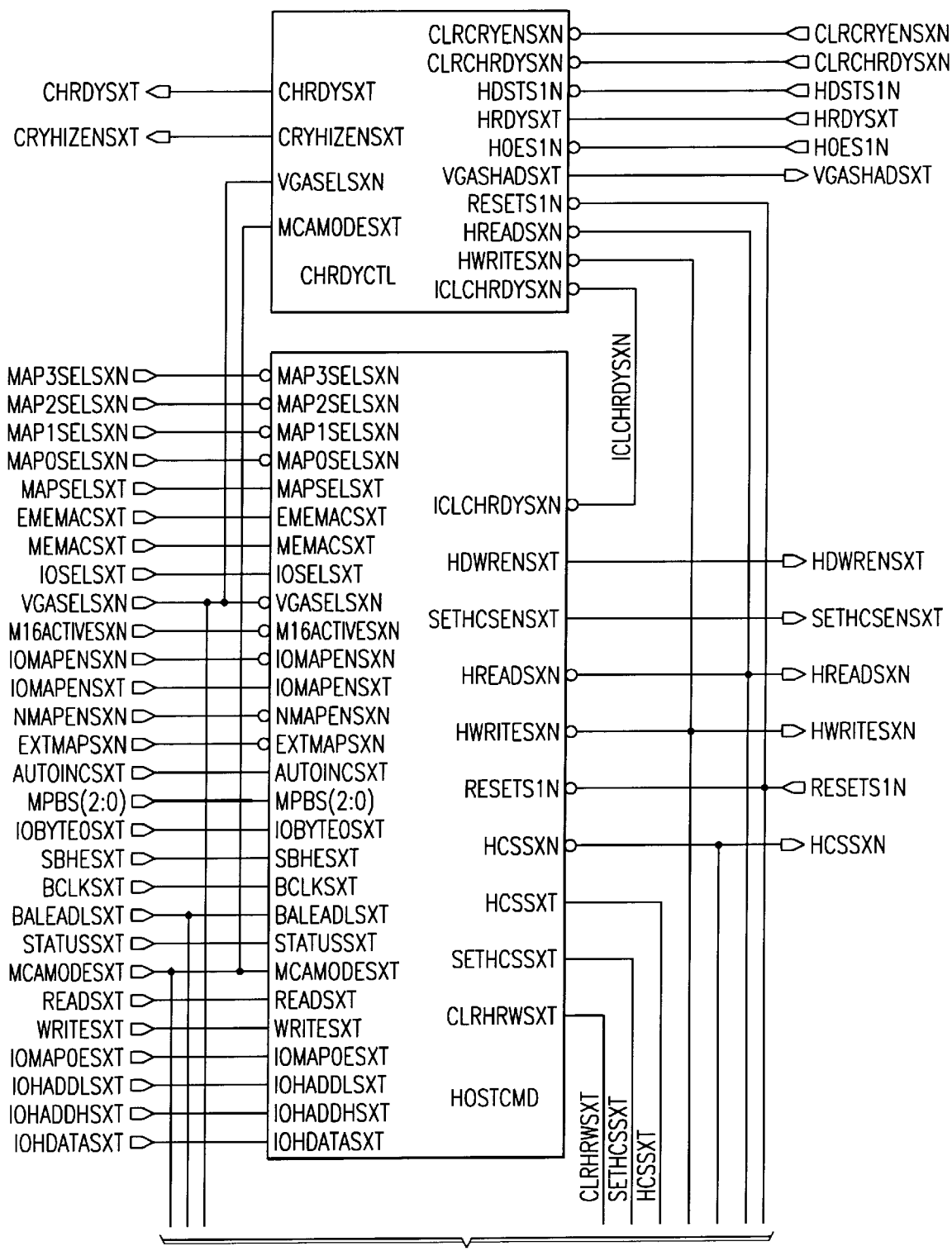
FIG. 22 is a block diagram of a Local Interface Unit block LIU of FIG. 20.
Figure 22B:
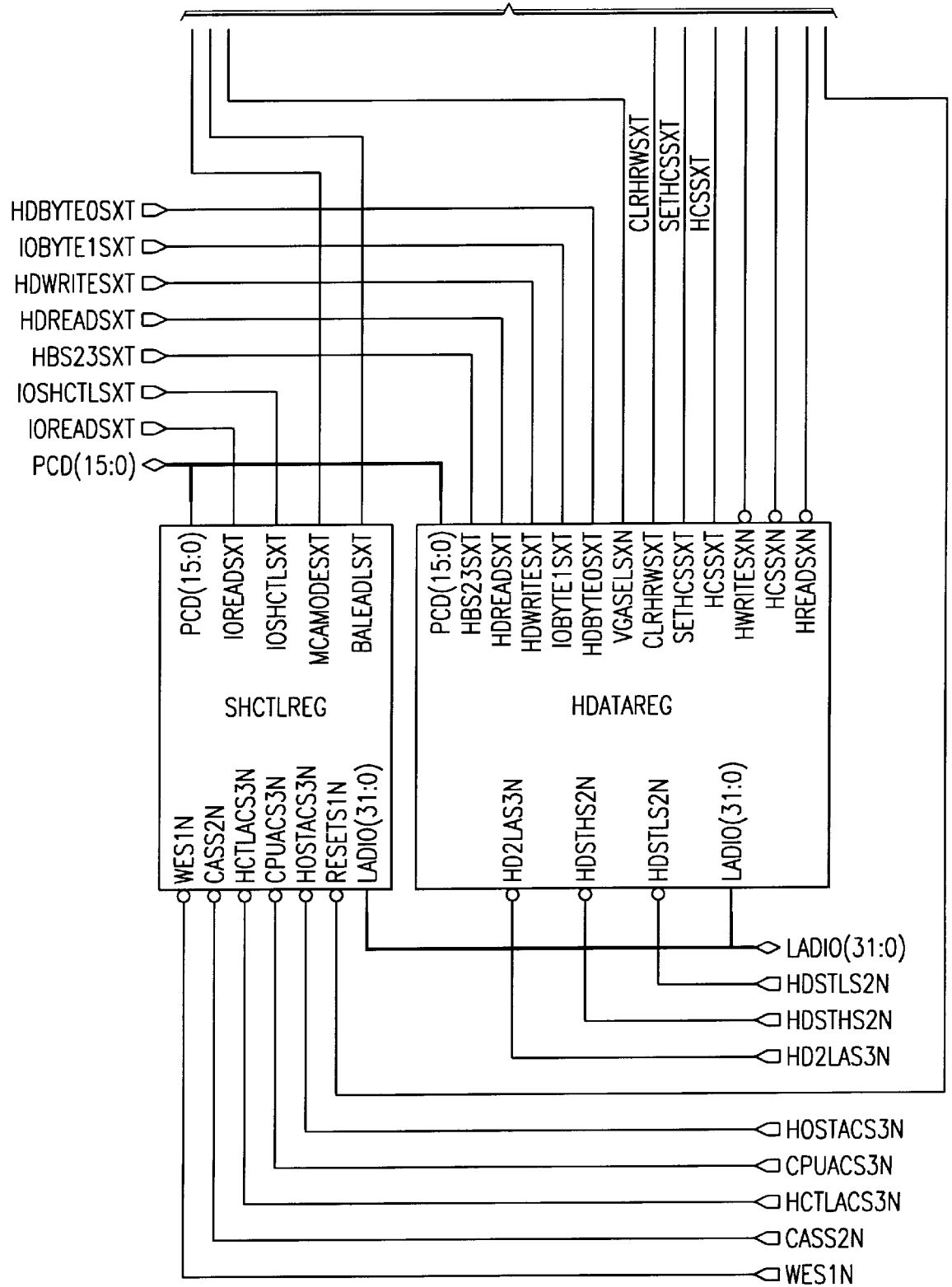
Figure 23A:
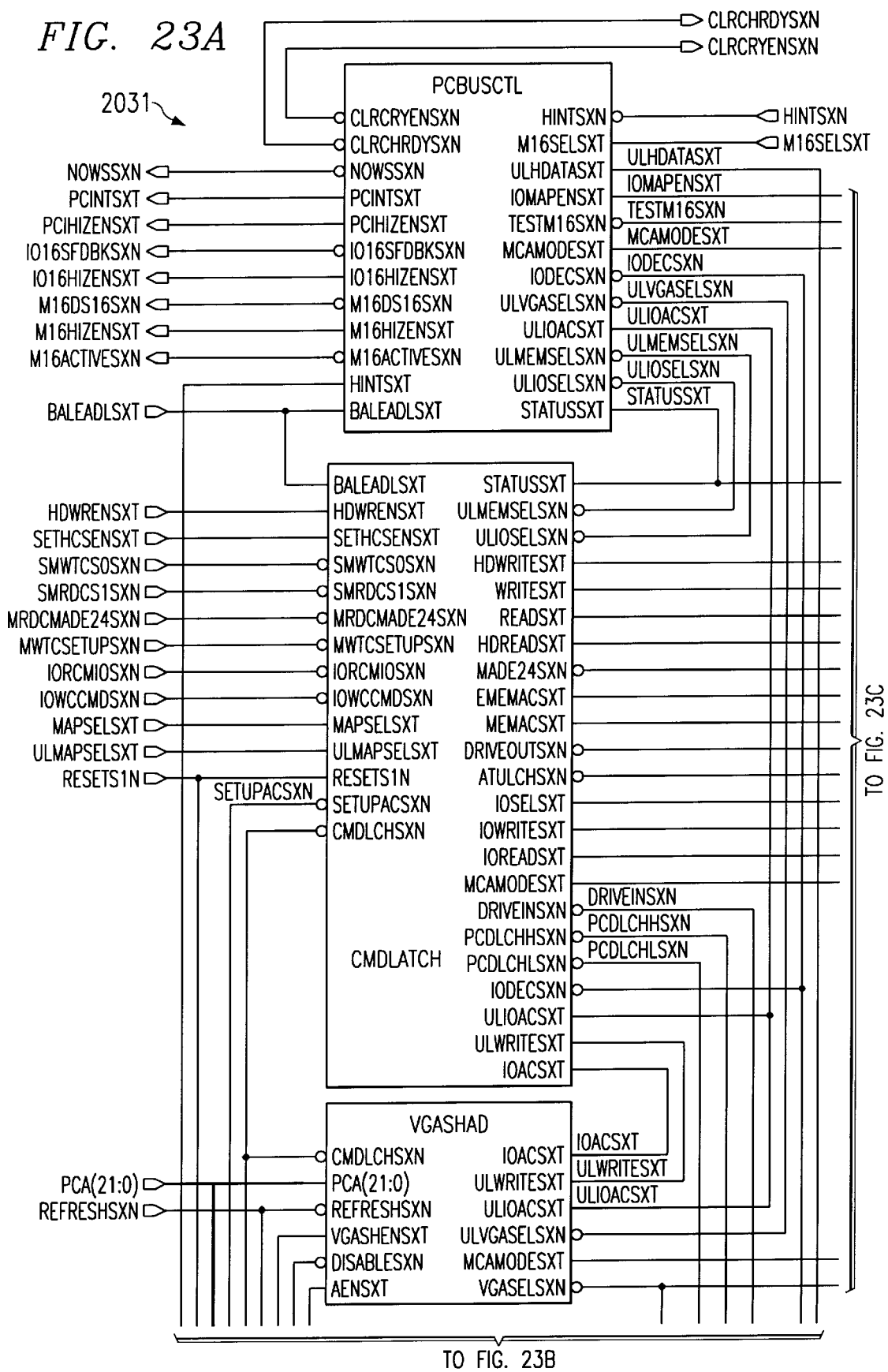
FIG. 23 is a block diagram of a Data Flow Unit block DFU of FIG. 20.
Figure 23B:
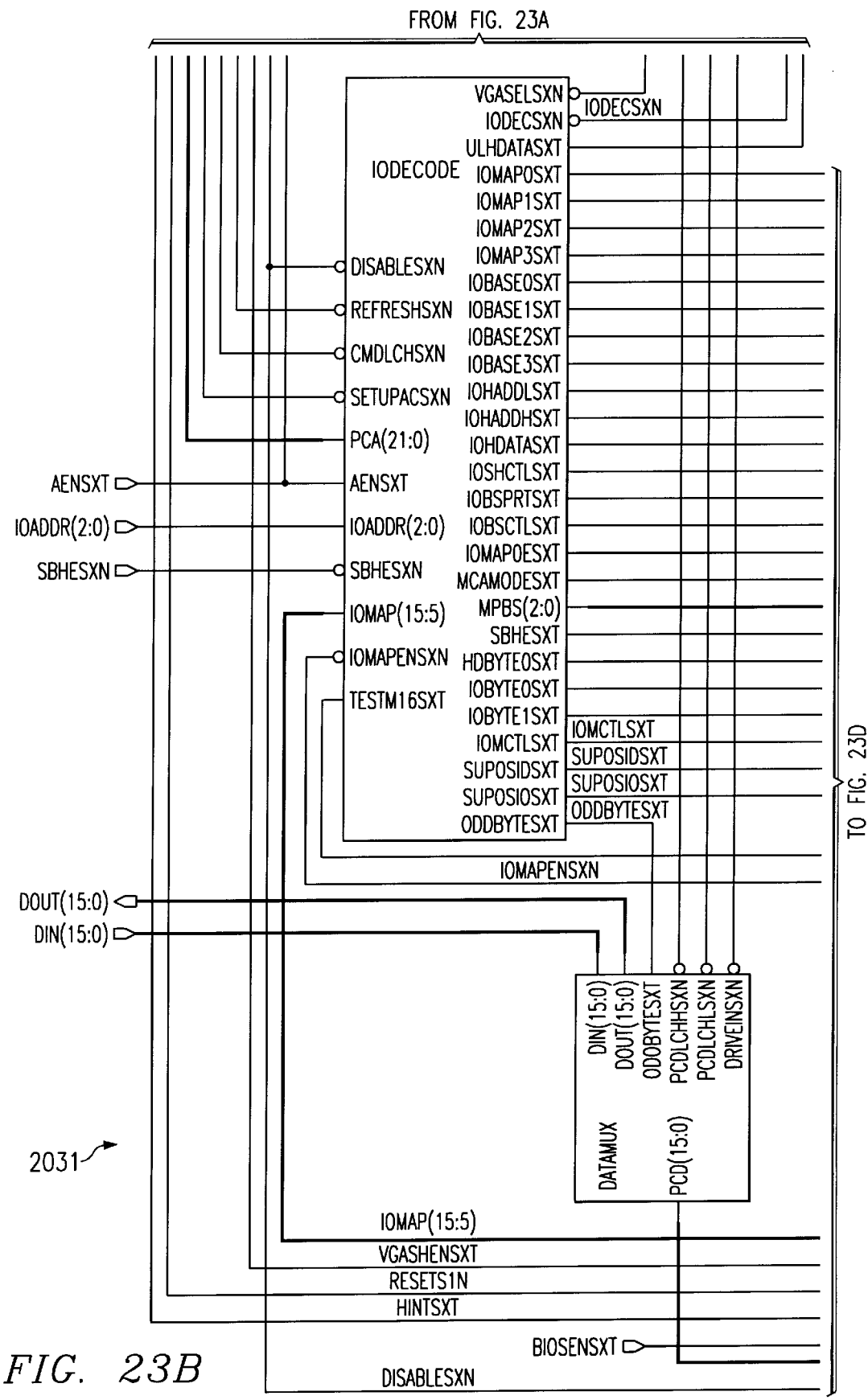
Figure 23C:
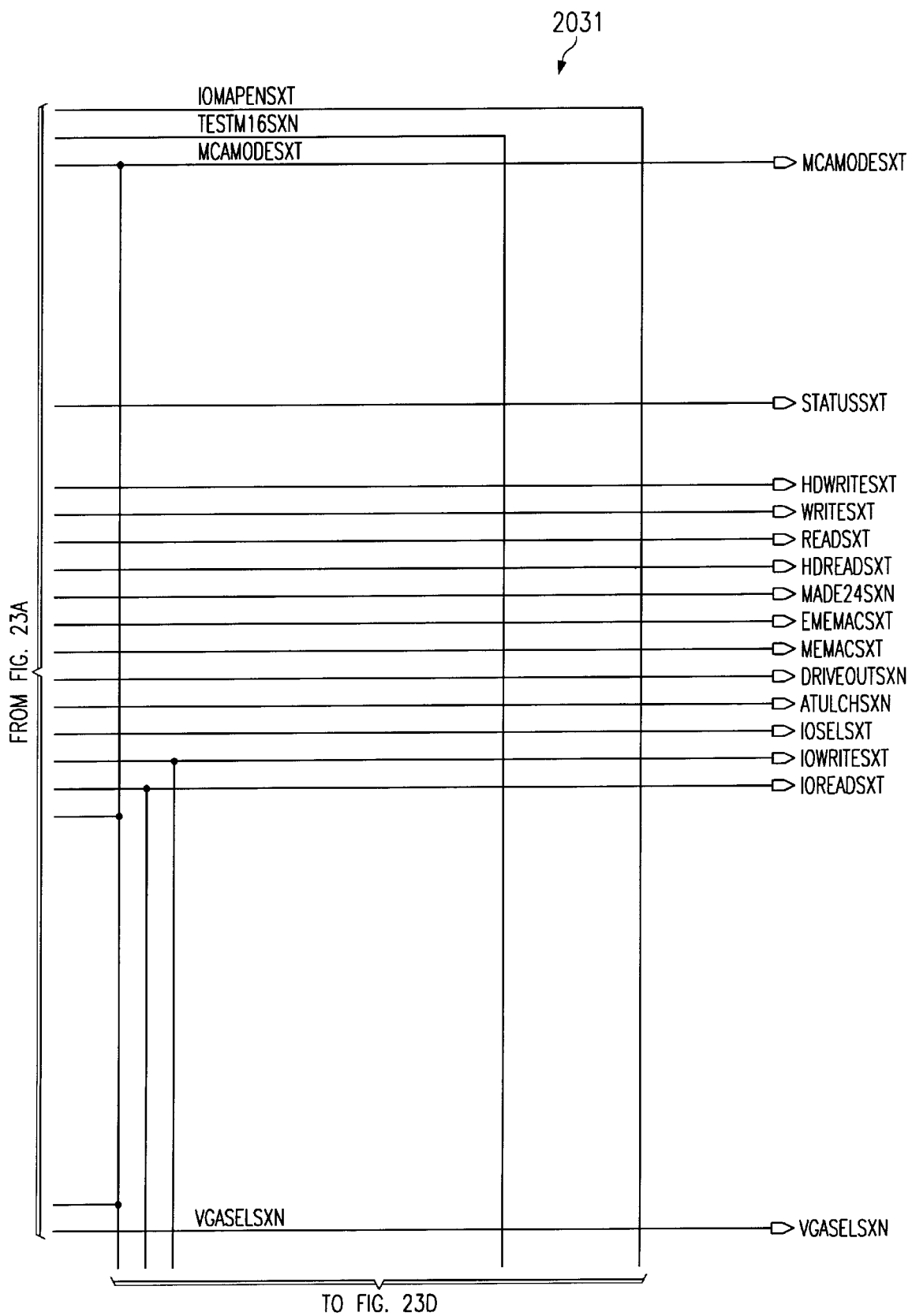
Figure 23D:
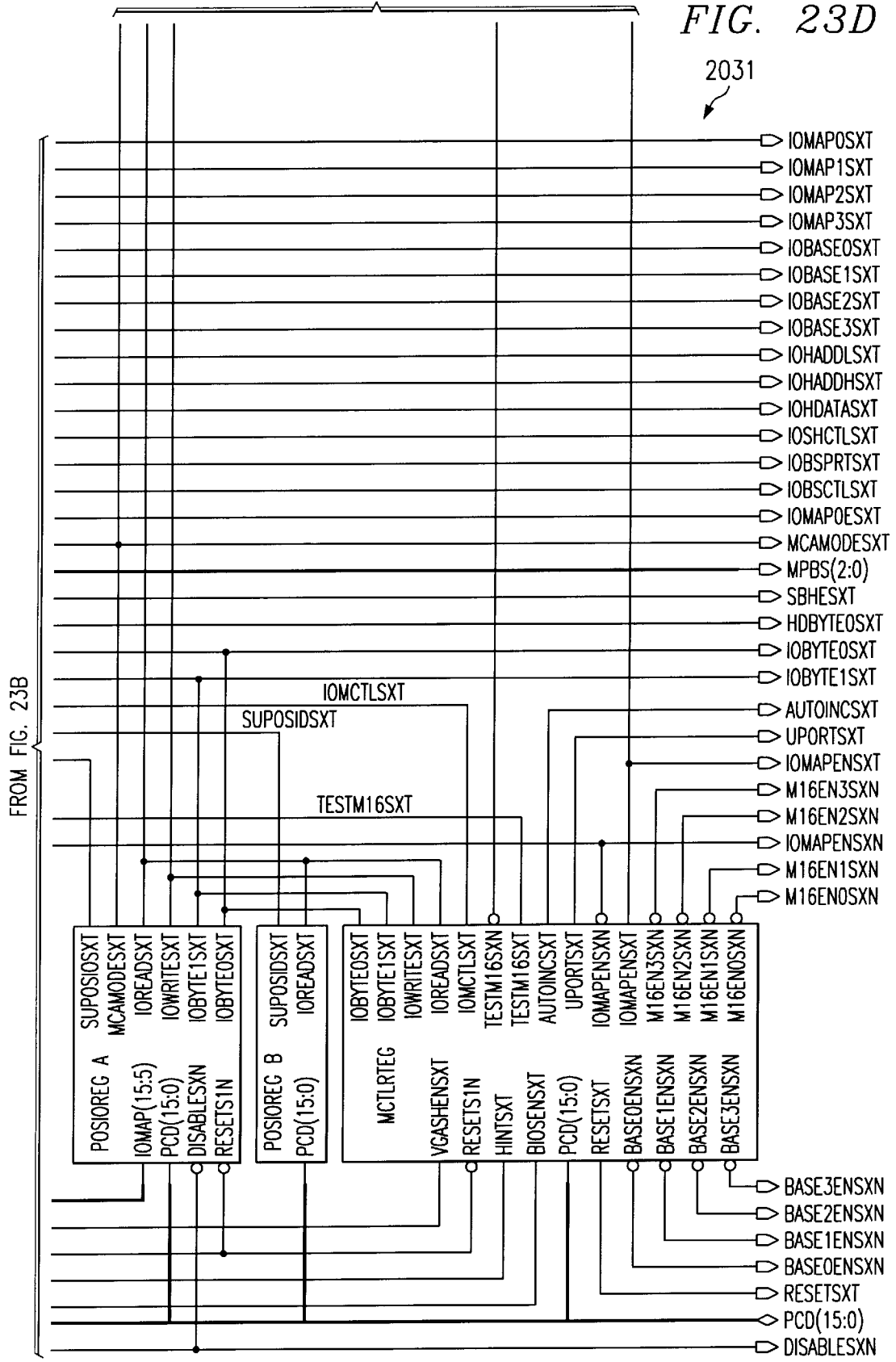
Figure 24A:
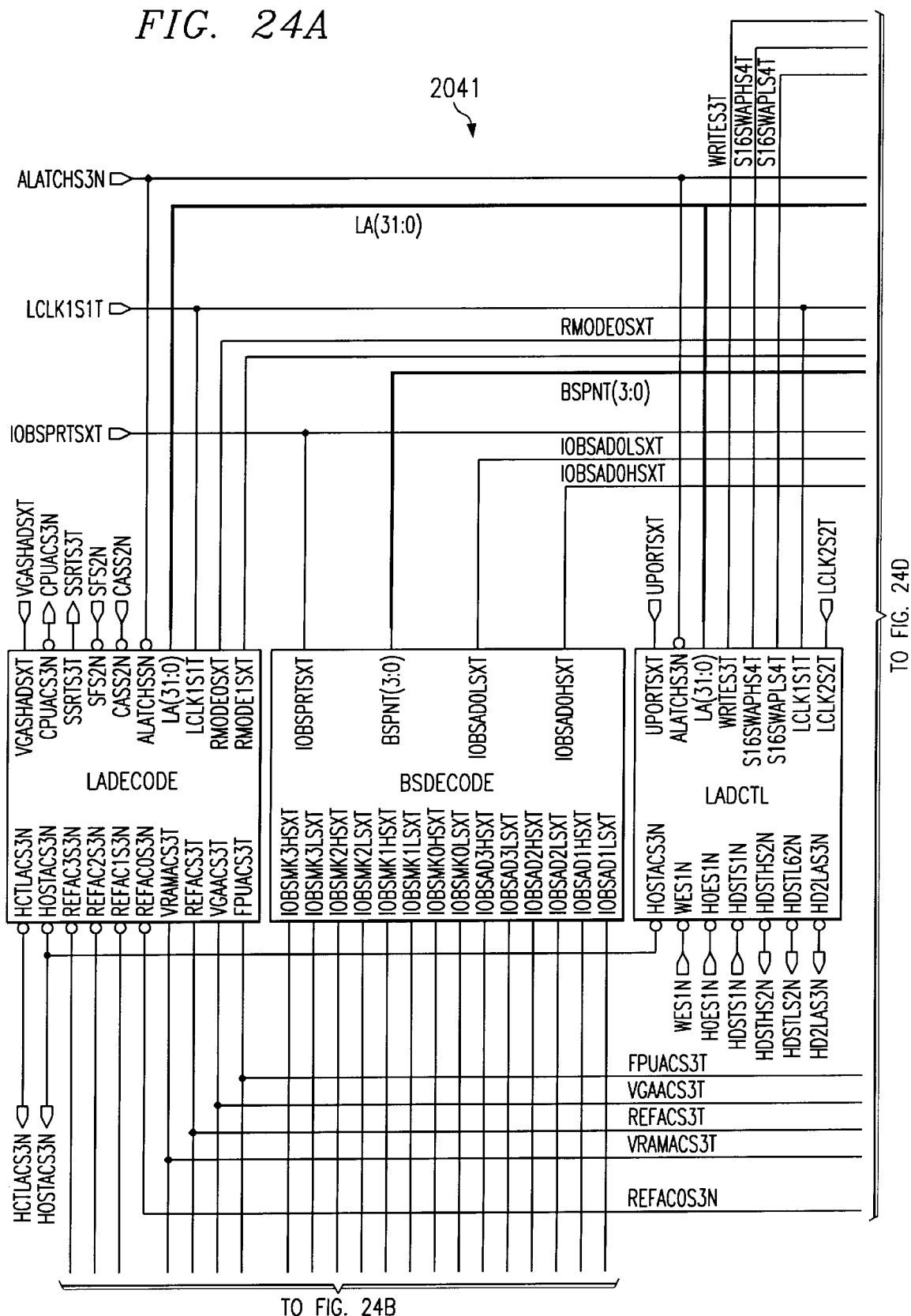
FIG. 24 is a block diagram of a block Local Decode Unit block LDU of FIG. 20.
Figure 24B:
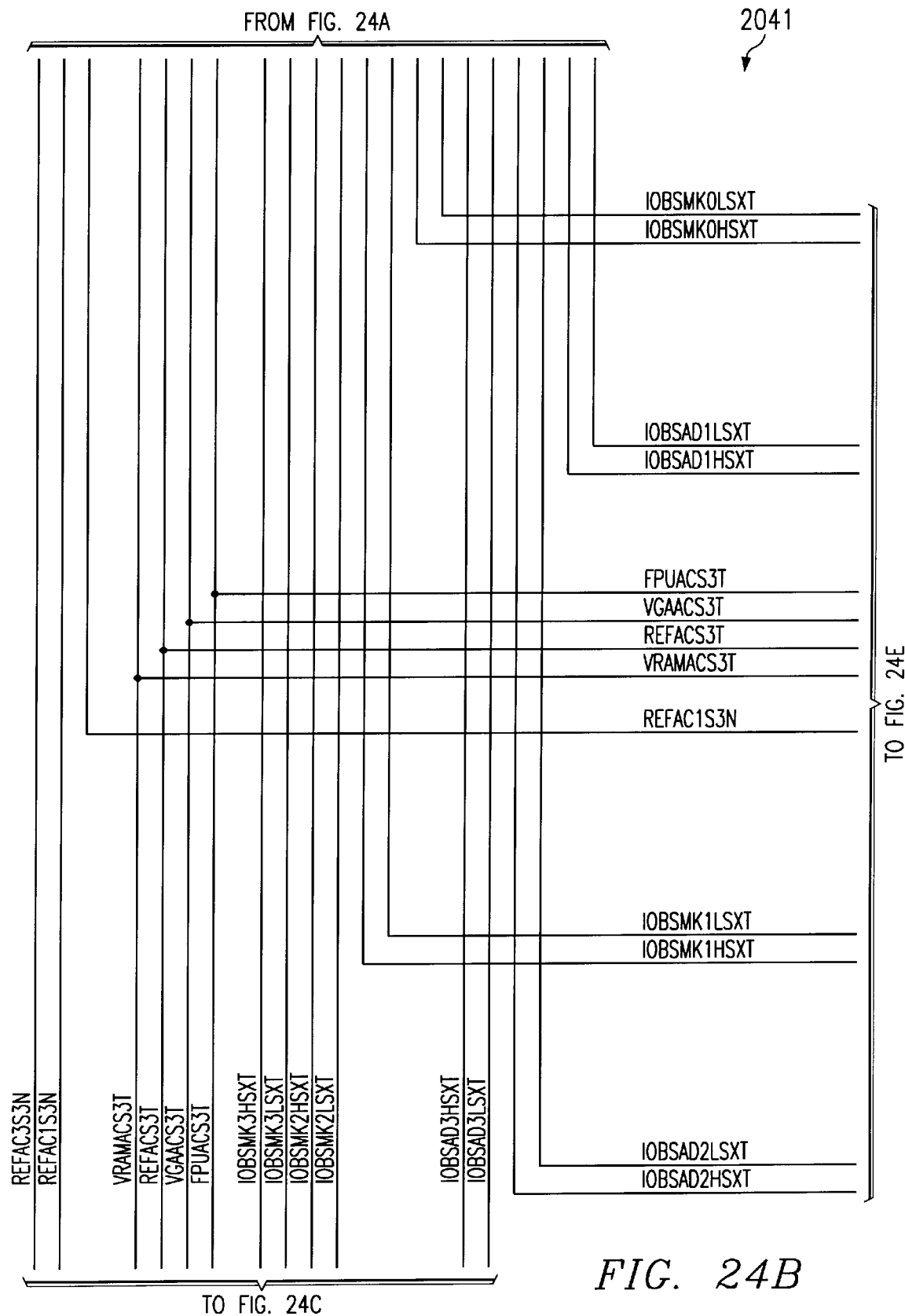
Figure 24C:
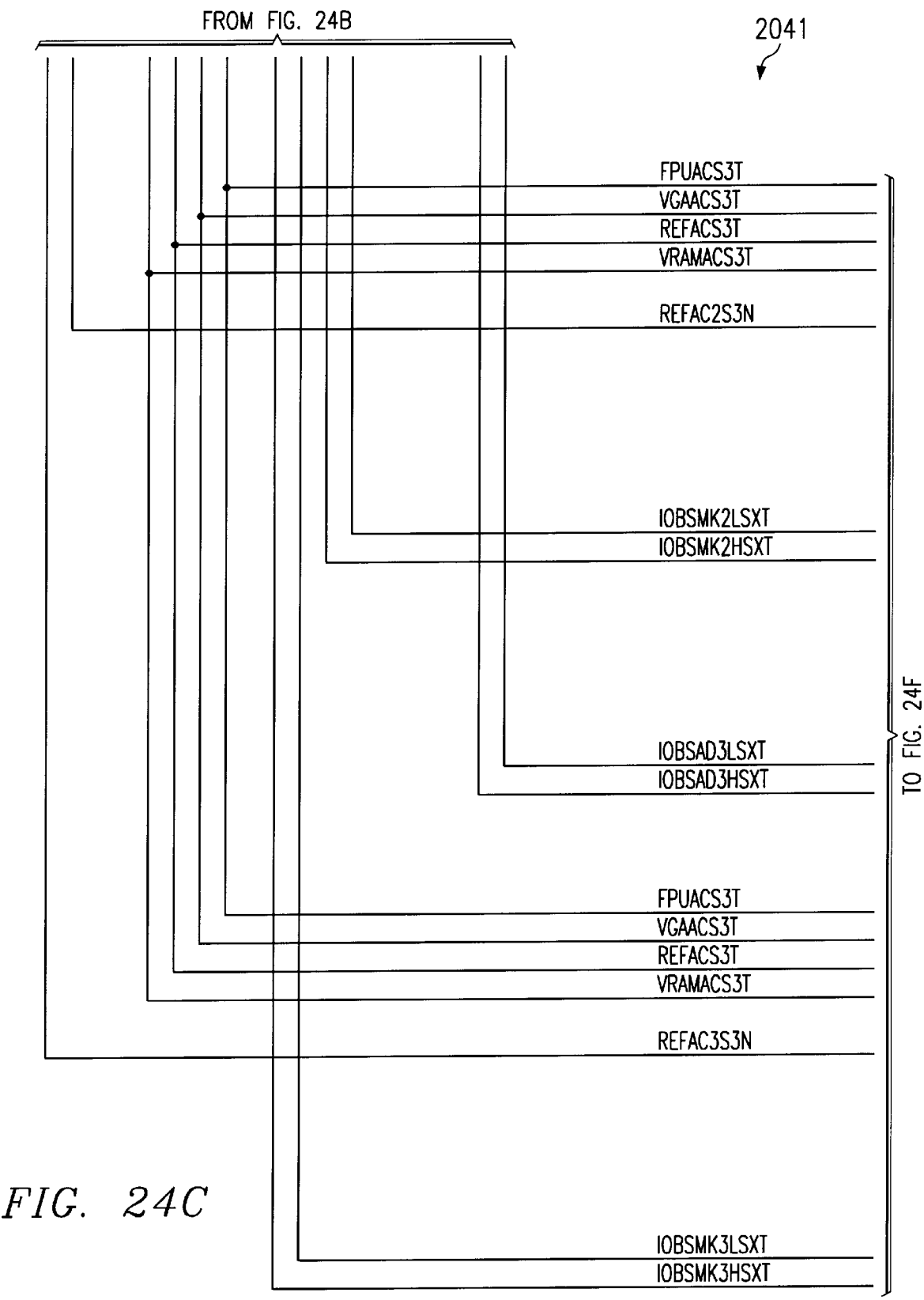
Figure 24D:
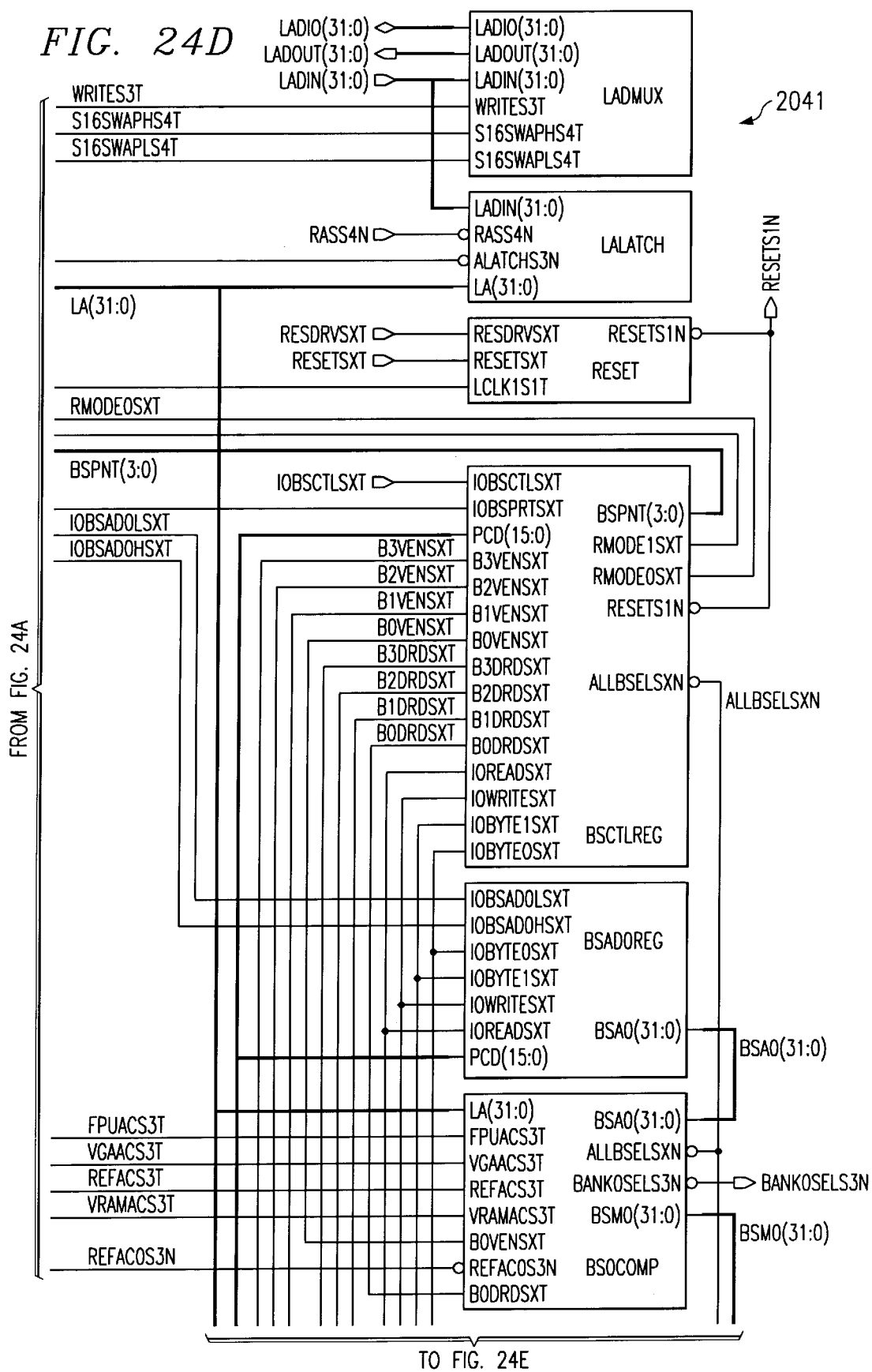
Figure 24E:
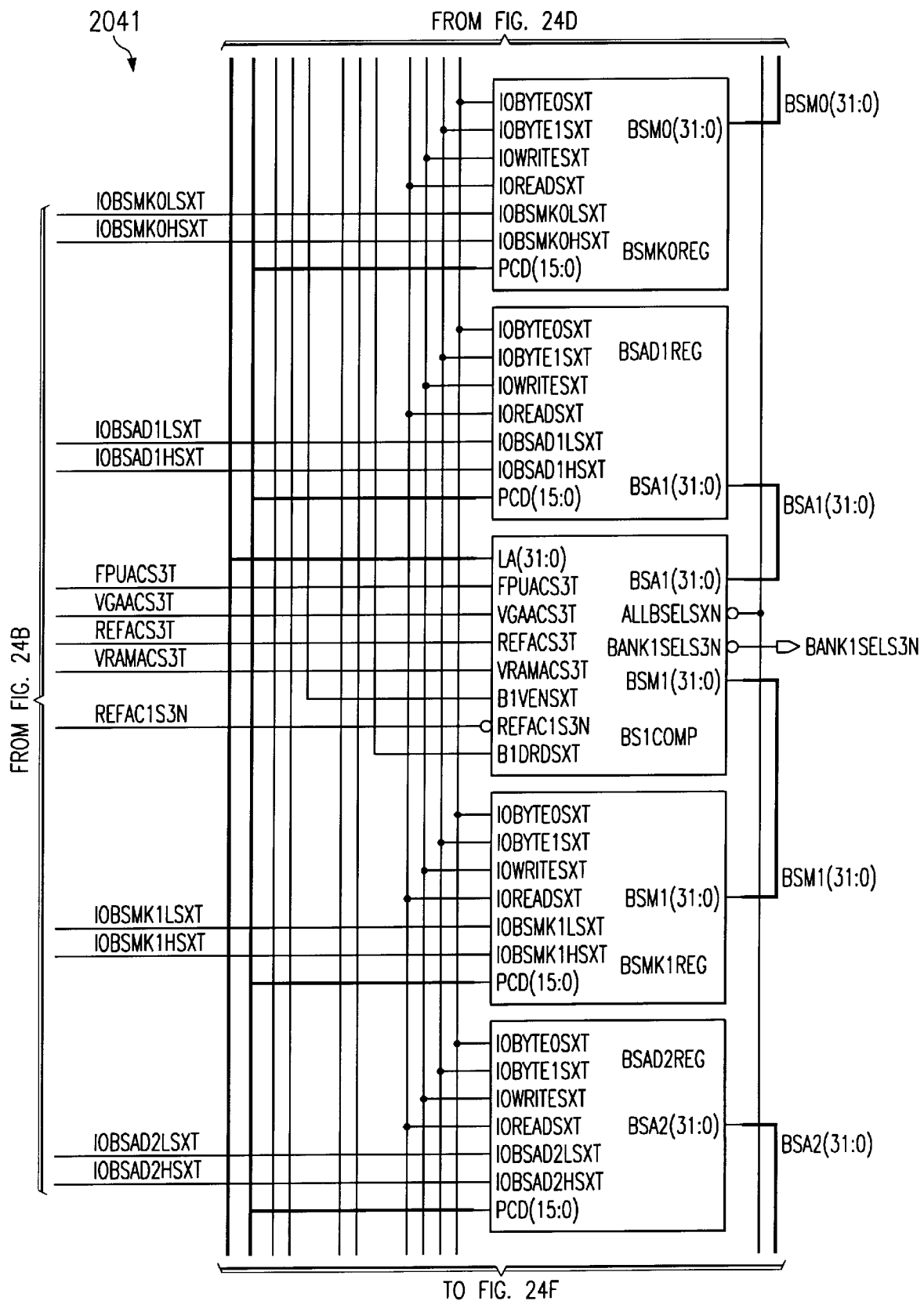
Figure 24F:
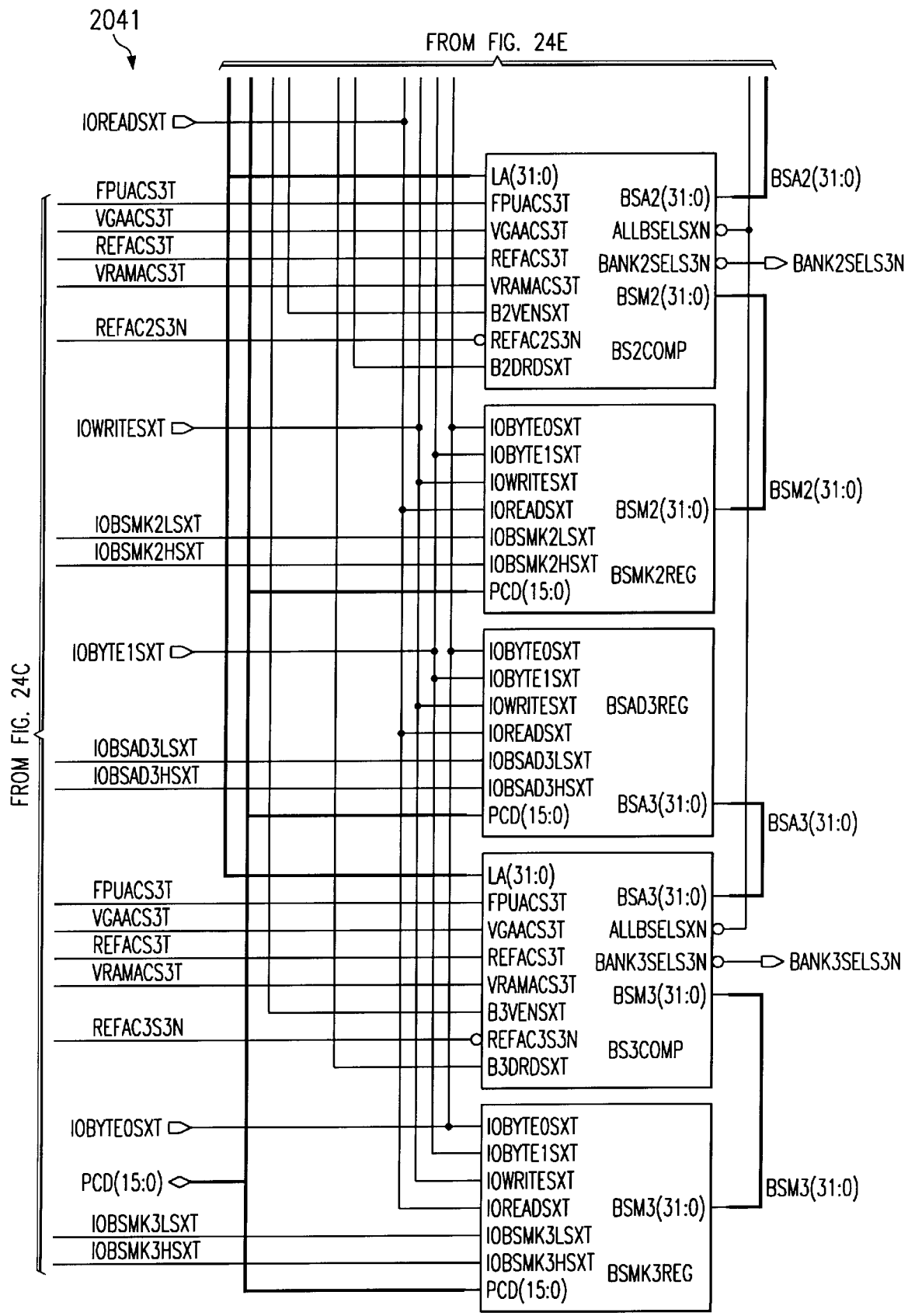

In FIG. 22 Local Interface Unit 2021 translates accesses on the host bus into accesses to the TMS34020 graphics coprocessor 120, generating the HCS-, HREAD- and HWRITE- signals. CHRDY, derived from HRDY, is passed back to the host. The data transceivers and shadowed host control register are also part of the LIU 2021. Compare FIG. 7 blocks 785, 741 and 761. In FIG. 22, blocks CHRYDCTL, HOSTCMD, SHCTLREG and HDATAREG are detailed in FIGS. 34–37 respectively.

Figure 34:
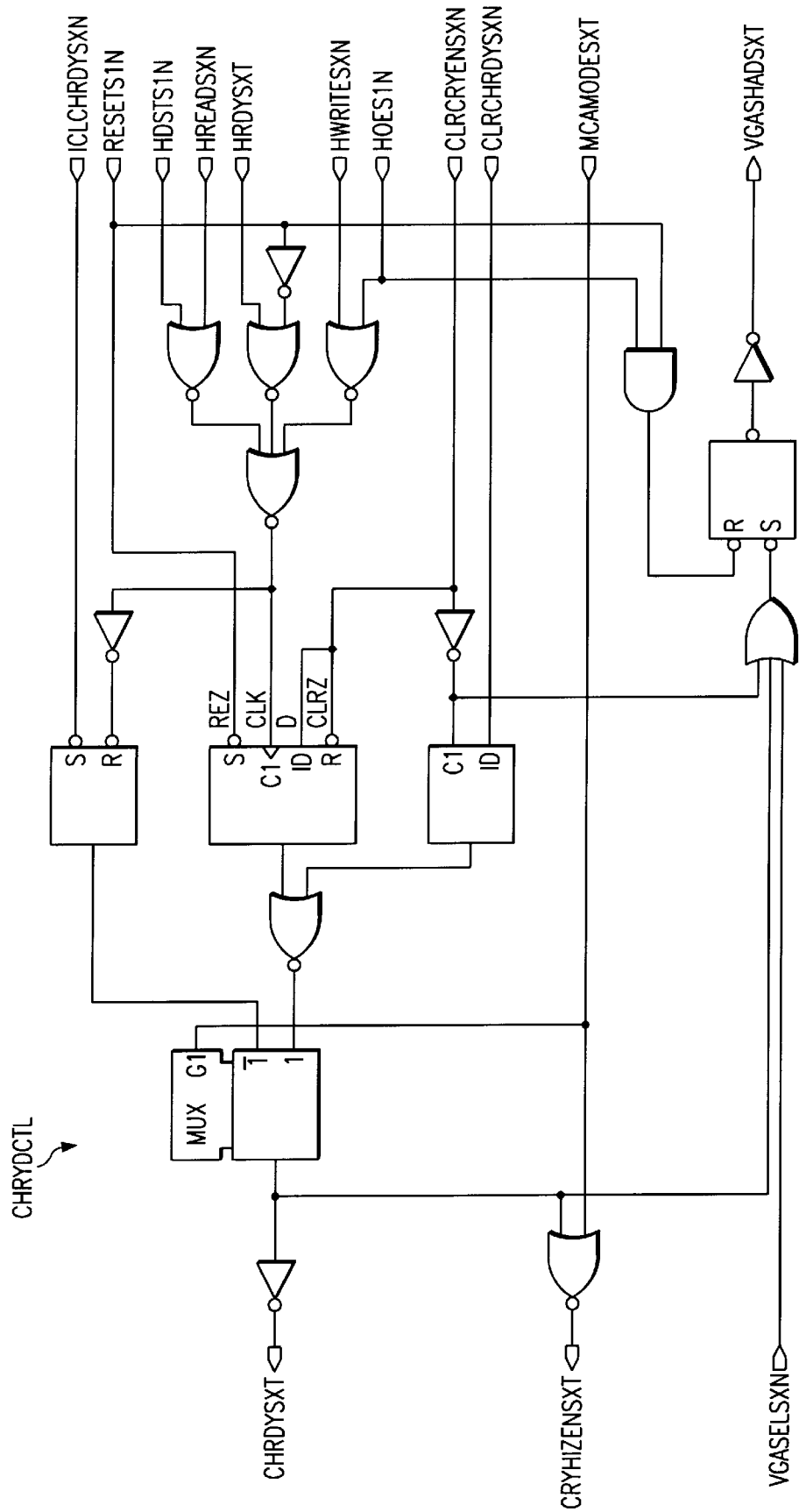
FIG. 34 is a schematic diagram of a ready control circuit CHRDYCTL of FIG. 22.

The CHRYDCTL block of FIG. 34 controls the CHRDY and VGASHAD signals. CHRDY is deasserted when HCS- goes active, and is not asserted again until access to HDATA is complete. VGASHAD is not asserted until CHRDY is asserted, to insure that only the VGA host access is pending.

Figure 35A:
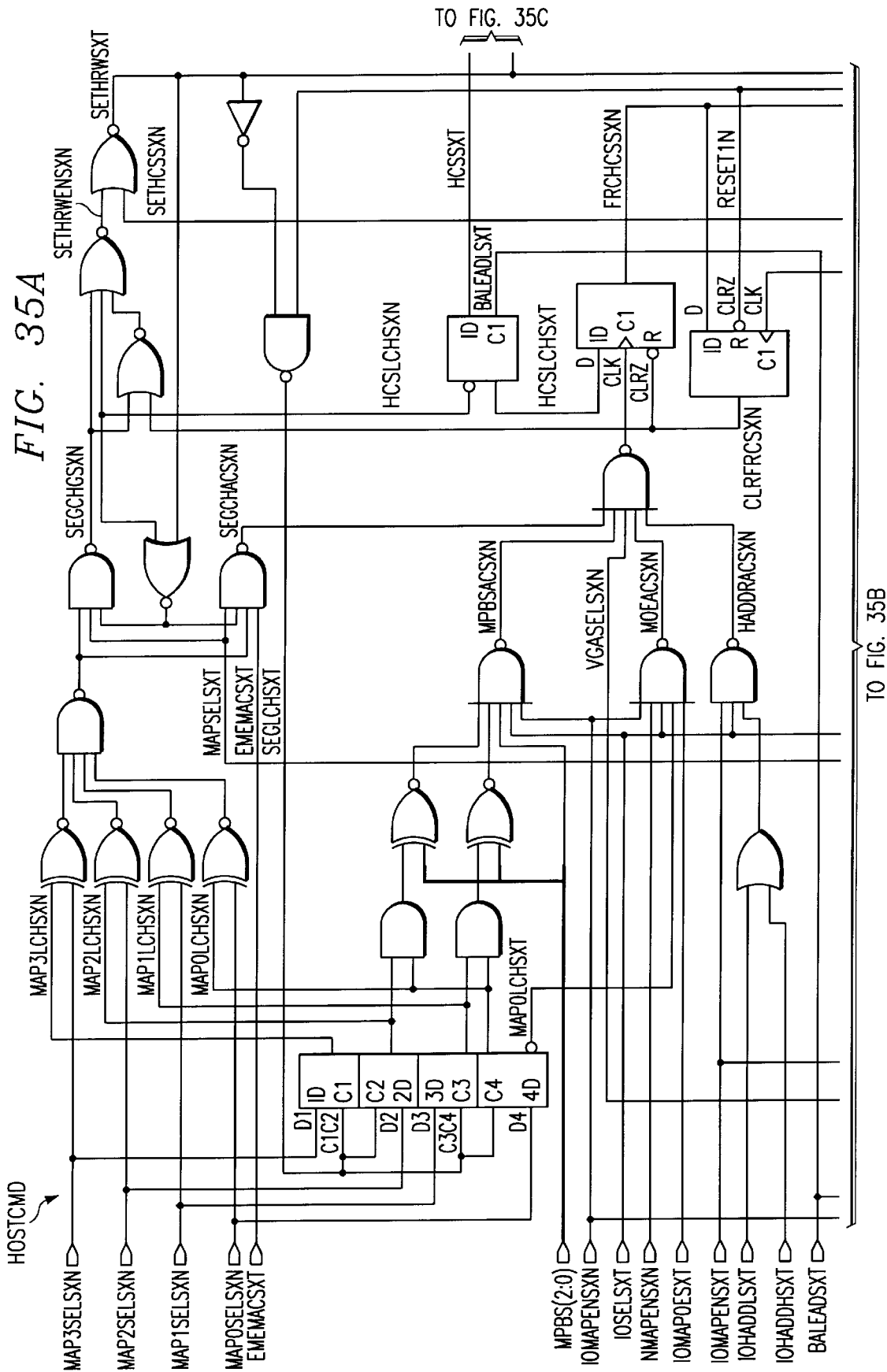
FIG. 35 is a schematic diagram of a host command circuit HOSTCMD of FIG. 22.
Figure 35B:
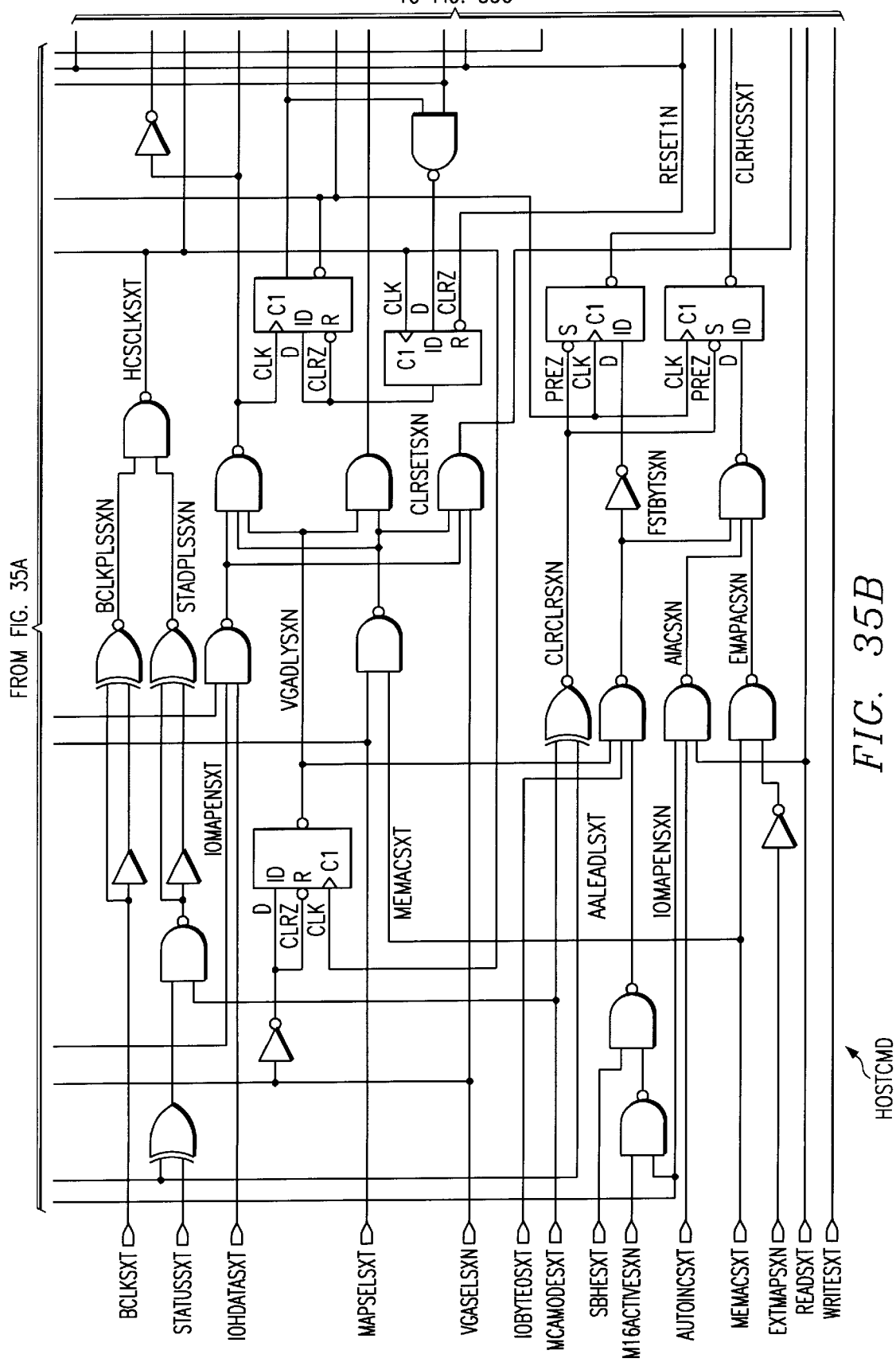
Figure 35C:
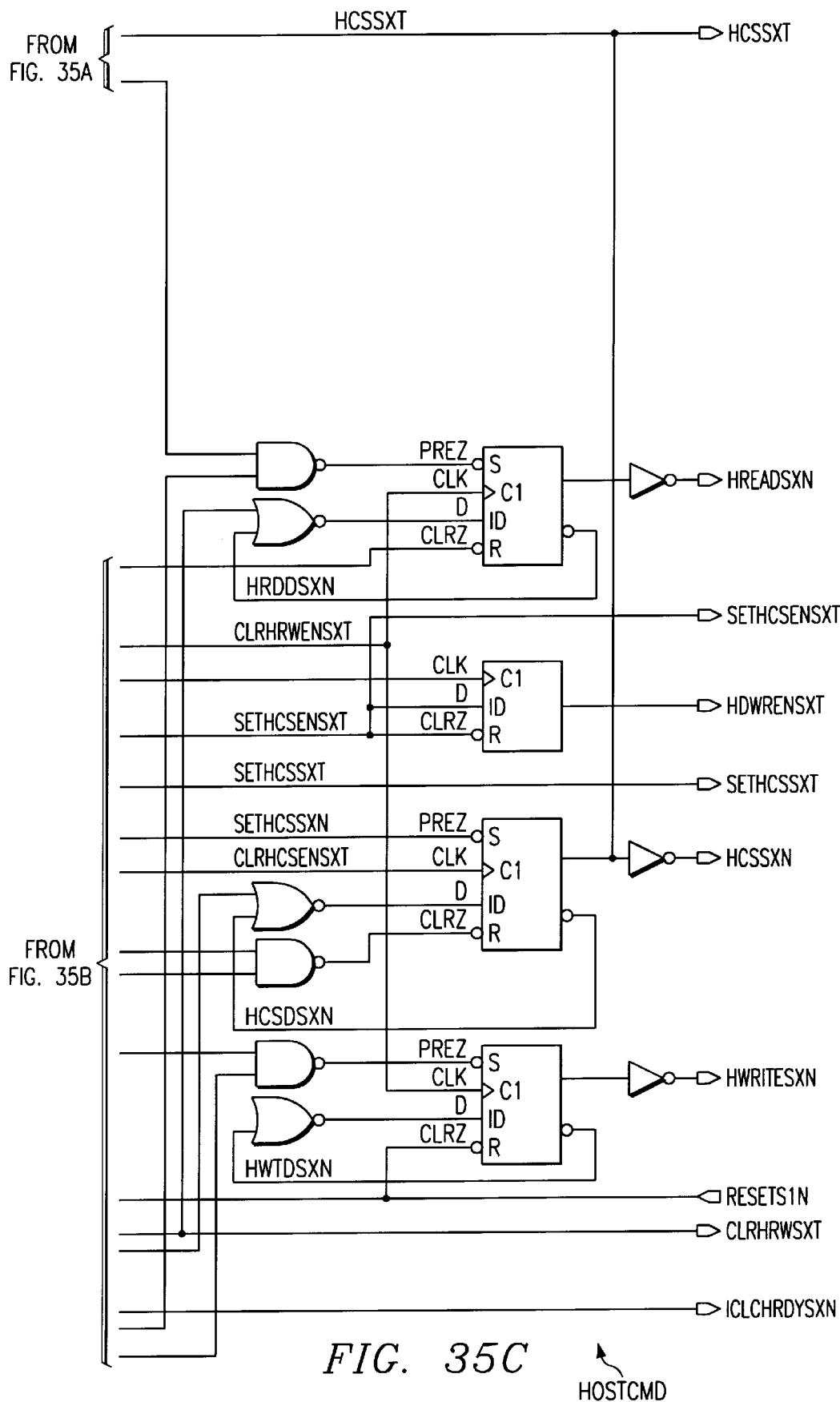

The HOSTCMD host command circuit of FIG. 35 controls the forcing clear, the setting and the clearing of HCS-, and the setting and clearing of HREAD- and HWRITE-. Timing pulses to control this operation are generated for both ISA and MCA buses using BCLK edges, ADL- and flip-flops as illustrated. Compare with description of block 785 of FIG. 7. Control of 34020 GSP autoincrement circuitry in response to host read signal and in response to address segment changes is thus advantageously supported by the circuitry of FIG. 35.

Figure 36:
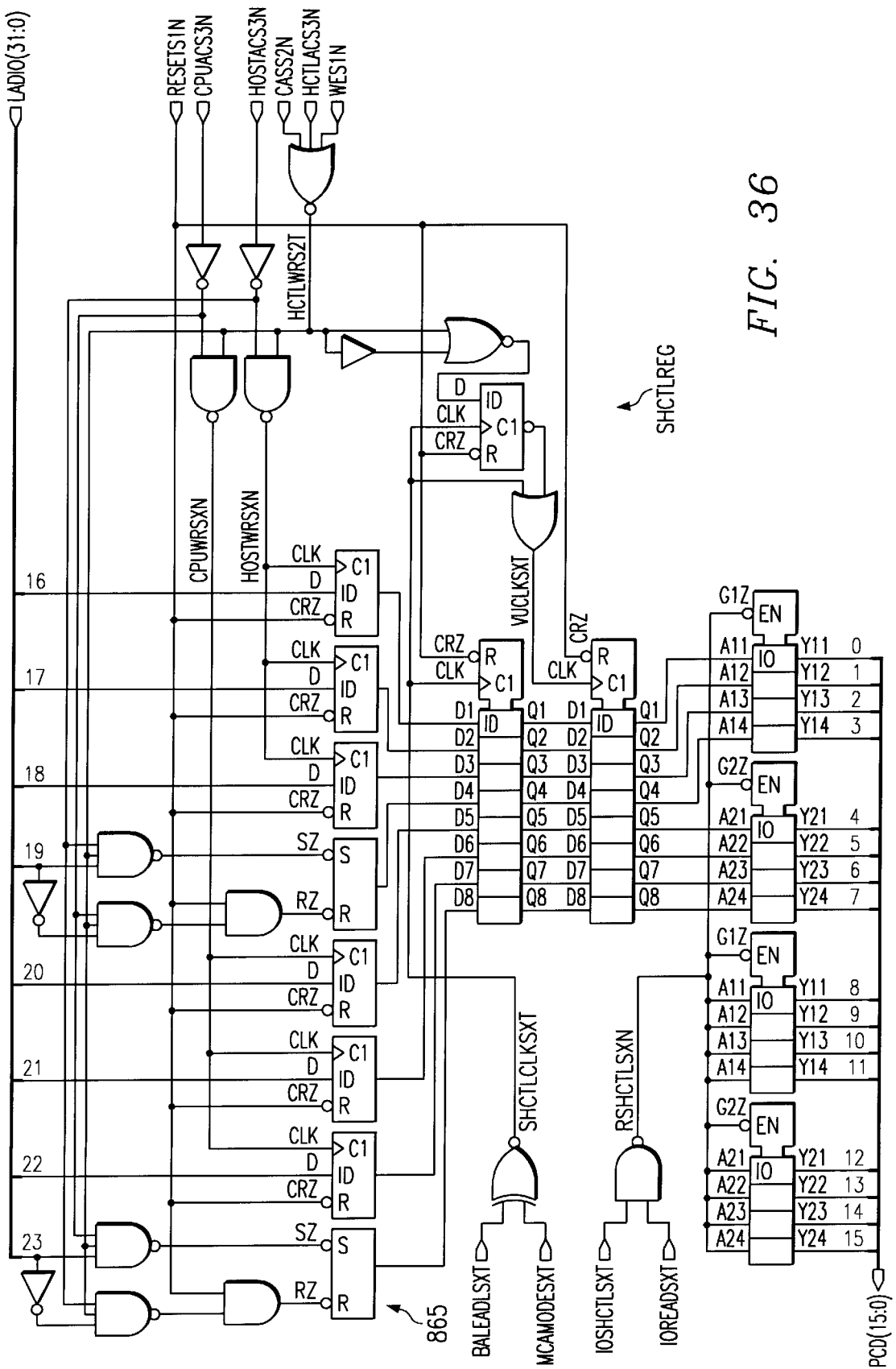
FIG. 36 is a schematic diagram of a shadow control register circuit SHCTLREG of FIG. 22.

The shadow control register circuit SHCTLREG of FIG. 36 shadows the TMS34020 HSTCTLL register, including the write protection circuitry. The captured data is synchronized to the host computer using BALE/ADL. A delayed write-enable is used to indicate when the latches contain valid (deterministic) data. Compare with FIG. 19.

Figure 37A:
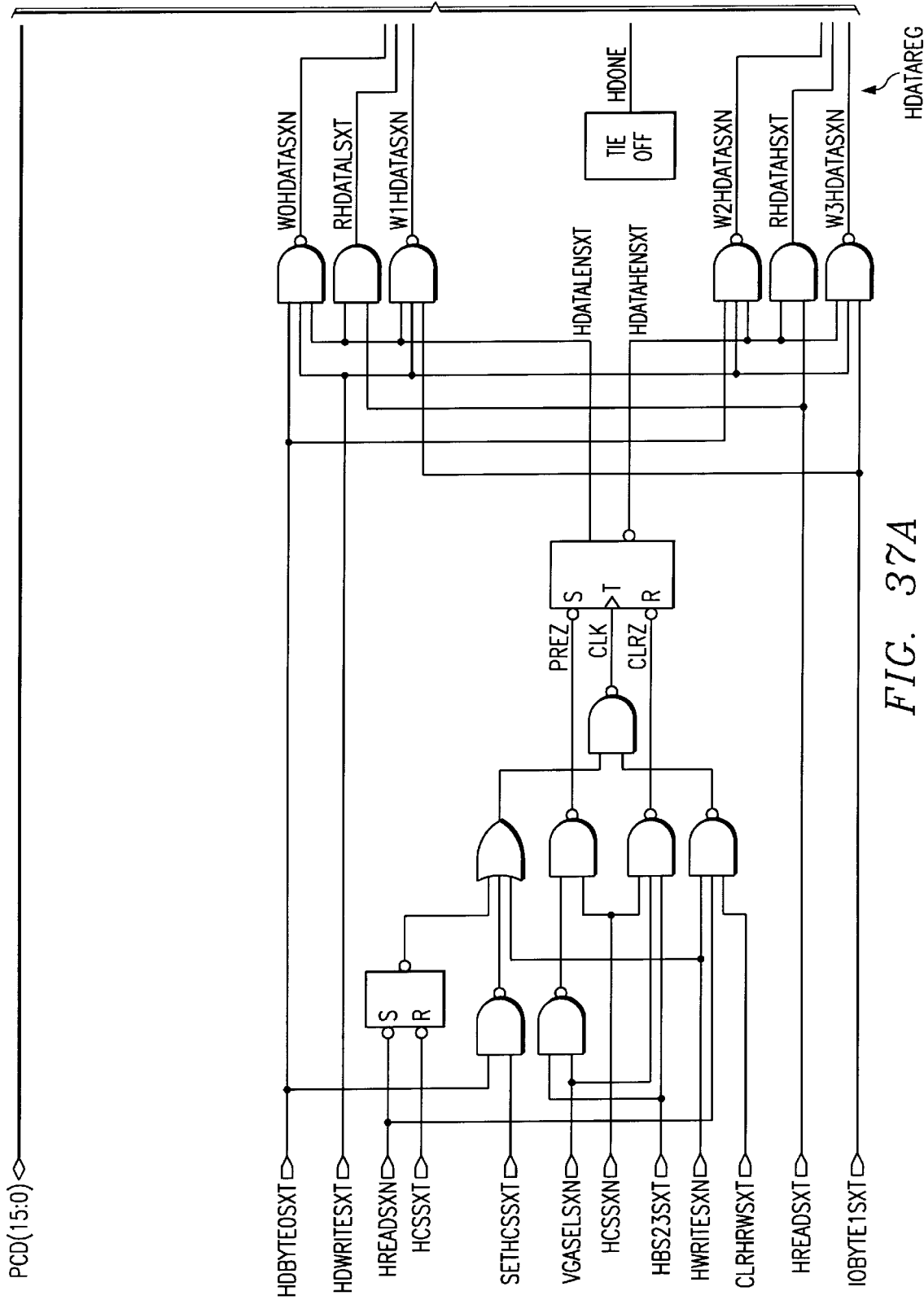
FIG. 37 is a schematic diagram of a data register circuit HDATAREG of FIG. 22.
Figure 37B:
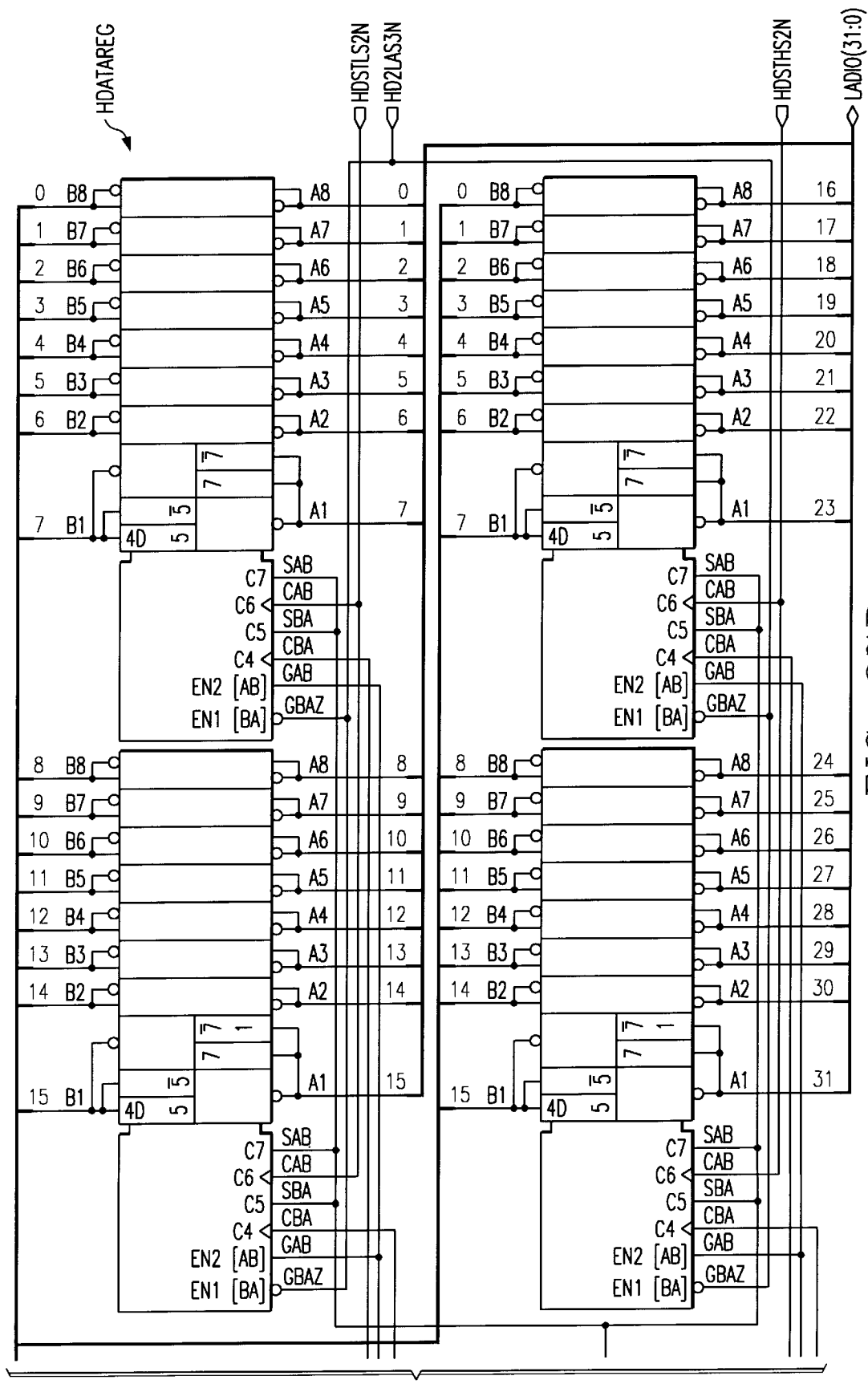

The host data register circuit HDATAREG of FIG. 37 corresponds to registers HDATA of FIG. 10 and block 741 of FIG. 7. The HDATA register is used to pass data between the TMS 34020 and the host computer. Only half of the 32 bit register is visible to the host computer at a given time. The byte strobes make the initial half selection, and a toggle flip-flop having outputs HDATAHENSXT and HDATAL-ENSXT changes halves on subsequent accesses. A double toggle is applied after a Read-modify-Write read operation.

In FIG. 23 Data Flow Unit 2031 contains the host bus data access decode and the internal data bus muxing. I/O register and VGA pass-through register decoding is also included. Compare with blocks 711 and 781 of FIG. 7. The MODECTL mode control register 731, the MCA POSID registers 795 and the host bus handshake logic are also included in DFU 2031. Blocks of circuitry are respectively detailed in FIGS. 38–44 and designated host bus control PCBUSCTL, command latch CMDLATCH, VGA shadow circuit VGASHAD, I/O decode circuit IODECODE, mode control register circuit MCTLREG, identification circuit POSIDREG, and data multiplexer DATAMUX.

Figure 38:
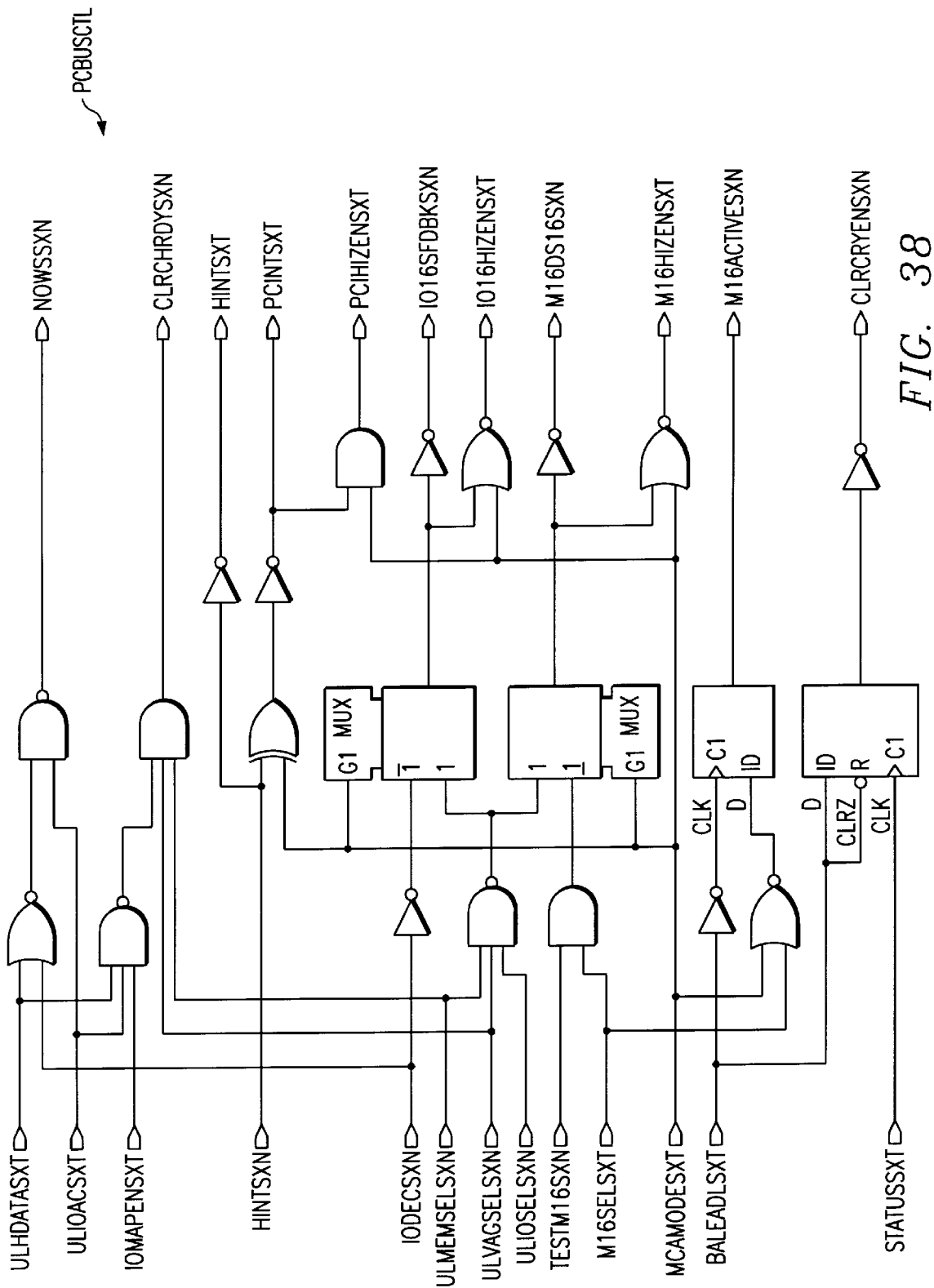
FIG. 38 is a schematic diagram of a bus control circuit PCBUSCTL of FIG. 23.

In FIG. 38 host bus control circuit PCBUSCTL controls signals fed back onto the host bus (for both ISA and MCA), with the exception of CHRDY, which is generated in the circuitry of FIG. 34. Note the tristate control signals. The ISA bus has open collector design and the MCA bus has totem pole design (vice-versa for PCINT).

Figure 39A:
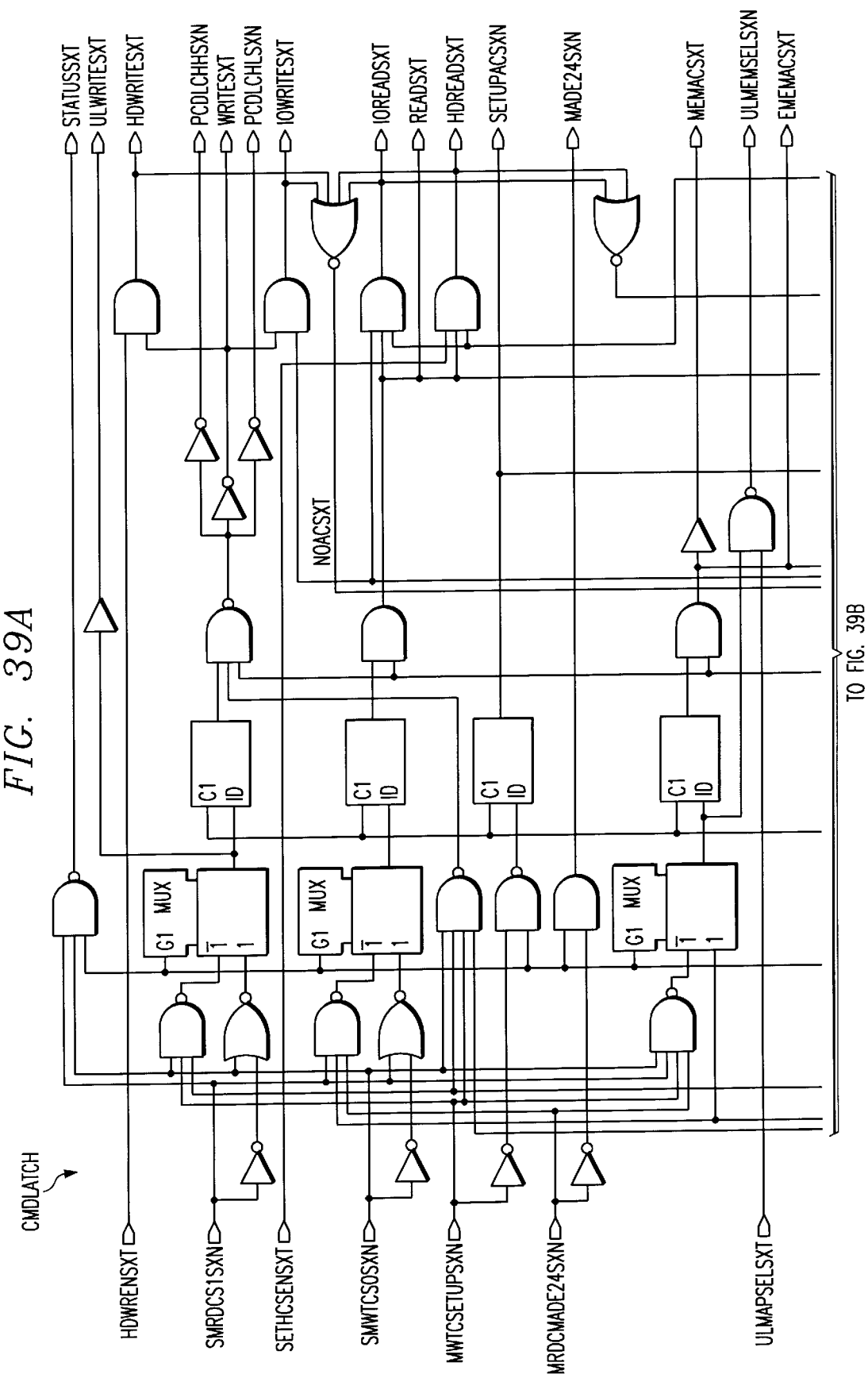
FIG. 39 is a schematic diagram of a command latch circuit CMDLATCH of FIG. 23.
Figure 39B:
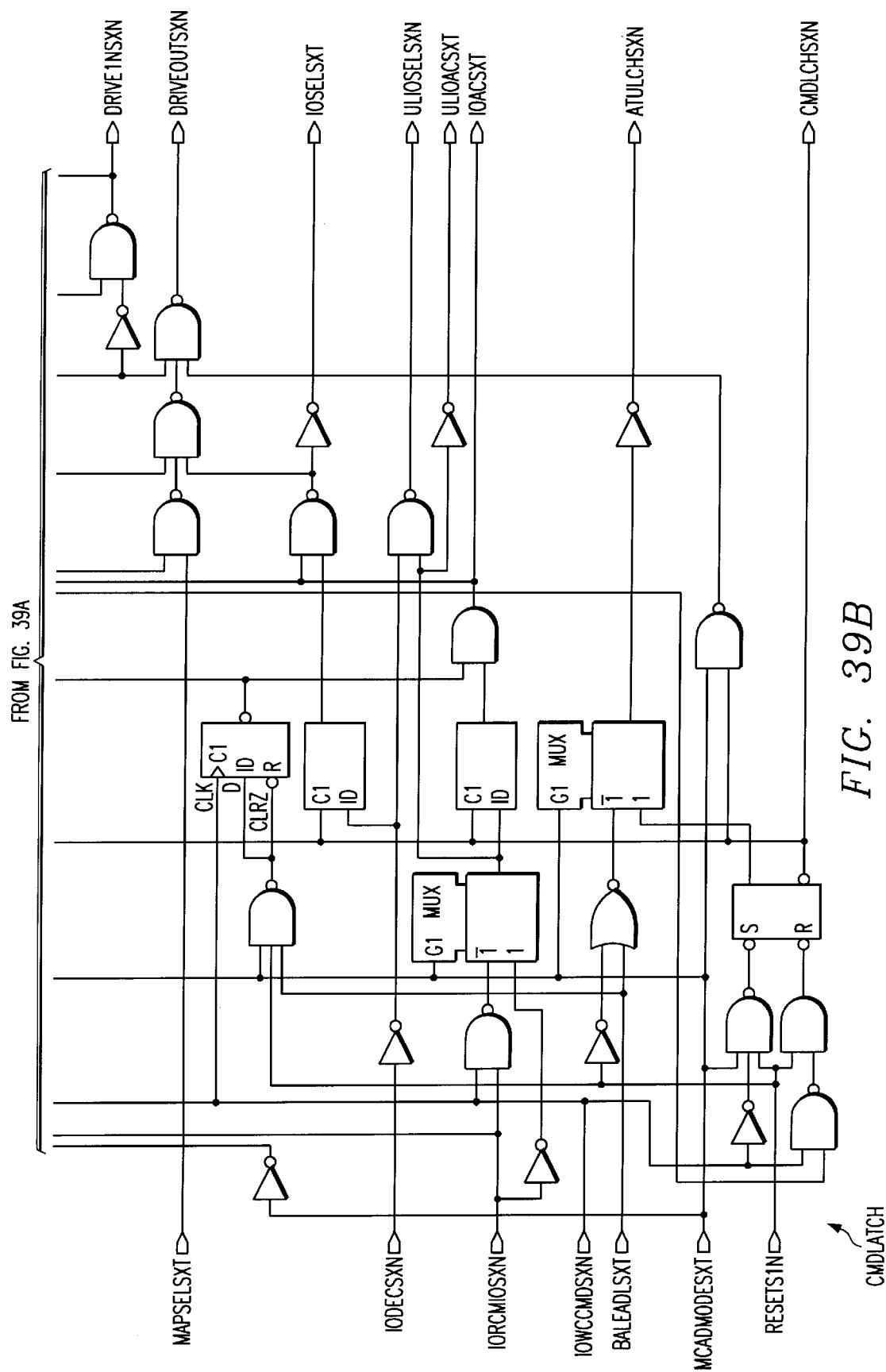

In FIG. 39 the CMDLATCH logic latches all of the command signals from the bus and translates them into READ, WRITE, MEMORY, I/O and data direction signals appropriate for either ISA or MCA. Data size and address size information is also latched.

Figure 40:
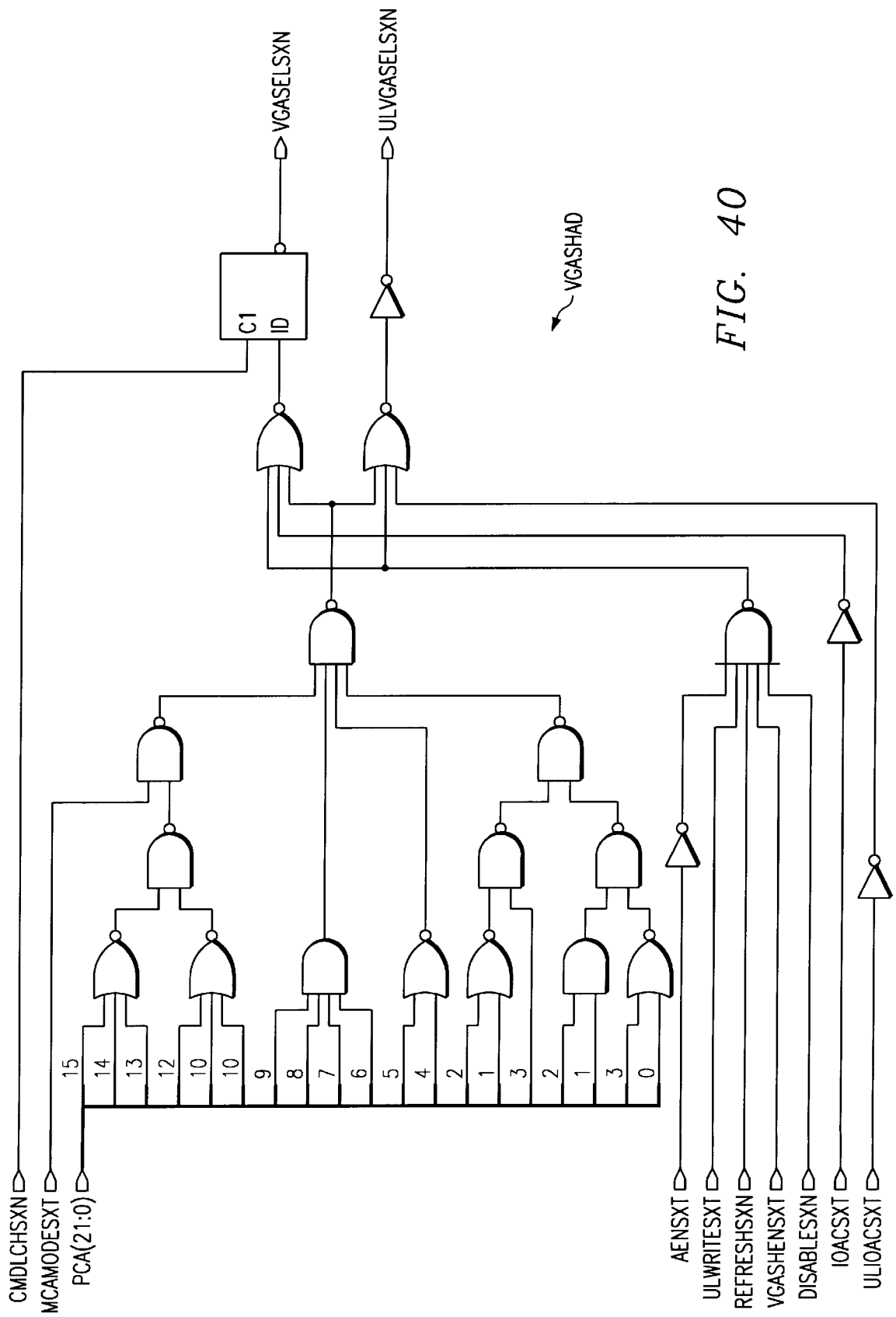
FIG. 40 is a schematic diagram of a VGA shadow circuit VGASHAD of FIG. 23.

In FIG. 40 the VGASHAD logic decodes the addresses of the three registers which are shadowed in order to perform VGA pass-through. These registers are READ MASK (03C6); WRITE ADDRESS MASK (03C8); AND COLOR PALETTE RAM (03C9). Lines PCA[10:15] are only decoded for MCA bus operation.

Figure 41A:
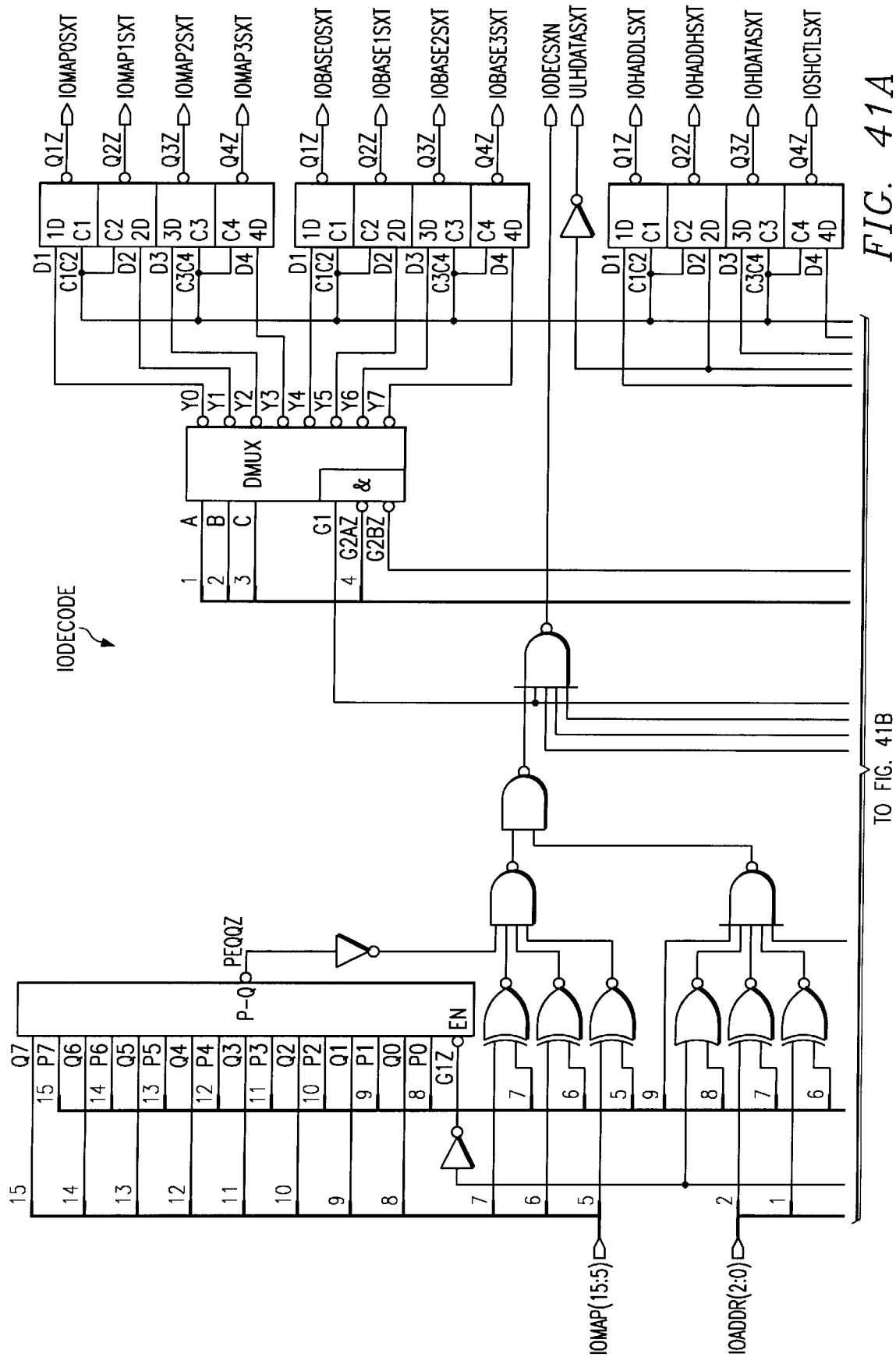
FIG. 41 is a schematic diagram of a decode circuit IODECODE of FIG. 23.
Figure 41B:
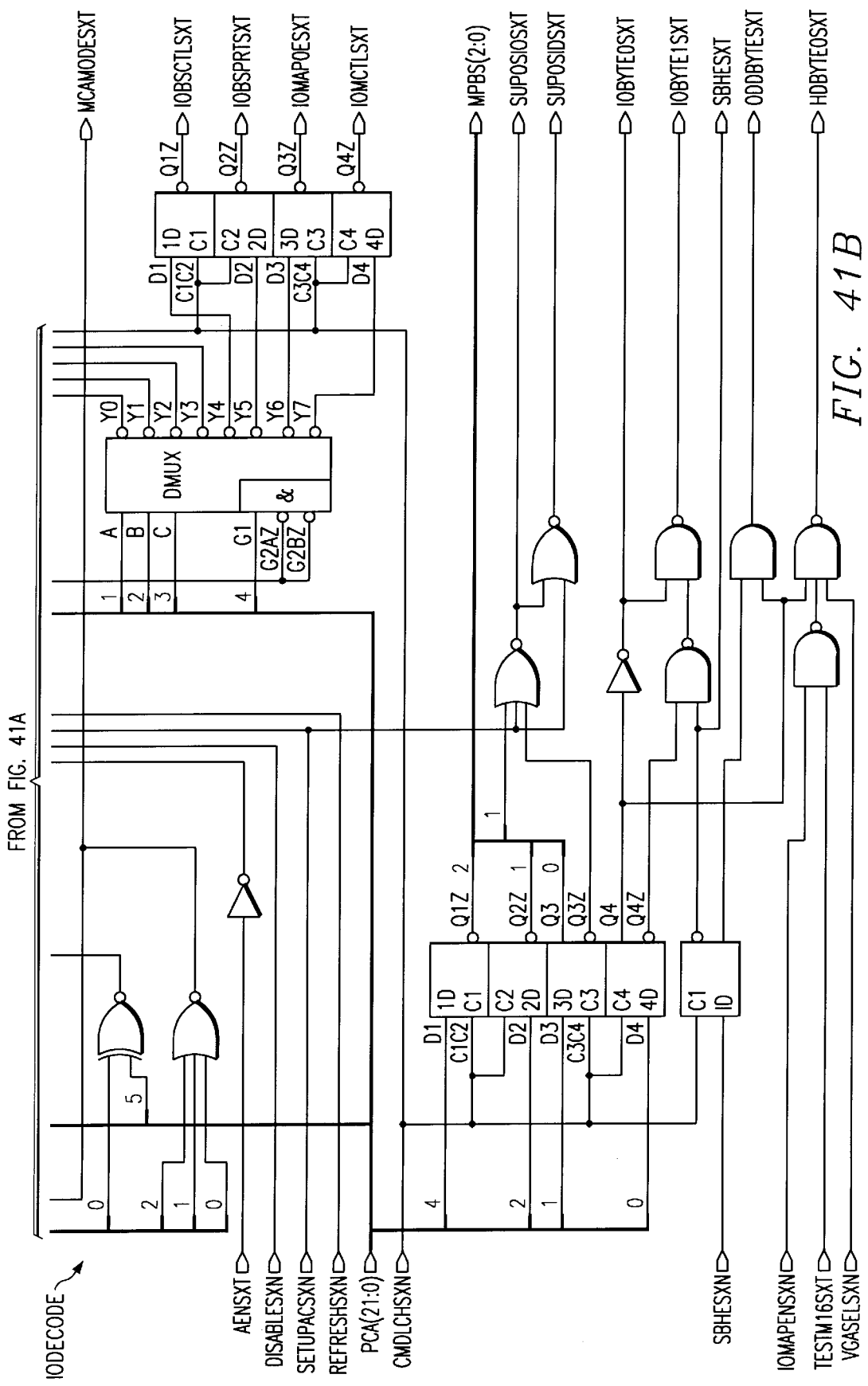

In FIG. 41 the IODECODE circuit contains the I/O address decoders for MCA (top of FIG.) and ISA (bottom). Further decode is performed to identify the register to be accessed, and which bytes are to be selected. Bytes of HDATA are controlled separately due to VGA pass through and M16 slot test.

Figure 42:
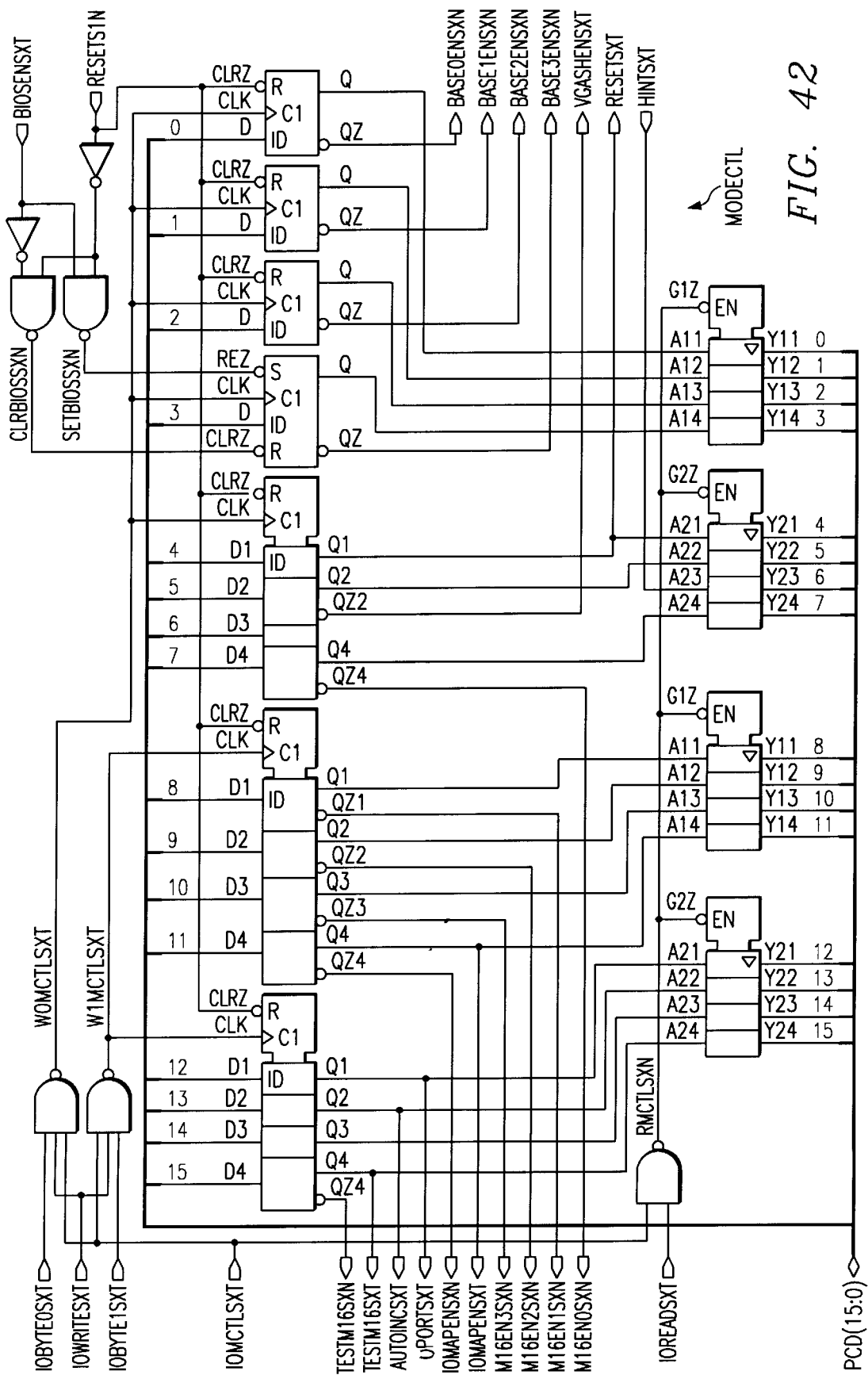
FIG. 42 is a schematic diagram of a mode control circuit MODECTL of FIG. 23.

In FIG. 42 the mode control register MODECTL contains all of the mode bits for the multifunction access device 116 with the exception of the NMAPEN bit in MAP0E register and the bank select control in MDCTL. The state of the BIOSENSXT line (upper right) during Reset determines whether BIOS mapping is enabled.

Figure 43A:
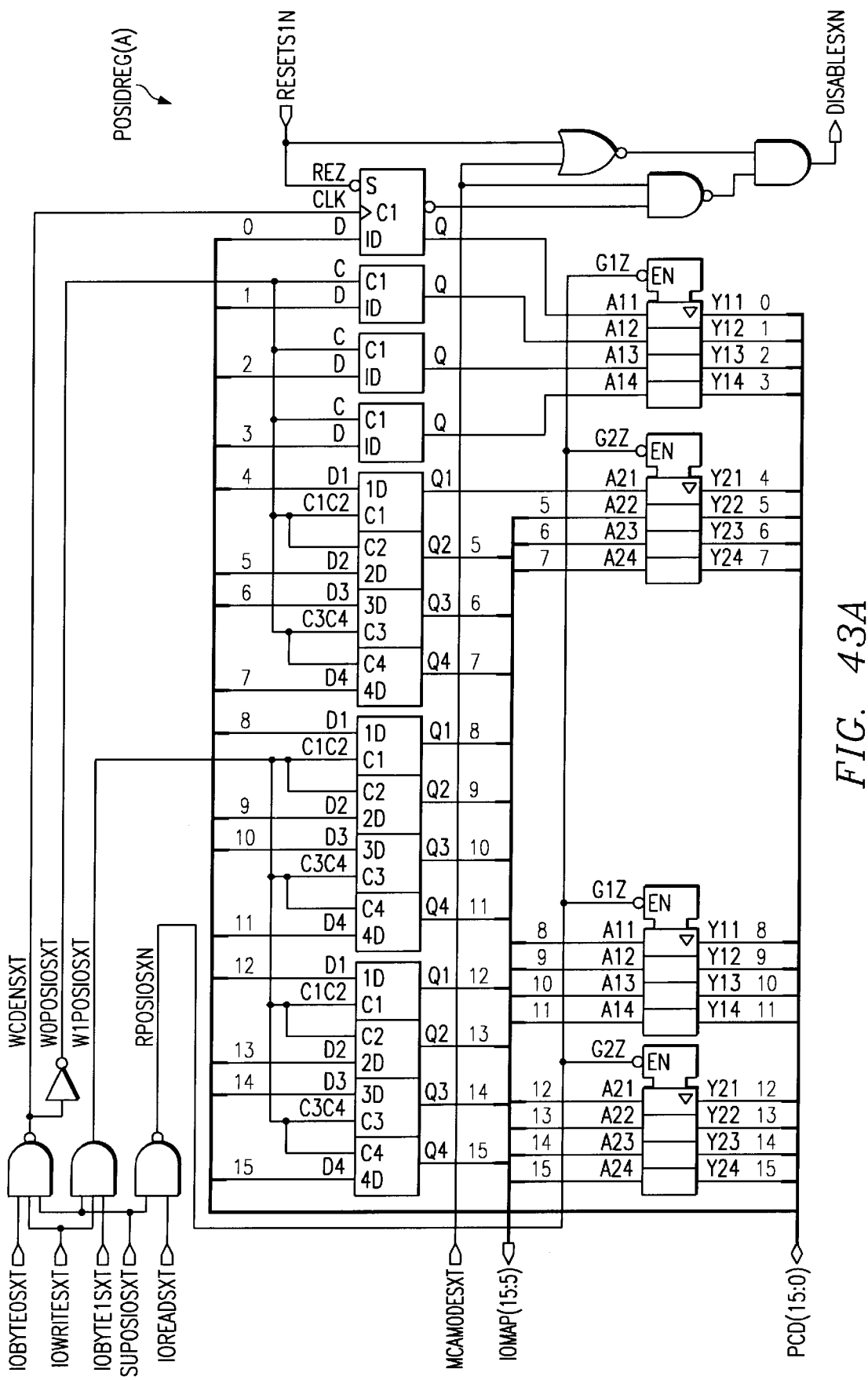
FIG. 43A is a schematic diagram of an MCA address position circuit POSIDREG of FIG. 23.

In FIG. 43A MCA address position circuit POSIDREG (A) is loaded during an MCA setup to indicate where in the MCA I/O space the device 116 is mapped. This circuit is not used in ISA mode.

Figure 43B:
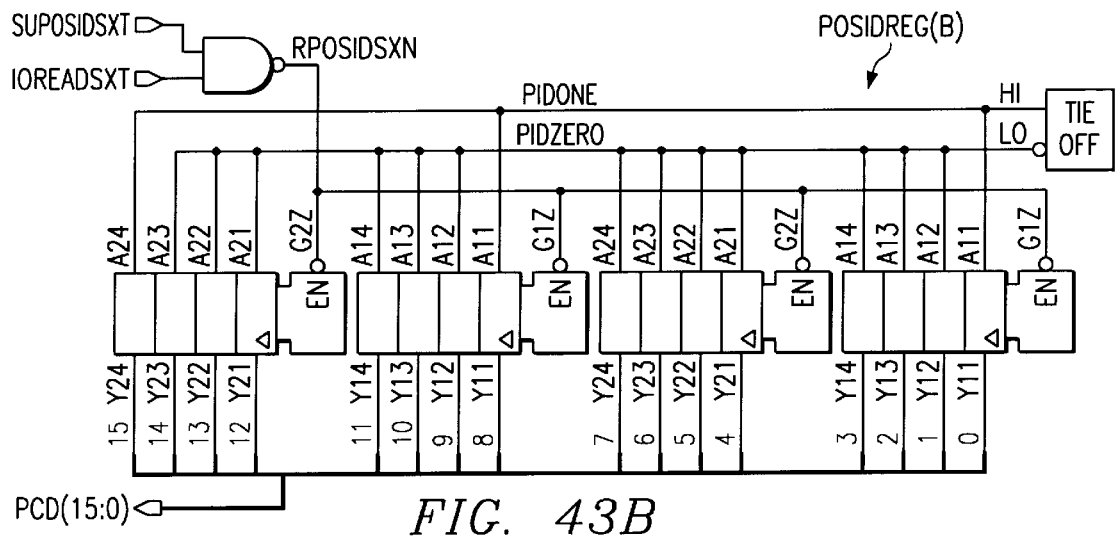
FIG. 43B is a schematic diagram of an MCA identification circuit POSIDREG of FIG. 23.

In FIG. 43B an MCA identification circuit POSIDREG(B) provides an officially assigned MCA adapter identification number 0x8101 for the device 116. This register is read-only in MCA mode and not used in ISA mode.

Figure 44:
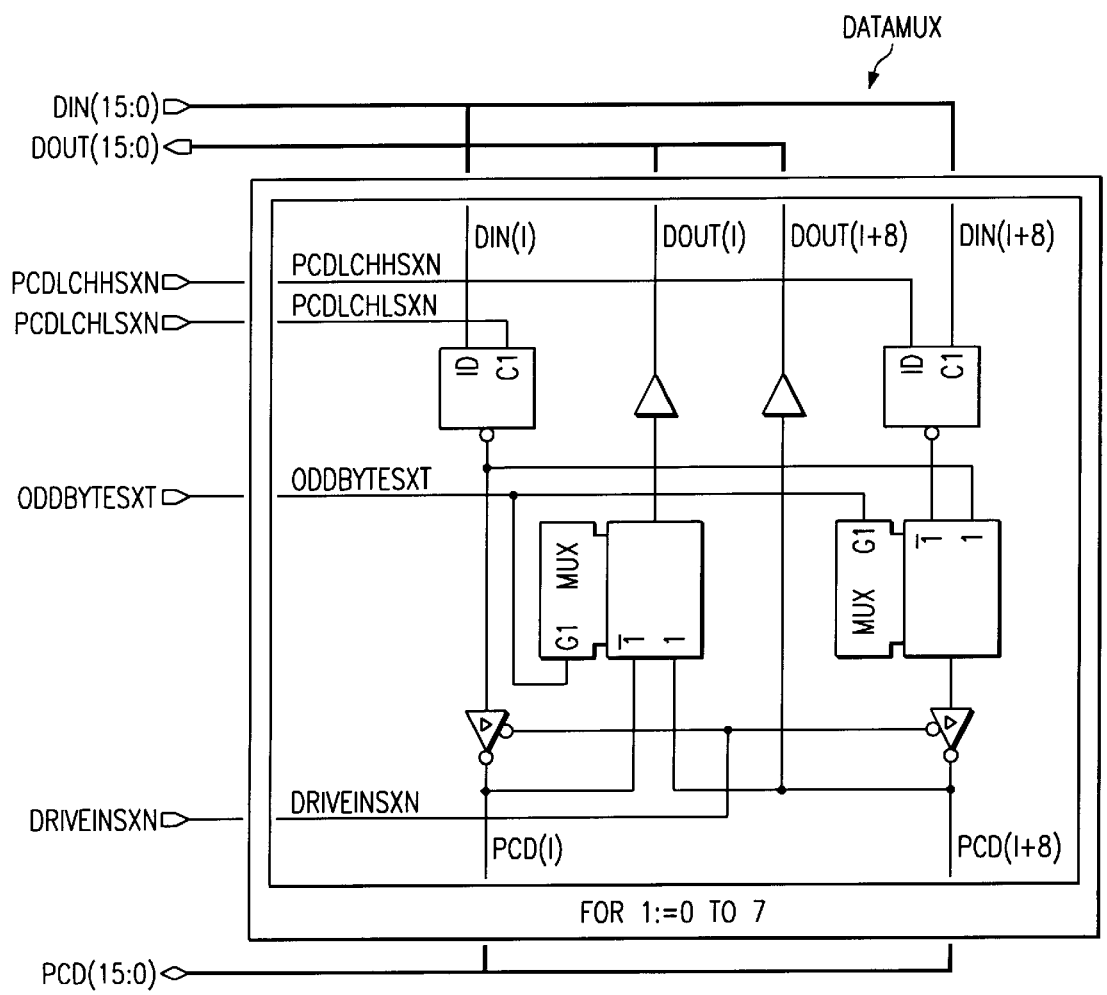
FIG. 44 is a schematic diagram of a circuit DATAMUX of FIG. 23.

In FIG. 44 data mux logic DATAMUX interfaces the internal host data bus PCD[15:0] to data bus pads of the chip for device 116. Multiplexing between the upper and lower halves of the bus for single-byte transfers is also performed by this DATAMUX circuit. This logic preferably is physically distributed adjacent to the D[15:0] pads of the chip.

In FIG. 24 Local Decode Unit 2041 contains LAD bus multiplexers and direction control. Local address decoding circuitry LADECODE, bank select registers, comparators and reset circuitry RESET are also included in LDU 2041. Detailed logic diagrams of FIGS. 45–54 illustrate the FIG. 24 interconnected blocks LADMUX, LALATCH, RESET, LADCTL, BSDECODE, LADECODE, BSCTLREG, BSAD0REG, BS0COMP, BSMK0REG, BSAD1REG, BS1COMP, BSMK1REG, BSAD2REG, BS2COMP, BSMK2REG, BSAD3REG, BS3COMP, and BSMK3REG respectively.

Figure 45:
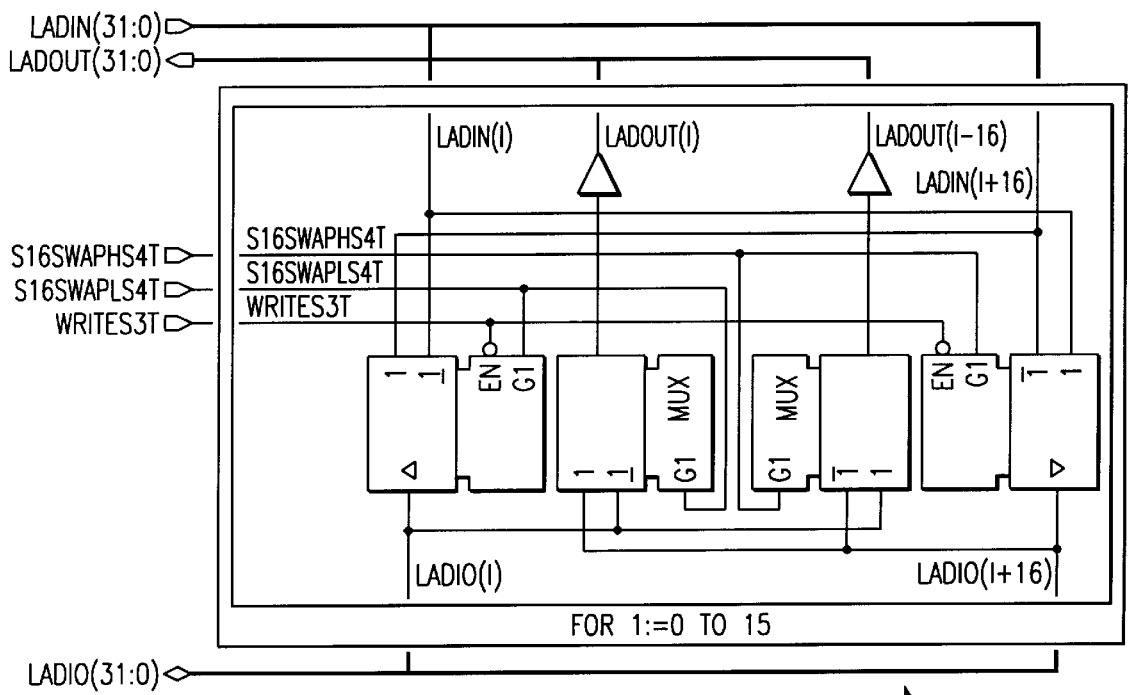
FIG. 45 is a schematic diagram of a circuit LADMUX of FIG. 24.

In FIG. 45 the local address multiplexer LADMUX block interfaces the internal local data bus LAD[31:0] to the LAD bus pads for connection of the chip 116 to the graphics coprocessor LAD bus. Multiplexing between the upper and lower halves of the bus for dynamic bus sizing transfers is also performed here. Preferably, this logic is physically distributed adjacent to the LAD[31:0] pads.

Figure 46:
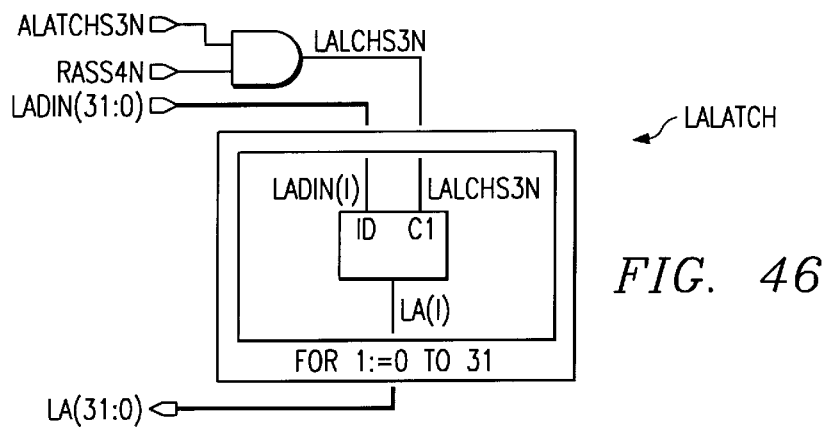
FIG. 46 is a schematic diagram of a latch circuit LALATCH of FIG. 24.

In FIG. 46 the local address latch LALATCH logic latches LAD[31:0] bus lines on the falling edge of the signal on line ALATCH-. Latching also occurs on the falling edge of row address strobe RAS- during operating cycles of FPU when ALATCH- is not active.

Figure 47:
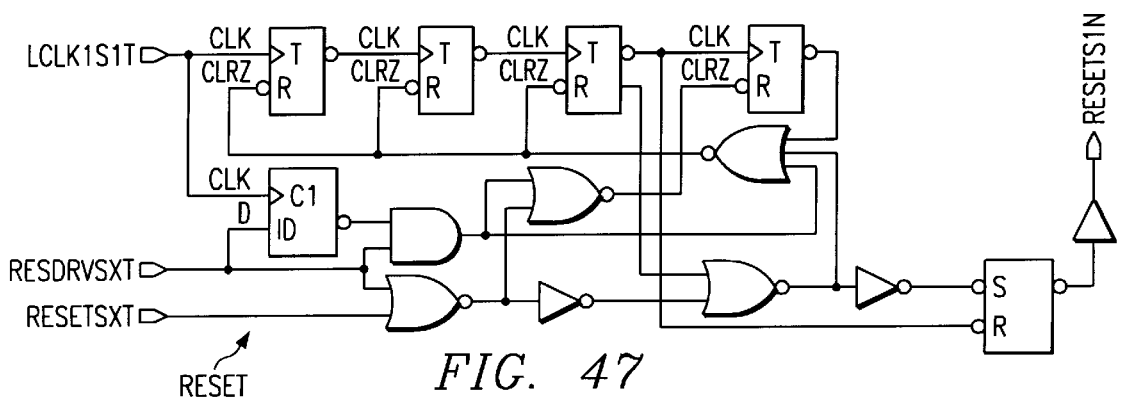
FIG. 47 is a schematic diagram of a reset circuit RESET of FIG. 24.

In FIG. 47 the reset logic RESET counts 4 LCLKs from an instant when reset drive signal RESDRV goes active before asserting reset signal RESETSIN, for glitch protection. Compare with block 791 of FIG. 7. Once asserted, signal RESETSIN in FIG. 47 is not then cleared for another four LCLK cycles, thus establishing a lower bound on the reset pulse width. Reset drive RESDRV is assumed to be active for at least 40 clock cycles of local clock LCLK at power up.

Figure 48:
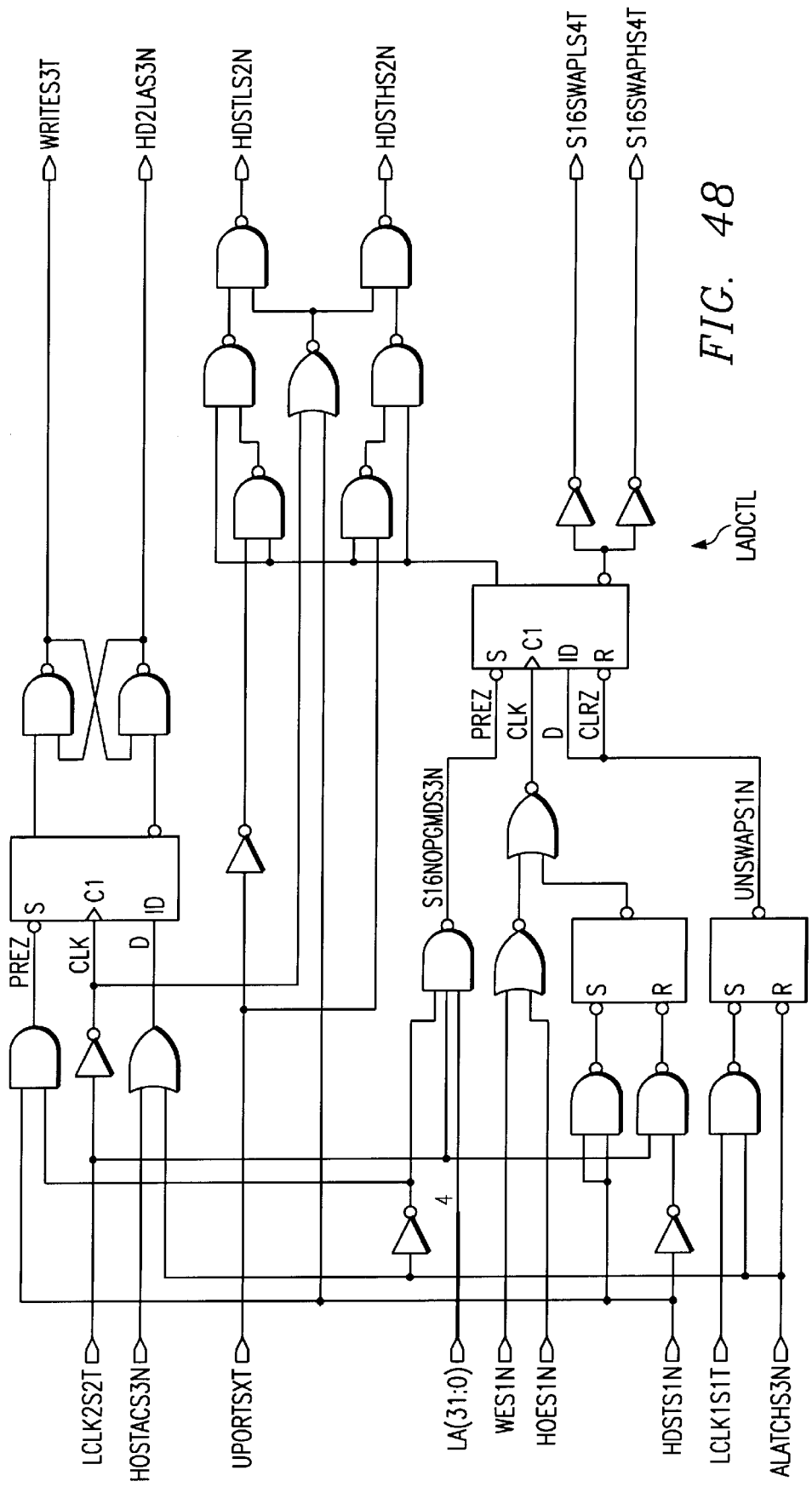
FIG. 48 is a schematic diagram of a control circuit LADCTL of FIG. 24.

In FIG. 48 the LADCTL block controls the direction (compare DIR of block 785 of FIG. 7) of data transfer on the LAD bus. This block also controls word swapping for dynamic bus sizing, and also controls latching or output operations of the HDATAREG transceivers.

Figure 49:
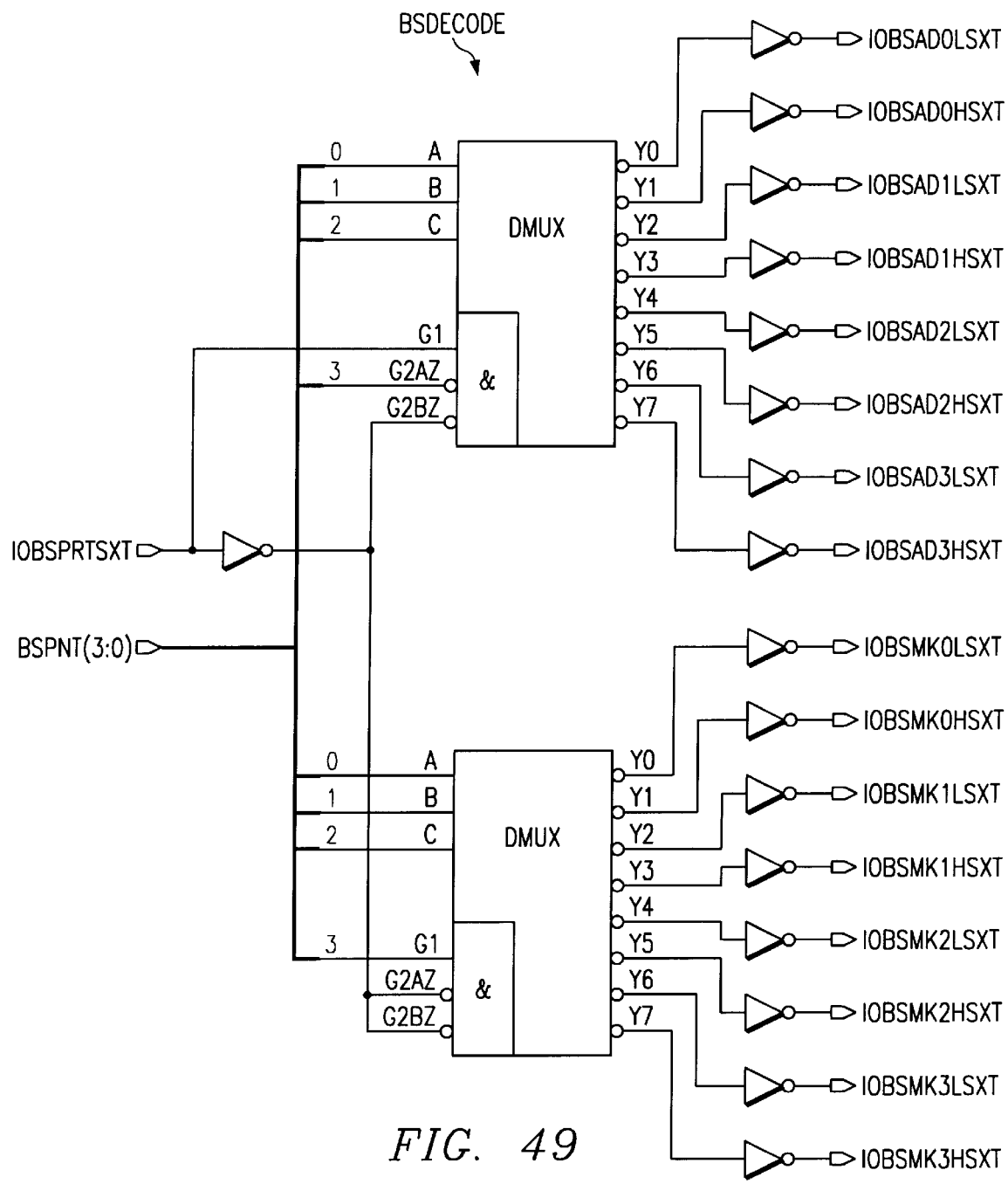
FIG. 49 is a schematic diagram of a bank select decode circuit BSDECODE of FIG. 24.

In FIG. 49, bank select decode BSDECODE logic contains I/O address decoders for the Bank Select data registers accessible at the BSPRT bank select port register I/O address location. Bank select pointer bits BSPNT[3:0] and corresponding bus lines from the bank select control BSCTL register provide the index into the Bank Select registers.

Figure 50:
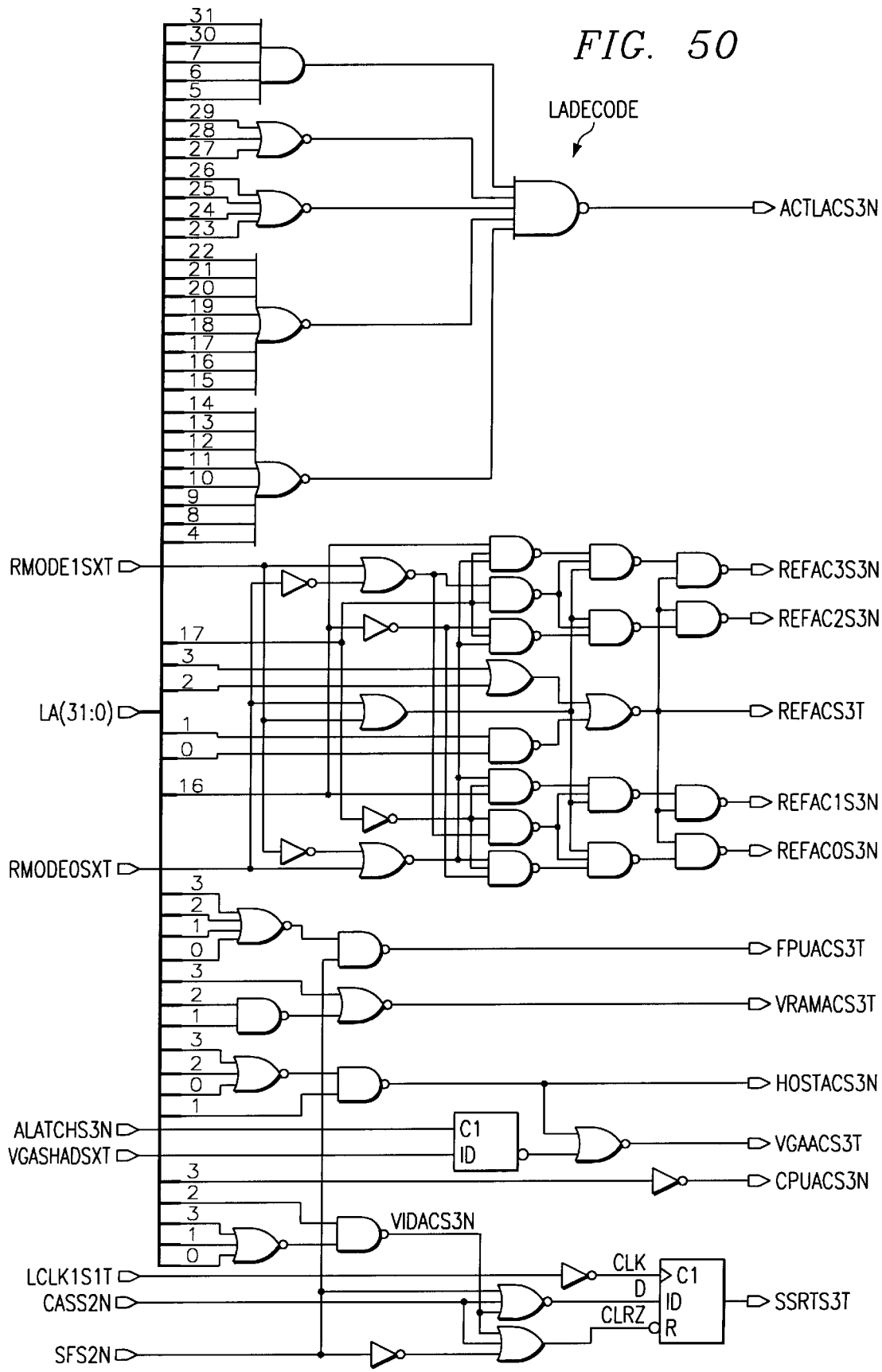
FIG. 50 is a schematic diagram of a decode circuit LADECODE of FIG. 24.

In FIG. 50, local address decode LADECODE logic contains combinatorial decode logic for decode of the TMS34020 address signal. The addresses comprise the HSTCTLL address (cf. decoder 863 of FIG. 19), HOST, CPU, VIDEO, FPU and special VRAM cycle status codes, split SRT pulse insertion indications (cf. SSRT decoder 771 of FIG. 7) and refresh partitioning between banks.

The abbreviation FPU stands for Floating Point Unit such as a Texas Instruments TMS34082 floating point numeric coprocessor which is suitably added to system 105 of FIG. 1 to perform scalar, vector, matrix and other operations with even greater speed. Such a coprocessor is described in coassigned patent applications: Ser. No. 387,472 filed Jul. 28, 1989 entitled "GRAPHICS PROCESSOR HAVING A FLOATING POINT COPROCESSOR" and now abandoned; U.S. Pat. No. 5,025,407 entitled "GRAPHICS FLOATING POINT COPROCESSOR HAVING MATRIX CAPABILITIES"; Ser. No. 387,479 filed Jul. 28, 1989 entitled "GRAPHICS COPROCESSOR HAVING IMAGING CAPABILITY" and now abandoned; Ser. No. 387,255 filed Jul. 28, 1989 entitled "GRAPHICS FLOATING POINT COPROCESSOR HAVING STAND-ALONE GRAPHICS CAPABILITY" and now abandoned; and Ser. No. 713,543 filed Jun. 7, 1991 and now abandoned, a continuation of Ser. No. 387,243 filed Jul. 28, 1989 entitled "GRAPHICS FLOATING POINT COPROCESSOR HAVING VECTOR MATHEMATICS CAPABILITY" and hereby incorporated herein by reference. Also, the FPU decoding circuit is applicable to support any type of coprocessor or coprocessors added to complement the GSP 120 of FIG. 1 in system 105.

Figure 51:
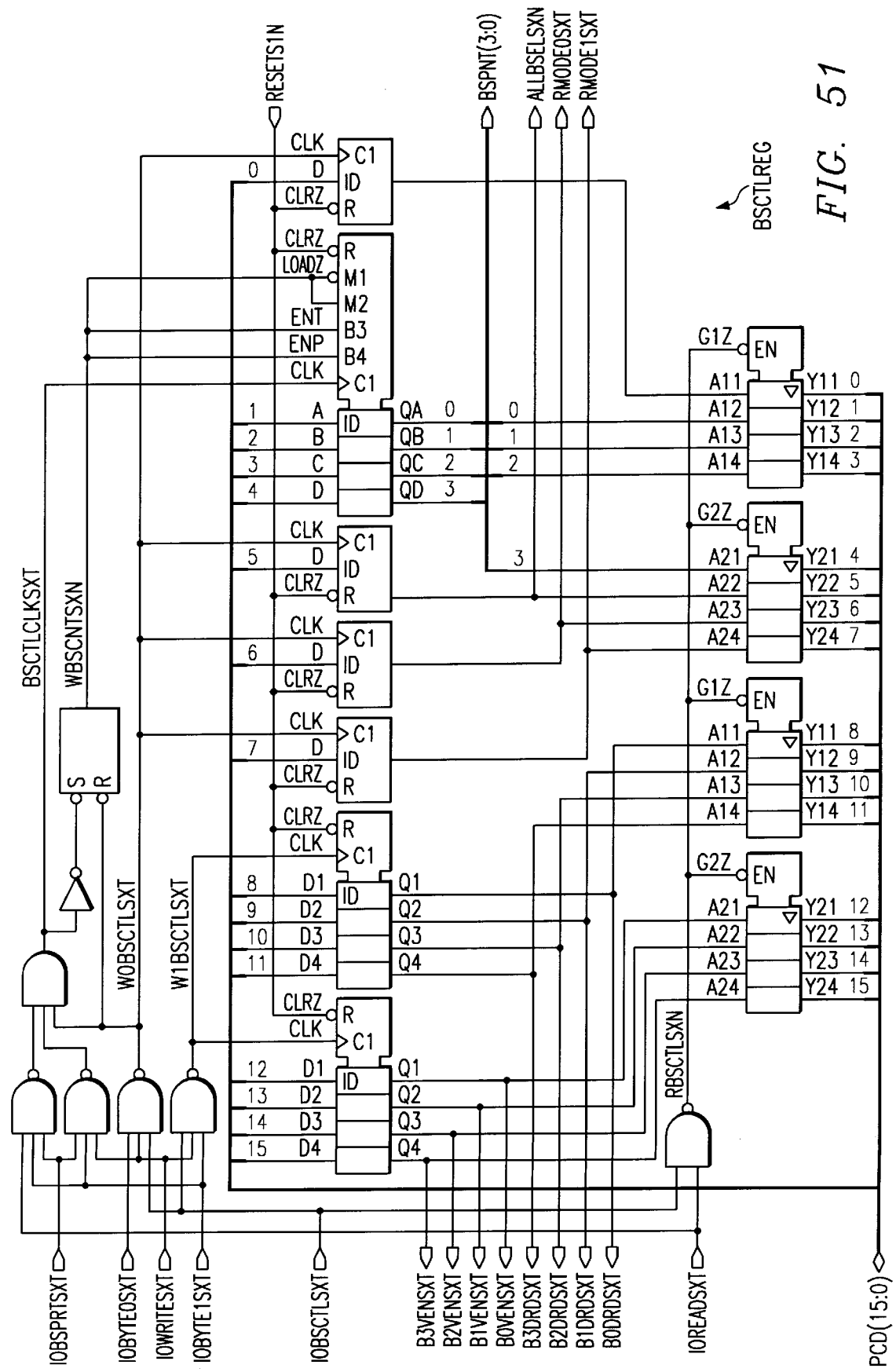
FIG. 51 is a schematic diagram of a bank select control register circuit BSCTLREG of FIG. 24.

In FIG. 51, bank select control register circuit BSCTLREG contains mode bits for controlling the bank select mode, and an index counter which addresses the 16 bank select data registers. The counter is clocked when byte0 of BSCTLREG is written, or when byte1 of the data port is accessed.

Figure 52:
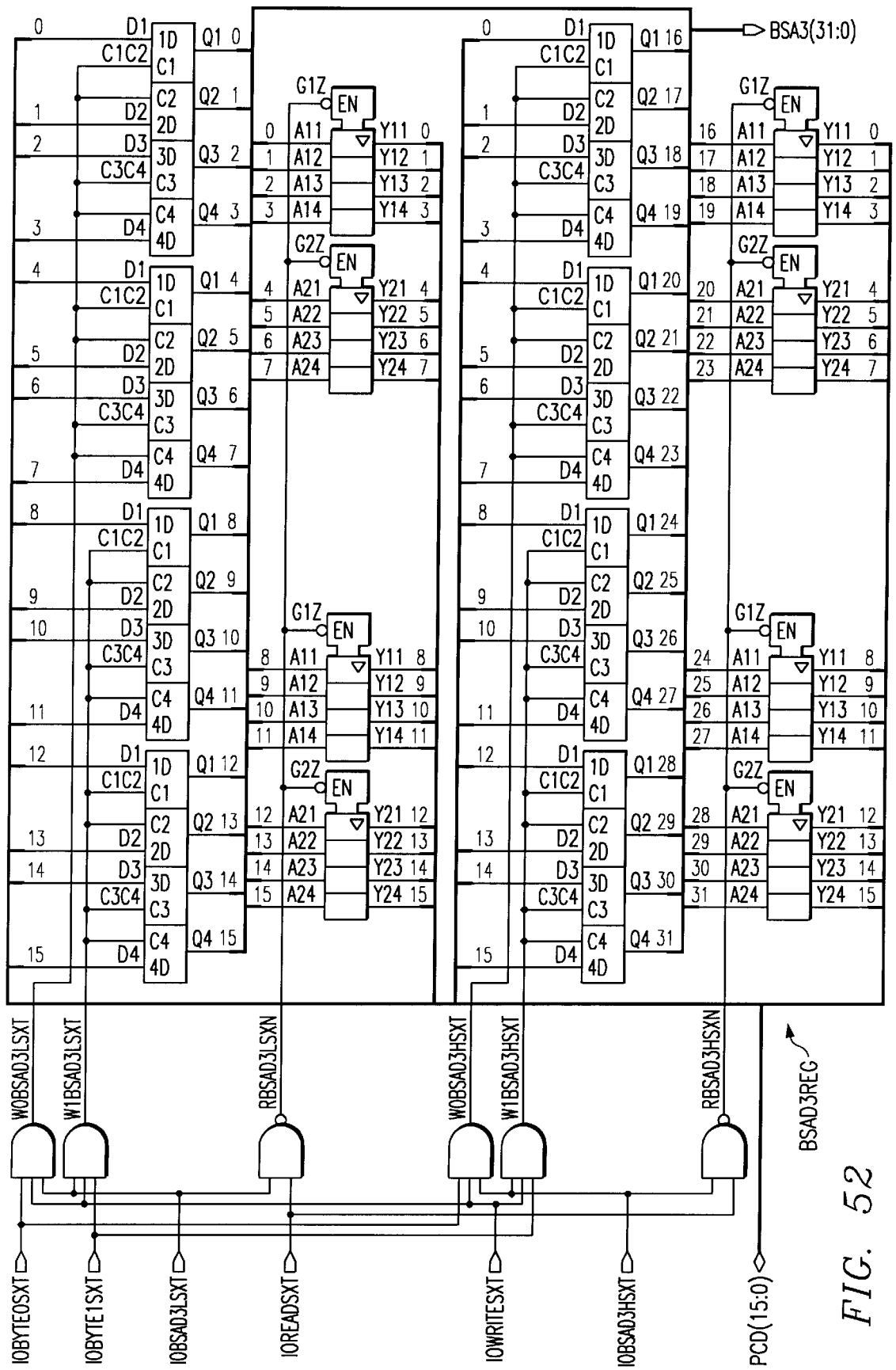
FIG. 52 is a schematic diagram of a bank select address register circuit BSAD3REG which is representative of four identical circuits BSAD0REG, BSAD1REG, BSAD2REG and BSAD3REG of FIG. 24.
Figure 53A:
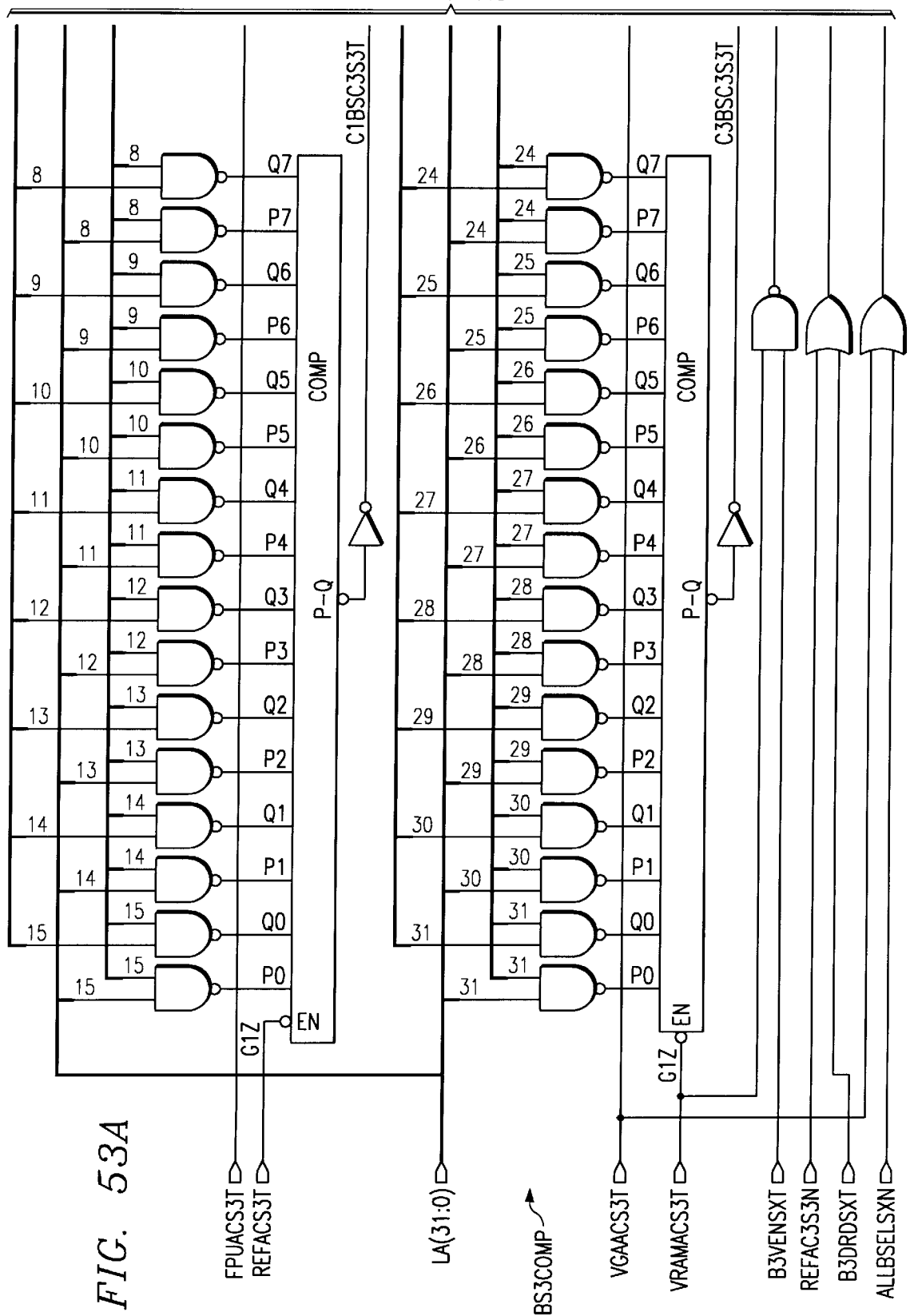
FIG. 53 is a schematic diagram of a bank select comparator circuit BS3COMP which is representative of four identical circuits BS0COMP, BS1COMP, BS2COMP and BS3COMP of FIG. 24.
Figure 53B:
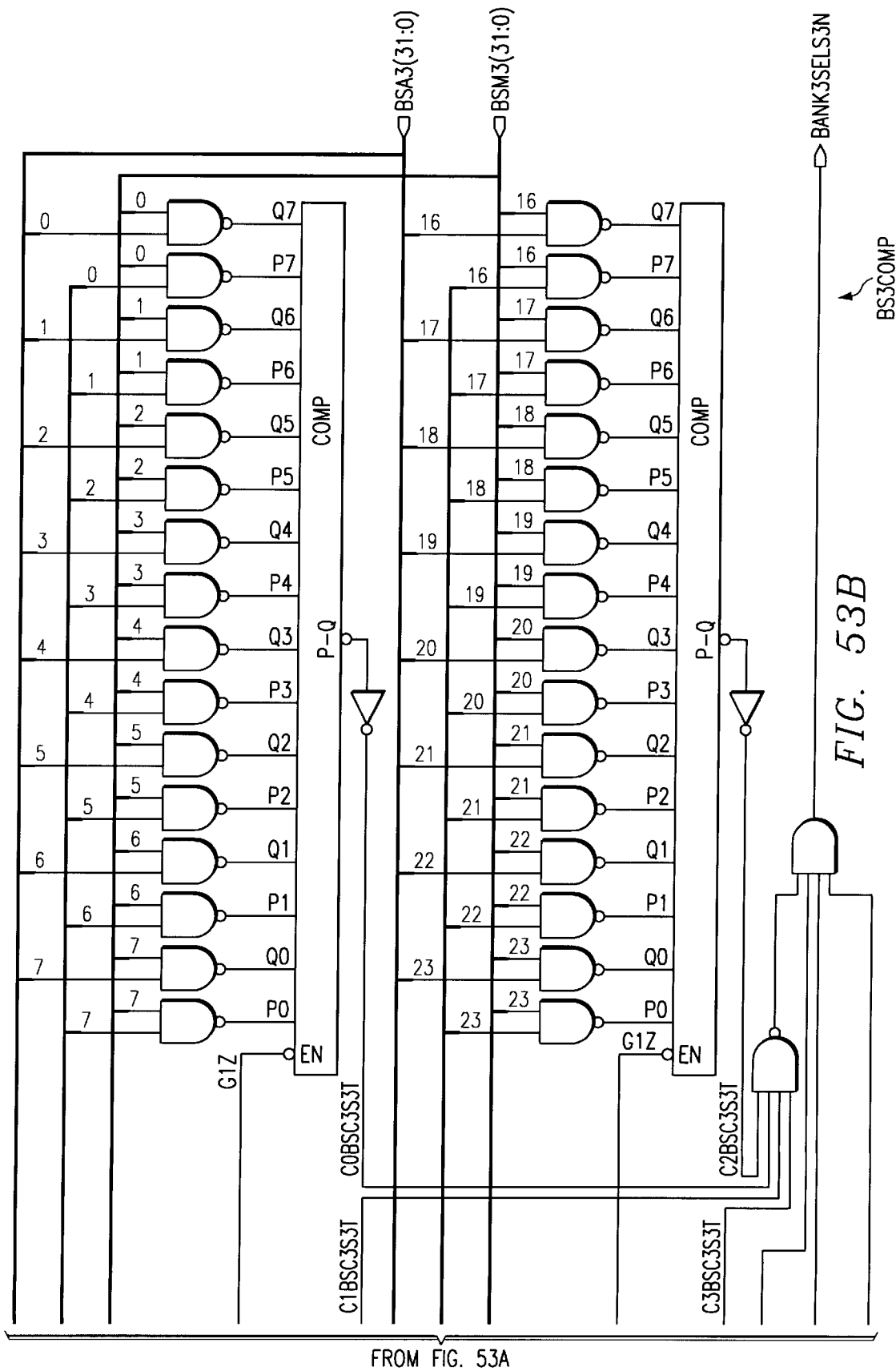
Figure 54:
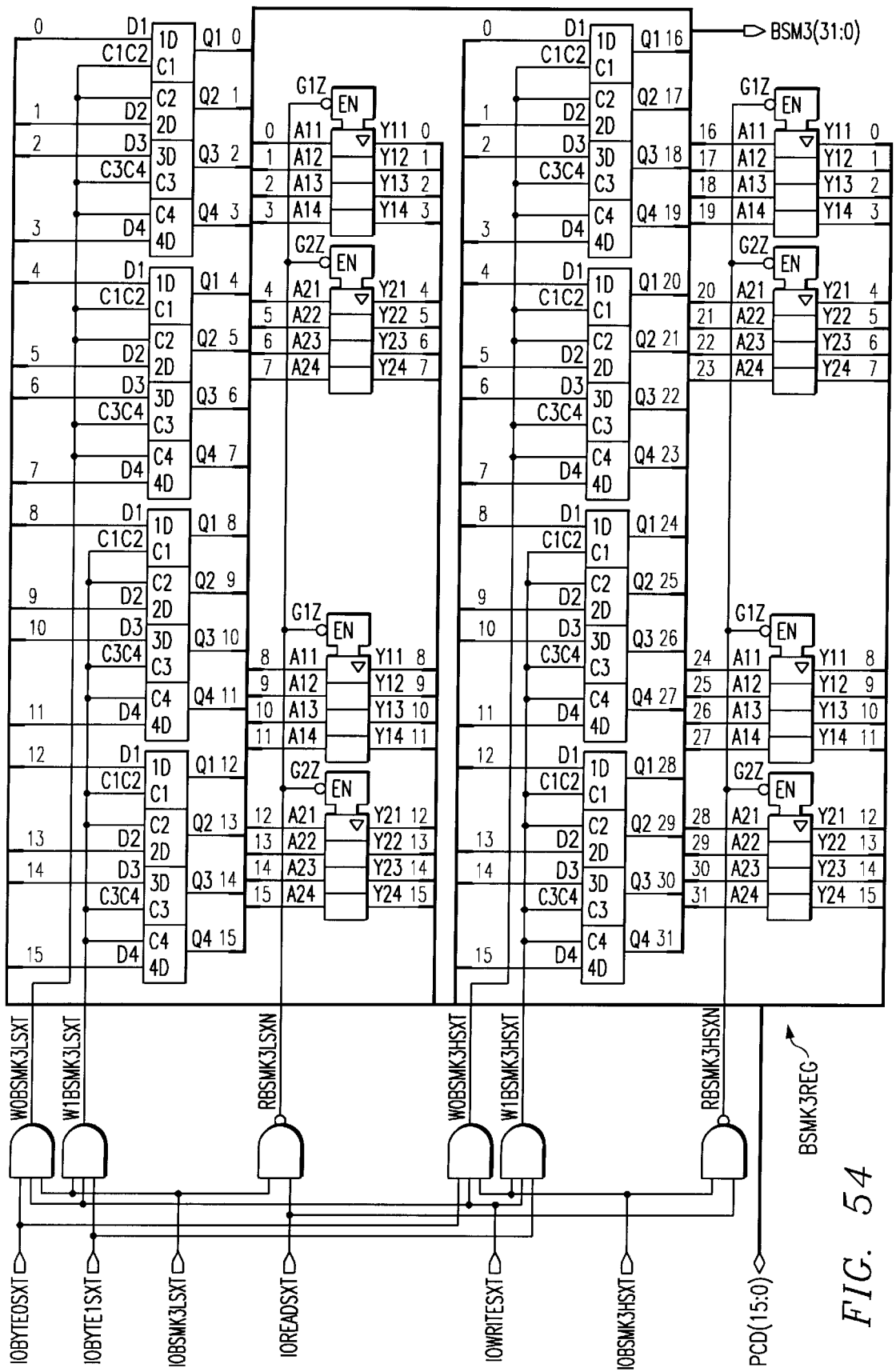
FIG. 54 is a schematic diagram of a bank select mask register circuit BSMK3REG which is representative of four identical circuits BSMK0REG, BSMK1REG, BSMK2REG and BSMK3REG of FIG. 24.

FIG. 52 represents one bank select address register BSAD3REG representing any of four identical Bank Select Address Registers BSAD0REG, BSAD1REG, BSAD2REG, BSAD3REG (by replacing the index 3 in FIG. 52 with 0,1,2 or 3) in conjunction with its corresponding Bank Select Mask Register BSMK3REG of FIG. 54. The bank select address register BSADn and mask register BSMSKn fully specify a bank of the TMS 34020 graphics coprocessor 120 local memory. In FIG. 53, each BSAn[31:0] bus (n=0,1,2,3) is compared to the LA[31:0] bus by a respective comparator circuit such as BS3COMP of FIG. 53, and masked by a corresponding BSMn[31:0] mask register to generate a bank select signal BANKnSEL leading to BSELn.

FIG. 53 represents one of four identical Bank Select Comparators BS0COMP, BS1COMP, BS2COMP, BS3COMP that determine whether the byte of local address bus LA[31:0] and the Bank Select address BSAn[31:0] match. Don't-cares are masked by bank select mask registers BSMn[31:0] of FIG. 54. DRAM refreshes and VRAM cycles are controlled separately. No banks are selected for FPU and VGA accesses.

FIG. 54 shows a representative one of four identical Bank Select Registers BSMK0REG, BSMK1REG, BSMK2REG, AND BSMK3REG that, in conjunction with associated bank select address register, fully specify a bank of the TMS34020 graphics coprocessor local memory. Each BSAn [31:0] bus is compared to the LA[31:0] bus, and masked by BSMn[31:0], in FIG. 53 to generate a bank select BSELn.

Figure 55A:
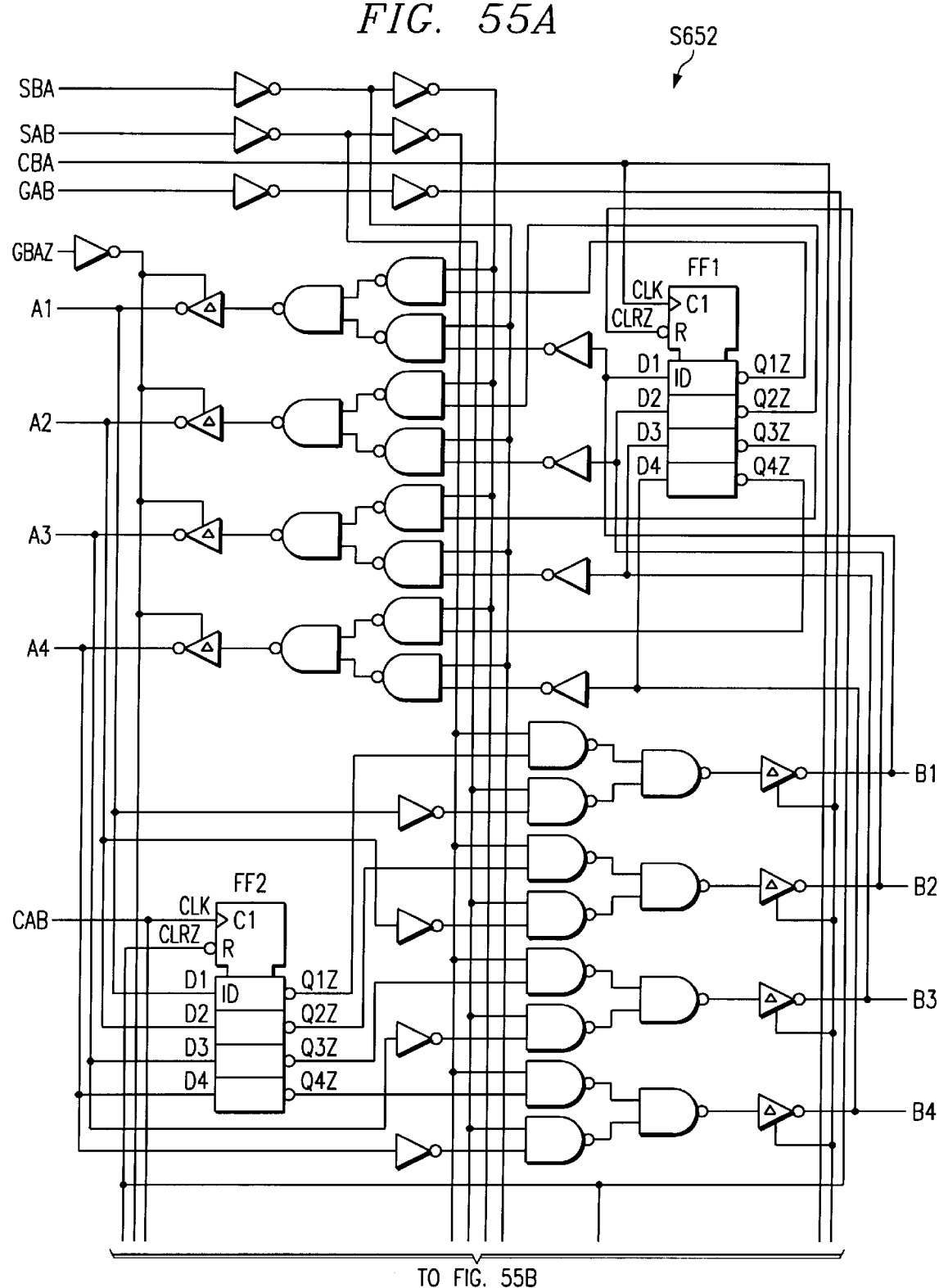
FIG. 55 is a schematic diagram of a circuit S652 of FIG. 37.
Figure 55B:
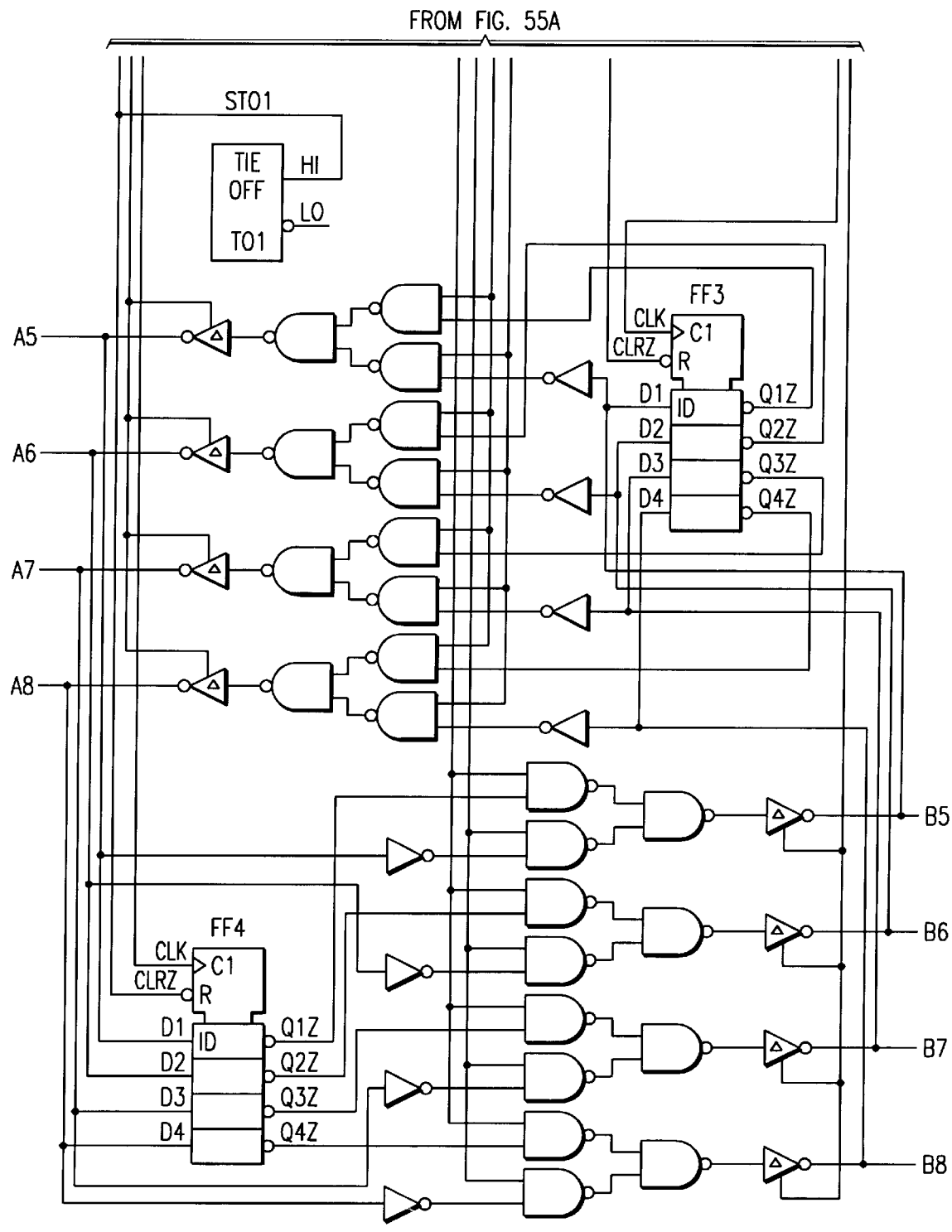

FIG. 55 shows a schematic of 8 bit bidirectional transceiver S652 of FIG. 37. The transceiver has lines A1–A8 communicating with lines B1–B8 via transceiver NAND and inverter logic circuits as illustrated in response to direction and other control signals on control lines SBA, SAB, CBA, CAB, GAB and GBAZ. The letters B and A are arbitrary identifiers.

Figure 56:
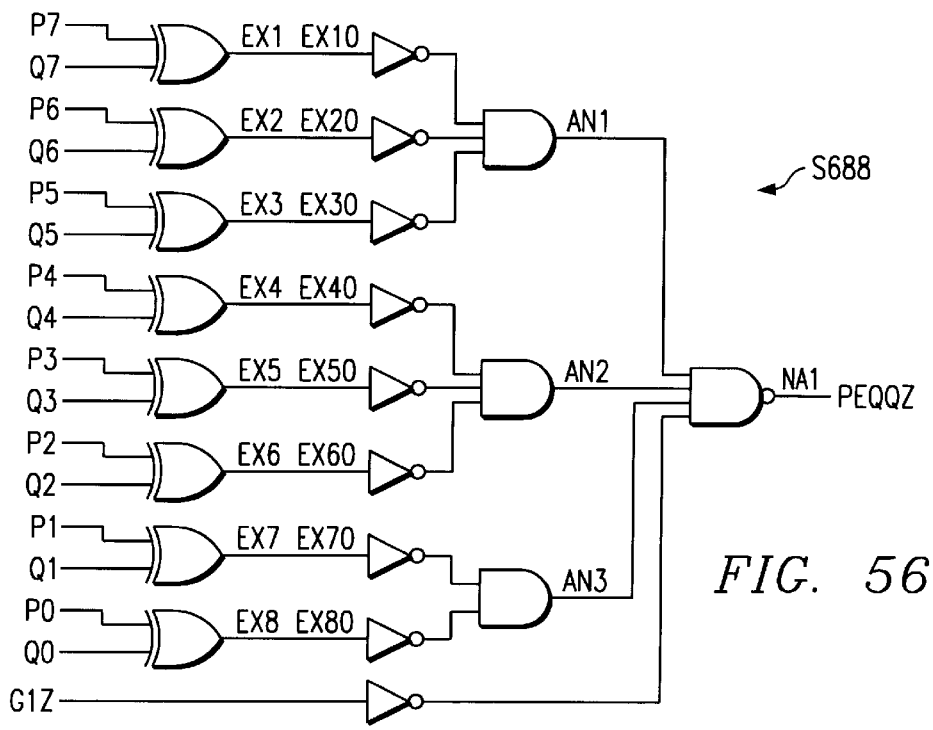
FIG. 56 is a schematic diagram of a circuit S688 of FIGS. 25 and 53.

FIG. 56 shows a schematic of comparator circuitry S688 for circuits BSnCOMP of FIG. 53 and IODECODE of FIG. 41. This circuit is also a block in the BASEnREG register circuits of FIG. 25. Circuitry S688 has 8 exclusive-NOR gates having inputs from 8 bit lines to be compared and followed by a multiple-gate NAND. An input G1Z qualifies the NAND circuit.

Figure 57:
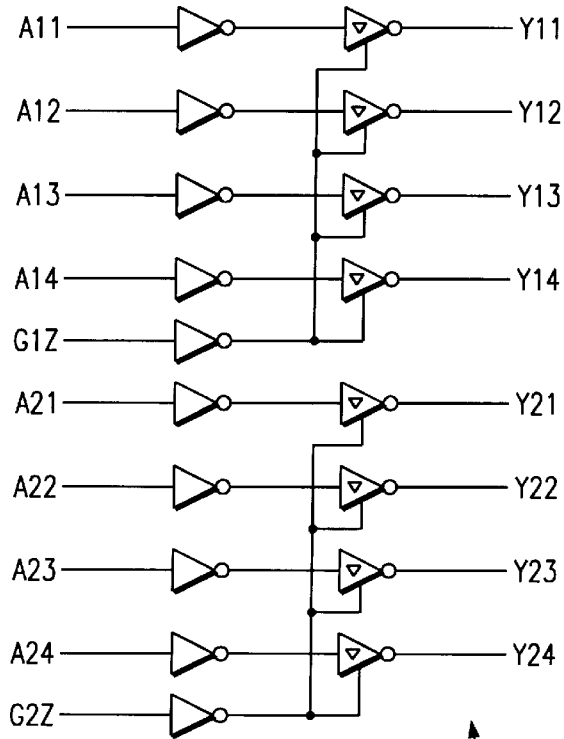
FIG. 57 is a schematic diagram of a circuit S244 of FIGS. 25–28, 31, 32, 36, 43A, 43B, 51, 52 and 54.

FIG. 57 shows a schematic of two four-bit buffers S244 for use in the circuit of FIGS. 25–28, 31, 32, 36, 43A, 43B, 51, 52 and 54. Control lines G1Z and G2Z are connected to enable respective sets of four buffers.

Figure 58:
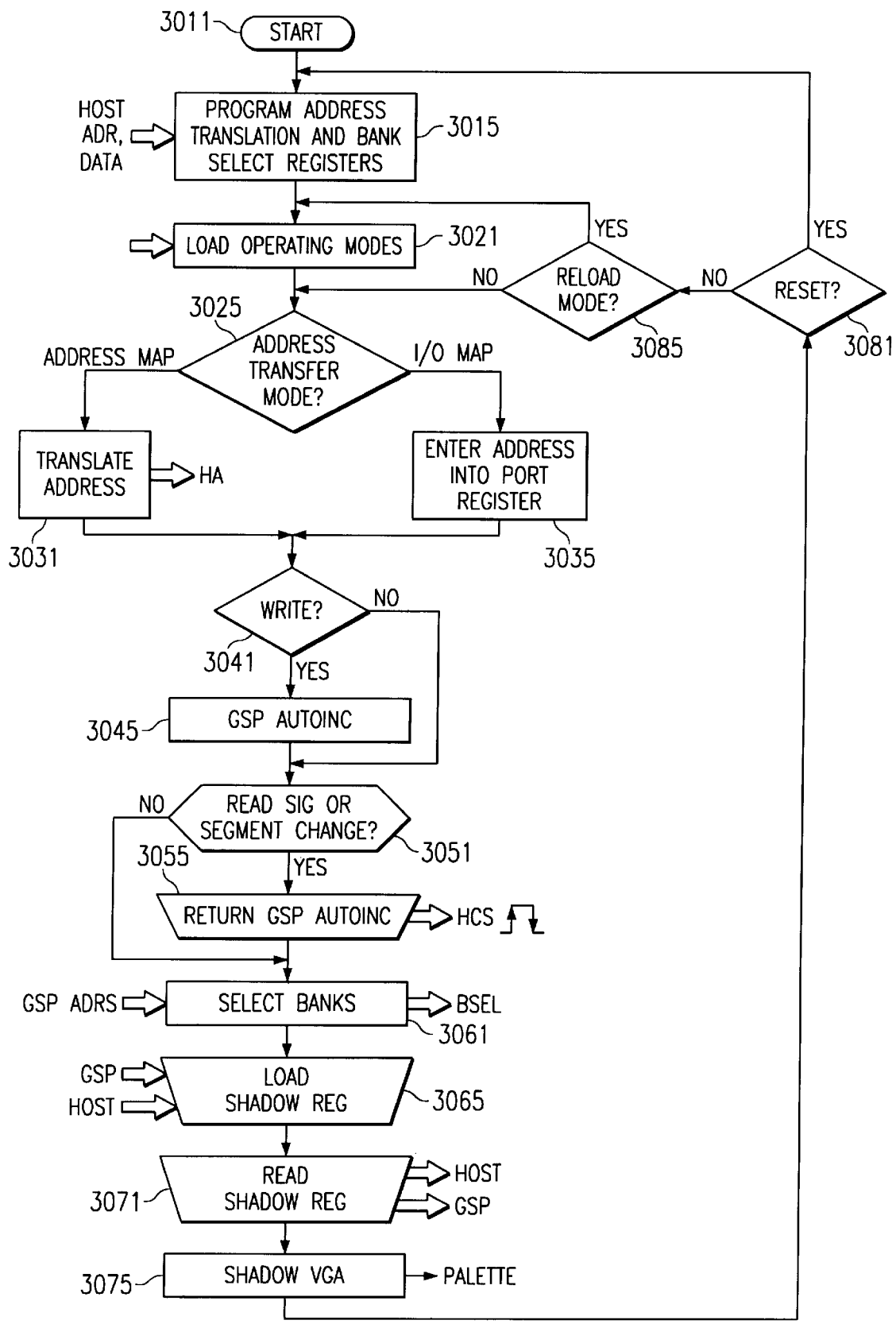
FIG. 58 is a process flow diagram of operational steps in the multifunctional access circuit of FIGS. 1, 4, 7 and 20.

In FIG. 58 process steps begin with a START 3011 in a method of operating the computer graphics system 105 of FIG. 1 having host computer 110 with its host bus including a host address bus and a host data bus, and graphics coprocessor 120 with its local address bus for supplying addresses and local data bus for supplying data. A step 3015 programs address translation registers BASEnREG, MAPnREG and MAP0EREG and bank select registers BSADn-REG and MASKnREG by decoding the host address bus addresses to select the registers and then loading the address translation registers and bank select registers with data from the host data bus 717. As described hereinabove, storing information in register circuits BASEnREG defines address segments. Next a step 3021 loads the mode control register MODECTL with operating mode information.

A decision step 3025 selectively establishes operation of address translation and port register asserting steps 3031 and

3035. When address translating is directed, further addresses are supplied in step 3031 by the host 110 on the host address bus to generate translated addresses on the local address bus HA based on the data loaded into the translation registers when the addresses are in the defined address segments. When I/O mapping is directed in step 3025, operations pass to a step 3035 to enter address information into a port register HADDRH, HADDRL from the host data bus and then assert the address information on the local address bus of the graphics processor.

Operations pass from either step 3031 or 3035 to a step 3041 wherein memory access to GSP local memory involves detection of a host write. If a host write occurs, a step 3045 automatically increments the translated address for GSP local memory. Logic circuitry in GSP 120 is also responsive to a control signal to return to the translated address, for example. If there is no write signal, or upon autoincrementing in step 3045, operations pass to a step 3051 which detects a host read signal or an address segment change. If either latter condition occurs, a branch is made to a step 3055 to return the GSP address asserted to its local memory to the translated address. Step 3055 thus supplies a rising and then falling control signal HCS- to the graphics processor when the address changes from one segment to another segment, or upon a read.

Operations pass from step 3051 (if no read or segment change) or from step 3055 to a step 3061. Step 3061 selects banks of memory in response to addresses supplied by the graphics processor on the local address bus based on the data loaded by the host computer into the bank select registers.

Figure 19:
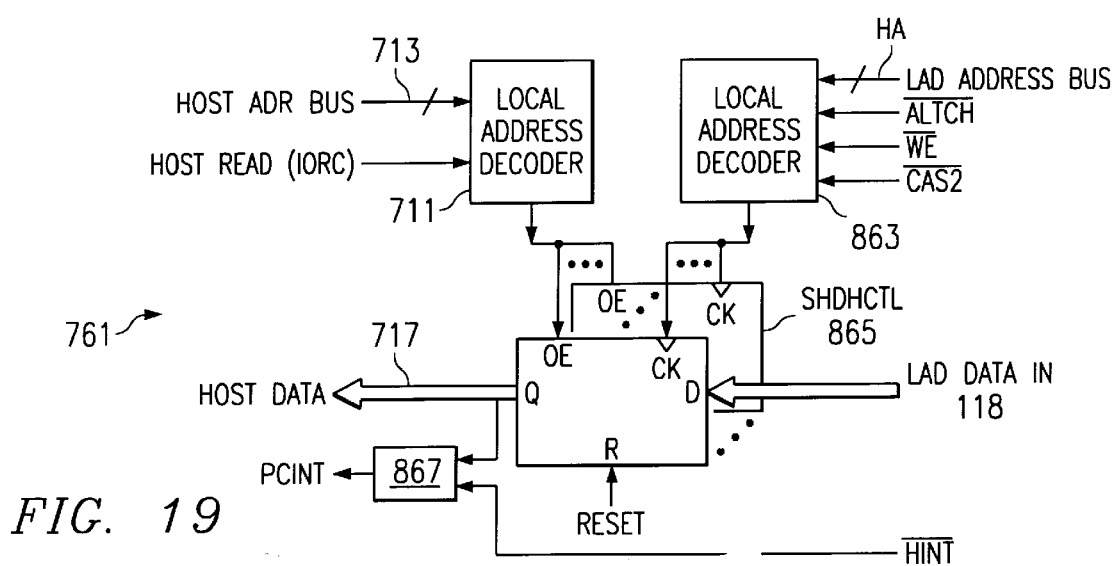
FIG. 19 is a block diagram of a shadow circuit in the multifunctional access circuit of FIGS. 4, 6 and 7.
Figure 20A:
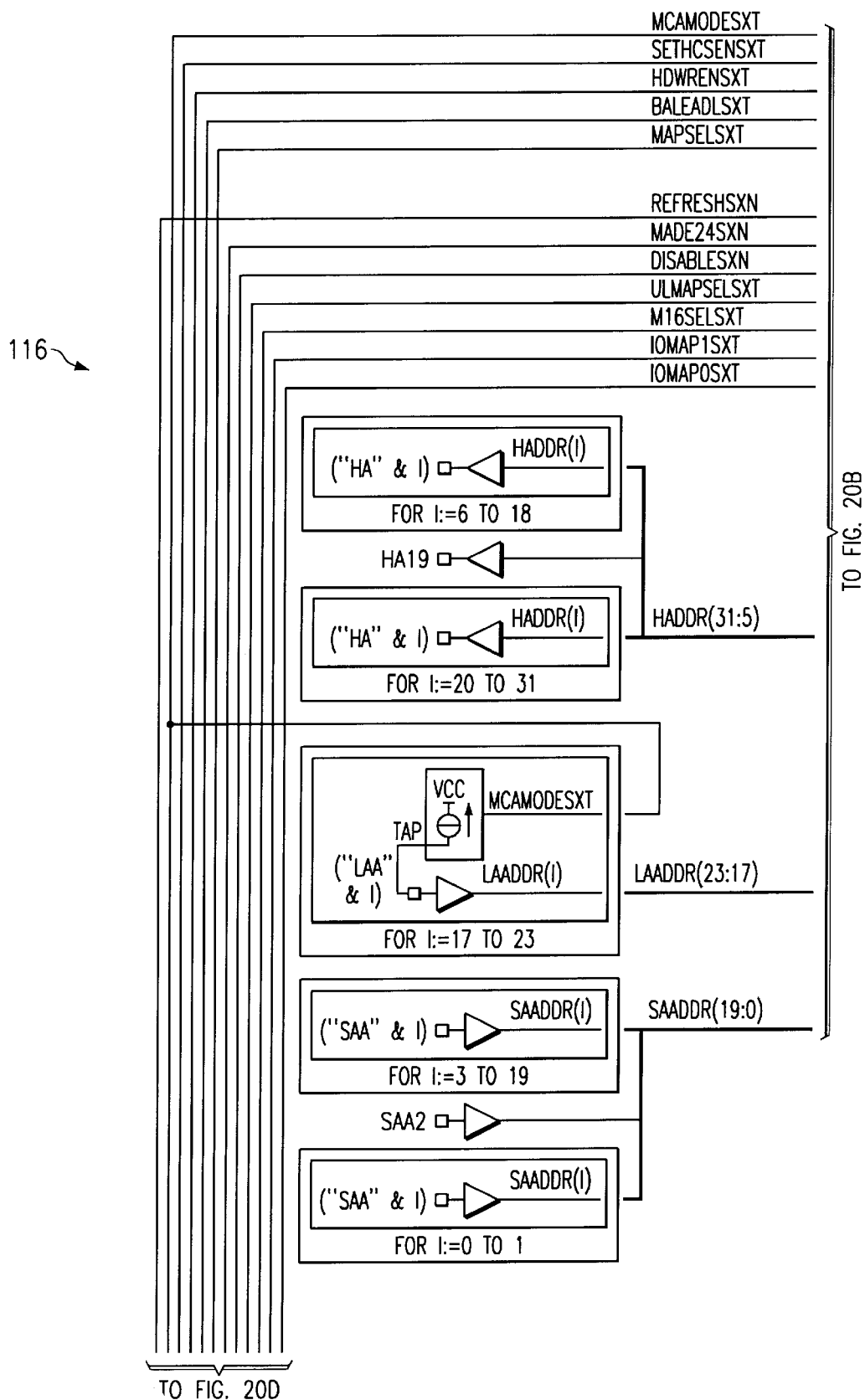
FIG. 20 is another block diagram of the multifunction access circuit of FIG. 7.
Figure 20B:
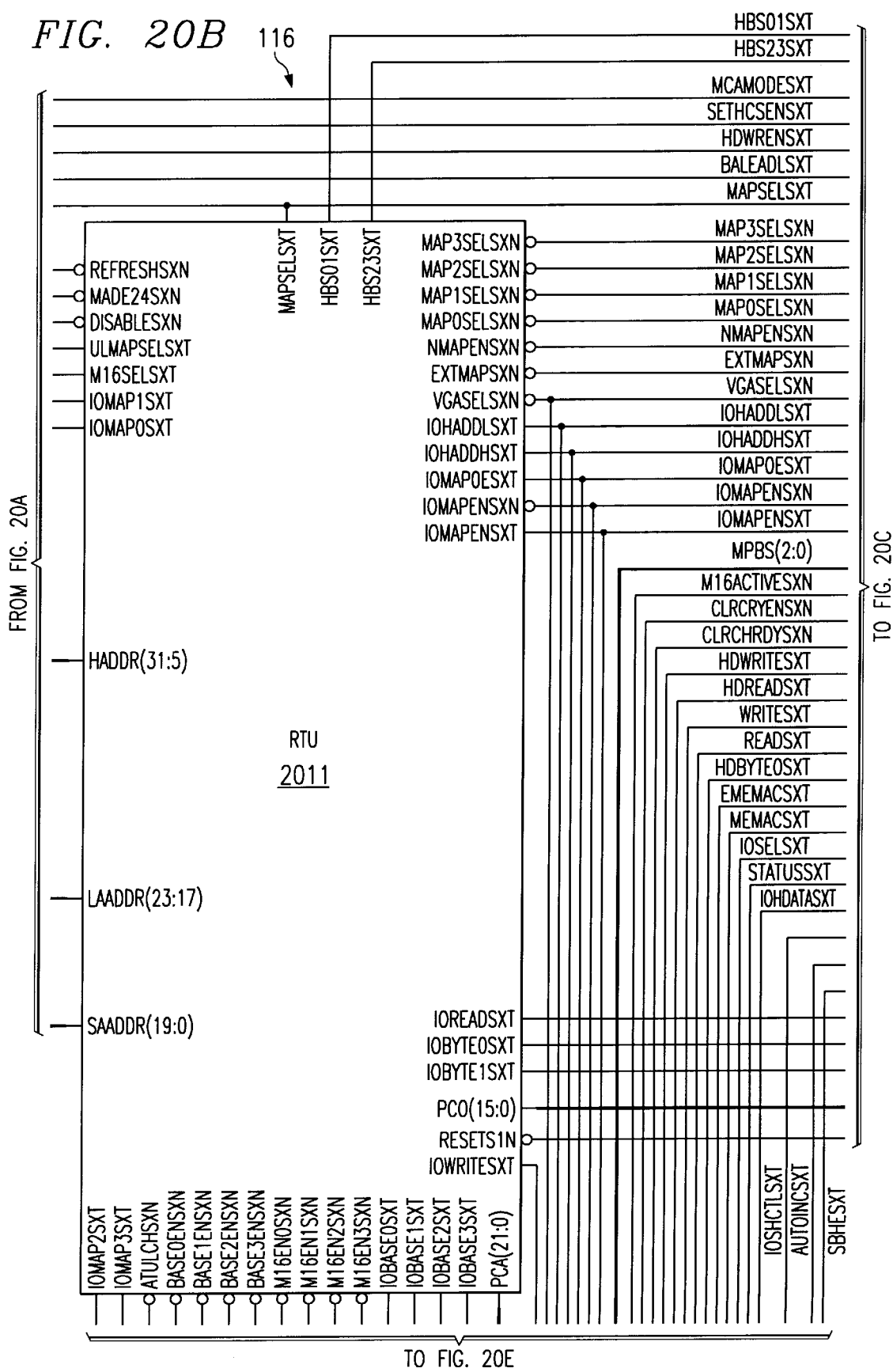
Figure 20C:
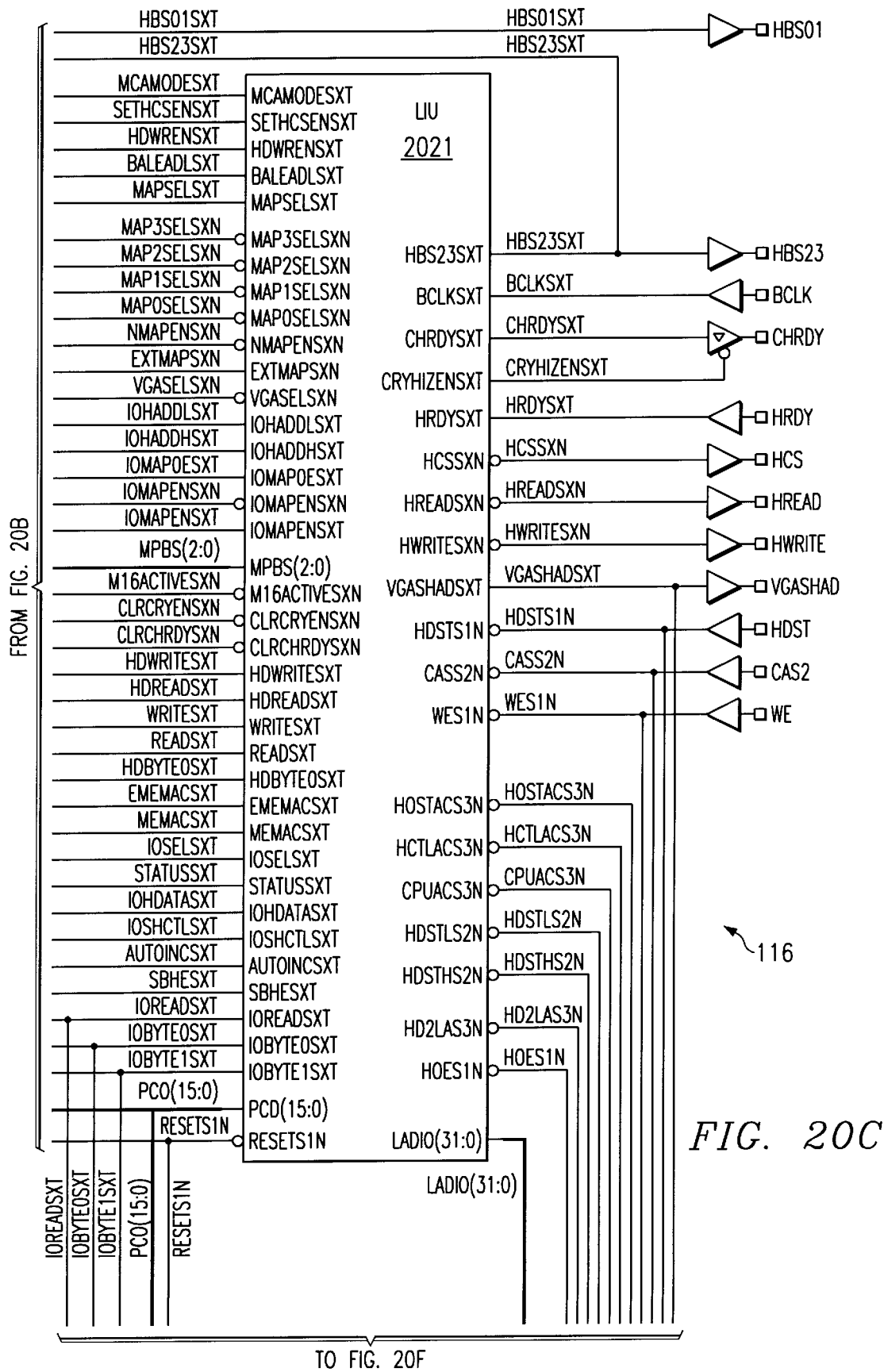
Figure 20D:
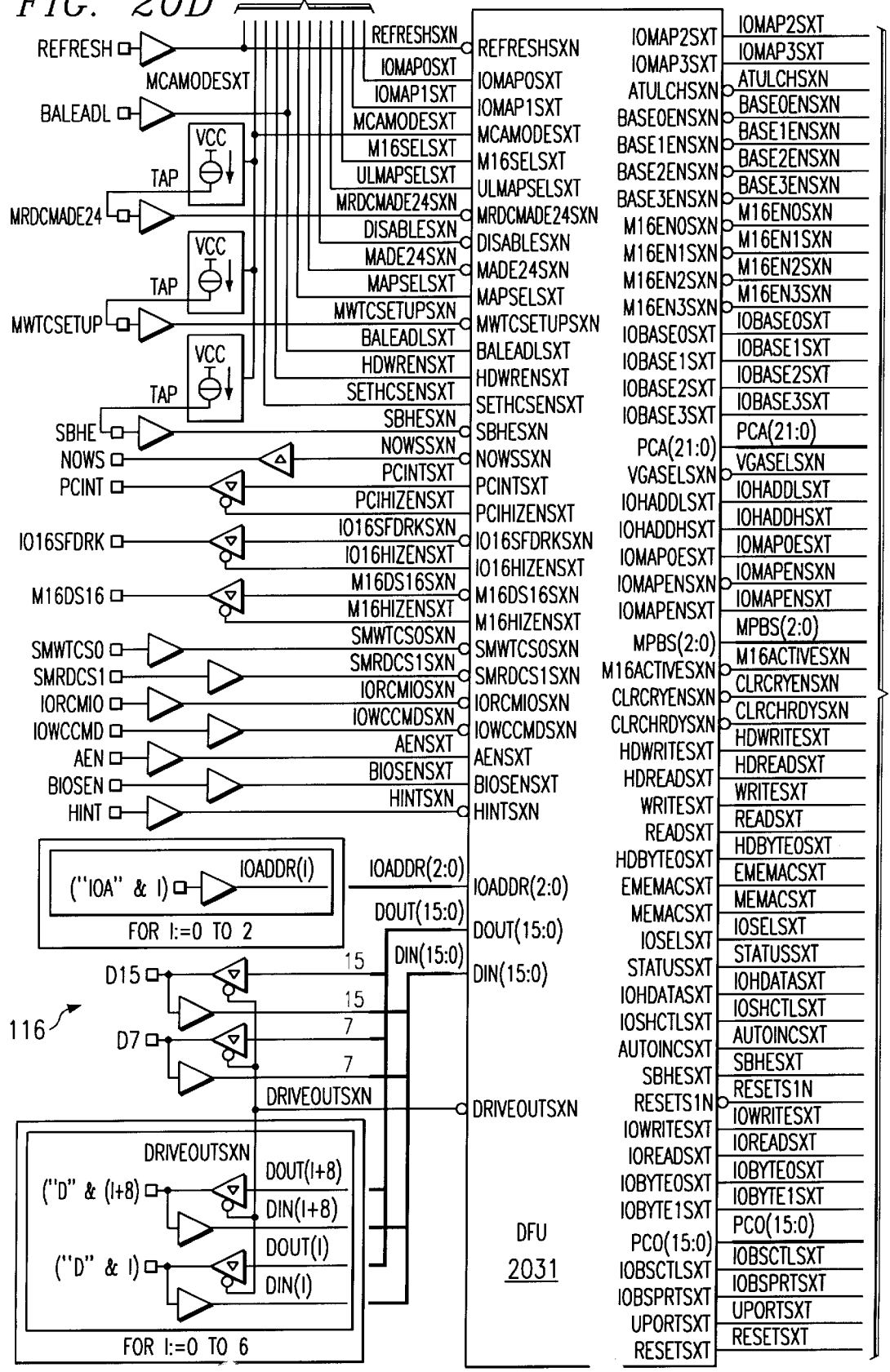
Figure 20F:
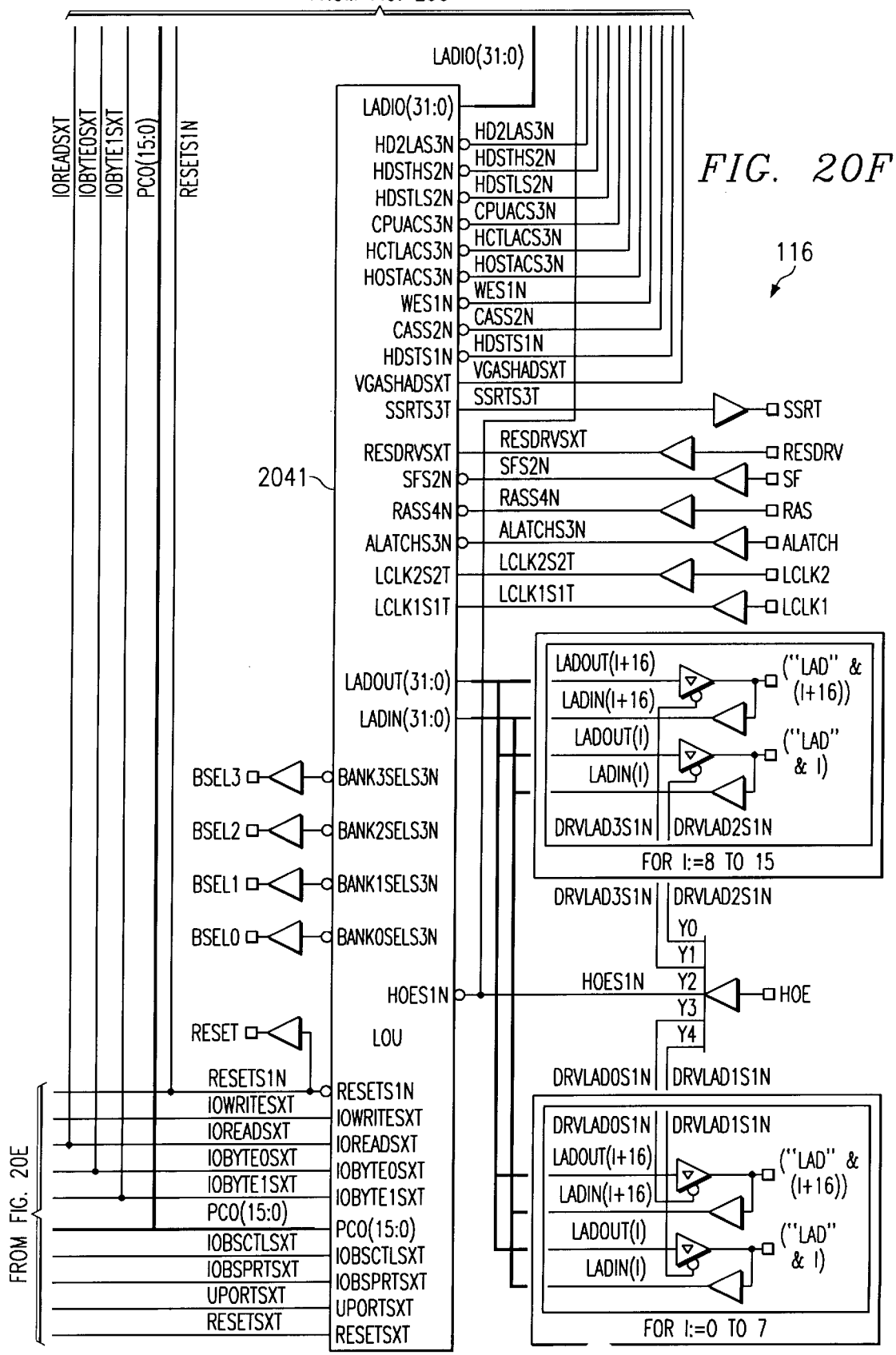
Figure 21A:
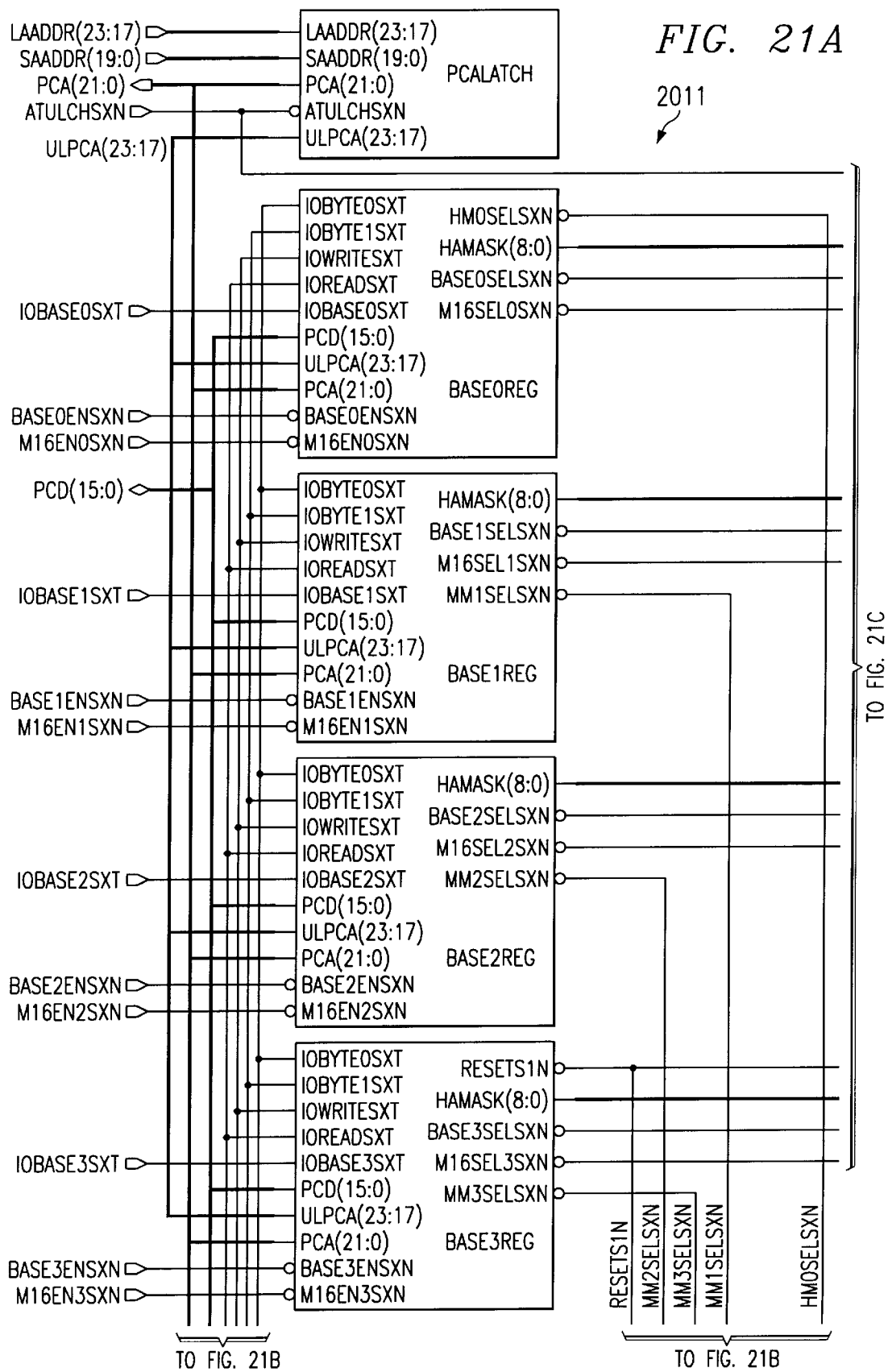
FIG. 21 is a block diagram of an Address Translation Unit block ATU of FIG. 20.
Figure 21B:
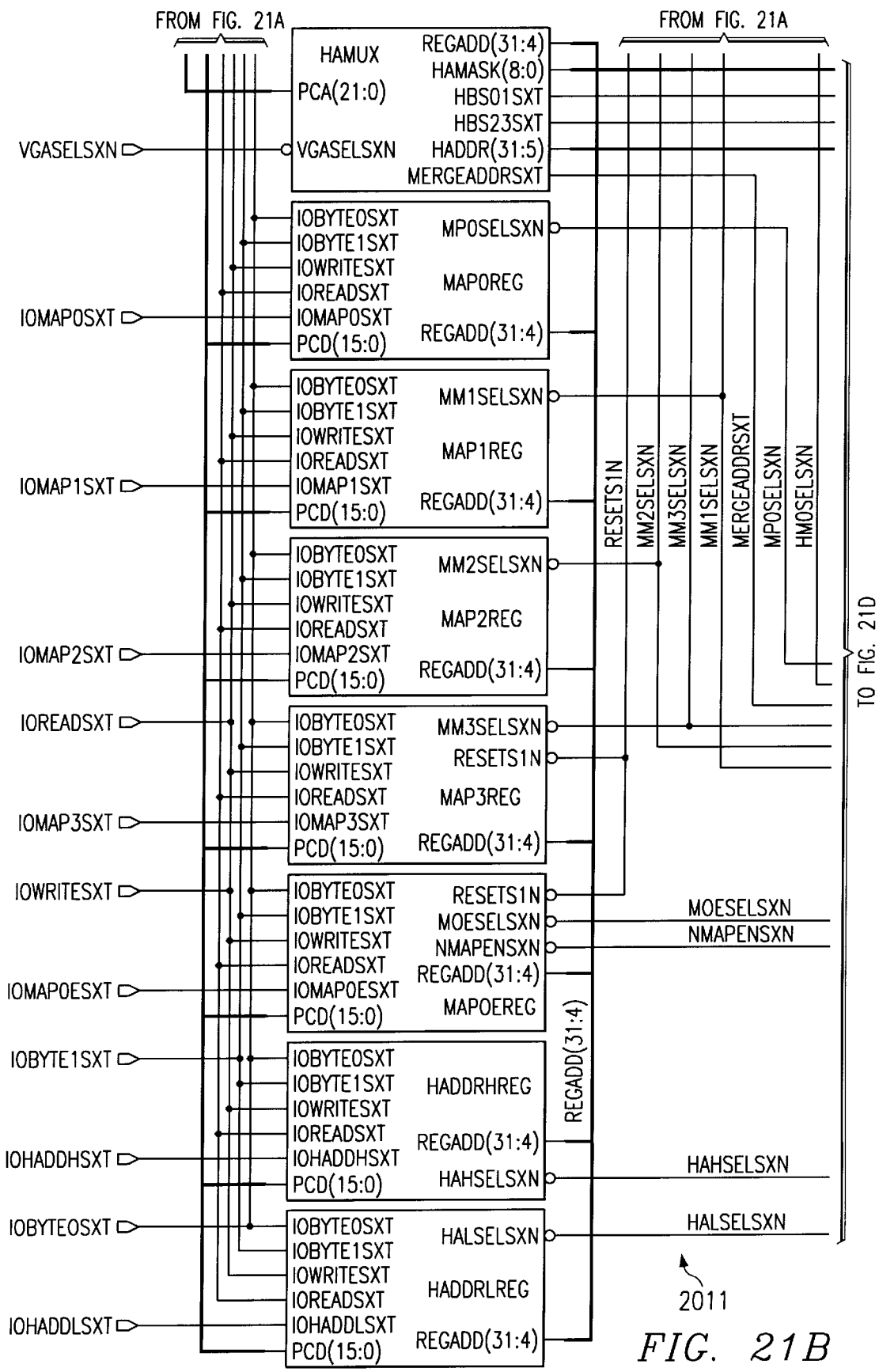
Figure 21C:
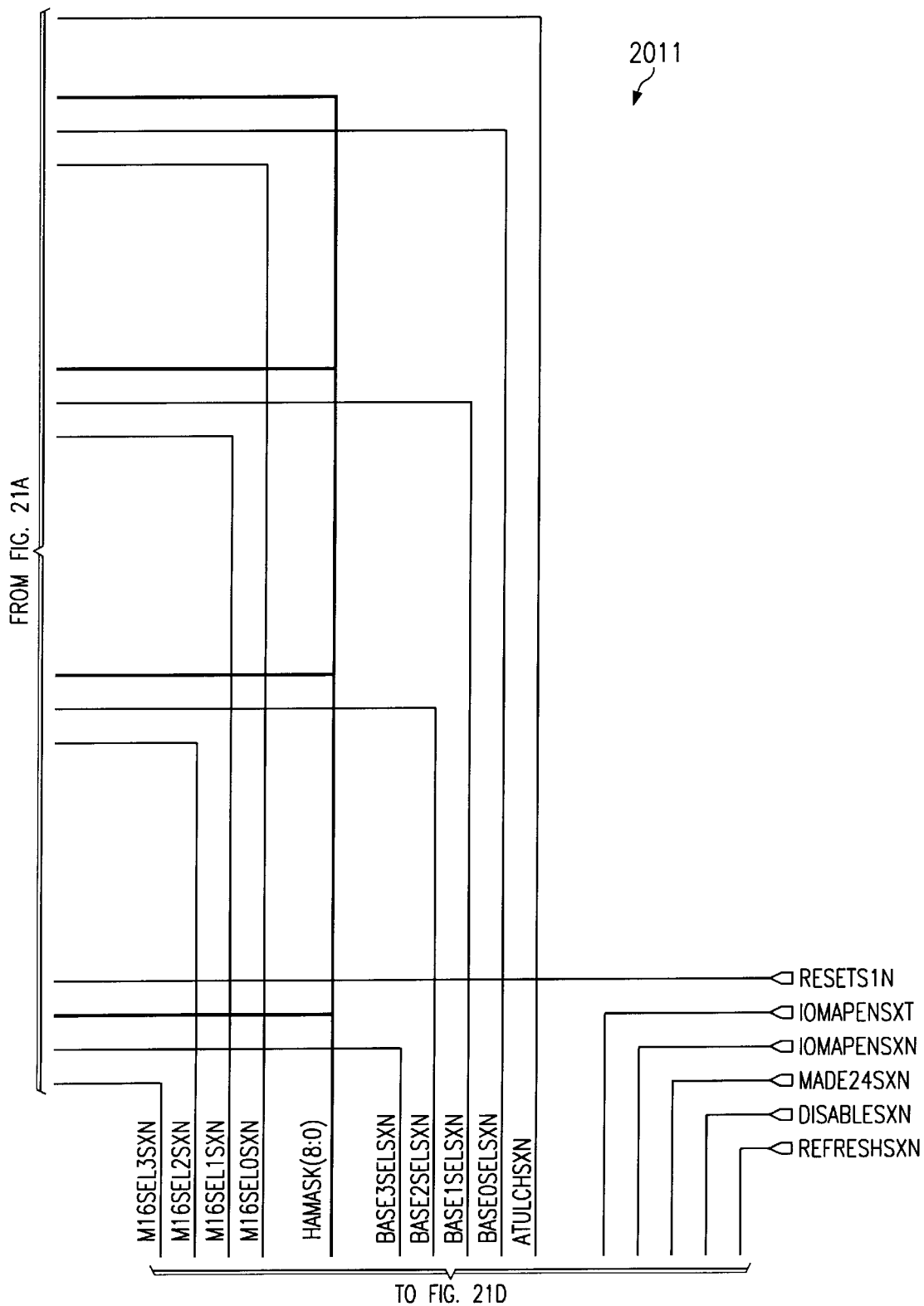
Figure 21D:
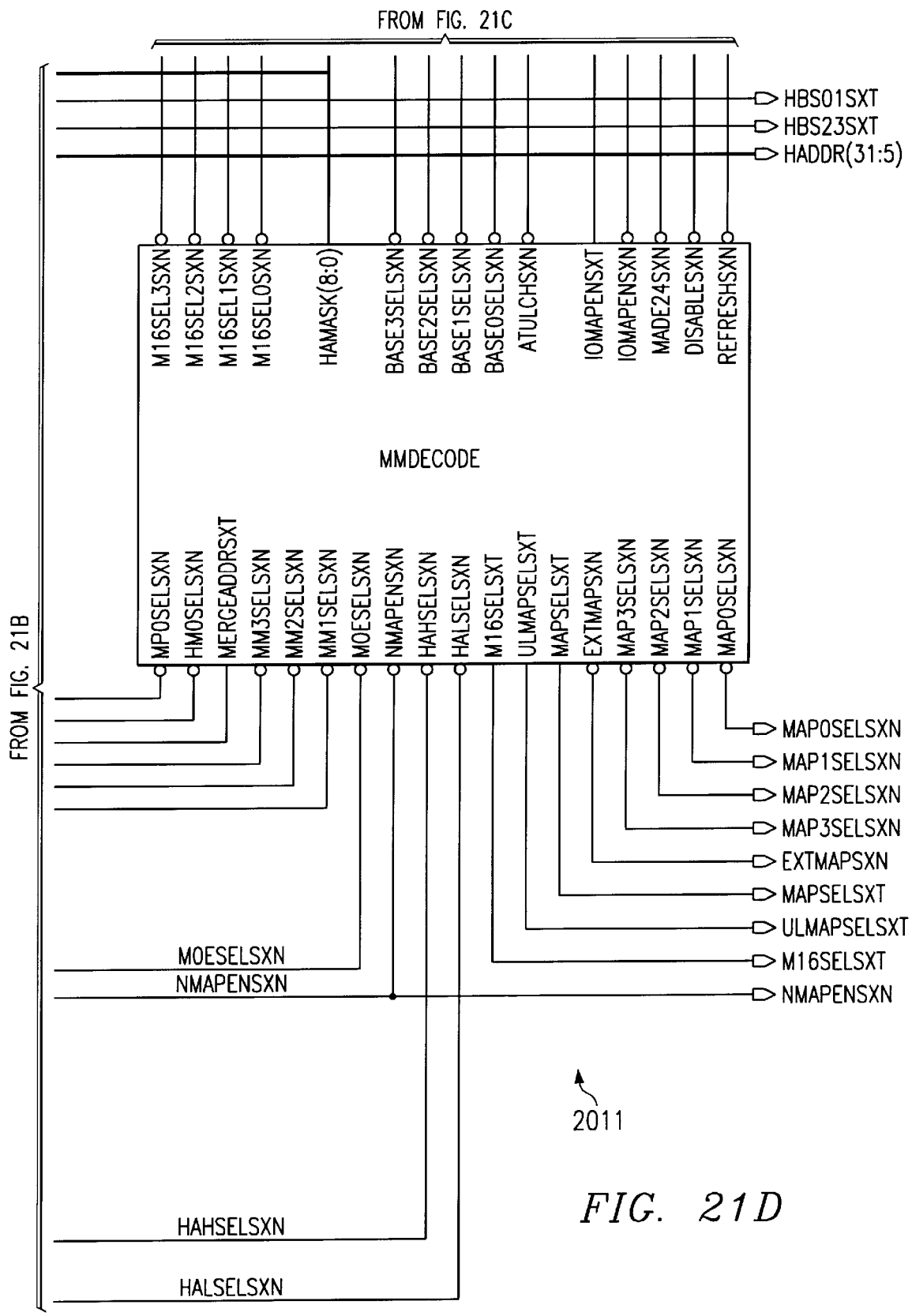

A step 3065 involves operating the graphics processor 120 to enter message passing and/or interrupt control information into both a control register HSTCTLL in the graphics processor 120 and a shadow register 761 of FIGS. 7 and 19 or SHCTLREG of FIG. 22 external of the graphics processor 120 for access in a step 3071 by the host computer 110 free of burden to the graphics processor 120. This communication is advantageously also two way for message passing from the host 110 to the GSP 120 as well as from GSP 120 to host 110.

A succeeding step 3075 monitors the address bus of the host computer to detect addresses indicating VGA graphics operations. A VGASHAD signal is output and the palette 4000 is operated in VGA pass-through mode.

A test step 3081 determines when RESET is called for and loops back to restart operations and begin again with step 3015. If not RESET, then operations proceed to a test step 3085 to determine whether the operating mode is to be reloaded, whereupon a branch is made to step 3021. Otherwise, operations proceed to step 3025 for continual execution of steps 3025–3085.

Figure 59:
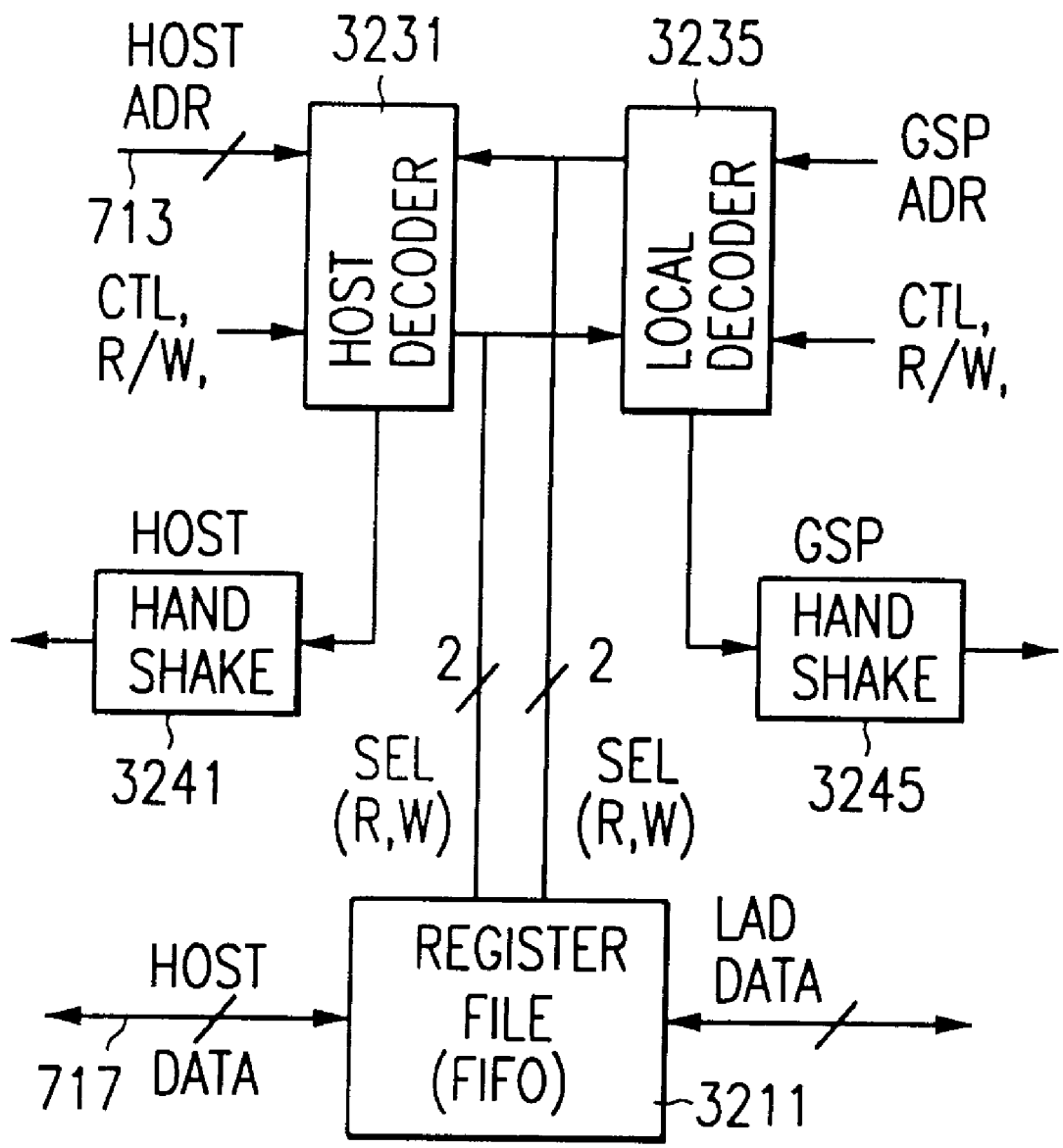
FIG. 59 is a block diagram of a FIFO register file circuit for improved data transfer between a host computer and a graphics coprocessor via the access device.

In FIG. 59, a circuit 3201 is added to the circuitry of FIG. 7 to provide a mechanism wherein host computer 110 writes into a register file 3211, one type of which is a FIFO, on host data bus 717. The data is transferred to GSP 120 via a local LAD data bus. Advantageously, the host computer 110 writes to the FIFO and simultaneously the GSP 120 reads from elsewhere in the FIFO. The host and GSP can independently read or write from different registers. Either computer can read a register while the other writes. This speeds up block data transfers in either direction.

Also, in block data swapping, the host and GSP both write into different locations in the FIFO and then both read out of it. Thus, there are two blocks to be swapped—host pixel data to be displayed and currently-displayed pixels (such as pixels in a graphics window). These two blocks are swapped by concurrent writes of the blocks into the FIFO and concurrent reads out of the FIFO. In this way a data bottleneck in windowing software execution is ameliorated. It is believed that a speed enhancement of 2–6 times is possible by this improvement.

A host address decoder 3231 is connected to a host address bus 713 and maps register file such as FIFO 3211 into a location in host address space. A local address decoder 3235 is connected to the local address bus and maps FIFO 3211 into a location in local address space also. Read/write R/W select lines from both decoders control the register file 3211 for concurrent writes by both host and GSP and then concurrent reads by both. The R/W select lines are also operable for concurrent write by host and read by GSP followed by concurrent write by GSP and read by host. The R/W select lines are further operable for repeated pairs of concurrent operations of write by host and read by GSP (or vice versa).

Decoders 3231 and 3235 are suitably made programmable, according to the principles described in connection with the address translator registers 716, to position them flexibly in the address space of the host 110 and GSP 120. Autoincrement circuits are suitably provided so that the strobe of the read or write access causes autoincrement. Both the programmability and autoincrement features are useful in a memory mapped environment. In a memory mapped environment the GSP space resides in a particular part of the host memory range or segment. When a host access is asserted in the particular memory segment, then a sequence through the FIFO mechanism is made word by word. From a software point of view, this approach is very straightforward, since the host writes into part of its own memory space.

The circuitry of FIG. 59 is also useful in an I/O mapped environment, wherein the host addresses one location and pumps data through that location while autoincrement circuitry sequentially addresses through the target memory.

Decode outputs from each decoder 3231 and 3235 go to the other decoder. When there is contention for the same register in register file 3211, handshake logic circuits 3241 and 3245 provide appropriate handshake signalling such as waitstates or faults for the host and GSP respectively.

A few preferred embodiments have been described in detail hereinabove. It is to be understood that the scope of the invention comprehends embodiments superficially different from those described yet within the inventive scope. For a few examples, color display devices utilized in combination can be raster-scanned cathode ray tube monitors, other raster-scanned devices, devices that are not raster-scanned and have parallelized line or frame drives, color printers, film formatters, and other hard copy displays, liquid crystal, plasma, holographic, deformable micromirror, and other displays of non-CRT technology, and three-dimensional and other nonplanar image formation technologies.

Microprocessor and microcomputer in some contexts are used to mean that microcomputer requires a memory; the usage herein is that these terms can also be synonymous and refer to equivalent things. The phrase processing circuitry comprehends ASIC circuits, PALs, PLAs, decoders, memories, non-software based processors, or other circuitry, or digital computers including microprocessors and microcomputers of any architecture, or combinations hereof. Palette in some contexts refers to a specific look-up table device and in the present work it also comprehends alternative color data word generation combined with one or more associated circuits such as digital to analog converter, selectors, timing controls, and functional and testability circuits and interfaces. Words of inclusion are to be interpreted as nonexhaustive in considering the scope of the invention.

Internal and external connections can be ohmic, capacitive, direct or indirect via intervening circuits or otherwise as desirable. Implementation is contemplated in discrete components or fully integrated circuits in silicon, gallium arsenide, and other electronic materials families as well as in optical-based or other technology-based forms and embodiments. It should be understood that various embodiments of the invention can employ hardware, software or microcoded firmware. Process diagrams herein are also representative of flow diagrams for microcoded and software based embodiments. The terms "register", "latch", and "data storage circuit" are interchangeable herein and each can include or be an example of any other for storing bits—for example, edge triggered circuits, level-sensitive circuits, flip-flops, various memory or other data storage circuits.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to this description. It is therefore contemplated that the appended claims cover any such modifications or embodiments as fall within the true scope of the invention.

Appendix

In FIGS. 20–59:
Signal names obey the following convention:
No fixed length.
Internal signals all end with a three digit qualifier, of which the first character is always S.
The second character is either X, 1, 2, 3 or 4:
  None of the signals derived from the PC bus are synchronous with respect to a master system clock, and are therefore denoted X.
  Some of the signals on the TMS34020 side are clocked using the TMS34020's LCLK1 and LCLK2 clock signals. The four different edges of these two signals each correspond to the beginning of one of the TMS34020's four sub-cycle phases, and signals clocked in one of these phases are denoted with the appropriate number, 1, 2, 3 or 4.
The third character is always T (for active high) or N (for active low).
Input signals have names which correspond to the external signals they are to be connected to, and therefore have no three digit qualifier.

The TMS34094 was designed to operate with either ISA or MCA PC buses. The intention throughout was to execute the design in such a way as to minimise the amount of duplicated logic required. Because of this, there are occasions where some logic appears to be unnecessary (for instance, a signal will always pass through a transparent latch, but the latch is only required in MCA mode, say, and so in ISA mode, the control signal for the latch is such that it is permanently transparent.

This was generally the preferred approach, rather than routing the unlatched signal to the ISA logic, and the latched signal to the MCA logic. For the case of a single signal, the difference between the two approaches is marginal. However, if the signal is a bus, the additional routing required is considerably higher in the second approach.

Because of this, there is almost no logic which is "MCA only" or "ISA only".

TMS34094 Schematics (FIGS. 20–57)

The following sections describe the schematics one by one, descending down the hierarchy from the top. Where multiple blocks exist at the same hierarchical level, they are described in the order which best suits their function and their interraction with the other blocks at the same level.

Top Level—TMS34094—FIG. 20.

This sheet contains the hookup of the four major sub-modules and all the I/O pads. Other features of note at this level are:

The pullup current sources on MRDCMADE24, MWTC-SETUP and SBHE,

The pulldown current sinks on LAA (23:17),

The centrally positioned, multitaped clock driver used to buffer HOE, so reduce the time taken to switch on the LAD (31:0) bus to a minimum.

Address Control Unit—ACU

This unit is concerned with the decoding, mapping and multiplexing of addresses used to access the TMS34020 through the TMS34094. The bulk of the hardware is for manipulating addresses when the TMS34020 is memory mapped into the PC.

Generally speaking, all the blocks placed on the left-hand side are registers, or have a datapath structure. The single block on the right contains control logic. (FIG. 21)

There are a number of addressing possibilities:

If it is a normal memory mapped access, then the upper bits of the address come from the MAP#REG register (MAP0-3 in the specification) corresponding to the selected segment. This is determined by which BASE#REG register (BASE0-3 in the specification) matched the PC address. The lower bits of the address come direct from the PC's address.

If it is an extended mapping memory mapped access (to segment 0), then the upper bits of the address come from MAP0REG, and the lower bits from MAP0EREG.

If it is an I/O mapped access, then the upper bits of the address come from HADDRHREG and the lower bits from HADDRLREG.

The REGADD(31:4) bus is used to carry the bits of the address generated from TMS34094 registers, whereas the PCL (21:0) bus carries the address bits generated by the PC. The merging of the two address components together is controlled by the value on the HAMASK (8:0) bus.

Memory-Mapped Decode—MMDECODE (FIG. 33)

This block is the heart of the ACU, so we shall start here. When an access is made to the TMS34020 through the TMS34094, the address passed through is determined here.

Normal Memory Mapped Mode

This mode is selected when IOE in MODECTL is a 0, and the NM bit in MAP0E is also a zero. These mode bits correspond to signals IOMAPENSXT, IOMAPENSXN and NMAPENSXN being 0, 1, 0 respectively.

The logic in the top left forms a prioritizer which selects which segment of PC memory (if any) is being accessed. A valid segment compare is conveyed on the BASE#SELSXN signals from the four BASE#REG registers. The results of this prioritization are latched with ATULCHSXN, before the address which generated the BASE#ENSXN signals becomes invalid.

The signals resulting directly from this are:

MAP#SELSXN (#=0→3). These signals indicate which MAP0-3 register is selected, if any.

MAPSELSXT indicates that one of MAP0-3 is selected (ie: that at least one of the BASE# SELSXN signals is active, and none of the disabling conditions are true).

ULMAP SELSXT is an unlatched version of the above used to generate handshake signals back to the PC. ISA could use either signal, but MCA requires this unlatched.

This selection mechanism is disabled by a number of signals:

REFRESHSXN is active when a refresh cycle is taking place.

DISABLESXN is active when the TMS34094 is disabled (MCA only), or reset.

MADE24SXN is inactive if a 32-bit address is being used by the PC (MCA only).

IOMAPENSXT is active if the TMS34094 is in I/O Mapped mode.

Having selected a MAP0-3 register, it then controls the multiplexing of this with the address from the PC to generate the address passed to the TMS34020 on HADDR(31:5). This is done in two stages:

1. Drive the contents of the selected MAP0-3 register onto the REGADD (31:4) bus, (FIG. 27)
2. Drive the address merging mask from the associated BASE0-3 register onto the HAMASK (8:0) bus. (FIG. 25)

The signals MM#SELSXN (Map and Mask SELect, where #=1, 2, 3) control both buses for segments 1, 2, and 3 respectively. For reasons associated with extended mapping mode and I/O mapped mode, these functions are controlled by separate signals for segment 0; MP0SELSXN and HM0SELSXN. However, in this mode they are both activated together, and are on as the default, to ensure that the bus is always driven.

The left-facing multi-input AND gates are used to provide protection against bus drive conflict when switching from one register to another.

Extended Memory Mapped Mode

This mode is selected when IOE in MODECTL is a 0, and the NM bit in MAP0E is a one, and only applies to segment 0. These mode bits correspond to signals IOMAPENSXT, IOMAPENSXN and NMAPENSXN being 0, 1, 1 respectively.

This mode causes the following whenever an access is made to Segment 0 (BASE0SELSXN is activated):

EXTMAPSXN is activated to indicate EXTended MAPping.

M0ESELSXN is activated by virtue of the fact that IOMAPENSXT is low, and this means that the contents of MAP0E are output on bits 15→4 of REGADD (31:4).

MERGEADDRSXT is deactivated, to indicate that bits 15→5 of HADDR (31:5) come from the corresponding bits of REGADD (31:4) instead of from the PC's address.

HAMASK (8:0) is loaded with a mask of all 1's (on this sheet) instead of the segment size mask from BASE0, to ensure that bits 31→16 of HADDR(31:5) all come from the corresponding bits of REGADD (31:4). (FIG. 30)

I/O Mapped Mode

This mode is selected when IOE in MODECTL is a 1. This mode bit corresponds to signals IOMAPENSXT, IOMAPENSXN 1, 0 respectively.

This mode causes the following:

HAHSELSXN and HALSELSXN are activated to load the contents of HADDRH and HADDRL onto the upper and lower halves of REGADD (31:0) respectively. (FIGS. 31, 32)

MERGEADDRSXT is deactivated, to indicate that bits 15→5 of HADDR (31:5) come from the corresponding bits of REGADD (31:4) instead of from the PC's address.

HAMASK (8:0) is loaded with a mask of all 1's (on this sheet) instead of the segment size mask from BASE0, to ensure that bits 31→16 of HADDR (31:5) all come from the corresponding bits of REGADD (31:4).

The four M16SEL#SXN signals from the BASE3-0 registers are negative-logic ORed together using a NAND gate, to generate the M16SELSXT signal. This indicates the the $\overline{M16}$ signal output back to the PC can be activated. This is for ISA only.

PC Address Latch—PCALATCH (FIG. 29)

This block simply buffers and selectively latches the address lines from the PC, on the falling edge of ATULCHSXN. This signal comes from CMDLATCH in the DFU.

ISA ATULCHSXN is essentially the same as BALE,

MCA ATULCHSXN is essentially the same as CMD. (See CMDLATCH description for more detail.)

Two buses result:

ULPCA (23:17) are unlatched, and are used for the memory mapped segment compares, and the subsequent generation of $\overline{M16}$ PCA (21:0) is partly latched (significant for ISA only) and is the primary address used in all other decodes, and HADDR (31:5) generation.

Base Registers—BASE#REG (FIG. 25)

This description applies to all four base registers (BASE0-3 in the specification). All are principally identical, with the exception of BASE3REG, which is preset to 0x0C00 at Reset (for BIOS support). The following explanation does not take into account the differences of this register, these should be self evident from the schematic and the brief description above.

The four S375's implement a 16-bit transparent latch, with the two S244's providing the read-back capability.

The bulk of the sheet is taken up by a comparator, or to be precise, two partially combined comparators. Almost all the comparator inputs are maskable (hence the long row of NAND gates).

The primary comparator uses the leftmost three XOR gates and the S608 8-bit comparator to produce an 11-bit address compare of bits 23→13 of the PC address (using ULPCA for the upper 3 bits and PCL for the rest) to the register contents (on bus B#DATA(15:0)). This determines whether the PC address matches the segment base address held in this register (BASE#SELSXN is activated if it does).

The secondary comparator compares bits 23→17 of the unlatched address (corresponding to LA(23:17) from the PC) to the register contents to determine whether the access should assert $\overline{M16}$ (ISA only).

The masking is because the segment size is variable. The larger the segment, the fewer the number of address bits that must be compared. The 4 LSBs of the register hold a code which defines the size of the segment pointed to by this register. The logic on the right turns this code into a mask of 1's on B#MASK (13:5), which in turn selects which bits to use for the address comparison.

B#MASK (13:5) can also be driven out onto the HAMASK (8:0) bus where it is used to control the merging of the associated map register contents with the PC address in the generation of the address sent to the TMS34020 via HADDR (31:5).

Other features of note:

BASE#ENSXN and M16EN#SXN are segment and 16-bit access enables controlled by the BE<3:0> and 16M<3:0> mode bits in MODECTL respectively.

Map Register—MAP#REG (FIGS. 26, 27)

This description applies to all four base registers (MAP0-3 in the specification). All are principally identical, with the exception of MAP3REG, which is preset to 0xF000 at Reset (for BIOS support). The following explanation does not take into account the differences of this register, these should be self evident from the schematic and the brief description above.

The four S375's implement a 16-bit transparent latch. Two of the S244's provide the read-back capability.

The other two S244's allow the register contents to be loaded onto bits 31→16 of the REGADD (31:4) bus, so that they can be used to form the upper part of the address sent to the TMS34020 in Memory Mapped mode.

Figure 28:
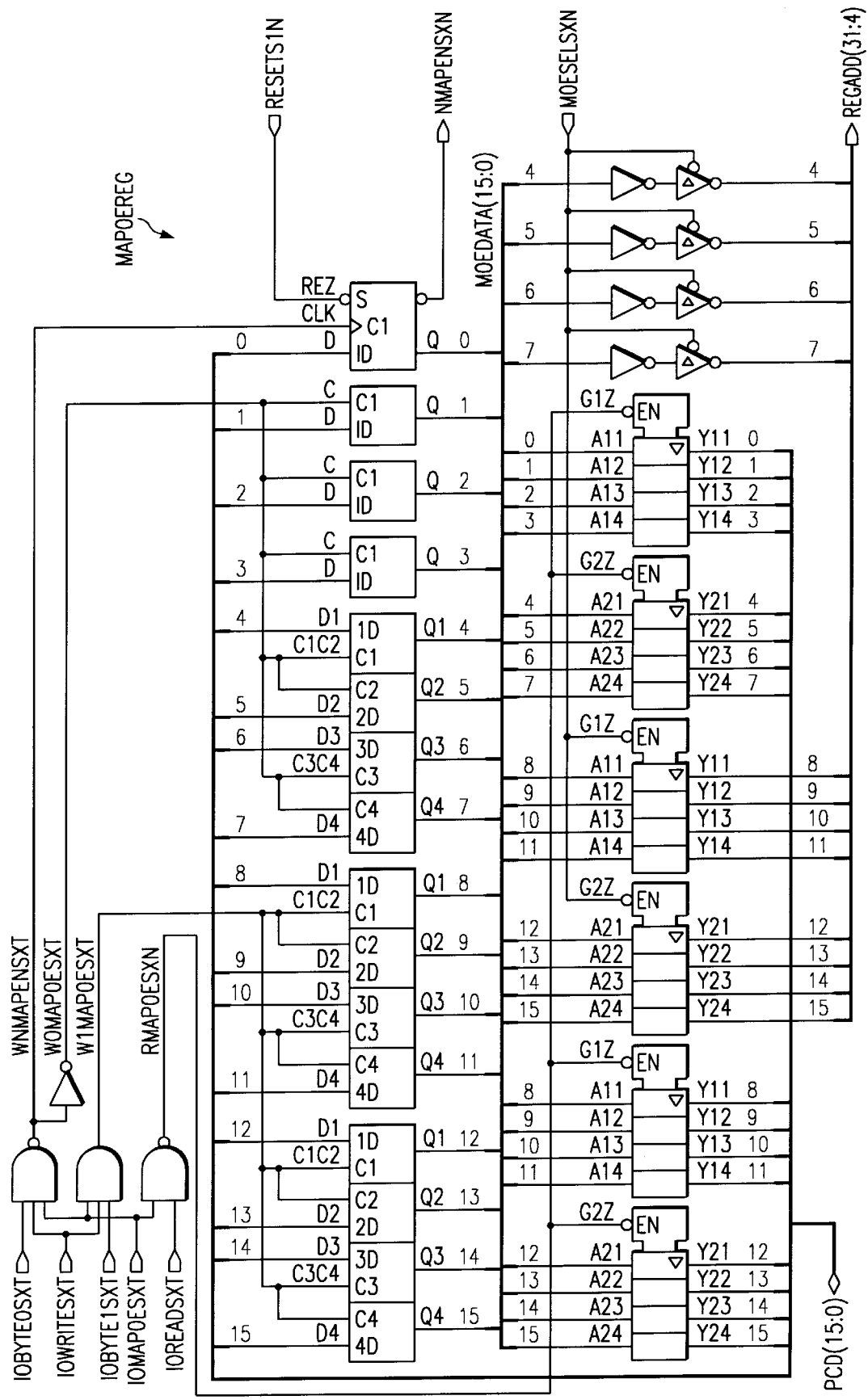
FIG. 28 is a block diagram of an extended map register circuit MAP0EREG in FIG. 21.

Extended Map Registers—MAP0EREG (FIG. 28)

This is MAP0E in the specification. It is identical to MAP#REG (#=0, 1, 2) with the following exceptions:

It can be loaded onto bits 15→4 of REGADD (31:4)

The LSB is the NM mode bit, which is set to one at reset.

Mapped Address Register (High)—HADDRHREG (FIG. 31)

This is is HADDRH in the specification. It is identical to MAP#REG (#=0, 1, 2), except for the control signals used to access it, and to load its contents onto REGADD (31:4).

Mapped Address Rear (Low)—HADDRLREG (FIG. 32)

This is is HADDRL in the specification. It is identical to MAP0EREG except for the control signals used to access it, and to load its contents onto REGADD (31:4), and that the LSB has no special function.

Host Address Mux—HAMUX (FIG. 30)

This block is where the address muxing is actually performed. All controls are generated within the ACU with the exception of the VGASELSXN signal, which is activated during a VGA pass-through access.

Generally, the address output on HADDR (31:5) and the two byte strobe signals HDS01SXT and HBS23SXT can come from two sources; either direct from the PC's address, via PCA (21:0), or from the TMS34094's on-chip address mapping registers, via REGADD (31:4).

The MERGEADDRSXT signal determine which source is used for the byte strobes and bits 15→5 of HADDR (31:5).

The HAMASK (8:0) bus determines which source is used for each of bits 24→16 of HADDR (31:5). This mask is from 0 to 9 contiguous 1's, always increasing from the LS end.

The VGASELSXN sign allows the two LSBs of the PC address to be muxed onto the two MSBs of HADDR (31:5) during VGA pass-through accesses. This allows a particular register within the palette to be selected.

Data Flow Unit—DFU This unit decodes commands from the PC bus (read, write, refresh, etc.), and all performs all address decodes other than those performed in the ACU. It then manages the transfer in to and out of all the TMS34094's registers. In addition, it provides the bulk of the handshake signals back to the PC bus. (FIG. 23)

Command Latch—CMDLATCH (FIG. 39)

This is where all the PC bus access signals are decoded. The organisation follows, moving from left to right:

1. Raw bus signals are grouped together and decoded to select the required operations.
2. These decodes pass through a group of muxes to select between ISA and MCA modes of operation. This is the primary ISA/MCA selection point within the TMS34094. All "A" inputs on the muxes are ISA decodes; all "B" inputs are MCA.
3. The mux outputs are then latched and gated with an enable signal.
4. Appropriate output signals are generated.

Three levels of gating in from the left there is a column of predominantly muxes and AND gates. Descending this column from the top, we have the following functions:

Active Status indicator (MCA only). Always true in ISA mode; true only if $\overline{so}$ or {{~S1}} are active in MCA mode.

Write cycle decode.

Read cycle decode.

The 4-input NAND gate provides a "fast-path" write decode (ISA only), to switch off the WRITESXT signal (and all its variants) quickly. This is because the worst case data hold time after write goes inactive is only 9 ns for ISA. The PCDLCHLSXN and PCDLCHHSXN signals latch the incoming data in the DATAMUX block, and so it is really these two which need to be switched low quickly.

Setup cycle decode (MCA only). Allows access to MCA POS registers.

Address size decode (MCA only). Accesses are only valid if the address is 24-bits, not 32. MADE24SXN low indicates a valid access.

Memory access decode.

Command valid signal (controls latch which drives CMD-VALSXT signal). The purpose of CMDVALSXT is to ensure that all address decodes have stabilised before any selection based on them is made. This is only necessary for MCA, where commands precede or are coincident with the address.

In ISA mode, this signal is always active (low), and CMDVALSXT is permanently high.

In MCA mode, the control signal is low when ADL is low. Thus, decodes gated with CMDVALSXT are not recognised within the chip until the falling edge of ADL. They stay valid until the rising edge of $\overline{CMD}$.

I/O access decode.

Address latch control for ISA. NOR gate inverts BALE, and ensures latches are transparent during reset.

Latch control (this applies to the LAB20 S-R latch and the gates driving it).

In ISA mode, the CMDLCHSXN output is permanently high. This means that (as far as this block is concerned) all the latches in the centre of the sheet are permanently transparent.

In MCA mode, CMDLCHSXN goes low on the falling edge of $\overline{CMD}$, and stays low until the rising edge of the NOACSXT (No ACcess) signal. NOACSXT is high when all four signals which directly control access to the registers are inactive. They go inactive when $\overline{CMD}$ goes inactive. This logic thereby provides an "insurance policy", which guarantees that addresses etc. latched by CMDLCHSXN are not corrupted until after the access is complete. Simply using $\overline{CMD}$ directly, in place of CMDLCHSXN, would have resulted in a potential race condition, where the the address which selects a register for access could become invalid before the access completed.

The decodes described above, once latched with CMDLCHSXN and validated with CMDVALSXT if necessary, are then driven out to the circuit (sometimes buffered), and/or combined to provide the remaining signals leaving on the right. Of these, the following are worthy of note:

| | |
|---|---|
| ULWRITESXT | is an unlatched version of the write decode, used in the VGA pass-through decode (necessary for generation of unlatched handshake signals in MCA). |
| IOREADSXT | is used to control reads of TMS34094 registers. Note the bus contention protection with DRIVEINSXN. |
| IOWRITESXT | is used to control writes of TMS34094 registers. |
| HDWRITESXT | controls writes to the S652 data tranceivers used to pass data through to the TMS34020. HDWRENSXT is active during accesses through to the TMS34020, and comes from HOSTCMD in the LIU. |
| HDREADSXT | controls reads from the S652 data tranceivers used to pass data through from the TMS34020. SETHCSENSXT is active during accesses through to the TMS34020, and comes from HOSTCMD in the LIU. Note the bus contention protection with DRIVEINSXN. |
| MEMACSXT | has a delay buffer in its path. |
| EMEMACSXT | is the original undelayed version of the above signal. |
| ULMEMSELSXN | is unlatched for MCA handshake signal generation purposes, and indicates that the TMS34094 should respond to a PC memory access. The memory access decode described earlier is gated with ULMAPSELSXT, which indicates that the TMS34094 is mapped in at this access's (memory) address. |
| DRIVEINSXN | enables the data latches on the D (15:0) pins to drive the internal data bus. It is active unless a read is in progress. Note the bus conflict protection, which ensures that the register read signals are all inactive before DRIVEINSXN can be activated. |
| DRIVEOUTSXN | Directly controls the tri-state of the D (15:0) pins. This signal is activated if a valid access to the TMS34094 is made, the access is a read, and (for MCA) $\overline{\text{CMD}}$ is active, as indicated by CMDLCHSXN being low. |
| ULIOSELSXN | Like ULMEMSELSXN, but for I/O accesses. The signal IODECSXN is only valid when the PC is mapped in at the (I/O) address of the current cycle. |
| IOSELSXT | as above, but latched. |

Address Decode—IODECODE

In FIG. 41, the PC address is decoded for the purpose of selecting an I/O register.

In the top left, the PC address (on PCA(21:0)) is compared with the address at which the TMS34094 is mapped in. The decodes converge on a 2-input NAND. The top input to this gate is the MCA decode, the bottom one is ISA.

The number of ISA mappings is limited, and encoded on the IOA (2:0) pins, entering this block as IOADDR (2:0).

The MCA mapping is contained within the POSIO register (OSELL and OSELH in the specification). The contents of this register are on the IOMAP (15:5) bus. (FIG. 43A)

A valid I/O address decode activates IODECSXN. This can be inhibited by the following conditions: (FIG. 41)

AENSXT is activated if an ISA DMA cycle is in progress (AEN pin high).

DISABLESXN is activated if the TMS34094 is disabled (MCA only) or reset.

SETUPACSXN is activated if an MCA setup cycle is in progress.

REFRESHSXN is activated if the current cycle is a refresh.

IODECSXN enables a decode of bits 4→1 of the PC address, to select a single 16-bit register. These outputs are latched by the CMDLCHSXN signal from CMDLATCH.

Other decodes in this block are:

| | |
|---|---|
| MCAMODESXT | is decoded from IOADDR (2:0) = 0,0,0. |
| MPBS (2:0) | is a special encoding of bits 4, 2 and 1 of PCA (21:0) which indicates which (if any) of the BASE#REG or MAP#REG registers is being accessed. This is for auto-increment support in the LIU. In this coding MPBS (2) indicates whether or not one of these registers is being addressed, and bits 1 and 0 indicate the segment it is associated with (the value of #). |
| SUPOSIOSXT, SUPOSIDSXT | Select between the two MCA POS registers for Setup accesses. |
| IOBYTE0SXT, IOBYTE1SXT | determine which byte or bytes within the selected 16-bit register are to be accessed, based on bit 0 of the address and $\overline{\text{SBHE}}$. |
| HDBYTE0SXT | is a special version of IOBYTE0SXT used only in the HDATAREG data transceivers. It is activated by VGA pass-through and the T16 bit in MODECTL. |
| ODDBYTESXT | is activated if an 8-bit access to the upper (odd) byte is selected. This causes the upper and lower halves of the internal data bus to be multiplexed together to correctly align the "odd" byte. |

VGA Pass—Rough Address Decoder—VGASHAD

This block decodes addresses of VGA registers shadowed by the TMS34094. Bits 15→10 of the address are only examined in MCA mode. (FIG. 40)

Two outputs are generated; the unlatched version is for the generation of handshake signals back to the PC (specifically, for MCA).

A valid address decode can be prevented by the following conditions:

AENSXT is activated if an ISA DMA cycle is in progress (AEN pin high).

ULWRITESXT is deactivated during reads.

REFRESHSXN is activated if the current cycle is a refresh.

VGASHENSXT is deactivated if VGA pass-through is disabled (SDD in MODECTL=1).

DISABLESXN is activated if the TMS34094 is disabled (MCA only) or reset.

IOACSXT and ULIOACSXT are deactivated if the access is not to I/O space.

Data Multiplexer DATAMUX (FIG. 44)

This block takes the separate input and output data buses connected to the D (15:0) pins, and converts them into one bidirectional bus (PCD (15:0)).

Incoming data is also latched here so that valid data can be driven onto the PCD (15:0) bus even when the TMS34094 is not selected.

ODDBYTESXT facilitates multiplexing the upper and lower halves of the bus together during single byte transfers to odd byte addresses.

PC Bus Handshake Control—PCBUSCTL (FIG. 38)

This block controls all handshake signals fed back to the PC bus, with the exception of CHRDY, which is only partially controlled from here. The functions are as follows:

NOWSSXN controls the $\overline{\text{NOWS}}$ pin, and is asserted whenever a register within the TMS34094 is accessed, unless that register is HDATAL, in which case, the TMS34020 is being accessed via that register address.

PCINTSXT is the interrupt out to the PC, and is controlled by the interrupt in from the TMS34020.

IO16SFDBK is bimodal:
In ISA mode, the $\overline{IO16}$ pin is asserted whenever an I/O access is made to the TMS34094.
In MCA mode, the $\overline{CD\ SFDBK}$ is asserted whenever a valid access to the TMS34094 is made (a memory segment, a register or VGA pass-through).

M16DDS16 is bimodal:
In ISA mode, the $\overline{M16}$ pin is asserted whenever a memory access is made to a segment which is defined to be able to accept 16-bit transfers (by the 16M<3:0> bits in MODECTL), unless T16 is set to enable the special 16-bit software test to be performed, the TMS34094.
In MCA mode, the $\overline{CD\ DS16}$ is asserted as per $\overline{CD\ SFDBK}$.

The PCINT, $\overline{IO16/CD\ SFDBK}$ and $\overline{M16/CD\ DS16}$ signals are all open collector in either ISA or MCA modes, and totem pole in the other. This is achieved using tri-state drivers which (if required to be open collector) are tri-stated when they have a high data value by the appropriate. HIZENSXT signal.

M16ACTIVESXN latches M16SELSXT on the falling edge of BALE/ADL for use by the LIU.

CLRCHRDYSXN (clear CHRDY) and CLRCRYENSXN (clear CHRDY enable) are used for control of the CHRDY signal in MCA mode, as the level output on CHRDY has to be determined early in an MCA cycle (see the CHRDYCTL description).
CLRCHRDYSXN will cause CHRDY to be deasserted low if an access through to the TMS34020 is decoded.
CLRCRYENSXN enables the use of CLRCHDYSXN from when either $\overline{S0}$ or $\overline{S1}$ are activated, until ADL is activated.

POS I/O Map Register—POSIOREG (FIG. 43A)
This is the OSELL and OSELH option registers (1-byte each) in the specification. This register is only accessible during an MCA setup cycle. It is used to hold the I/O space address into which the TMS34094 is mapped, and the CDEN CarD ENable bit.

POS I.D. Regster—POSIDREG (FIG. 43B)
This is the IDL and IDH ID registers (1-byte each) in the specification. This register is only accessible during an MCA setup cycle, and is read only. It is hardwire to the 0x8101 MCA I.D code.

Mode Control Register—MCTLREG (FIG. 42)
This is the MODECTL register in the specification, and contains various mode bits as defined in the spec. It is loaded with zero at reset, with the possible exception of the BE3 bit. This is set according to the level of the BIOSEN pin, so that if BIOS is enabled, memory mapped segment 3 is enabled.

Note the interrupt signal from the TMS34020, HINTSXT entering the S244. This allows the interrupt to be read from this bit.

Local Decode Unit—LDU (FIG. 24)
This unit manages the TMS34020 side of the TMS34094, with the exception of the direct host interface controls. By far the largest proportion of its logic is devoted to the bank select mechanism. In addition, it is also responsible for controlling reset.

Reset controls—RESET (FIG. 47)
This is a counter, which uses the TMS34094 RESDRV pin and the soft reset HRS bit in MODECTL (via the RESDRVSXT and RESETSXT signals respectively) to control the $\overline{RESET}$ output signal, RESETS1N. This signal is also used to reset the internals of the TMS34094.

In order to activate RESET1N, the input Reset signal must be active for a minimum of 4 LCLK cycles. This is to remove the possibility of noise on the reset signal causing a spurious reset. This was observed on the '20 SDB.

Once RESETS1N is activated, it is guaranteed to then stay active until the input Reset is deasserted, or 4 LCLK cycles, whichever is the longest. This ensures that the TMS34020's minimum reset pulse spec is not violated.

Local Address Latch—LALATCH (FIG. 46)
This block latches the address on the LAD (31:0) bus on the falling edge of $\overline{ALATCH}$. $\overline{RAS}$ is included because $\overline{ALATCH}$ is deasserted before the end of the cycle during some TMS34020 coprocessor cycles.

Local Address Decode—LADECODE (FIG. 50)
This block performs various address decodes from the address latched in LALATCH. From top to bottom:
A full decode of the TMS34020's HSTCTLL I/O register address, to allow it to be shadowed.
The next group of gates decode the status code on the 4 LSBs of LA (31:0) and bits 16 and 17, to determine
That a refresh cycle is occuring (REFACS3T active).
Which bank select or selects should be affected. In addition to the address, this is determined by the RM<1:0> bits in BSCTL. These two mode bits are input on the RMODE0SXT and RMODZ1SXT signals.

FPUACS3T is a status code decode for TMS34020 coprocessor accesses (status code=0x0).

VRAMCS3T is a status code decode for TMS34020 VRAM load write mask/colour mask cycles (status codes 0x6 and 0x7).

HOSTACS3N is a status code decode for TMS34020 Host initiated cycles (status codes 0x2).

CPUACS3N is a status code decode for TMS34020 CPU initiated cycles (status codes 0x8).

VGAACS3T is active during TMS34020 host initiated memory cycles caused by VGA pass-through. VGASHADSXT comes from the CHRDYCTL, and becomes active at the end of a VGA pass-through access from the PC. This is because the subsequent TMS34020 memory cycle cannot start until after the end of the PC cycle which initiated it. SSRTS3T controls the SSRT pin. It is activated during non-split register SRT cycles (VIDACS3N is the 0x4 status code decode for SRT cycles). SF=0 indicates that the SRT is non-split. The signal is active for one cycle.

LAD Bus Control—LADCTL (FIG.48)
This block provides access strobes for the TMS34020 side of the S652 data transceivers (in DATAREG), and controls the direction and multiplexing of the LAD bus.
WRITES3T and HD2LASA3N are complementary signals, with the cross-coupled NAND gates aranteeing switching order to prevent bus contention. They are active when a host write cycle is may) occur).
WRITES3T allows the LAD bus to drive the internal LADIO (31:0) bus when it is low. This occurs during TMS34020 host read cycles
HD2LAS3N allows the host data transceivers to drive the internal LADIO (31:0) bus when it is low. This occurs during TMS34020 host write cycles.
During host write cycles, valid data must be on the external LAD (31:0) bus before $\overline{CAS}$ goes w, but can only be driven out when $\overline{HOE}$ goes low. Because of this, the TMS34094 is designed so that the data tranceiver contents are output onto the internal ADIO (31:0) bus in anticipation of a write cycle, so that $\overline{\text{HOE}}$ has only to switch the output rivers on.

Thus, WRITES3T is high and ED2LAS3T is low except when:
1. HDST is low (a host read).
2. $\overline{\text{ALATCH}}$ is high (when the address is coming in).
3. The current access is not a host access. This is clocked with the fall edge of LCLK2, so that the change from input to output occurs after the failing edge of $\overline{\text{ALATCH}}$.

LALATCH is connected directly to LADIO (31:0). HDSTLS2N and HDSTHS2N are the signals used to latch data into the S652's (on their rising edges). They are normally both active simultaneously, unless the access is decoded as being a IZE16 (dynamic bus sizing) access. If this is the case, one or other only is activated. Which one depends on the value of the PSL mode bit, the value of which is on the UPORTSXT signal. DSTLS2N and HDSTHS2N are generated from the HDST input, and are retimed with LCLK2 to allow time for the dynamic bus sizing latch to resolve before they are activated.

The logic at the bottom of the page determines whether the current TMS34020 host cycle is IZE16 transfer or not. Two factors can determine whether the current cycle is SIZE16.

If the value of LAD (4) at the falling edge of $\overline{\text{ALATCH}}$ is a 1, the cycle is a SIZE16 transfer. This will only occur if the TMS34020 cannot perform the access in page mode.

If a host cycle does occur in page mode, it must be a SIZE16 transfer, as this is the only time host cycles are performed in page mode.

The logic contris this as follows:
1. The UNSWAPS1N signal is activated whenever (C(~ALATCH) and (CLCLK1) are high. This clears the latch between non page mode cycles.
2. The S16NOPGMDS3N signal is activated whenever bit 4 of the address (latched on LA (31:0) by LALATCH) is a 1, $\overline{\text{ALATCH}}$ is low and LCLK1 is high. This sets the latch whenever a non page mode SIZE16 is detected.
3. The logic in the centre could be reopfimized somewhat, but basically, it clocks the latch at the end of a host cycle, indicated by HDST going high (a read) or $\overline{\text{HOE}}$ and $\overline{\text{WE}}$ going high (a write). This causes the latch to be set after any host access, in anticipation of a page mode SIZE16 in the next cycle. If this does not occur, item 1 clears the latch.

The two output signals control the data swapping on the upper and lower halves of the LADIO (31:0) and LADOUT (31:0) buses respectively.

LAD Bus Multiplexer LADMUX (FIG. 45)

This block takes the separate input and output data buses connected to the LAD (31:0) pins, and converts them into one bidirectional bus (LADIO (31:0)).

WRITES3T determined whether data is driven in on LADIO (31:0) from here or not.

S16SWAPLS4T and S16SWAPLS4T facilitates swapping the upper and lower halves of the bus when performing SIZE16 accesses. They are separated for electrical reasons as their loading is high.

Bank Select Control Register—BSCTLREG (FIG. 51)

This is the BSCTL register in the specification, and contains various mode bits as defined in the spec. It is loaded with zero at reset.

Note the S161a counter used to provide the autoincrementing pointer for accessing the Bank Select registers. This counter has some special control:

Writes to the lower byte of this register cause the WBSCNTSXN (write to counter) signal to be activated, and the BSCTLCLKSXT (counter clock) to be primed low. At the end of the cycle, both signals go high. The clock signal strobes the data through into the counter. The S161a requires that the rising edge of the clock occur whilst the load signal is active. This is the purpose of the LAB 10 S-R latch.

Reads or writes of the upper byte of the BSPORT address (ie: the bank select register pointed to by the counter) cause the counter to be incremented by the rising edge of BSCTLCKSXT.

Bank Select I/O Address Decode—BSDECODE (FIG. 49)

Access to the bank select registers is via a second level of address mapping, using the pointer in the BSCTL register. When an access to the BSPORT register is decoded by IODECODE, The pointer value (BSPNT(3:0)) is decoded to select one of the sixteen bank select registers.

Bank Select Address Register—BSAD#REG (FIG. 52)

These are the BSAD#L and BSAD#H register pairs in the specification. Each block contains one pair of 16-bit registers. They are used to contain the address values with which the address latched from LAD (31:0) will be compared. The BSA# (31:0) bus carries the value out.

Bank Select Mask Register—BSMK#REG (FIG. 54)

These are the BSMK#L and BSMK#H register pairs in the specification. These are identical to the BSAD#L and BSAD#H register pairs, except in the use of their outputs.

Bank Selected Comparators—BS#COMP (FIG. 53)

These are four 32-bit comparators used to determine the values to be output on the BSEL (3:0) pins.

BSA# (31:0) is compared to LA (31:0). Those bits irrelevant to the compare am masked out by BSM# (31:0), via the rows of NAND gates.

Each S688 8-bit comparator has a different enable signal. Thus, special decodes can disable the regular address comnpanson. There are four signals which do this, and they are all status code decodes performed in LADECODE.

When the compator is disabled, other overriding conditions can take effect:

The BVEN<3:0> mode bits determine which banks are selected during a VRAM access.

The BDRD<3:0> mode bits determine which banks are selected during a Refresh cycle, along with the refresh pseudo address decode on the REFAC#S3N signal.

In addition, all banks can be enabled via the ALLBSELSXN signal, derived from the ABD mode bit. This can be overridden by a VGA pass-through access.

Local Interface Unit—LIU (FIG. 22)

This is the smallest submodule, but it contains far and away the most intricate and complicated logic in the HOSTCMD block. It is concerned with managing the TMS34020's host interface, the CHRDY signal back to the PC, and the shadowing of the TMS34020's HSTCTLL register.

Host Command Logic—HOSTCMD (FIG. 35)

On the right are latches defining the three output signals to the TMS34020; $\overline{\text{HCS}}$, $\overline{\text{HREAD}}$ and $\overline{\text{HWRITE}}$. The fourth latch is for controlling access to the S652 data transceivers, and is explained later.

In the centre there seven latches in a column. These can be split into three groups (the logic at the top is related to the top group, and will be explained later). They provide pulses for setting and clearing the above signals' latches:

The two latches in the centre control the setting of the signals (ie: the falling edges).

The two latches at the bottom control the clearing of the signals (ie: the rising edges).

The three latches are the top control the clearing of $\overline{HCS}$ when one of the autoincrement modes is selected. These are involked by I/O mapped mode (IOE=1), extended memory mapped mode to segment 0 (IOE=0 and NM=0), or memory mapped reads with the AI bit=1. In these modes, $\overline{HCS}$ is normally held low between accesses. It is only cleared when a new address is required. This is referred to as forcing clear, or simply forcing $\overline{HCS}$ in the ensuing description.

On the left is the logic which control the column of latches.

The latches are mostly clocked by the HCSCLKSXT signal. This signal is controlled by two delay-line one-shots, one for ISA and one for MCA. The result is a high-going pulse at each of the following times:

ISA Each edge (rising and falling) of BCLK. This results in two pulses per BCLK cycle.

MCA Each edge (rising and falling) of ADL, $\overline{S0}$ or $\overline{S1}$. This results in four pulses per MCA cycle.

The three groups of latches and their control are discussed in the following sections.

Set Logic

The signal latches are all set using the Preset pins on the latches. The pulse which causes the HCS latch to be set is SETHCSSXN. This is triggered by the SETHCSENSXT signal, which clocks the latch. This signal is activated whenever an access through the TMS34094 to the TMS34020 is detected, that is to say, A memory mapped access, indicated by MEMACSXT and MAPSELSXT being active.

An I/O mapped access to the HDATA transceivers, indicated by IOHDATASXT, IOSELSXT and IOMPENSXT.

A VGA pass-through access, indicated by VGASELSXN. The reason for the latch delaying through the DTC10 is explained in paragraph 4.4.1.5.

On the next HCSCLKSXT edge, SETHCSSXT causes the CLRSETSXN signal to be set, which in turn clears the SETHCSSXN signal. The only exception to this is if the force logic is activated, and FRCHCSSXN is low, in which case SSETHCSSXN will stay active until the next clock edge.

Notice that SETHCSSXN controls the SETHRWSXT signal, which causes the HREAD or HWRITE latch to be set. The logic with which STEHCSSXN is conditioning is described below.

Clear Logic

The signal latches are all cleared using their D and CLX pins. This is therefore a two-stage process. The HCS latch is cleared in a slightly different manner from the HREAD and HWRITE latches.

Looking at the dock signals first:

The CLRHRWENSXT signal is SETHCSENSXT inverted. It therefore has a rising edge at the end of any access through to the TMS34020.

The CLRHCSENSXT signal is identical to CLRHRWENSXT, except that it is not primed by an I/O mapped access, as I/O mapped accesses are auto-increment accesses, and $\overline{HCS}$ is not deasserted at the end of the access; it is forced inactive when HADDRL or HADORH are accessed.

The value present on the D pins on the rising edge of CLRHRWENSXT and CLRHSCENSXT determined whether the latches are actually cleared. Both CLRHRWSXT and CLRHCSSXT signals are controlled similarly:

They are driven inactive by CLRCLRSXN, which is low when BALE is high (ISA) or ADL is low (MCA).

They are then clocked to the appropriate value on the rising edge of SETHCSSXN.

When clocked,

CLRHRWSXT is activated unless FSTBYTSXN is low.

CLRHCSSXT is activated unless FSTBYTSXN, AIACSXN or EMAPACSXN are low.

The significance of these signals is as follows:

| | |
|---|---|
| FSTBYTSXN | If the PC is using an 8-bit data bus, the 16-bits of data for a single access to/from the TMS34020 are to be transfered as two bytes, one after the other. $\overline{HCS}$ and $\overline{HREAD}$ or $\overline{HWRITE}$ are not deasserted at the end of the first access (see FIG. 13). The TMS34020 access will be extended over into the next PC access if: It is not a VGA pass-through access (this is the only time when a single byte can be transfered), and IOBYTE0SXT is active, indicating that the lowerr byte is being accessed, and Either $\overline{SBHE}$ is active, or its a memory mapped access and $\overline{M16}$ is disabled. |
| AIACSXN | If the access is a memory mapped read and the AI mode bit is set, $\overline{HCS}$ should be maintained low between accesses. |
| EMAPACSXN | If the access is an extended memory mapped access, $\overline{HCS}$ should be maintained low between accesses. |

The output of each signal latch is fed round to the input. This ensures that if CLRHCSSXN or CLRHRWSXN are not active, then the latch maintains its current state when clocked.

Force Logic

This controls only the HCS latch directly, via its Clear pin. However, it also affects the duration of the SETHCSSXN signal and conditions this in the generation of the SETHRWSXT signal.

The FRCHCSSXN signal is clocked by the 5-input NAND slightly above the centre of the diagram. Any access which could cause the HCS latch to be forced clear causes a rising edge on the output of this gate. The five conditions are as follows, from the top:

| | |
|---|---|
| SEGCHACSXN | is activated if there is a memory mapped access to a segment other than the previous access. The S375 at top left contains the segment selection of the previous access. This is compared with the current segment selection, and this signal is activated if they are different. The SETHRWSXT signal then updates the S375 in preparation for the next access. |
| {MPBSACSXN} | is activated if an access to the MAP3-0 or BASE3-0 register associated with the current segment (latched in the S375) is made. (If either of these registers are accessed, a new address must be provided to the TMS34020.) The MPBS (2:0) bus contains a condensed decode of the I/O register address; bit 2 indicates an access to MAP3-0 or BASE3-0, and bits 1 and 0 encode the associated segment number. |
| VGASELSXN | indicates that a VGA pass-through access is occuring. A new address must therefore be passed through to the TMS34020. |
| M0EACSXN | Performs the same type of function as MPBSACSXN, but for accesses to MAP0E in extended mapping mode. |

-continued

| | |
|---|---|
| HADDRACSXN | is activated if an access to HADDRL or HADDRH occurs in I/O mapped mode. If this occurs, a new address must be passed to the TMS34020. |

Whether or not FRCHCSSXN is activated depends on the value of the HCSLCHSXT signal. This is basically $\overline{HCS}$ latched with BALEADL. If $\overline{HCS}$ is already inactive high, there is no need to force it inactive high, and so FRCHCSSXN is not asserted.

Once set, FRCHCSSXN causes the CLRFRCSXN signal to be activated on the next HCSCLKSXT edge, which in turn clears the FRCHCSSXN signal. This signal is therefore only ever active for the time between two HCSCLKSXT pulses.

When active, FRCHCSSXN prevents SETHCSSXN (which can be activated at the same time in memory mapped mode) from being cleared. When both active, FRCHCSSXN dominates over SETHCSSXN to cause the HCS latch to be cleared. SETHCSSXN can then set HCS after FRCHCSSXN has gone inactive.

The net effect of FRCHCSSXN is to cause $\overline{HCS}$ to be taken inactive high at the time it would normally be brought low, and extending the SETHCSSXN signal so that $\overline{HCS}$ can be taken active high on the next HCSCLKSXT edge.

Forcing Implication—HREAD and HWRITE latches

In memory mapped mode with autoincrement, an access can be to a different memory segment than the previous one. This means that $\overline{HCS}$ is forced high before it is set low, all during the same PC access.

Normally, the HREAD or HWRITE latch is set at the same time as the HCS latch. However, when HCS is forced clear, the setting is delayed by one HCSCLKSXT period. This relies on the fact that the Clear input to the latch dominates over the Preset input, and works because the latch is always active when the force occurs.

The setting of the HREAD and HWRITE latches is also delayed, otherwise there is the possibility that $\overline{HREAD}$ or $\overline{HWRITE}$ could be activated just before HCS was cleared, causing the TMS34020 to see a short access glitch where $\overline{HCS}$ and one of either $\overline{HREAD}$ or $\overline{HWRITE}$ were active simultaneously.

The "clear dominance" method employed to delay the setting of HCS is not used for HREAD or HWRITE because the latches are already cleared when the force and set occur. If SETHCSSXN was activated just before FRCHCSSXN a glitch would be caused on the $\overline{HREAD}$ or $\overline{HWRITE}$ signals.

An alternative method is therefore employed, and this is the function of the logic at the very top of the diagram. Before SETHRWSXT is activated, SETHRWENSXN is to be low. It will be high if a segment change is about to take place, as this is the only time the setting of HCS is delayed by FRCHCSSXN being active:

SEGCHCSXN is the address decode part of SEGCHACSXN. It is active low if the current address does not match the current memory segment.

If $\overline{HCS}$ was latched as being active low before the current cycle began, HCSLCHSXN will be active low, and this indicates the FRCHCSSXN will become set.

The 3rd NOR gate input will be low until CLRFRCSXN becomes active. Until this occurs, SETHRWENSXN will be inactive high.

Thus SETHRWSXT is prevented from being activated until FRCHCSSXN is deasserted.

The left-facing 2-input NOR gate feeding into SEGCHACSXN and SEGEMCGSXN is to prevent glitches occuring on these signals due to the reloading of the S375.

Forcing Implications—VGA Pass-Through Accesses

Unlike a segment change, there is no way to anticipate that a VGA access is going to happen. Thus, it is not possible to generate an "early warning" to prevent $\overline{HREAD}$ or $\overline{HWRITE}$ from being activated too soon. Because of this, a latch is used to delay the activation of the SETHCSENSXT signal by one HCSCLKSXT period. This ensures $\overline{HCS}$ and (in this case) $\overline{HWRITE}$ is not set until after $\overline{HCS}$ is forced clear. This is a rather brute force mechanism, as it delays the assertion of $\overline{HCS}$ regardless of whether a force is necessary. However, access speed is not perceived to be a problem during VGA pass-through writes.

Other logic in this block:

ICLCHRDYSXN is basically the same as an inverted SETHCSENSXT, except that it uses VGASELSXN instead of VGADLYSXN. This is for deasserting CHRDY in ISA mode.

CLRZ pin to the TAB20. Thus, if the PC makes an access to an odd 16-bit address, the upper half is selected, and vice versa Tee only exception to this are VGA pass-through accesses, which always select the lower half.

If $\overline{HCS}$ is held active between subsequent accesses, the CLX pin of the TAB20 is used to toggle between the two halves. This is primarily achieved by the lower input to the CLK NAND gate. In this case, CLKRHTNSXT, HREADSXT and KMTESXT all high causes a toggle. This condition occurs jut after an access to the TMS34020.

The TMS34020's prefetch after write mode complicates the matter however, as it allows a read and a write to the same location to occur before incrementing the address (and toggling the register half). As the TMS34020 mode bits controlling this are unknown to the TMS34094, an alternate method is used. This relies on the fact that normally, only all reads or all writes can be strung together in an access sequence with $\overline{HCS}$ held low throughout. Thus, if both $\overline{HREAD}$ and $\overline{HWRITE}$ are activated in the same sequence, the TMS34094 can deduce that the half should be toggled only after the write. In fact, as the TAB20 is always toggled at the end of an access, the action taken is to toggle it again at the beginning of the write access, having the effect that the write occurs to the same half as the preceeding read.

This is achieved with the LAB10 S-R latch, which records the fact that $\overline{HREAD}$ has been activated until $\overline{HCS}$ is deasserted high. If $\overline{HWRITE}$ is activated and this latch is set, the TAB20 is clocked when SETHCSSXT is activated, provided the access is not a serialised byte access to the odd byte.

Shadow HSTCTLL Register—SHCTLREG (FIG. 36)

This is the SHDHCTL register in the specification. This register shadows the lower byte of the TMS34020's HSTCTLL register, and mimics all the write protection mechanisms provided in the TMS34020. This allows the PC to accurately poll the state of the TMS34020's host interrupts and messages without actually accessing the TMS34020.

The write protect mechanisms are outlined in the specification. A write to the lower byte of the TMS34020's HSTCTLL register is detected as follows:

HCTLACS3N is a decode of the register's address.

CASS2N comes from the $\overline{CAS2}$ pin, and indicates that the relevant byte is being accessed.

WES1N comes from the $\overline{WE}$ pin, and indicates a write.

Having selected the register, the status code decode determines whether the access was initiated by the TMS34020's CPU (CPUACS3N) or the PC (HOSTACS3N).

The two S273's are to provide data synchronisation to the PC. This works as follows:

1. SHCTLCLKST causes the first S273 to be updated on either the falling edge of BALE or the rising edge of ADL. It also causes the control latch on the right to be updated. This latches a delayed version of HCTLWRS2T. If HCTLWS2T is low or (due to the delay) has only just gone high), this indicates that the data latched into the first S273 may not be valid.

2. The next time a rising edge occurs on SHCTLCLKSXT, the output of the control latch determines that VUCLSXT is only activated if the contents of the first S273 are valid. Thus only valid data should be loaded into the second S273, and subsequently read by the PC.

What is claimed is:

1. A multifunction access circuit for use with first and second digital computers each having an address bus for supplying addresses and a data bus for transferring data, the access circuit comprising:

a register file having a first data port including inputs and outputs connected to the data bus of the first digital computer and a second data port including inputs and outputs connected to the data bus of the second digital computer, said register file having a plurality of storage locations for storing data, and said register file capable of transferring data between said first data port and a first selected storage location simultaneously with transferring data between said second data port and a second selected storage location different from said first selected storage location;

a first address decoder connected to the address bus of the first computer and said register file, said first address decoder translating an address received on the address bus of the first computer into a first storage location of said register file;

a second address decoder connected to the address bus of the second computer and said register file, said second address decoder translating an address received on the address bus of the second computer into a second storage location of said register file; and at least one of said first and second address decoders being programmable to position it in an address space of said corresponding first or second computer.

2. The access circuit of claim 1 further comprising:

a first handshake circuit connected to said first address decoder and the first digital computer;

a second handshake circuit connected to said second address decoder and the second digital computer; and said first and second address decoders are connected to each other whereby when said first storage location of said first address decoder is equal to said second storage location of said second address decoder a selected one of said first handshake circuit or said second handshake circuit signals the corresponding first or second digital computer a memory waitstate.

3. The access circuit of claim 1 further comprising:

a first handshake circuit connected to said first address decoder and the first digital computer;

a second handshake circuit connected to said second address decoder and the second digital computer; and said first and second address decoders are connected to each other whereby when said first storage location of said first address decoder is equal to said second storage location of said second address decoder a selected one of said first handshake circuit or said second handshake circuit signals the corresponding first or second digital computer a memory fault.

4. A computer graphics system for block data swapping comprising:

a host computer having a host bus including a host address bus for supplying addresses and a host data bus for transferring data;

a graphics processor having a local address bus for supplying addresses and a local data bus for transferring data; and an access circuit having a register file having a first data port including data inputs and outputs connected to the host data bus of said host computer and a second data port including data inputs and outputs connected to the local data bus to the graphics processor, said register file having a plurality of storage locations for storing data, and said register file capable of transferring data between said first data port and a first selected storage location simultaneously with transferring data between said second data port and a second selected storage location different from said first selected storage location;

a first address decoder connected to the address bus of the host computer and said register file, said first address decoder translating an address received on the address bus of the host computer into a first storage location of said register file;

a second address decoder connected to the address bus of the graphics processor and said register file, said second address decoder translating an address received on the address bus of the graphics processor into a second storage location of said register file;

at least one of said first and second address decoders being programmable to position it in an address space of said corresponding first or second computer.

5. The computer graphics system of claim 4 further comprising:

a first handshake circuit connected to said first address decoder and the host computer;

a second handshake circuit connected to said second address decoder and the graphics processor; and said first and second address decoders are connected to each other whereby when said first storage location of said first address decoder is equal to said second storage location of said second address decoder a selected one of said first handshake circuit or said second handshake circuit signals the corresponding host computer or graphics processor a memory waitstate.

6. The computer graphics system of claim 4 further comprising:

a first handshake circuit connected to said first address decoder and the host computer;

a second handshake circuit connected to said second address decoder and the graphics processor; and said first and second address decoders are connected to each other whereby when said first storage location of said first address decoder is equal to said second storage location of said second address decoder a selected one of said first handshake circuit or said second handshake circuit signals the corresponding host computer or graphics processor a memory fault.

* * * * *